US012577853B2

(12) United States Patent
Holland

(10) Patent No.: US 12,577,853 B2
(45) Date of Patent: Mar. 17, 2026

(54) SYSTEM, METHOD AND APPARATUS FOR GENERATING ELECTRIC POWER FROM SUBSURFACE WELLS

(71) Applicant: David Holland, Humble, TX (US)

(72) Inventor: David Holland, Humble, TX (US)

( * ) Notice: Subject to any disclaimer, the term of this patent is extended or adjusted under 35 U.S.C. 154(b) by 0 days.

(21) Appl. No.: 18/608,666

(22) Filed: Mar. 18, 2024

(65) Prior Publication Data

US 2024/0376854 A1 Nov. 14, 2024

Related U.S. Application Data

(63) Continuation-in-part of application No. 17/718,391, filed on Apr. 12, 2022, now Pat. No. 11,933,147.

(51) Int. Cl.
*E21B 41/00* (2006.01)
*E21B 43/12* (2006.01)
(Continued)

(52) U.S. Cl.
CPC ............ *E21B 41/00* (2013.01); *E21B 43/121* (2013.01); *E21B 43/40* (2013.01); *F03B 13/00* (2013.01)

(58) Field of Classification Search
CPC .... E21B 43/128; E21B 41/0085; E21B 41/00; E21B 43/121; F03B 17/062; F03B 13/00; F03B 13/02; F05B 2240/12; Y02E 10/20
See application file for complete search history.

(56) References Cited

U.S. PATENT DOCUMENTS 4,967,559 A * 11/1990 Johnston ................ B01D 53/52 60/685
11,643,904 B1 5/2023 Rosenholm
(Continued)

FOREIGN PATENT DOCUMENTS

WO WO2023064320 A1 4/2023

OTHER PUBLICATIONS

International Search Report and Written Opinion, mailed Jul. 3, 2025.

*Primary Examiner* — Brad Harcourt
(74) *Attorney, Agent, or Firm* — Kirby Drake

(57) ABSTRACT

A system, method, and apparatus for generating kinetic energy electricity production concurrent with thermal energy electricity production, chemical energy electricity production or any other electricity production concurrent with kinetic energy power production from a plurality of subsurface wells penetrating or terminating in fluid-bearing, subterranean zones or intervals containing energy producing components which may include heat, fluid flow, pressure, hydrocarbons, water, water comprising sodium chloride of varying concentrations, water comprising hydrogen, hydrocarbons comprising hydrogen, hydrogen alone, or any other energy producing components, or any combination thereof, of these energy producing components. The system involves methods and apparatus summarized in a six-step process that includes: Phase 1—Fluid Production, Phase 2—Fluid Gathering and Combination, Phase 3—Kinetic Energy/Thermal Energy Electricity Cogeneration, Phase 4—Fluid Processing, Phase 5—Kinetic Energy/Chemical Energy Electricity Cogeneration and Phase 6—Fluid Pumping, Distribution, and Injection.

16 Claims, 34 Drawing Sheets

(51) Int. Cl.
*E21B 43/40* (2006.01)
*F03B 13/00* (2006.01)

(56) References Cited

U.S. PATENT DOCUMENTS

| | | | | |
|---|---|---|---|---|
| 11,933,147 | B2 * | 3/2024 | Holland | F03B 17/062 |
| 2006/0048770 | A1 * | 3/2006 | Meksvanh | F24T 10/20 126/620 |
| 2008/0017369 | A1 * | 1/2008 | Sarada | E21B 43/40 166/266 |
| 2009/0056944 | A1 * | 3/2009 | Nitschke | E21B 43/40 166/272.3 |
| 2012/0260655 | A1 | 10/2012 | Kaplan et al. | |
| 2014/0174745 | A1 * | 6/2014 | Harrison | C02F 9/00 166/305.1 |
| 2021/0325089 | A1 | 10/2021 | Toews et al. | |
| 2021/0363854 | A1 * | 11/2021 | Tu | E21B 23/01 |
| 2022/0282695 | A1 * | 9/2022 | Peviani | E21B 43/38 |

* cited by examiner (A - A)

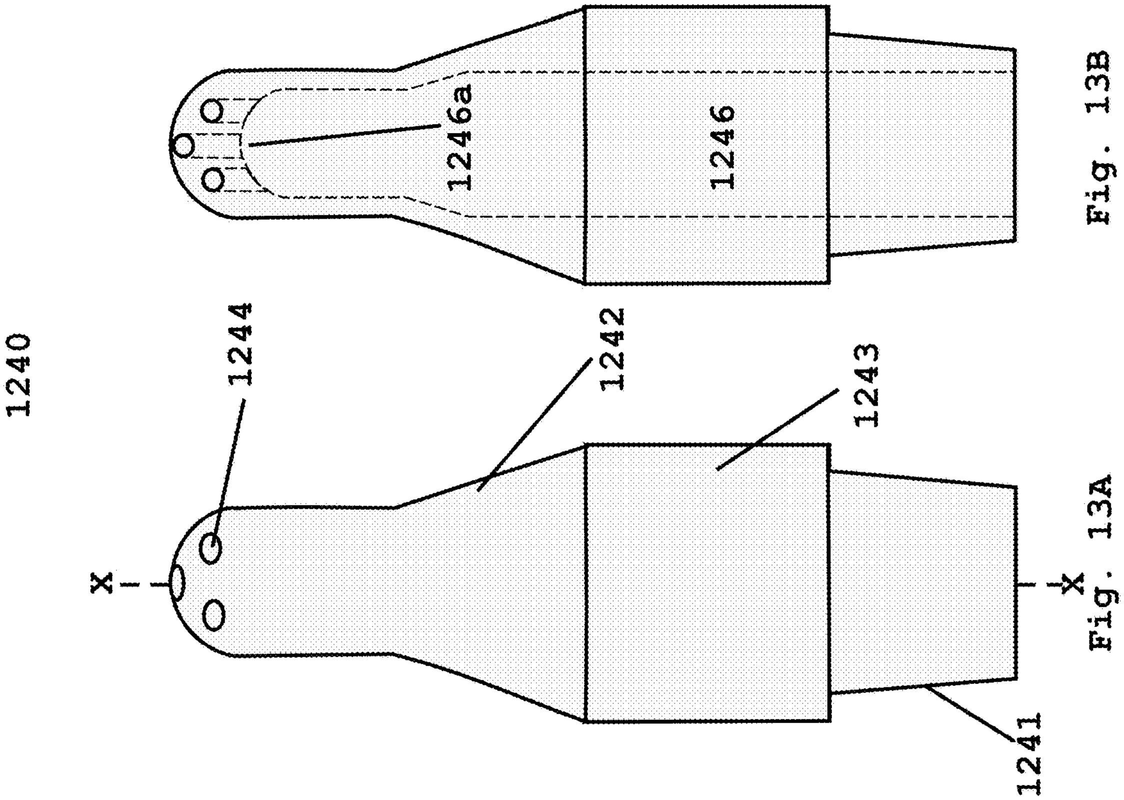
Fig. 13B
Fig. 13A
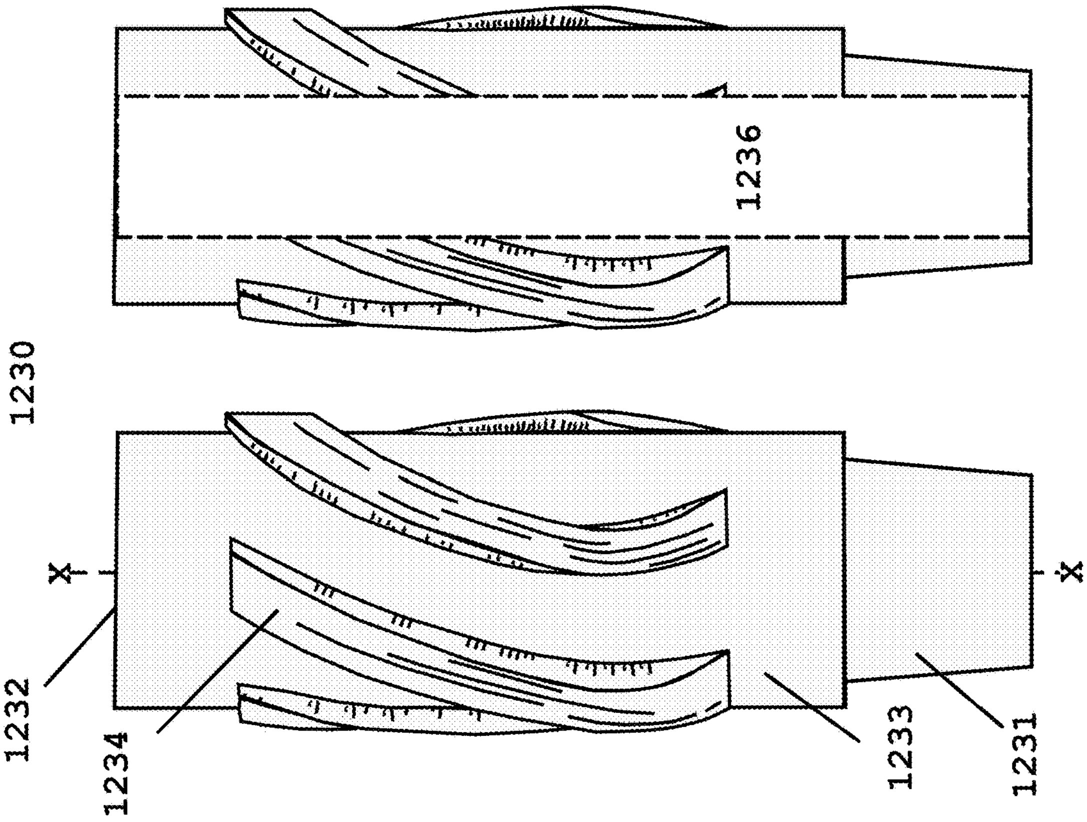
Fig. 12B
Fig. 12A (A - A)

(A - A)

1300
1312
1311
1313
1317
1318
1323
1323-1
1323-2
1323-3
A
B

Section A - A

Section B - B

Section A - A

SYSTEM, METHOD AND APPARATUS FOR GENERATING ELECTRIC POWER FROM SUBSURFACE WELLS

RELATED APPLICATIONS

This application is a continuation-in-part of U.S. application Ser. No. 17/718,391 filed Apr. 12, 2022, by David Holland entitled "System, Method, and Apparatus for Generating Hydroelectric from Subsurface Wells" the disclosure of which is incorporated herein by reference for all purposes.

FIELD OF THE DISCLOSURE

The present disclosure generally relates to electric power generation and, more particularly, to power generating systems, methods and apparatus for accessing and producing fluid from subterranean zones that contain water as the primary fluid, water that may include hydrocarbons, water containing hydrogen, water that may be heated from heat sources originating below the surface of the earth, water that may contain sodium chloride, water that may contain any other energy producing components, or any combination thereof, for the purpose of generating hydroelectric power, cogenerating hydroelectric power together with power generated from thermal heat, cogenerating hydroelectric power together with power generated from chemical components contained within the fluid (e.g., hydrocarbons, hydrogen, or other chemical components), or any combination thereof, used for electricity production from energy generation components contained within the water, and produced from subsurface wells.

BACKGROUND

Patent application Ser. No. 17/718,391 entitled "System, Method, and Apparatus for Generating Hydroelectric Power from Subsurface Wells" introduced a System, Method and Apparatus for generating hydroelectric power from subsurface wells. The largest surface sourced hydropower plant globally is the Three Gorges Dam located on the Yangtze River in China. The height of Three Gorges is 181 M (~594 Ft.) with a design head of 139.5 M (~460 Ft.), which equates to a pressure of approximately 200 psi, combined with a maximum design discharge water flow rate of 966.4 $m^3$/sec., results in an installed capacity of 22,500 MW output (USGS, 2018). One $m^3$/sec is equivalent to approximately 543,440 BPD, provided as a comparison to flow rate capacity that would be required for subsurface wells used for hydropower. As shown by the aforementioned example of Three Gorges Dam, electricity generation from hydropower requires pressure and flow rate. For surface sources of water, hydropower electricity production is typically provided via low pressure combined with a very high water flow rate that results as water moves in a river or stream due to a geographic change in elevation, or contained water falls from a certain elevation created by a dam height. For subsurface sources of water, electricity generation will be accomplished by producing fluids at much lower flow rates, compared to surface sources of water, combined with much higher pressures, equating to extremely high head levels, thousands of feet, that are typically not possible for surface sources of water. For example, for a subsurface power generation facility with 30 wells each producing 50,000 BPD from one well, completed in one subsurface reservoir, with a producing pressure of 1,500 psi, equivalent to approximately a 3,460 ft. head, the single well producing from a single subterranean zone, strata or reservoir could generate approximately 700 kilowatt (KW) of electricity, and for 30 wells, this is approximately 21,000 KW of power. When producing from multiple reservoirs, for example, three reservoirs simultaneously from one well, each reservoir producing 50,000 BPD with a pressure of 1,500 psi, the electrical generation capacity increases to approximately 2,100 KW (2.1 megawatt, MW) per well per day, or a total of 63,000 KW per day for 30 wells (63 MW per day). For comparison, according to the U.S. Energy Information Administration, the average U.S. home uses 893 Kilowatt-hours (kwh) of electricity per month. Per the U.S. Wind Turbine Database, the mean capacity of wind turbines that achieved commercial operations in 2020 is 2.75 MW with the average wind turbine generating over 843,000 kWh per month, enough to power 940 average U.S. homes (United States Geological Survey). Of significance, is the fact that for hydropower from subsurface wells to become an economically viable technology, each producing well will be required to produce fluids at the highest possible rate combined with the highest possible pressure.

Development of technology making use of subsurface wells and subterranean zones, strata or reservoirs for the purpose of generating hydroelectric power now creates a method to improve existing conventional geothermal, enhanced geothermal and hydrocarbon energy generation technology that will eliminate or at least reduce the primary problems contributing specifically to the lack of geothermal energy technology's widespread use. It is to be understood that the use of the word geothermal or geothermal energy throughout this disclosure includes both conventional and enhanced or engineered geothermal energy generation systems. The present disclosure provides a system, method and apparatus permitting the generation of geothermal, hydropower and hydrocarbon energy production, or any combination thereof, originating from one or a plurality of subterranean zone(s), strata or reservoir(s) using a plurality of wells for the purpose of flowing or producing fluids that contain components facilitating said energy production. Collective coproduction of hydropower combined with geothermal energy, hydrocarbon energy or any combination thereof, will substantially improve development economics by allowing for multiple revenue streams from one or a plurality of subterranean zone(s), strata or reservoir(s), will expand the development and use of geothermal energy by preferentially targeting reservoirs containing a primary fluid being water, water that may contain heat, and also may contain hydrocarbons, other valuable resources, or any combination thereof, with temperatures ranging from 90° C.-182° C. (194° F.-360° F.), suitable for binary steam production used for electricity generation, or electricity generation via flash steam when temperatures are above 182° C. Binary cycle power plants operate with water temperatures much lower, ranging from 90° C.-182° C. (194° F.-360° F.), compared to conventional flash steam power plants requiring temperatures greater than 182° C. (360° F.). Subterranean zone(s), strata or reservoir(s) in the temperature range required for binary steam production and subsequent electricity generation, are located in many geographic areas that include high population density areas as evinced by the hundreds of thousands of existing oil and gas wells globally that produce fluids originating from subsurface reservoirs with temperatures ranging from 90° C.-182° C. (194° F.-360° F.), and thereby will provide existing available resources in the form of oil and gas wells producing high volumes of water or are non-producing as a result of high water production, and are no longer commercially viable for hydrocarbon production, for use to repurpose said wells to produce hydropower, geothermal and hydrocarbon production that may be residual or primarily composed of natural gas, or any combination thereof for the purpose of generating electricity. In doing so, specifically related to the oil and gas industry, a fluid that is viewed as a cost and environmental liability, produced water from hydrocarbon formations, now will be a revenue generating commodity by utilizing produced water containing heat energy, energy resulting from fluid production and pressure, and chemical energy from hydrocarbons, hydrogen or other valuable energy producing components that may be contained within the fluid, to cogenerate geothermal, hydropower, hydrogen, other renewable energy that may derive from components within produced water, or any combination thereof, that will reduce costs of operations, reduce emissions contributing to climate change, thereby reducing the carbon footprint and improving operation economics, from hydrocarbon energy generation operations and reduce the cost and environmental risk associated with treating and disposing of said produced water. Expanding the geographic location available for geothermal development, away from magma and/or volcanic heat source locations where high heat sources required for geothermal energy generation reside, through the use of fluids, within the suitable temperature range for use with binary steam power generation resources, will permit the placement of geothermal, hydropower and hydrocarbon energy generation plants or any combination thereof, and associated infrastructure near high population centers thereby providing the additional benefit of lowering the cost of energy distribution and delivery.

Geothermal energy is a sustainable and renewable energy source. Enhanced geothermal systems (EGS), convert thermal energy into electric power by exposing fluid, that is typically at a lower temperature than the rock material heated by a thermal heat source, to the heated rock whereby, heat contained within the rock, or rock fracture network, is transferred to the fluid, that could be in liquid form, gaseous form, or any combination thereof, and producing the heated fluid via wells to the surface, and further to a turbine used for electricity generation. Conventional EGS typically use two separate wells, one for production of heated fluid and a second well for fluid return to the heat source for production again. Fluid from the injection well traverses through the subterranean zone, strata or reservoir and its varying permeable rock, that may include subzones or compartments within the primary zone, that may have permeability that varies from the permeability of the main zone, and/or may include one or more fracture networks throughout the main zone and/or subzone compartments. This method of fluid traverse through the reservoir is inefficient, as there is significant loss of fluid flow and potential loss of heated fluid available at the producing well due to a lack of interwell connectivity, fluid permeating through the reservoir pore space, and/or loss within the reservoir fracture network, resulting in a reduced fluid volume available for production at the producing well. There is a need for a method and apparatus permitting convective heat transfer to a primary transport fluid utilizing an efficient means of traverse, assuring interwell connectivity from the injection well to the producing well whereby, cooled fluid entering the reservoir via the injection well, can traverse efficiently through the reservoir to the producing well, and if a heat source is present, the fluid can be effectively heated and transported to the producing well without any loss or at least a minimal loss, of contained heat energy or energy resulting from fluid flow combined with pressure.

Energy production and use have emerged as critically important issues facing the United States and other developed countries. As recoverable fossil fuels are depleted and negative externalities associated with their use continue to mount, governments and others increasingly focus on renewable energy resources as a means of reducing our reliance on fossil fuels. Renewable energy is energy derived from resources that are regenerative or, for all practical purposes, cannot be depleted. For this reason, renewable energy sources are fundamentally different from fossil fuels and do not produce as many greenhouse gases and other pollutants as fossil fuel combustion. Mankind's traditional uses of wind, water, and solar energy are widespread in developed and developing countries, but the mass production of electricity using renewable energy sources has become more important recently, reflecting the major threats of climate change due to pollution, exhaustion of fossil fuels, and the environmental, social, and political risks associated with fossil fuels and nuclear power. It is known that energy components present in water (in the form of motive energy, heat, hydrocarbons or other energy generation components that may be contained within water) can be harnessed and used. Flowing water, because it is approximately a thousand times denser than air, can yield considerable amounts of energy.

There are many forms of water-based energy production, some of which include, large-scale energy production from dams, smaller scale run-of-the river open-water type installations, stored reservoir systems, micro-hydro systems generating electric power from municipal water supply piping systems, tidal-motion energy production systems, conventional flash steam, binary steam and enhanced geothermal systems. A huge amount of water exists in the form of groundwater contained within water-bearing subterranean zones, strata or reservoirs known as aquifers. Aquifers are porous, permeable water-bearing formations. These formations may be abnormally pressured, hydropressured or geopressured.

Subterranean zones, strata and reservoirs can contain everything necessary for large-scale renewable power generation, namely, heat, pressure, hydrocarbons, water, water comprising sodium chloride of varying concentrations, water comprising hydrogen, hydrocarbons comprising hydrogen, hydrogen alone, or any other energy producing components, within the water, combined with pathways for fluid flow that exist within these formations, or can be created with new and/or existing technology. Renewable power generation and the power plants used for energy generation have been providing clean energy for more than a hundred years, but only in certain geographic regions where specific renewable resources are available, like near specific bodies of surface water suitable for hydropower installations, or areas that are suitable for energy production by the sun or wind. Energy provided by the wind and sun is not reliable or dispatchable energy sources due to their intermittent capability of only providing energy when the sun is shining or the wind is blowing. Water-bearing subterranean zones are available everywhere, without geographic restriction, as required by surface sourced hydropower, and have no intermittent energy production deficiencies attributable to wind and solar energy resources. Water-bearing subterranean zones, strata or reservoirs are capable of providing reliable, dispatchable and sustainable renewable energy, 24 hours per day, everywhere!

Even with geographic restriction, whereby, only select locations can provide a combination of sufficient water volume, and/or a method of generating fluid motion or head pressure from an elevation change, necessary for hydropower energy production from surface sources of water, according to the U.S. Department of the Interior, hydropower is the only water-based energy resource, now provided solely by surface water sources, and is currently the most important, widely used renewable energy source, representing about 17% of total energy production globally. Over 35 countries rely on hydropower for at least 50% of their national electricity demand (USGS, 2018). In the U.S., hydropower produces 6.5% of the nation's electricity and 31.5% of renewable energy. A primary risk and problem with conventional surface sources of water used for hydropower electricity generation are due to the impact that could result from climate change. Oak Ridge National Laboratory has conducted three SECURE Water Act of 2009 Section 9505 impact studies detailing the impact climate change will have on surface sourced hydropower, citing "climate change results in more extreme weather events across the United States—particularly droughts in the west—it is crucial to better understand and predict the conditions that impact sustainable hydropower electricity generation". The third study, conducted from 2018-2022, concluded "rising temperatures from 1° F. to 6° F. may lead to increasing water evaporation from hydropower reservoirs, which decreases generation capacity because hydropower depends on a certain level, or head, of water supply" (Oak Ridge National Laboratory, 2018).

A further problem with surface sources of water used for water-based electricity generation, specifically hydropower, is the ecological and environmental impacts associated with excessive amounts of land used for dam construction and water retention. The NASA/USGS Landsat Program provides continuous space-based data relative to Earth's land resources and environment. A Mar. 15, 2018 article published in NASA's Landsat Science, entitled "Land Under Water: Estimating Hydropower's Land Use Impacts", cited as potential environmental impacts are, altering freshwater habitats, degrading water quality, and change of land use by flooding required for water retention reservoirs. (NASA Landsat Science, 2018). There is a need to develop power generation systems, methods, and apparatus for the purpose of electricity generation that do not rely on resources that may be at risk due to the negative impacts of climate change and minimize the ecological and environmental impacts resulting from excessive land use consistent with existing water-based, surface sourced power generation resources.

Water resources originate from primarily two sources, namely, surface and subsurface sources. Surface water resources include rivers, lakes, streams, seas, oceans, gulfs, surface snow and ice. Subsurface water can be found in two places, the water table and in aquifers. Water from the water table is defined as groundwater. Water below the water table depth originates from unconfined aquifers and deeper below the earth's surface, below the unconfined aquifer depth, are confined aquifers. Confined aquifers are subterranean zones, strata or reservoirs, separated from unconfined aquifers by an impermeable rock layer like shale or some other type of impermeable formation barrier or geologic layer, which contain water alone or may include combinations of water with other fluids, like hydrocarbons, for example. Layers of impermeable material are both above and below the subterranean zone, strata or reservoir causing it to be under pressure. This disclosure relates primarily to the one or plurality of subterranean zone(s), strata or reservoir(s), defined as confined aquifers, containing fluid composed primarily of water alone as the primary fluid, water that may include hydrocarbons, and/or water that may be heated from heat sources originating within the subterranean zone, strata or reservoir or from another source external to the water source, whereby, the water is heated by convection and/or conduction from an external heat source, and may be used for the purpose of generating electricity. Subsurface water sourced power, for the purpose of generating electricity, is defined as power generated from fluid heated from a subsurface heat source, power generated from components contained within the water that may include hydrocarbons, power generated from fluid flow and pressure, or any combination thereof, that utilize a plurality of wells, drilled into or through the one or plurality of subterranean zone(s), strata or reservoir(s) for the purpose of completing the one or plurality of wells in said zones, to permit fluid production into the well or borehole, producing those fluids to the surface, combining the fluid from a plurality of wells into a system of interconnected pipes that direct the fluid to one or more power generation devices that may include any conventional system for generating electricity and use by the public that may include dry steam energy, flash steam energy, binary cycle energy, thermoelectric energy, salinity gradient power (blue energy), energy generated from impulse and reaction turbines used for hydropower electricity generation, hydrocarbon energy, and secondary heat power energy generation, or any combination thereof, and is used by those familiar with the art for electricity generation by various power generation means, as described herein, using energy contained in fluid in the form of heat, energy derived chemically from fluid components contained therein, or energy that results from the flow or production of the fluid together with pressure or energy supplied by an external means to artificially lower hydrostatic pressure necessary for the fluid to flow into a wellbore or borehole, reach the surface through the borehole or through tubular members or pipes contained within the wellbore or borehole, whereby it is gathered together in a system of pipes at the surface designed to receive fluid from a plurality of wells directing it to said energy generation equipment and used to generate electricity from any source or any combination of sources previously described, whereby the combined fluid is further processed to separate or at least reduce the energy generation components that may be contained within the primary fluid being water, permitting the primary fluid being water to be further distributed into a system of interconnected pipes leading to a plurality of wells that are drilled into and/or intersect the one or more originating subterranean zones, strata or reservoirs or pipes contained within the reservoir that permit a flow of fluid back to the originating producing wells or boreholes, whereby said fluid can be injected via pump or other means into the originating zones permitting the continuous fluid production and energy generation again.

Geopressured aquifers exist globally and may contain four or more sources of energy that are available for electricity production, namely, Thermal Energy provided by geothermal heat, Kinetic Energy provided by fluid flow and pressure, Chemical Energy from produced hydrocarbons and/or hydrogen and energy from salinity gradient comprising various sodium chloride concentrations, and/or other energy generating components that may exist from and/or between water sources. Energy from geothermal heat and from produced hydrocarbons are well known and established technologies providing energy production from thermal energy and chemical energy, respectively.

Subterranean zones, strata or reservoirs containing these fluids are geologically complex. The term reservoir heterogeneity is used to describe the geological complexity of a subterranean zone, strata or reservoir and the relationship of that complexity to the flow of fluids through it. For simplicity of description, the term reservoir may be used to denote a subterranean zone, strata or reservoir. Reservoirs are inherently heterogeneous assemblages of depositional facies and subfacies each with characteristics and commonly differing sediment textures, stratification types and bedding architectures comprised of lateral stratigraphic rock formations with varying permeable and/or natural fractures that contain fluid. Variability is compounded by post depositional alterations of the strata, such as through compaction, cementation, and tectonic deformation. Heterogeneities at the wellbore scale affect matrix permeability, distribution of fluid contained within the reservoir, directional flow of fluids, potential fluid-rock interactions, and reservoir damage. Heterogeneities at the interwell scale affect fluid flow patterns, drainage efficiency of the reservoir, and lateral flow efficiency of injected fluids into the reservoir. Like interwell heterogeneity, heterogeneities at the reservoir scale are difficult to assess because information derived at smaller scales must be scaled up and generalized. This generalization may not take into consideration complex depositional systems that may include reservoir compartmentalization and/or compartmentalization together with fracture systems contained within the reservoir. Reservoirs being complex depositional systems are often compartmentalized and separate compartments may not be in communication with other compartments, fracture systems or other areas that encompass the reservoir. If for example, a plurality of producing wells were in one compartment of the reservoir and a plurality of injection wells were in another compartment, separated from one another by reservoir heterogeneities that may exist within the reservoir, the interwell connectivity within the reservoir, required for renewable energy production, would not exist. Reservoir heterogeneity is a primary problem related to producing fluid from a subsurface reservoir and re-injecting fluid back into the originating reservoir for the purpose of producing that fluid again. Fluids contained in subsurface reservoirs are typically contained in numerous small compartments with varying permeability which includes one or more stratified layers over a large areal extent. Due to this complexity, confirming interwell connectivity within new or existing reservoirs is an expensive and complicated process. That this information is extremely difficult to ascertain, is evinced by the numerous techniques developed to infer interwell connectivity within a reservoir. To produce renewable energy via electricity generation from subsurface wells, there must be interwell connectivity within the reservoir to insure producing wells are in communication with injection wells to permit the continuous cycle of fluid flow through the reservoir required for continuous energy production. There is a need to develop systems, methods and apparatus that permit the continuous flow of fluid in subterranean zones, strata or reservoirs that are complex and may be compartmentalized and/or fractured as a result of that complexity for the purpose of continuous flow or production necessary for renewable energy production originating from subterranean zones, strata or reservoirs.

There are a number of different types of well configurations that can be drilled that reduce interwell connection risk applicable to compartmentalized heterogeneous reservoirs. Well configurations include any combination of conventional, sidetrack, and directional wells, with horizontal, lateral, and multilateral wells. A conventional well is primarily vertical or moderately deviated. A sidetrack well is drilled from an existing wellbore or a partly drilled well that has a need to exit out of the side of an existing wellbore for a variety of reasons that could include drilling past an obstruction in the main wellbore, drilling to a new target subterranean zone or to drill out into a target zone or as a result of some other reason. A directional well is a well that deviates from a vertically straight line and can include build-and-hold, S-shaped and continuous build well types. Horizontal wells are wells that deviate a conventional, sidetrack or directional well to a high angle, generally greater than 80°, with the intent of keeping the well within a specific subterranean zone, strata or reservoir. Lateral wells are wells that have at least one main branch section radiating from the main well section or borehole that may include one or more sub-branch sections radiating from each main branch section. Multilateral wells are wells that are configured with more than one lateral well section that may include one or more main branch section radiating from the main well or borehole and/or sub-branches radiating out from each main branch section. The main well, each branch and/or sub-branch can produce fluids from one or more subterranean zones, strata or reservoirs into the main wellbore and further to the surface. Lateral and multilateral wells can be drilled from conventional, sidetrack, directional or horizontal wells or any combination thereof. Horizontal, lateral and multilateral well completions can allow for maximum subterranean zone, strata or reservoir contact from a single well. It is well known in prior art associated with the oil and gas industry that the use of horizontal wells drilled from surface locations on land and/or surface or subsea locations in water have improved well economics, increased well production, and have reduced the environmental impact of recovering valuable fluids, like hydrocarbons, from subterranean zones, strata or reservoirs. It is also well known that the use of horizontal wells can reduce the number of wells required to fully produce the subsurface area that encompasses the subterranean zone, strata or reservoir, whereby such development, production and processing of recovered fluid can reduce the areal extent of the surface location. As a result, the cost and environmental impact of developing and producing the subsurface fluids can be reduced. Subterranean zones, strata or reservoirs containing valuable fluids, like hydrocarbons, can be produced efficiently through a network of horizontal wellbores. By increasing zone contact wells can access more of the zone fluid volume and thereby increase the zone productivity index (PI).

The productivity index or PI is a measure of the well potential or ability for fluid contained within a subterranean zone, strata or reservoir to produce at a given pressure differential between the reservoir and the wellbore, and is a commonly measured well property with units of bbl/day/psi. High PI wells produce at high rates of production while wells with a low PI produce at low rates. Utilizing conventional, sidetrack and directional well configurations or any combination thereof, combined with horizontal, lateral and multilateral well configurations or any combination thereof, will increase zone contact for each individual zone, that could be one or more zones penetrated by a well, thereby increasing the PI for each zone penetrated and completed to permit fluid entry into the main wellbore and thereby providing a single well that is capable of fluid production at the highest rate possible. By combining a plurality of single wells designed using horizontal, lateral and multilateral well configurations, completed in and producing from one or more subterranean zones, strata or reservoirs, permit the highest fluid production rate available per well for fluid that is produced to the surface, combined in a system of interconnected pipes used to direct fluid flow to a turbine for the purpose of utilizing fluid flow and pressure to turn a turbine rotor used to operate a generator to produce electricity from a plurality of subsurface wells producing from one or a plurality of subterranean zone(s), strata or reservoir(s). Utilizing the aforementioned description of designing conventional, sidetrack and directional well configurations combined with horizontal, lateral, multilateral well configurations, or any combination thereof, can be utilized for newly drilled wells or an existing conventional, sidetrack or directional well that does not include horizontal, lateral or multilateral well configurations. An existing conventional, sidetrack or directional well or any combination thereof, that does not include horizontal well sections, lateral or multilateral well sections that extend from the main well section out into the penetrated subterranean zone, strata or reservoir, can be redesigned and reconfigured to include horizontal, lateral and multilateral well sections, or any combination thereof, that extend from the main well section out into the one or more subterranean zones, strata or reservoirs that were penetrated by the existing well for the purpose of increasing zone contact to improve or increase the well fluid production rate thereby, permitting a single existing well to produce the fluid from the one or plurality of penetrated subterranean zone(s), strata or reservoir(s) at highest rate possible. By designing one or a plurality of new wells or reconfiguring one or a plurality of existing conventional, sidetrack or directional single wells, or any combination thereof, using horizontal, lateral and multilateral well configurations, or any combination thereof, according to the aforementioned description, also provides the benefit of utilizing a limited surface area to optimally drill into subterranean zones, strata or reservoirs permitting optimal fluid production, fluid processing and electricity generation from that limited surface area. This permits the use of this technology on land utilizing a limited surface area or on a structure of limited size, positioned in a body of water, that could be an ocean, sea or lake that is fixed to the bottom of the submerged earth's surface or a floating structure, that could also include motor powered floating vessels or structures positioned above the submerged earth's surface, with wells located on the structure or on the submerged earth's surface below the surface of the water, that permit only a limited surface area for a plurality of subsurface wells required for fluid production, fluid gathering, electricity generation, fluid processing, fluid distribution into a plurality of wells and reinjection back to the originating subterranean zones, strata or reservoirs permitting production again.

In their natural state, most wells will not produce fluid at their optimum or maximum rate. Radial flow from a subterranean zone, strata or reservoir into a wellbore is not an efficient flow regime. As fluid approaches a wellbore, it has to pass through successively smaller and smaller areas resulting in a reduction of flow. By designing a well to permit a fluid flow pattern in a subterranean zone, strata or reservoir which transitions from radial flow to linear flow as it approaches the wellbore, results in a transition change in the fluid flow pattern that will increase well productivity into the wellbore. Additionally, during the drilling operation, drilling fluid systems are used to balance formation pressure for the purpose of pressure control, to maintain borehole stability, carry drilling cuttings to the surface and act as a cooling mechanism for the drill bit. Drilling fluid systems are designed with two primary goals namely, 1. To ensure safe, stable boreholes, which is accomplished by operating within an acceptable mud-weight window, and 2. To achieve high rates of penetration so that rig time and well cost can be minimized. These primary design considerations do not take into consideration future well productivity. Drilling operations expose the target subterranean zone, strata or reservoir to what is defined as drilling induced formation damage. Solid particles and chemicals in the drilling fluid system, flow into the zone or reservoir pore space, and extend out a certain distance from the borehole/reservoir interface creating an impairment zone or zone of reduced permeability within the vicinity of the borehole. Typically, any unintended impedance to the flow of fluids into or out of a borehole or wellbore is referred to as formation damage. Drilling induced formation damage is a primary problem impacting the production of fluids within a subterranean zone, strata or reservoir by reducing near-wellbore permeability thereby, reducing or preventing the flow of reservoir fluids into the borehole or wellbore and/or injection back into an originating zone. A properly designed and executed hydraulic fracture can change the fluid flow pattern, from radial to near linear, in a subterranean zone strata or reservoir and create an undamaged channel or flow path filled with a high permeability material, designed to maintain the channel width, and create an undamaged flow path extending from the borehole/reservoir interface through the drilling induced damage zone out into the subterranean zone, strata or reservoir for fluid contained within the subterranean zone, strata or reservoir to flow linearly as opposed to radially, unimpeded from the reservoir, through the drilling induced damaged zone and into the borehole or well or from a borehole well back into the subterranean zone, strata or reservoir. In the oil and gas industry, hydraulic fracturing, as a completion method to improve well production, has been used commercially for over 60 years. According to the U.S. Department of Energy, up to 95% (U.S. DOE, 2014) of new wells drilled today are hydraulically fractured, accounting for two-thirds of total U.S. market natural gas production and about half of U.S. crude oil production (U.S. Energy Information Administration, 2015) and hydraulic fracturing combined with horizontal drilling allows multiple wells to be drilled from one location, reducing the size of the drilling area on the surface by as much as 90% (American Petroleum Institute, 2017). Hydraulic fracturing has not been utilized as a method to generate linear flow paths filled with high permeability material designed to maintain the channel width, and create an undamaged flow path extending from the borehole/reservoir interface through the drilling induced damage zone out into the subterranean zone, strata or reservoir for fluid contained within the subterranean zone, strata or reservoir to flow linearly as opposed to radially, unimpeded from the reservoir, through the drilling induced damaged zone and into the borehole or well or from a borehole well back into the subterranean zone, strata or reservoir for the purpose of coproducing fluid from or injecting fluid back into one or a plurality of subterranean zone(s), strata or reservoir(s) for coproducing energy from hydropower combined with energy production by other means. There is a need to develop flow paths within subterranean zones, strata or reservoirs that extend beyond the drilling induced damage zone, and to permit unimpeded linear as opposed to radial flow path from the reservoir, through the drilling induced damaged zone, and into the well or borehole, for the purpose of producing reservoir fluid to the surface at the highest possible rate, and/or injecting fluid from a borehole or well, back into the subterranean zone, strata or reservoir, for the purpose of coproducing fluid from or coinjecting fluid back into one or a plurality of subterranean zone(s), strata or reservoir(s), for the purpose of coproducing energy from hydropower combined with energy production by any other means, derived from fluids originating from one or a plurality of subterranean zone(s), strata, or reservoir(s) and produced from a plurality of wells.

Subterranean zones, strata or reservoirs are confined and under stress due to the zone depth and the overburden stress applied resulting from layers of sediment and rock above the zone of interest. The stresses a subterranean zone, strata or reservoir are subjected in, in-situ, are divided into three principle stresses, namely, σ1—vertical stress, σ2—minimum horizontal stress and σ3—maximum horizontal stress. These stresses are normally compressive, anisotropic, and nonhomogeneous, which means that the compressive stresses on the rock are not equal and vary in magnitude on the basis of direction. The magnitude and direction of principle stresses are important because they control the pressure required to create and propagate a fracture, the shape and vertical extent of the fracture, the direction of the fracture, and the stresses trying to crush the propping agent during fluid production. A hydraulic fracture will propagate perpendicular to the least principle stress. Where there is a high contrast between minimum and maximum horizontal stresses, fracture stimulation creates a narrow or linear fracture fairway, and where there is a low contrast, wide complex fracture geometry is created. Considering wells, new or existing, drilled into a subterranean, zone, strata or reservoir, in a normal faulting stress regime, if the well is drilled in the direction of maximum horizontal stress, the resulting hydraulic fracture stimulation will result, most likely, with the fracture being initiated parallel to the wellbore axis and if the well is drilled in the direction of minimum horizontal stress, the resulting hydraulic fracture stimulation will result, most likely, with the fracture being initiated perpendicular to the wellbore axis. Well orientation related to drilled direction in a subterranean zone, strata or reservoir, relative to minimum or maximum horizontal stress is a primary problem. If a well has not been designed to be in either of these two major directions, future hydraulic fracturing, with the purpose to expose the wellbore to the largest possible area of the subterranean zone, strata or reservoir, to obtain the highest rate possible for electricity generation utilizing hydropower sourced from one or a plurality subsurface wells, may not be achieved.

In the United States and globally there are thousands of inactive oil and gas wells and/or wells that are producing marginally economic volumes of hydrocarbons that pose an economic, environmental and social threat as a result of inactivity and/or marginal production. Within a subsurface reservoir, water is typically the primary fluid combined with the hydrocarbon fluid that may be oil, gas or a combination thereof. A well drilled for the purpose of producing hydrocarbons many times are drilled into a subsurface zone, strata or reservoir whereby, only water within the zone is encountered and these wells are commonly referred to as a dry hole, or an existing hydrocarbon well becomes inactive primarily when hydrocarbons within the subsurface reservoir have been produced, and the resulting hydrocarbon production is not economic enough to sustain well operations with only a fluid comprising primarily water being produced. When newly drilled wells encounter only water in a formation, or hydrocarbons within the reservoir have been exhausted, or fully produced, a well becomes inactive because there is no perceived commercial value for water within reservoirs drilled for the purpose of hydrocarbon production. A primary problem that exists within the oil and gas industry is a result of the primary reservoir fluid, water, contained in subsurface reservoirs, has no perceived commercial value.

Produced water from hydrocarbon reservoirs is not pure water. Produced water may contain dissolved mineral salts, or it may be mixed with organic compounds and/or inorganic metals or other elements that may be defined as hazardous excluding it for normal use or use for other commercial purposes. Because of the presence of these constituents, it can be expensive to treat produced water for reuse. Instead, it is often injected into deep underground wastewater disposal wells onsite at the well facility location or transported to offsite wastewater well locations for disposal, which is also expensive and could pose an environmental impact if during transport there was a containment failure resulting in a spill. In the U.S. alone, approximately 60 million barrels (2.5 billion gallons) of produced water are extracted each day from existing oil and gas wells (American Geosciences Institute, 2018) that could be utilized, or at least a portion thereof, for the purpose of generating electricity from subsurface wells. There is a need to develop a useful purpose for newly drilled oil and gas wells only encountering water and existing oil and gas wells producing primarily water, that may also contain hydrocarbons and/or other energy generating components, that create a commercial value and reduce the liability associated with fluid production, being water alone or primarily water, after production of hydrocarbons can no longer be commercially or economically produced.

Repurposing oil and gas wells that are perceived to have no commercial and/or economic value provide an exceptional opportunity to utilize existing wells that can be reconfigured for use to generate electricity from subterranean zones, strata or reservoirs containing primarily water. Utilizing fluid and pressure contained in subterranean zones, strata and reservoirs to generate electricity through the use of subsurface wells can be separate and independent of the water available from oil and gas industry subterranean zones, strata or reservoirs. Subsurface, geopressured aquifers that do not contain hydrocarbons exist around the world and can be a source of pressure and fluid used for energy production. The term "geopressure" was introduced in late 1950s by Charles Stuart of Shell Oil Company and refers to reservoir fluid pressure that significantly exceeds hydrostatic pressure at the depth of the zone, is not open to the atmosphere and the reservoir is isolated or compartmentalized by subsurface faulting (Society of Petroleum Engineers, 2019). The fluid pressure reflects a part, or all of the weight of the superincumbent rock deposits. Aquifers are huge storehouses of water and geopressured accumulations have been observed in many areas of the world (Oak Ridge National Laboratory, 2018). In the United States for example, the structural and stratigraphic environments of geopressure in the northern Gulf of Mexico basin and the Gulf Coast are well known. In a region approximately 35 to 75 miles wide along the coast of Texas, from the Rio Grande River in the southwest, to the Mississippi River Delta in the east, a distance of approximately 800 miles, and coincides with Pleistocene and Holocene formations, one region of geopressured water-bearing formations are prevalent extending far out into the Gulf of Mexico beneath the Gulf of Mexico Continental Shelf (Paul H. Jones, United States Geological Survey, 1969). Subterranean zones, strata or reservoirs that include geopressured aquifers, hydrothermal reservoirs or other water-bearing formations that do not include the presence of hydrocarbons, penetrated by one or a plurality of wells, provide sources of energy and that do not require the use of hydrocarbon-bearing subterranean zones, strata or reservoirs for the purpose of energy production, whereby these primarily water-bearing zones may be utilized separate and independent of any hydrocarbon-bearing subterranean zone, strata or reservoir for the purpose of generating power from subsurface wells.

Archaeological evidence shows that the first human use of geothermal resources in North America occurred more than 10,000 years ago with the settlement of Paleo-Indians at hot springs, but construction of the Hot Lake Hotel near La Grande, Oregon in 1864, marked the first time that the energy from hot springs was used on a large scale (U.S. Department of Energy). According to the United States Office of Energy Efficiency & Renewable Energy (EERE), in 2020, geothermal energy contributed 3.673 GW of electricity, representing less than 1% of U.S. energy capacity (Office of Energy Efficiency & Renewable Energy, 2021). Geothermal energy is one of the best forms of sustainable renewable energy but its potential has not been fully realized. Geothermal energy is environmentally friendly with infinite possibilities of meeting large-scale energy demands required now and into the future. While there are many advantages of geothermal energy, it also includes several problems, some of which include: 1. High initial capital requirements and deferred return on investment. Geothermal energy is not presently cost-effective with investment returns requiring approximately 10 to 15 years or longer. 2. Conventional geothermal energy resources are location specific and this is considered a primary problem for its development as a viable energy resource. The best sites are deep inside tectonically and/or volcanically active areas away from cities or metropolitan areas and are located in unconventional areas without major population centers. 3. High distribution cost—due to its distance from high population areas, conventional geothermal technology requires a more complicated and extensive network of distribution channels, resulting in higher costs compared to other forms of renewable energy. 4. Conventional geothermal energy requires high temperatures, in the range of 182° C. (360° F.), or above, using flash steam for energy production. Well locations targeting geothermal resources must first be identified, followed by drilling operations requiring extensive periods of time with the necessity of using costly equipment and technology designed to operate in these extreme temperature environments, results in much higher costs compared to other forms of renewable energy production. These primary problems have led to widespread uncertainty regarding geothermal energy as a stand-alone energy resource, and as a result, its viability has been questioned as a large-scale source of competitively priced renewable energy. There is a need to develop systems, methods and apparatus that improve the economics of geothermal energy development, permit development near major population centers, reduce the cost of energy production distribution and costs applicable to finding and gaining access to geothermal energy producing resources via drilling wells for the purpose of establishing geothermal energy production as a large-scale, competitively priced renewable energy resource.

Geothermal energy systems are well known to those skilled in the art. For this disclosure, within a subterranean zone, strata or reservoir, a geothermal resource refers to any system that transfers heat from within the earth to its surface. For example, hot rocks, without water, are geothermal. Hydrothermal resources are subsets of geothermal resources, meaning that the transfer of heat involves water, either in a liquid or a vapor state. Hot springs and geysers, for example, are hydrothermal resources. It should be noted that the terms geothermal and hydrothermal resource might be defined differently in other disclosures. Three geological components are required for the formation of a hydrothermal water-bearing subterranean zone, strata or reservoir, namely, water, heat and permeability within the subterranean zone, strata or reservoir. The underlying heat source is either magma, in the case of volcanic systems, or heat from a normal temperature increase with depth in the earth. Fractures or interconnected pore space within rock formations often create the permeability for these systems. The geothermal industry and the U.S. Geological Survey divide hydrothermal systems into two subclasses based on chemically determined maximum subsurface temperatures whereby, high temperature fluids are fluids with temperatures 90° C. (~195° F.) or above, and moderate to low temperature fluids are fluids below 90° C. (~195° F.). A general description of electricity production utilizing geothermal energy requires a heat source that can be accessed by a borehole whereby fluid is heated and known as a primary working fluid. The primary working fluid may be in liquid or vapor form and is extracted or produced to the surface whereby heat contained within the fluid is utilized for energy production directly, by dry steam energy production, for example, or indirectly, by binary cycle heat exchange energy production, for example. Geothermal resources may also include hydrocarbons, fluids containing high concentrations of highly corrosive components, like $H_2S$ and $CO_2$ combined with mineral compositions that result in scale deposition on contacted components, whereby fluid contact may result in deterioration of or scale accumulation on well components and downstream equipment that would require expensive coatings, chemical treatments and maintenance for prevention. There is a need to isolate or at least reduce fluid exposure to apparatus required for production and/or injection containing highly corrosive components and/or scale deposition components contained within hydrothermal reservoirs to reduce the costs associated with damage, repair and maintenance that would be required resulting from exposure to these damaging components to facilitate coproducing thermal energy with energy from other energy generating components that exist within fluid originating from one or a plurality of subterranean zone(s), strata, or reservoir(s).

Geothermal energy systems utilize three methods of heat transfer, namely, heat transfer by radiation, conduction and convection from heat sources from within the earth. Radiation is heat transfer by the emission and absorption of thermal photons in the form of ray, wave or particle energy radiated from a heat source. Conduction is the transfer of energy between atoms of a material and convection is the movement of a warm mass toward a cooler mass, by means of a fluid that may be a liquid or a gas, caused by molecular motion. Heat loss from fluid contained in a subsurface reservoir is the transfer of heat from thermal fluids to the surrounding environment, which could be rock formations with lower temperatures as fluid moves from a high heat source deep within the earth, to lower temperatures as the geothermal gradient decreases toward the surface, heat transfer between the fluid bodies used for fluid transport, and heat transfer between the thermal fluid and air. Heat loss is transferred conductively between the thermal fluid and materials like earth formations and/or surfaces like steel used for fluid transport, for example, and by convection from the fluid surface to air. Closed-loop heat exchangers in deep geothermal wells, used for heat transfer from a heat source to a primary transport fluid for the purpose of electricity production, are well known by those skilled in the art. These designs, sometimes called Advanced Geothermal Systems (AGS), rely on conduction and sometimes free convection, as a means of heat transfer between the heat source and the primary transport fluid. These processes are inherently much slower and a less efficient means of heat transfer compared to forced convection, which is what drives energy transport into a conventional geothermal or an enhanced geothermal system (EGS) well. Forced convection heat transfer is a process whereby, heat is transferred from a solid surface to a fluid, which could be a liquid or a gas, which is in motion. As previously discussed, a naturally occurring geothermal system, known as a hydrothermal system, is defined by three key elements, namely, heat, fluid and permeability at depth. EGS is a man-made reservoir, created where there is a hot source rock but, insufficient natural permeability at depth. In an EGS, fluid is injected into the subsurface, under controlled conditions, for the purpose of creating or expanding the fracture network within the heat source to create artificial permeability for convective heat transfer. Conductive heat transfer closed-loop designs rely solely on heat conduction to transport energy into the wellbore or borehole. Heat conduction brings energy slowly, and so purely conductive closed-loop designs produce very low power per foot of wellbore (McClure, 2021). Slow energy transport from closed-loop well configurations and apparatus used for conduction heat transfer is a primary problem associated with existing closed-loop heat exchange systems and apparatus, which result in lower heat transfer rates between the heat source and the primary transport fluid, lowering thermal efficiency that has a negative impact on project economics, and existing EGS requires expensive and complex fracturing methods required for efficient convective heat transfer. There is a need to improve closed-loop heat exchange systems and existing apparatus that rely on conduction as a means of heat transfer from the heat source to the primary carrier fluid used for transporting thermal energy to the surface for the purpose of electricity production from thermal heat, and there is a need for methods, systems and apparatus that can improve heat transfer efficiency between the heat source and the primary carrier fluid without the need for costly and complex fracturing methods required for EGS, and that may provide heat transfer by convective and/or conductive means.

There remains a need for a method of coproducing thermal, kinetic and chemical energy production resources, or any combination thereof, sourced from fluid contained within subsurface zones, strata or reservoirs that mitigate the risk of future energy production that may result from climate change, minimize the ecological and environmental impacts resulting from excessive land use applicable to surface sourced renewable energy resources, provide a useful purpose for existing oil and gas wells no longer producing hydrocarbons and/or producing high water volumes, reduce the exposure to highly corrosive and scale accumulation fluid components contained within reservoir fluids and there remains a need for a method of efficiently extracting heat that does not rely solely on conductive heat transfer methods and apparatus for heat transfer from a heat source to a primary transport fluid for heat transfer from subterranean zones, strata or reservoirs utilizing horizontal, lateral, or multilateral geometries, or any combination thereof, and closed-loop apparatus for geothermal applications which are not limited by complex geology, reservoir compartmentalization, permeability, rock type or inefficient heat transfer methods. The technology of the present disclosure addresses these imperfections in a variety of technology areas and uniquely consolidates methodologies that improve existing energy production technology and permit coproduction from multiple energy sources, sourced from fluid and/or heat sources within the earth, originating from one or a plurality of subterranean zone(s), strata or reservoir(s), which utilize a plurality of subsurface wells to produce fluid containing energy generation components to the surface whereby, said fluid is gathered together into a system of interconnected pipes directing fluid to energy generation apparatus for the purpose of electricity generation, subsequent fluid processing and additional energy production, followed by fluid distribution into a system of interconnected pipes to guide processed fluid to one or a plurality of injection wells for reinjection into the originating subsurface zones, facilitating the continuous production of energy again derived from said fluid.

SUMMARY

Embodiments of the present disclosure may provide a method, system or apparatus of coproducing three or more sources of energy, namely, thermal, chemical, kinetic, osmotic energy, or any combination thereof, from subterranean zones, strata or reservoirs through the use of subsurface wells. Subterranean zones, strata or reservoirs and a plurality of wells may be used for the purpose of using fluid containing geothermal heat combined with fluid flow to generate thermal energy derived from geothermal heat together with kinetic energy derived from hydropower. Subterranean zones, strata or reservoirs and a plurality of wells may be used for the purpose of using fluid containing hydrocarbons combined with fluid flow to generate chemical energy derived from hydrocarbons together with kinetic energy derived from hydropower. Subterranean zones, strata or reservoirs and a plurality of wells may be used for the purpose of using fluid containing geothermal heat and fluid containing hydrocarbons combined with fluid flow to generate thermal energy derived from thermal heat, chemical energy derived from hydrocarbons together with kinetic energy derived from hydropower, whereby fluid production singularly can be utilized to generate electricity derived from kinetic energy generation apparatus, or fluid production together with heat contained within the fluid can be utilized to cogenerate electricity from both kinetic and thermal energy generation apparatus together, or fluid production together with hydrocarbons or other energy generation components contained within the fluid can be utilized to cogenerate electricity from both kinetic and chemical energy generation apparatus together, or fluid production together with both heat and energy generation components contained within the fluid can be utilized to cogenerate electricity from kinetic, thermal and chemical energy generation apparatus collectively together. There is a need to provide a system, method and apparatus for generating Kinetic Energy combined with Thermal Energy together. There is a need to provide a system, method and apparatus for generating Kinetic Energy combined with Chemical Energy together and there is a need to provide a system, method and apparatus for generating Kinetic Energy combined with Thermal, Chemical and any other energy generation component contained in fluid originating from subsurface zones, strata or reservoirs, for the purpose of electric power generation.

Embodiments of the present disclosure may provide systems and methods to develop alternate fluid sources for energy production that do not rely on surface fluid sources to renewably generate thermal, kinetic or chemical energy. Embodiments of the present disclosure may provide coproduction systems and methods permitting hydropower, geothermal, hydrocarbon, and any other energy production, or any combination thereof, that may be derived from fluid processes and/or fluid containing valuable energy producing components that may be contained in one or a plurality of subterranean zone(s), strata, or reservoir(s). Valuable energy producing processes and/or components may include heat, fluid flow, pressure, hydrocarbons, water, water comprising sodium chloride of varying concentrations, water comprising hydrogen, hydrocarbons comprising hydrogen, hydrogen alone, or any other energy producing components, or any combination thereof, that may be contained within the fluid that may provide energy and/or a useful purpose. Embodiments of the present disclosure may provide systems and methods permitting the production of energy, which may include electricity, derived from thermal energy, kinetic energy, and chemical energy, or any combination thereof, from said fluids containing valuable energy producing components, and/or other valuable components that may provide a useful purpose. Methods and systems that do not rely on surface sources of fluid for energy production, may reduce the ecological and environmental impacts associated with altering surface freshwater habitats, degrading water quality and excessive land use required for surface water-sourced energy production, water retention and associated structures necessary for said energy production.

Embodiments of the present disclosure may permit the use of horizontal, lateral, and multilateral well geometries, or any combination thereof, together with methods and apparatus to coproduce and/or co-inject fluid for the coproduction of energy derived from energy components within fluid sourced from one or a plurality of subterranean zone(s), strata, or reservoir(s), and that may efficiently extract heat from heat sources, and transfer said heat to primary transport fluids, that may transfer heat convectively, and/or improve conductive heat transfer methods for heat transfer from heat source to primary transport fluid, derived from heat sources originating from subterranean zones, strata or reservoirs, together with closed-loop apparatus for geothermal applications, which are not limited by complex geology, reservoir compartmentalization, permeability, rock type or inefficient heat transfer methods Embodiments of the present disclosure may permit the use of apparatus which comprise a primary heat exchanger to efficiently transfer heat from a heat source to a primary transport fluid whereby, the well is in contact with the geothermal formation, and that may efficiently extract heat from heat sources, and transfer said heat to primary transport fluids, that may transfer heat convectively, and/or improve conductive heat transfer methods for heat transfer from heat source to primary transport fluid, derived from heat sources originating from subterranean zones, strata or reservoirs, together with closed-loop apparatus for geothermal applications, which are not limited by complex geology, reservoir compartmentalization, permeability, rock type or inefficient heat transfer methods.

Embodiments of the present disclosure may provide systems and methods of joining pipes that may interconnect a plurality of boreholes that may be cased or uncased, and may be defined as a well, if one, or well(s) if a plurality, intersecting, penetrating and/or terminating in one or a plurality of subsurface zone(s), strata, or reservoir(s), that may be defined as zone or reservoir, if one, or zone(s) or reservoir(s) for a plurality, that may consist of complex geologic heterogeneous systems that may include one or more subsurface faults, varying permeability, varying porosity, limited natural fracture networks, compartments, and/or other complexities that may prevent, restrict, or impede fluid flow within, from or into the one or a plurality of subsurface zone(s), strata, or reservoir(s). The systems and methods of joining pipes may create a system or network of interconnected pipes within one or a plurality of subsurface zone(s), strata, or reservoir(s) for the purpose of creating flow paths that may provide continuous fluid flow that may be unrestricted and/or unimpeded within, from or into the one or a plurality of subsurface zone(s), strata, or reservoir(s). The systems and methods of joining pipes may interconnect boreholes that may be cased, uncased, or any combination thereof, and used for the purpose of producing fluid from the one or a plurality of subsurface zone(s), strata, or reservoir(s), to boreholes that may be cased or uncased, or any combination thereof, and used for the purpose of injecting fluid into the one or a plurality of subsurface zone(s), strata, or reservoir(s). The systems and methods of joining pipes may create a process whereby energy producing fluid that may be contained within the one or a plurality of subsurface zone(s), strata, or reservoir(s) may flow into boreholes that may be cased, uncased, or any combination thereof, and used for the purpose of producing fluid from the one or a plurality of subsurface zone(s), strata, or reservoir(s), whereby fluid flows into the producing well to the surface, using pressure energy contained within the reservoir(s) or flow to the surface is artificially induced by artificial means, into a system of interconnected pipes that direct the fluid to apparatus used for energy production, the energy producing fluid is used for energy generation that may be electricity or energy for a useful purpose, is processed to separate energy containing components individually and from waste components or other components contained within the fluid that may not provide a useful purpose, leaving a fluid composed primarily of water whereby, additional energy may be produced from the separated, individual energy producing components, and the remaining fluid, consisting primarily of water, flows or is pumped into a system of interconnected pipes that direct the fluid to one or a plurality of boreholes that may be cased, uncased, or any combination thereof, and used for the purpose of injecting fluid into, the same one or plurality of originating subterranean zone(s), strata, or reservoir(s) for the purpose of creating a flow-loop of interconnected flow paths that provide continuous, unimpeded fluid flow between producing well(s) and injection well(s), required for continuous energy production.

Embodiments of the present disclosure may provide systems that include an outer conduit combined with an inner conduit within a borehole used to transport fluid flowing into the borehole and to the surface, received from one or a plurality of subterranean zone(s), strata, or reservoir(s), and/or fluid flowing or pumped, from the surface back into one or a plurality of subterranean zone(s), strata, or reservoir(s). The systems that may include an outer conduit combined with an inner conduit within a borehole which may include cement systems, external to the outer conduit, designed to isolate the one or a plurality of subterranean zone(s), strata, or reservoir(s) from one another, bond or attach the outer conduit to the borehole and/or reservoir interface, or any combination thereof, and said cement systems designed for isolation and bonding, may also be designed to thermally connect the reservoir(s), the borehole, the outer conduit, inner conduit(s), or any combination thereof, to one another whereby, cement system design includes methods, processes and/or components used with the specific purpose of transferring heat from one body to another. The systems that include an outer conduit combined with an inner conduit may include an outer conduit combined with one or more conduits contained within the inner conduit. The systems that include an outer conduit combined with an inner conduit may include an outer conduit and/or inner conduit that includes apparatus designed as sealing devices, devices that offset or center the conduit within the borehole, devices that may prevent, restrict or divert flow, devices used for the purpose of connecting one borehole that may be cased, uncased or any combination thereof, to another borehole that may be cased, uncased, or any combination thereof, devices that may be attached to or positioned internally within the outer conduit and/or inner conduits used for the purpose of locating or to at least assist with locating, opposing boreholes that may be cased, uncased, or any combination thereof, and positioned whereby the path of one well permits interconnection to another well and/or locating components relative to other components within boreholes and/or wells. The systems that include an outer conduit combined with an inner conduit may include components designed to guide, direct or assist with the process of interconnecting one borehole that may be cased, uncased or any combination thereof, to another borehole that may be cased, uncased, or any combination thereof. The systems that include an outer conduit combined with an inner conduit may include components that may provide thermal coupling between the reservoir, the fluid that may be contained within the reservoir, the outer conduit and/or the one or more inner conduits that may be contained within the outer conduit, any other devices known to those skilled in the art that may be connected to an outer conduit and/or inner conduit and utilized for a useful purpose, or any combination thereof. The systems that may include an outer conduit combined with an inner conduit may include an inner conduit that may be combined with one or more conduits contained within the inner conduit. The systems that include an outer conduit combined with an inner conduit may include an inner conduit that may be combined with one or more conduits contained within the inner conduit that may be attached or connected externally to the one or more inner conduits, and/or may include internal to the one or more internal conduits, materials and/or components designed to thermally isolate the inner conduit(s) from the fluid that may be contained within the outer conduit from fluid that may be contained within the one or more inner conduit(s), thermally isolate the inner conduit(s) from the outer conduit and/or any components attached or connected to the outer conduit, the borehole, the one or a plurality of subterranean zone(s), strata, or reservoir(s), any fluid that may be contained within said reservoir(s), or any combination thereof, for convective and/or conductive heat transfer of heat that may be contained in the one or a plurality of zone(s).

Embodiments of the present disclosure may provide a system and method permitting the continuous flow of fluid in subterranean zones, strata or reservoirs that are complex, have variable permeability, and may be compartmentalized due to said complexity, whereby, interwell connectivity can be confirmed, allowing continuous flow or production out of, through and into the subterranean zones, strata or reservoir, whereby a flow-loop is created between producer wells and injection wells, as required for renewable energy production. Embodiments of the present disclosure may provide a method for developing linear flow paths within subterranean zones, strata or reservoirs that extend beyond damaged zones created near the borehole-reservoir interface, and a certain distance out into the reservoir, that may impede flow or production into the well or borehole or may impede fluid flow from a well or borehole back into a zone, as a result of drilling induced formation damage resulting from drilling into or through said zones or reservoirs, whereby an unimpeded linear flow path is created from the well or borehole, through the drilling induced damage zone, and out into the undamaged portion of said zone or reservoir. Embodiments of the present disclosure may provide flow assurance within the subterranean zone, strata or reservoir utilizing an efficient means of interwell connectivity from injection well to production well whereby fluid entering the reservoir via an injection well can effectively traverse through the reservoir, and/or acquire heat convectively, and/or conductively, from a heat source within a reservoir, whereby heat is transferred to the primary transport fluid, said fluid flows unimpeded, to the producing well, to the surface, to energy generation equipment, to processing equipment for further processing, to an injection well and back to the originating zone for subsequent production thereby, permitting energy production from multiple sources of energy generation components originating from fluid and/or heat contained with said zone(s) or reservoir(s).

Embodiments of the present disclosure may provide systems and methods that improve the economics of geothermal energy resource development, permit development near major population centers, reduce the cost of energy production distribution, costs applicable to geothermal resource access through the use of repurposing existing oil and gas wells and drilling new wells whereby multiple sources of revenue are generated from a single well expenditure. Methods may provide an alternate use for newly drilled oil and gas wells designated as dry holes or for existing oil and gas wells producing high volumes of fluid consisting primarily of produced water or alternate uses for oil and gas wells no longer producing and are shut-in because the cost of producing fluid being primarily water exceeds the revenue generated from any remaining hydrocarbons produced with the water. Methods may reduce the environmental impact resulting from oil and gas operation produced water, offset the operating costs associated with handling, treating, transporting, and disposing of massive volumes of produced water associated with mature, late-life oil and gas operations, and permit the extension of the useful life of those operations, by transitioning produced water into a revenue-generating commodity. Systems and methods may mitigate the risk of component and/or apparatus damage that may result through exposure to potentially damaging corrosion and scale accumulation from aqueous or gaseous corrosive elements and components frequently found in fluids originating from subterranean zones and produced from subsurface wells.

Systems and methods disclosed may reduce the risk climate change may have on energy production derived from surface sources of water caused by drought and higher temperatures whereby, surface sources of water are reduced and thereby reducing available power generated from those sources of water, or from extreme rain events that may cause flooding resulting in the catastrophic failure of structures, like dams, designed to retain water and create head pressure required for energy production, or extreme wind events resulting in catastrophic failure of energy resources that rely on wind or the sun whereby, failure would risk lives, the environment and energy production resulting from failure. Systems and methods may provide a means of environmental sustainability, whereby produced water is beneficially reused reducing the negative impact resulting from produced water applicable to oil and gas industry operations, by implementing a renewable energy technology permitting its beneficial use, whereby the negative environmental impact associated with produced water is reduced. Systems and methods may extend the useful life of oil and gas industry operations by development of a revenue generating useful purpose for shut-in wells no longer producing commercial volumes of hydrocarbons or wells producing high volumes of water often associated with mature, late-life oil and gas operations. Systems and methods also may utilize materials that increase corrosion resistance to potentially corrosive aqueous or gaseous components or components resulting in scale accumulation that may originate from subsurface fluids whereby utilizing said materials or reducing exposure to said damaging components may reduce costs associated with damage, repair and maintenance to equipment that may result from exposure.

The present disclosure relates to electric power generation and, more particularly, to a power generating system, method and apparatus for accessing and producing fluid from subterranean zones that contain water as a primary fluid, water that may include hydrocarbons, and/or water that may be heated from heat sources originating below the surface of the earth, for the purpose of generating hydro-electric power (Kinetic Energy), power generated from geothermal heat (Thermal Energy), power generated from components contained within the water that may include hydrocarbons or hydrogen (Chemical Energy), power that may be generated from any other energy producing component contained within the fluid and/or from valuable components contained within the fluid that may provide a useful purpose, or any combination thereof. The present disclosure provides methods, systems and apparatus whereby energy producing fluid that may be contained within the one or a plurality of subsurface zone(s), strata, or reservoir(s) may flow into boreholes that may be cased, uncased, or any combination thereof, and used for the purpose of producing fluid from the one or a plurality of subsurface zone(s), strata, or reservoir(s), whereby fluid flows into the producing well to the surface, using pressure energy contained within the reservoir(s) or flow to the surface is artificially induced by artificial means, into a system of interconnected pipes that direct the fluid to apparatus used for energy production, the energy producing fluid is used for energy generation that may be electricity or energy for a useful purpose, is processed to separate energy containing components individually and from waste components or other components contained within the fluid that may not provide a useful purpose, leaving a fluid composed primarily of water whereby, additional energy may be produced from the separated, individual, energy producing components, and the remaining fluid, consisting primarily of water, flows or is pumped into a system of interconnected pipes that direct the fluid to one or a plurality of boreholes that may be cased, uncased, or any combination thereof, and used for the purpose of injecting fluid into, the same one or plurality of originating subterranean zone(s), strata, or reservoir(s) for the purpose of creating a flow-loop of interconnected flow paths that provide continuous, unimpeded fluid flow between producing well(s) and injection well(s), required for continuous energy production and/or continuous coproduction of energy. The present disclosure provides methods, systems and apparatus whereby, a plurality of subsurface wells that penetrate through or terminate in one or a plurality of subterranean zone(s), strata or reservoir(s), interconnect to create a system of flow paths not limited by complex geology, subsurface faults, porosity, permeability, reservoir compartmentalization, limited fracture networks, reservoir composition, and/or any other element that may prevent, restrict or impede flow from, within, or into said reservoir(s). The present disclosure relates to power generated from fluid originating from one or a plurality of subterranean zone(s), strata, or reservoirs, using subsurface wells, to produce fluid that could be flowing at high velocities whereby, fluids that may consist primarily of water, water containing hydrocarbons, water containing heat, or fluids originating from subterranean zone(s), strata, or reservoir(s), could contain corrosive components consisting of high salinity water, $CO_2$ and/or $H_2S$ and/or other corrosive and mineral components, resulting in an environment that could initiate aqueous, gaseous and/or flow-induced erosion, corrosion, and/or scale accumulation on contacted surfaces whereby, the use of materials composed of resin-based carbon fiber reinforced polymer composition (CFRP), carbon fiber reinforced phenolic resin composition (CFRPR), surface coatings designed for corrosion and/or erosion resistance, materials composed primarily of nickel-base alloy elements consisting of nickel, iron, chromium, molybdenum, copper, niobium, titanium, and aluminum, when combined in specific weight percentages, provide materials that may improve corrosion resistance, erosion resistance, may be used to construct, build or manufacture turbine machine apparatus, conduits used for borehole stability and/or containment, conduits used for fluid transport, apparatus used for the transfer of heat between bodies, apparatus used for thermal isolation, and/or any components required for thermal, kinetic, and chemical energy production utilizing primarily subterranean sourced aqueous fluid required for energy production, electricity generation or any other useful purpose.

BRIEF DESCRIPTION OF THE DRAWINGS

For a more complete understanding of this disclosure, reference is now made to the following description, taken in conjunction with the accompanying drawings, in which:

FIG. 12A and FIG. 12B depict the side view of well connection interface guide cone body, and the internal bore configuration of the well connection interface guide cone body, respectively, according to an embodiment of the present disclosure;

FIG. 13A and FIG. 13B depict the side view of the borehole offset body assembly and the internal bore configuration of the borehole offset body assembly, respectively, according to an embodiment of the present disclosure;

DETAILED DESCRIPTION

Figure 1A:
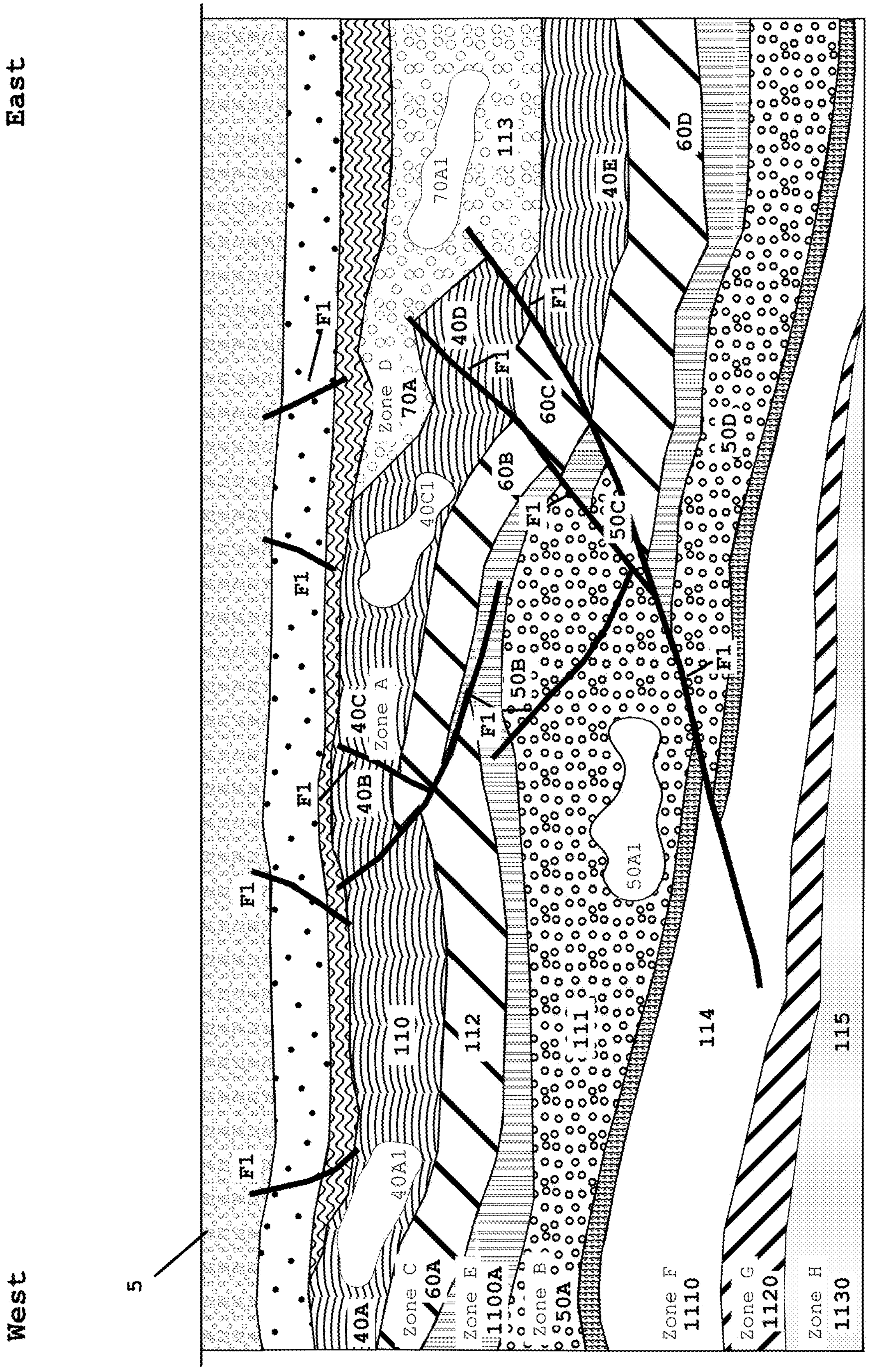
FIG. 1A depicts a schematic cross-section view of a complex, heterogeneous, subsurface geologic system according to an embodiment of the present disclosure.

Embodiments of the present disclosure may provide a system encompassing methods and apparatus for generating hydroelectric power from produced fluids in subterranean zones, strata, or reservoirs, cogenerating hydroelectric power together with power generated from thermal heat contained in fluids produced from subterranean zones, strata, or reservoirs, cogenerating hydroelectric power together with power generated from hydrocarbons contained in fluids produced from subterranean zones, strata, or reservoirs, cogenerating hydroelectric power together with power generated from other energy generation components contained in produced fluids that may include hydrogen contained in the fluid used for hydrogen energy production or any other energy generation component contained in fluid originating from subterranean zones, strata, or reservoirs, or any combination of the aforementioned energy generation components together with hydroelectric power, thereof, derived from produced fluids in subterranean zones, strata, or reservoirs as summarized in a six (6) phase process (FIGS. 51 and 52), using subsurface wells that penetrate or terminate in one or a plurality of fluid-bearing zone(s), strata, or reservoir(s) containing water alone, water containing heat, water containing hydrocarbons, water containing other energy generation components or any combination thereof. The 6-phase process includes the following methods: Phase 1—Fluid Production, Phase 2—Fluid Gathering and Combination, Phase 3—Kinetic Energy/Thermal Energy Electricity Cogeneration, Phase 4—Fluid Processing, Phase 5—Kinetic Energy/Chemical Energy Electricity Cogeneration, and Phase 6—Fluid Pumping, Distribution, and Injection. For the sake of conciseness, all features of an actual implementation, as in any engineering or design project, may not be described or illustrated.

The following illustrative description is intended for ease of understanding related to described methods and apparatus. As one of ordinary skill in the art will readily appreciate from the disclosure, processes, machines, manufacture, compositions of matter, means, method or steps, presently existing or later to be developed that perform substantially the same function or achieve substantially the same result as the corresponding embodiments described herein may be utilized according to the present disclosure.

Phase 1—Fluid Production. Fluids are produced from one or more subterranean zone(s), strata, or reservoir(s) to the surface. In Phase 1—Fluid Production step A, a new well may be drilled that penetrates through or terminates in one or a plurality of fluid-bearing subterranean zone(s), strata or reservoir(s) or an existing well that has been drilled may be utilized, penetrates through, or is terminated in one or a plurality of fluid-bearing zone(s), strata or reservoir(s), which contain one or more inlet pipes interconnected to one or more inlet feed lines. A new well may be designed to follow a vertical well path that penetrates through or terminates in one or a plurality of fluid-bearing subterranean zone(s), strata or reservoir(s), follows a path that deviates from a vertical orientation that may include one or more horizontal wellbore sections, and known to those skilled in the art as a parent wellbore, one or more lateral wellbore sections deviating from the main wellbore subsection that could be vertical, deviated or horizontal, and known to those skilled in the art as a child wellbore, one or more lateral subsections deviating from a child wellbore, or any combination thereof, of the aforementioned well path configurations. An existing well may also be used in its existing configuration or it may be altered to reconfigure the well, whereby reconfiguration could include modifying the original borehole size, intersecting the same or other fluid-bearing zone(s), strata, or reservoir(s), the same or other zone(s) than those intersected by the original wellbore, modifying the well path that could include deviation of the wellbore whereby the well path deviates from a vertical orientation, the well path is sidetracked to bypass the original wellbore and/or components contained in the original wellbore, the well path deviates in a horizontal orientation relative to the original wellbore, the well path includes more than one horizontal wellbore section, the well path includes one or more lateral child wellbore sections deviating from the original or reconfigured parent wellbore section that may include deviated, sidetrack, and horizontal wellbore sections, and one or more lateral subsections deviating from one or more lateral child wellbore sections, or any combination thereof of the aforementioned wellbore path configurations. In Phase 1—Fluid Production step B, a new or an existing well may be designed or reconfigured whereby, methods and apparatus presently disclosed are utilized for the purpose of joining producing wellbores to injection wellbores. Wellbores may be parent alone, parent and child, whereby the parent wellbore may include one or more horizontal wellbore sections extending from a vertical and/or deviated wellbore section, or any combination thereof, that may also include one or more lateral child wellbore section(s), whereby producing child wellbores are joined to injection child wellbores that may include one or more lateral wellbore subsections deviating from child lateral wellbore section(s), that could be vertical, deviated or horizontal, or any combination thereof, for the purpose of developing a system of flow paths within subterranean zone(s), strata, or reservoir(s) that may include complex depositional systems whereby the zone(s), strata, or reservoir(s), may include subsurface faults dividing zones, strata or reservoirs, a limited natural fracture network, varying permeability, porosity, compartments or other heterogeneities within the subterranean zone(s), strata, or reservoir(s) that affect fluid flow patterns, and may also include fluid flow patterns impacted by reduced permeability or damage by external processes and/or fluids used to drill or complete the borehole that invade the reservoir in an area lateral to the wellbore that extends from the wellbore/reservoir interface out a certain distance into the reservoir whereby, fluid entry into the wellbore may be prevented, impeded or restricted by fluid flow patterns, from, through or into the reservoir, that may prevent interwell connectivity between producing wells and injection wells whereby, continuous flow from, through or into the reservoir(s) required for renewable energy production may be impacted. In Phase 1—Fluid Production step C, systems and method are disclosed for the purpose of joining producing wells to injection wells. The systems and methods of joining pipes or conduits may create a system or network of interconnected pipes within one or a plurality of subsurface zone(s), strata, or reservoir(s) for the purpose of creating flow paths that may provide continuous fluid flow that may be unrestricted and/or unimpeded within, from or into the one or a plurality of subsurface zone(s), strata, or reservoir(s). The systems and methods of joining pipes or conduits may interconnect boreholes that may be cased, uncased, or any combination thereof, and used for the purpose of producing fluid from the one or a plurality of subsurface zone(s), strata, or reservoir(s), to boreholes that may be cased or uncased, or any combination thereof, and used for the purpose of injecting fluid into the one or a plurality of subsurface zone(s), strata, or reservoir(s). The systems and methods of joining pipes or conduits may create a process whereby energy producing fluid that may be contained within the one or a plurality of subsurface zone(s), strata, or reservoir(s) may flow into boreholes that may be cased, uncased, or any combination thereof, and used for the purpose of producing fluid from the one or a plurality of subsurface zone(s), strata, or reservoir(s), whereby fluid flows into the producing well to the surface, using pressure energy contained within the reservoir(s) or flow to the surface is artificially induced by artificial means, into a system of interconnected pipes that direct the fluid to apparatus used for energy production, the energy producing fluid is used for energy generation that may be electricity or energy for a useful purpose, is processed to separate energy containing components individually and from waste components or other components contained within the fluid that may not provide a useful purpose, leaving a fluid composed primarily of water whereby, additional energy may be produced from the separated, individual energy producing components, and the remaining fluid, consisting primarily of water, flows or is pumped into a system of interconnected pipes that direct the fluid to one or a plurality of boreholes that may be cased, uncased, or any combination thereof, and used for the purpose of injecting fluid into, the same one or plurality of originating subterranean zone(s), strata, or reservoir(s) for the purpose of creating interconnected flow paths that provide continuous, unimpeded fluid flow between producing well(s) and injection well(s), required for continuous energy production. The method of interconnection and production follows a five (5) sequence drilling process whereby, a new well, an existing well in its present configuration, or an existing well that is reconfigured, and designated as a producing well, intersects, penetrates or terminates in one or a plurality of subterranean zone(s), strata, or reservoir(s) and a second well, that may be a new well, an existing well in its present configuration or an existing well that is reconfigured, and is designated as an injection well, intersects, penetrates and/or terminates in one or a plurality of subterranean zone(s), strata, or reservoir(s) whereby the producing well and the injection well intersect, penetrate and/or terminate in the same zone(s). The borehole, designated as the parent borehole, can be in any configuration, such as vertical, directional, horizontal, or any combination thereof, for each producing well borehole and injection well borehole that may be cased, uncased or any combination thereof. In one aspect of the present disclosure, the producing well and injection well are new with the drilling process to facilitate the parent borehole being complete, and further drilling processes are underway to facilitate producing well borehole interconnection to the injection well borehole, or injection well borehole interconnection to the producing well borehole whereby, a lateral borehole, designated as a child borehole, is extended from the parent wellbore of either the producing well borehole and/or injection well borehole with orientation of the child borehole proximate to the opposing well. A primary embodiment of the present disclosure utilized for wellbore interconnection, is a wellbore connection interface device 1210. To facilitate interconnection, two wellbore connection interface devices are interconnected to create a joint with one well being designated the primary well with a primary wellbore or borehole comprising an external completion assembly which also comprises as a component, a wellbore connection interface device, which is intersected by a secondary well with a secondary wellbore or borehole comprising an external casing completion assembly, which also comprises as a component, a wellbore connection interface device whereby, the wellbore connection interface device in the primary borehole is intersected by the wellbore connection interface device in the secondary well whereby, the secondary wellbore connection interface device penetrates through the primary well wellbore connection interface device and the interconnection of one wellbore connection interface device to another, upon completion of Well Interconnection Drilling Sequence 5, creates a sealed joint facilitated by methods summarized in the foregoing five (5) sequences whereby, In Well Interconnection Drilling Sequence 1 a secondary well borehole comprising a drilling assembly is drilled in close proximity to a primary well borehole comprising a wellbore connection interface device, in Well Interconnection Drilling Sequence 2 the precise location of the primary borehole comprising wellbore connection interface device is determined, and the secondary borehole comprising the drilling assembly is drilled to that precise location, in Well Interconnection Drilling Sequence 3 the drilling assembly within the secondary borehole penetrates and drills through the wellbore connection interface device within the primary well borehole, and further out into the surrounding formation, in Well Interconnection Drilling Sequence 4 an external casing completion assembly comprising a wellbore connection interface is deployed within the secondary well borehole, penetration through the primary well wellbore connection interface device whereby when complete the wellbore connection interface device within the secondary well is inside the wellbore connection interface device for the primary well and the secondary wellbore comprising the external casing completion assembly is bonded together in the borehole with a bonding system 81 and in Well Interconnection Drilling Sequence 5 all obstructions created within the primary well wellbore connection interface device by the interconnection process, which may include bonding system 81 and secondary well wellbore connection interface device, or other obstructions are removed whereby, an unobstructed flow path is created within the joint, facilitated by the interconnection of wellbore connection interface devices and in the final step an internal seal is installed within the primary well wellbore connection interface device to facilitate an internal joint seal. Additional descriptive details of the five sequence interconnection process are provided herein FIGS. 15-19 of the present disclosure. Phase 1—Fluid Production step D is Production Flow Sequence 1 whereby, a method and apparatus according to embodiments of the present disclosure provide for coproducing fluids originating from one or a plurality of subterranean zone(s), strata, or reservoir(s) such that heated or thermal fluid that may originate from one or a plurality of subterranean zone(s), strata, or reservoir(s), which may be defined as thermal or geothermal zone(s), may be coproduced with non-thermal fluids originating from one or a plurality of subterranean zone(s), strata, or reservoir(s), that may be defined as non-thermal zone(s), and may be produced simultaneously together. Coproduction requires producing together fluids which may comprise thermal energy together with non-thermal lower temperature fluids whereby, a wellbore may comprise components which may include both high thermally conductive components to facilitate heat transfer between materials and high thermally resistant components to provide insulative properties which may prevent or minimize heat loss from one material to another. When ultrahigh or low thermal conductivity component materials are desirable to achieve high thermal conductance from one material to another, for example, when heat from a heat source is desired to be transferred to a heat carrier or when low thermal conductance or high thermal resistance from one material to another is desired, for example, when insulating a heat carrier to prevent or minimize thermal energy loss from the heat carrier is desired, materials consistent with the desired thermal conductivity are utilized specific to the intended purpose. Thermal conductivity is the energy transmitted across a unit area per unit time and k (thermal conductivity coefficient), characterizes the heat-conducting ability of materials, which range from Xenon gas with a low thermal conductivity of 0.006 W/m-K to a high thermal conductivity of approximately 2,000 W/m-K for diamond. Temperature is an incoherent phenomenon whereby, changes in entropy are associated to changes in temperature. Heat flow is related to a quantity of collisions, called phonon scattering, which may occur at the atomic level within a material and travels in the direction of high heat to low heat whereby, heat from a heat source are transferred to a material with heat being absorbed on the surface of material A, causing molecules on the surface to move more quickly whereby, collisions occur with other molecules with energy transferred with each collision which continues through the material until contact is made with a material B whereby, the process continues as long as heat energy is added with heat transfer continuing from a high temperature material to a lower temperature material until the temperature difference between the heat source, material A, material B, and any other materials with lower temperatures than the heat source, reach a state of thermal equilibrium. Thermal conductance is a measure of the ability of a material or system to transfer or conduct heat, and thermal resistance, conversely measures the opposition to the heat flow in a material or system, depend on four basic factors: the temperature gradient, the cross-section of the material, the path length and the properties of the material. Heat conduction properties of materials are rated relative to the thermal conductivity coefficient of silver with a k value of 100 W/m-K whereas, material thermal conductivity is reduced (thermal resistivity increases) for k-values below 100 W/m-K and becomes higher for materials with k-values above 100 W/m-K. The present disclosure generally relates to generating hydroelectric power, cogenerating hydroelectric power together with power generated from thermal heat, cogenerating hydroelectric power together with power generated from chemical components contained within fluid (e.g., hydrocarbons, hydrogen, other energy producing chemical components), or any combination thereof whereby, facilitation may require components which may comprise high thermal conductivity material to transfer thermal energy from a heat source to a heat carrier and may also require components which may comprise thermal resistant materials or thermal insulators used for the purpose of containing thermal energy transferred from a heat source to a heat carrier which may contain the thermal energy within the heat carrier whereby, thermal energy loss to other materials or the surrounding environment is prevented or at least minimized. Embodiments of the present disclosure may comprise high thermally conductive components, high thermally resistant components, or any combination thereof whereby, when high thermal conductivity components are desired to facilitate the transfer of heat from a heat source to a heat carrier components and/or component materials may include: any high thermally conductive metallic, non-metallic, or polymer composite material, which may include silver, components comprising silver, which may include silver paste, or silver alloys, copper, copper alloys, gold, aluminum, aluminum nitride, aluminum alloys, tungsten, tungsten alloys, zinc, zinc alloys, silicon carbide, Zeolites, which may be comprised of consolidated NaX Zeolite, graphite, graphite with expanded natural graphite, which may include silica gel-expanded graphite, diamonds, components comprising diamonds which may include diamond powder or diamond coatings, any composite material, composite adsorbents, composite coated adsorbents, composite coatings, and/or any other high thermally conductive materials, or any combination thereof, or any other high thermally conductive materials known to those skilled in the art. Embodiments of the present disclosure may also comprise high thermally resistant components whereby, when high thermal resistant components are desired to facilitate containing heat within a heat carrier and/or to prevent or minimize the loss of thermal energy which may occur from exposure to lower temperature materials or a lower temperature environment, thermal insulating components and/or component materials may include: Yttria-stabilized zirconia (YSZ) ceramic material, aerogel/fibrous ceramic composite materials that may comprise mullite fibers and $ZrO_2$—$SiO_2$ components that may be aerogels, $ZrBr_2$—ZrC nanofiber material that may be an aerogel, ceramic silica-based materials that may be an aerogel, hexagonal boron nitride materials that may be an aerogel, polyacrylonitrile (PAN) based carbon fiber materials that may comprise poly(methyl methacrylate) (PMMA) and/or silica nanoparticles (SNP) materials, low-density, low thermal conductivity rayon-based carbon fiber material, carbon fiber-reinforced carbon composite (C/C) materials that may contain phenolic resin, any high thermally resistant materials which may comprise resins for the purpose of developing high thermally resistant composite materials that may include phenolic resins, any other high thermally resistant materials defined as thermal barrier materials and/or coatings known to those skilled in the art whereby, thermal conductivity is equal to or lower than 6 W/mK, and is designed for exposure to temperatures ranging from ambient surface temperature of −90° C. through a subsurface temperature of 3,700° C., or any combination thereof, materials used for the purpose of fluid heat insulation. Thermal and non-thermal fluid coproduction is facilitated by way of an internal conduit within a producer well 20, positioned in sections of producer well 20, producing thermal production 10-T, and non-thermal production 10 simultaneously together, comprising an inner conduit and an outer conduit whereby, insulating material contained within the space external to the inner conduit and internal to the outer conduit, which may also include an insulating material external to the outer conduit, thermally insulates one fluid from another in applicable sections of a producer well 20 comprising both thermal production 10-T and non-thermal production 10 coproducing simultaneously, and defined as a primary thermal insulated body 1400 that may also comprise a secondary thermal insulated body 1400A whereby, said body thermally isolates one fluid from another facilitating coproducing thermal and non-thermal fluids simultaneously providing the coproduction of energy from a thermal source, a non-thermal source, a thermal source that may include hydrocarbons and/or other energy producing components, a non-thermal source that may include hydrocarbons and/or other energy producing components, or any combination thereof. Materials used for the purpose thermal insulation comprising an embodiment of the present disclosure, and included as an insulating component within a primary thermal insulated body 1400, and may also comprise the thermal insulation component of a secondary thermal insulated body 1400A whereby, primary thermal insulated body 1400 and/or secondary thermal insulated body 1400A may include any of the aforementioned high thermally resistant materials which are the same for each component, or may vary from one component to another. The method of producing thermal and/or non-thermal fluids, according to an embodiment of the present disclosure, originating from one or a plurality of subterranean zone(s), strata or reservoir(s), from a producing well, according to embodiments of the present disclosure, comprising the production flow sequence 1 whereby, a conduit, comprising sections of conduit attached one to another, and comprising a producer well internal completion assembly 90P, may also comprise one or a plurality of fluid flow enhancement device(s), defined as a gravel pack screen assembly, known to those skilled in the art, and used for the purpose of preventing formation material that may originate from within a subterranean zone, that may restrict fluid entry into a producing well, and/or facilitate pumping fluid and/or fluid comprising media sized to provide a conduit of defined permeability, whereby the flow conduit is perforation 100 penetrating producer well internal completion assembly 90P and the producing well wellbore external casing completion assembly 80P, extending a small distance into the zone, permitting a flow path from a subterranean zone into a producer well internal completion assembly 90P, and/or to facilitate pumping fluid and/or fluid comprising media sized to provide an extended conduit or linear flow path of defined permeability, whereby the perforation 100 penetrating the producer well internal completion assembly 90P and the producer well wellbore external casing completion assembly 80P, extending a small distance into the zone and a fracture, induced by fluid flow and pump pressure into a subterranean zone, create a linear flow path that may extend beyond any damaged zone within the formation produced by a drilling operation whereby, hydraulic fracture 101 may substantially enhance fluid flow entry and fluid flow rate into a producing well wellbore external casing completion assembly 80P and/or producing well internal completion assembly 90P, which may comprise one or a plurality of primary thermal insulated bodies 1400 which may also include, a secondary thermal insulated body 1400A, attached to the one or plurality of primary thermal insulated bodies 1400, one or more internal completion assembly sealing devices 130, or packer(s), known to those skilled in the art, and deployed as a component attached to a producer well internal completion assembly 90P, or any combination thereof, and used for the purpose of isolating fluid flow that may exist within the wellbore external casing completion assembly 80P, one or a plurality of internal completion assembly flow-through sealing device(s) 132, deployed as a component attached to the producer well internal completion assembly 90P, and used for the purpose of permitting fluid flow through a sealing device within a wellbore external casing completion assembly 80P, one or more flow control device(s) 83, which may prevent, restrict, or provide fluid flow entry from within the wellbore external casing completion assembly 80P into a producer well internal completion assembly 90P, and/or to prevent, restrict, or provide fluid flow within the producer well internal completion assembly 90P, one or a plurality of location orientation device(s) used for the purpose of determining the location of one component contained within the producing well internal completion assembly 90P, relative to another, one or a plurality of accessory device(s) used for the purpose of placing and/or location orientation for other devices that may measure fluid properties, pressure, temperature, flow rate or other desired fluid flow and/or zone parameters or for other purposes and/or devices that may be required and/or desired within the producer well internal completion assembly 90P, from time-to-time, prevent or restrict fluid flow from within the producer well internal completion assembly 90P, one or more heat transfer bodies 1300, used for the purpose of transferring heat originating from heat sources within the earth, heat transferred from heat sources within the earth to heat transfer bodies that may comprise a wellbore external casing completion assembly 80P, to fluid flowing within the producer well internal completion assembly 90P which may then be used for energy production, and/or any other component which may compose a conduit assembly, one or a plurality of safety devices used for the purpose of pressure and/or fluid containment with a producer well internal completion assembly 90P, components for any other purpose, or any combination thereof, which may comprise a producer well internal completion assembly 90P, and are known to those skilled in the art and used for the purpose of producing fluid, isolating, restricting and/or diverting flow, measuring fluid and/or zone parameters, providing a flow path for fluids, contained within one or a plurality of subterranean zone(s), strata, or reservoir(s), and provide a method of coproducing thermal production 10-T and/or non-thermal production 10, for the purpose of energy production whereby, said assembly when composed, comprises a producer well internal completion assembly 90P whereby, said assembly is deployed from the surface facilitated by an assembly designed for well internal completion assemblies from the surface of the earth 5, that may be defined as a rig, drilling rig, completion rig, workover rig, hydraulic workover unit, or any device known to those skilled in the art and used for the purpose of a producer well internal completion assembly 90P deployment within a wellbore external casing completion assembly 80P.

Phase 2—Fluid Gathering and Combination. Produced fluids may be gathered from a plurality of wells and combined in a system of interconnected pipes. In step A, fluids flow from individual wells that contain energy generation components, namely, heat, hydrocarbons, water salinity, hydrogen and any other energy generation component or any combination thereof, into one or more inlet pipes contained within the borehole, cased wellbore, or any combination thereof, to the surface using pressure energy or any other energy source inducing fluid flow contained within the reservoir(s), or flow to the surface is artificially induced by artificial means, enter one or more interconnected pipe(s), flow line(s), or pipeline(s) at the surface leading to a gathering system of interconnected pipes that include a modular system of lateral lines and a modular system of main lines that include a system of safety, flow control and monitoring devices permitting one or any number of wells being connected, controlled and monitored within the system of interconnected lines and pipes that may control, direct and monitor flow to one or any number of energy generation systems used for thermal energy production, kinetic energy production, chemical energy production, energy production by any other means or any combination thereof. In step B, a plurality of flowing or producing wells connected to a gathering system of interconnected pipes, combined with pressure energy, naturally occurring from within the reservoir(s) or artificially induced and/or any other energy generation components contained within the fluid, that may include, heat, fluid flow, pressure, hydrocarbons, water, water comprising sodium chloride of varying concentrations, water comprising hydrogen, hydrocarbons comprising hydrogen, hydrogen alone, or any other energy producing components, or any combination thereof, contained within the fluid, originating from the subterranean zone(s), strata or reservoir(s), create the energy required for thermal energy production, kinetic energy production, chemical energy production, energy production by any other means, or any combination thereof.

Phase 3, Sequence 1—Kinetic Energy/Thermal Energy Electricity Cogeneration (Thermal Energy Electricity Generation). In step A, accumulated fluid from a plurality of flowing or producing wells contained in a gathering system of interconnected pipes, combined with pressure energy, naturally occurring from within the reservoir(s) or artificially induced and/or any other energy generation components contained within the fluid, that may include, heat, fluid flow, pressure, hydrocarbons, water, water comprising sodium chloride of varying concentrations, water comprising hydrogen, hydrocarbons comprising hydrogen, hydrogen alone, or any other energy producing components, or any combination thereof, flowing in a gathering system of interconnected lateral and main lines, are directed and connected to, one or more thermal energy production devices that may include dry steam, flash steam, binary steam (e.g., Organic Rankine Cycle and Kalina Cycle heat exchange binary steam devices), supercritical CO2, thermoelectric or any combination thereof, steam or heat powered turbines, with pressurized, freshwater fluids, hydrocarbon-based fluids, sodium-based fluids, corrosive fluids, or any combination thereof, these fluids. In step B, the fluid flow rate, combined with the well pressure, (normal pressure, geopressure or artificially induced pressure), originating from the subterranean zone(s), strata or reservoir(s) contained within the well together with heat contained within the fluid, that may be in liquid or vapor form, create the energy necessary to turn the turbine runner or impeller connected to a shaft connected to an electric generator used to produce electricity. In some embodiments, dry heat vapor is used directly to create the energy required to turn the turbine runner connected to a generator used for electricity production for a dry steam power generation. In some embodiments, superheated fluid, typically with temperatures greater than 180° C. (~360° F.), combined with pressure contained within the fluid, enter a vessel with a lower pressure than the pressure contained within the superheated fluid, whereby the lower pressure causes some of the fluid in liquid form to rapidly transition to vapor form with the produced vapor creating the energy necessary to turn the turbine runner or impeller connected to a shaft connected to an electric generator used to produce electricity for Flash Steam power generation. Some embodiments may further include a heat exchanger for heating a (primary) working fluid contained inside a pipe, directed and connected to a turbine for electricity generation in a closed loop system, whereby, the loop system is in thermal contact to the heat exchanger recovering heat from a secondary working fluid. A second working fluid containing, and originating from one or more subterranean zone(s), strata, or reservoir(s) is combined in a pipe directed and connected to a heat exchanger in thermal contact to the pipe containing a (primary) working fluid whereby, heat contained in the second working fluid is transferred to the primary working fluid circulating in a closed-loop connected to a turbine, which is subsequently used to turn a turbine rotor connected to a generator, used for Binary Cycle electricity power production. Two distinct working fluids are used whereby the primary working fluid may be organic hydrocarbon, a refrigerant, or an inorganic fluid and the second working fluid originates from one or more subterranean zone(s), strata, or reservoir(s) within the earth and consists of fluid and any contained components within said fluid, originating from one or more subterranean zone(s), strata, or reservoir(s) within the earth. Power may be generated by dry steam, flash steam, binary cycle, thermoelectric and any other power generation method, or any combination thereof, whereby heat is the energy production source.

Phase 3, Sequence 2—Kinetic Energy/Thermal Energy Electricity Cogeneration (Kinetic Energy Electricity Generation). In step A, accumulated fluid from a plurality of wells, flowing into a gathering system of interconnected lateral and main lines and used for hydropower energy production, is combined with fluid used for Phase 3, Thermal Energy Electricity Production, after contained heat has been utilized for energy production, and flows together with fluid used for hydropower energy production, into interconnected pipes connected to one or more hydro-turbines modified to permit operation with pressurized, freshwater fluids, hydrocarbon-based fluids, sodium-based fluids, corrosive fluids, or any combination of these fluids. In one embodiment of the present invention, a pump may be connected to the thermal heat exchanger fluid line outlet pipe downstream of the thermal heat exchanger to supply pressure to the exiting fluid, prior to said fluid joining fluid used for hydropower production to increase the fluid pressure to a pressure equal to the fluid pressure used for hydropower energy production. In step B, the fluid flow rate, combined with the well pressure, (normal pressure, geopressure or artificially induced pressure), originating from the subterranean zone(s), strata or reservoir(s) contained within the well, create the pressure or head and flow rate resulting from one or more subsurface wells flowing into the gathering system of interconnected pipes. This pressure and combined fluid volume create the required flow rate and head pressure necessary to turn the turbine runner or impeller connected to a shaft connected to an electric generator used to produce electricity.

Phase 4—Fluid Processing. In step A, produced fluids are discharged from the hydro-turbine into one or more outlet pipes containing equipment or apparatus preventing back flow to the hydro-turbine and leading to fluid processing equipment and/or apparatus utilized, if required, to separate the combined fluid stream into individual components of oil, gas, water and any waste components such as helium and carbon dioxide or other waste components that may be contained within the fluid. In step B, the separated fluids of oil, gas water and any waste components, flow into individual outlet lines for additional processing, storage, energy production and/or sale. The processed gas flows through the gas outlet line into one or more vapor chemical energy production inlet line(s), gas transmission pipeline(s) or any combination thereof. The processed oil flows through the oil outlet line into one or more liquid chemical energy production inlet line(s), an oil storage and/or containment system, oil transmission pipeline(s), or any combination thereof. The separated fluid of fresh or sodium-based water flows from the processing equipment into one or more outlet line(s) leading to a containment system of one or more tanks, or a fluid distribution system composed of one or more interconnected lines or pipes.

Phase 5, Sequence 1—Kinetic Energy/Chemical Energy Electricity Cogeneration (Chemical Energy Electricity Generation). In step A, accumulated, processed oil, gas, or any combination thereof, fluid flowing from Phase 4—Fluid Processing, flows into individual liquid and vapor outlet lines, and is directed to one or more inlet liquid and/or vapor lines, respectively, leading to a combustion turbine, boiler, or any combination thereof, chemical energy production component. In step B, air is used the primary working fluid for turbine operation. Atmospheric air flows through a compressor that increases the air to a higher pressure followed by adding fuel to the air mixture. The pressurized air/fuel mixture is ignited whereby combustion generates a high-temperature/high-pressure fluid flow. The energy contained in the high-temperature/high-pressure vapor enters a turbine, producing energy used to turn a shaft connected to an electric generator used to produce electricity. In step C, energy production applicable to Phase 3—Thermal Energy Electricity Production, step B, and Phase 5—Chemical Energy Electricity Production, step B, create residual secondary energy in the form heated fluid resulting from heat exchange occurring between the primary working fluid and cooling fluid used for Phase 3—Thermal Energy Electricity Production and from heat vapor expelled by primary combustion components during Phase 5—Chemical Energy Electricity Production, step B. Some embodiments may include one or more heat exchanger(s) for heating a (primary) working fluid contained inside a pipe, directed and connected to a turbine for electricity generation in a closed-loop system whereby, the closed-loop system for the primary working fluid is in thermal contact to the heat exchanger recovering heat from a secondary working fluid. Some embodiments may include a heat exchanger used for secondary energy electricity production resulting from primary Phase 3—Thermal Energy Electricity Production and some embodiments may include a heat exchanger used for secondary energy production resulting from Phase 5—Chemical Energy Electricity Production whereby, the primary working fluid closed-loop system with its contained primary working fluid and used for secondary energy electricity production is common to or the same closed-loop system with contained primary working fluid used for the heat exchanger applicable to Phase 3 secondary energy production. A second working fluid, flowing in a closed-loop system may originate from fluid used during the heat transfer cooling process applicable to Phase 3—Thermal Energy Electricity Production, step B, and a second working fluid, flowing in a closed-loop-system, may originate from fluid heat generated from Phase 5—Chemical Energy Electricity Production, step B. Phase 3 heat exchange closed-loop secondary working fluid system pipe is directed and connected to a heat exchanger in thermal contact to the pipe containing the secondary energy production (primary) working fluid, and Phase 5 heat exchange secondary working fluid closed-loop system pipe is directed and connected to a heat exchanger in thermal contact to the pipe containing secondary energy production (primary) working fluid, whereby, the primary working fluid closed-loop piping system used for the heat exchanger applicable to Phase 3 energy production and the primary working fluid closed-loop piping system used for the heat exchanger applicable to Phase 5 energy are the same closed-loop piping system. For each heat exchange system, heat contained in the second working fluid is transferred to the primary working fluid circulating in a closed-loop and connected to a turbine, which is subsequently used to turn a turbine a shaft connected to a generator, and used for Secondary Energy Binary Cycle power electricity production. Two or more distinct working fluids may be used whereby the primary working fluid and/or the secondary working fluid may be organic hydrocarbon, a refrigerant, or an inorganic fluid. Power may be generated by dry steam, flash steam, binary cycle, thermoelectric and any other power generation method, or any combination thereof, whereby heat is the energy production source.

Phase 5, Sequence 2—Kinetic Energy/Chemical Energy Electricity Cogeneration (Kinetic Energy Electricity Generation). In step A, accumulated fluid from a plurality of wells, flowing into a gathering system of interconnected lateral and main lines and used for hydropower energy production, is combined with fluid used for Phase 3, Thermal Energy Electricity Production, after contained heat has been utilized for energy production, and flows together with fluid used for hydropower energy production, into interconnected pipes connected to one or more hydro-turbines modified to permit operation with pressurized, freshwater fluids, hydrocarbon-based fluids, sodium-based fluids, corrosive fluids, or any combination of these fluids. In one embodiment of the present invention, a pump may be connected to the thermal heat exchanger fluid line outlet pipe downstream of the thermal heat exchanger to supply pressure to the exiting fluid, prior to said fluid joining fluid used for hydropower production to increase the fluid pressure to a pressure equal to the fluid pressure used for hydropower energy production. In step B, the fluid flow rate, combined with the well pressure, (normal pressure, geopressure or artificially induced pressure), originating from the subterranean zone(s), strata or reservoir(s) contained within the well, create the pressure or head and flow rate resulting from one or more subsurface wells flowing into the gathering system of interconnected pipes. This pressure and combined fluid volume create the required flow rate and head pressure necessary to turn the turbine runner or impeller connected to a shaft connected to an electric generator used to produce electricity.

Phase 6—Fluid Pumping, Distribution, and Injection. In step A, a new well may be drilled that penetrates through or terminates in subterranean fluid-bearing zone(s), strata or reservoir(s) or utilize an existing well that has been drilled, penetrates through or is terminated in a fluid-bearing zone(s), strata or reservoir(s) that contain one or more inlet pipes interconnected to one or more inlet feed lines. A new well may be designed to follow a vertical well path that penetrates through or terminates in subterranean fluid-bearing zone(s), strata or reservoir(s), follows a path that deviates from a vertical orientation that may include one or more horizontal wellbore sections, and known in the art as a parent wellbore, one or more lateral wellbore sections deviating from the main wellbore subsection that could be vertical, deviated or horizontal, and known in the art as a child wellbore, one or more lateral subsections deviating from a child wellbore, or any combination thereof, of the aforementioned well path configurations. An existing well may also be used in its existing configuration or it may be altered to reconfigure the well, whereby reconfiguration could include modifying the original borehole size, intersecting the same or other fluid-bearing zone(s), strata, or reservoir(s), the same or other zone(s) than those intersected by the original wellbore, modifying the well path that could include deviation of the wellbore whereby the well path deviates from a vertical orientation, the well path is sidetracked to bypass the original wellbore and/or components contained in the original wellbore, the well path deviates in a horizontal orientation relative to the original wellbore, the well path includes more than one horizontal wellbore section, the well path includes one or more lateral child wellbore sections deviating from the original or reconfigured parent wellbore section that may include deviated, sidetrack, and horizontal wellbore sections, and one or more lateral subsections deviating from one or more lateral child wellbore sections, or any combination thereof of the aforementioned wellbore path configurations. A new or an existing well may be designed or reconfigured whereby methods and apparatus presently disclosed are utilized for the purpose of joining producing wellbores to injection wellbores. Wellbores may be parent alone, parent and child, whereby the parent wellbore may include one or more horizontal wellbore sections extending from a vertical and/or deviated wellbore section, or any combination thereof, that may also include one or more lateral child wellbore section(s), whereby producing child wellbores are joined to injection child wellbores that may include one or more lateral wellbore subsections deviating from child lateral wellbore section(s), that could be vertical, deviated or horizontal, or any combination thereof, for the purpose of developing a system of flow paths within subterranean zone(s), strata, or reservoir(s) that may include complex depositional systems whereby the zone(s), strata, or reservoir(s) include varying permeability, porosity, compartments or other heterogeneities within the subterranean zone(s), strata, or reservoir(s) that affect fluid flow patterns and may also include fluid flow patterns impacted by reduced permeability or damage by external processes and/or fluids used to drill or complete the borehole that invade the reservoir in an area lateral to the wellbore that extends from the wellbore/reservoir interface out a certain distance into the reservoir whereby, fluid entry into the wellbore may be impeded or may affect fluid flow patterns into the wellbore, that may prevent interwell connectivity between producing wells and injection wells whereby, continuous flow into and/or out of the reservoir(s) required for renewable energy production may be impacted. Methods and apparatus disclosed for the purpose of joining producing wells to injection wells permit unimpeded flow connecting producing wells to injection wells whereby, a continuous fluid flow path originating from one or more subterranean zone(s), strata, or reservoir(s), for fluid flow into one or a plurality of producing well(s), whereby fluid flows to the surface using pressure energy contained within the reservoir(s) or flow to the surface is artificially induced by artificial means, is used for energy generation, is processed, and flows or is pumped back into one or a plurality of injection well(s) to the same one or more originating subterranean zone(s), strata, or reservoir(s) for the purpose of continuous, unimpeded fluid flow between producing well(s) and injection well(s) required for continuous energy production. In step B, access may be provided for fluids contained in the subterranean fluid-bearing zone(s), strata, or reservoir(s) to enter the well containing one or more inlet pipes. Access may be provided from a well that is cased or uncased. For uncased wells fluids may flow directly from the subterranean fluid-bearing zone(s), strata, or reservoir(s) into the well and inlet pipes. Cased wells require penetrations or perforations through the pipes to permit fluid entry into the well and access to the inlet pipes contained within the well. Access is not restricted to a single subterranean zone, subsurface strata, or reservoir. Access may be provided from one or any number of subterranean fluid-bearing zone(s), strata, or reservoir(s), and fluid may flow simultaneously into one or a plurality of well(s), and into one or more inlet pipes contained within the well(s). For subterranean fluid-bearing zone(s), strata, or reservoir(s) that may be cased, uncased, or any combination thereof, that may include complex depositional systems whereby, the zone(s), strata, or reservoir(s) include varying permeability, porosity, compartments or other heterogeneities within the subterranean zone(s), strata, or reservoir(s) that may affect fluid flow patterns and/or fluid flow paths that may be impacted by reduced permeability or damage caused by external processes and/or fluids used to drill or complete the borehole that invade the reservoir in an area lateral to the wellbore that extends from the wellbore/reservoir interface out a certain distance into the reservoir whereby, fluid entry into the wellbore may be impeded or may affect fluid flow patterns into the wellbore, that may prevent interwell connectivity between producing wells and injection wells, such that perforations may be combined with other processes that may include hydraulic fracturing, or pumping other fluids designed to improve flow patterns and create flow paths within subterranean zone(s), strata or reservoir(s), by removing or at least reducing materials that impede or affect fluid flow patterns and flow paths or by stabilizing the reservoir/wellbore interface by means of apparatus and methods designed for stabilization like gravel pack screens, slotted liners or other apparatus and formation solid control methods known in the art and used for the purpose of providing unimpeded fluid flow from the reservoir into the wellbore. In step C, the fresh or saltwater fluid containment system, lines, or pipes from the fluid processing system are connected to a fluid pumping system composed of one or more fluid injection pumps. The fluid pumping system is connected to a fluid distribution system composed of one or more injection lines or pipes. The fluid distribution system is connected to one or more injection lines leading to one or more subsurface wells. In step D, the injection pump system is composed of one or more pumps that are connected to a distribution system of one or more interconnected pipes connected to one or more subsurface wells with injection lines or pipes that penetrate or terminate in one or more fluid-bearing zones. The fresh or sodium-based water from the containment system or system or one interconnected lines or pipes is pumped into one or more injection lines or pipes of the distribution system leading to one or more wells. The well(s) may contain one or more lines penetrating through or terminating in one or more subterranean fluid-bearing zone(s), strata or reservoir(s) with access, penetrations or perforations into the subterranean fluid-bearing zone(s), strata or reservoir(s) that permit injection into one subterranean zone, strata or reservoir or injection into multiple zones, strata, or reservoirs simultaneously. In step E, the fluid injected into one or more fluid-bearing subterranean zone(s), strata, or reservoir(s) is then recycled and reproduced and the renewable energy production process continues again with Phase 1 of the method described above.

Figure 48:
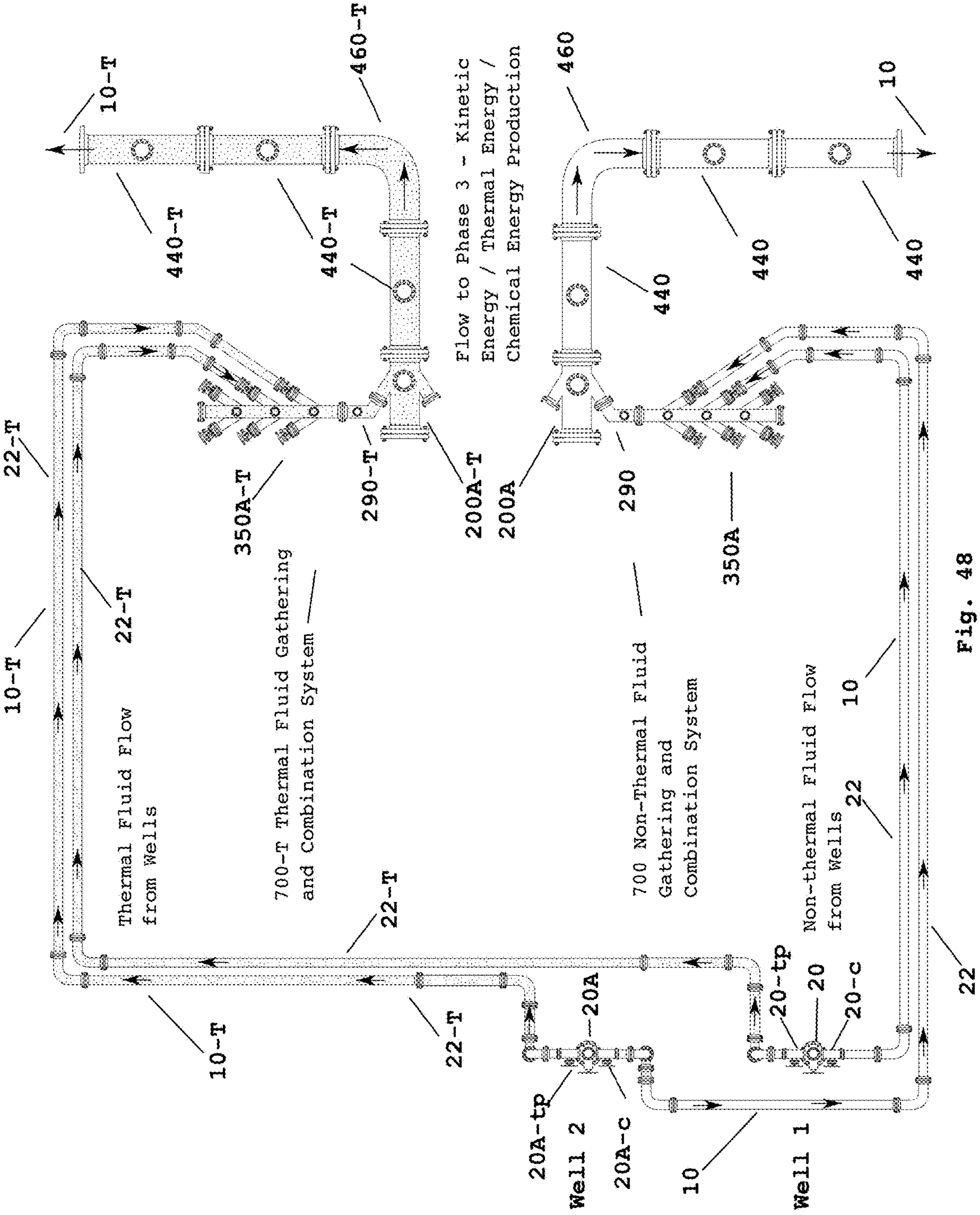
FIG. 48 depicts a plan view of a non-thermal and thermal well system, fluid gathering and fluid combination system 700 and 700-T, respectively, facilitating coproduction of thermal and non-thermal fluid for the purpose of cogenerating electricity from kinetic energy and thermal energy, kinetic energy and chemical energy, kinetic energy and other energy, from produced fluids in subterranean zones, strata, or reservoirs, according to embodiments of the present disclosure.

For Phase 2, Fluid Gathering and Combination and Phase 6, Fluid Pumping, Distribution and Injection, there is a three-level component hierarchy wherein for Phase 2 fluid processing, level one includes components from each individual well, related to a dual-fluid stream and described in FIG. 48 whereby, thermal production 10-T is produced from the producing well internal completion assembly 90P, 90P1 and non-thermal production 10 is produced from the producing well external casing completion assembly 80P annulus, external to the internal completion assembly 90P and internal to the external casing completion assembly 80P, level 2 includes components required to gather multiple fluid streams together whereby, each individual well requires one thermal inlet, or thermal production flowline 22-T for thermal production 10-T produced from thermal zones and one non-thermal inlet, or non-thermal production flowline 22 for each well producing non-thermal production 10, each well flowing into a gathering body 350A comprising multiple inlets 380, 410; one thermal fluid gathering body 350A comprising multiple inlets; one for each inlet producing thermal production 10-T and one non-thermal production 10 gathering body 350A for each well non-thermal production flowline 22 producing non-thermal production 10, and level 3 includes components that combine the gathered fluids from multiple well streams into a combined singular fluid stream, one singular fluid stream for thermal fluid and one singular fluid stream for non-thermal production for further processing in Phases 3, 4 and 5. For Phase 6 Fluid Pumping, Distribution and Injection whereby, the hierarchy is reversed starting at the individual fluid processed level whereby, energy generating components are removed leaving a fluid stream composed primarily of water, followed by separating or distributing the combined fluid stream and finally level three with the fluid stream pumped back into an individual well level for injection, related to a dual-fluid stream and described in FIG. 42.

Embodiments of the present disclosure may provide a system, method, and apparatus for cogenerating power from thermal, kinetic and chemical energy components contained within fluid originating from one or a plurality of subterranean zone(s), strata, or reservoir(s) and produced from a plurality of subsurface wells penetrating or terminating in fluid-bearing intervals containing water alone or any combination of gas, oil, water, heat, $H_2$, a salinity gradient, any other energy generation components, or a combination thereof. The flow or production of these fluids from a plurality of wells, defined as non-thermal zone fluid production 10 and thermal zone fluid production 10-T, in FIGS. 2-6, is gathered into a gathering system of interconnected pipes FIG. 48, designated as system 700 in FIG. 48, leading to an Energy Production Facility 1800 in FIG. 49, for the purpose of cogenerating electricity from Kinetic Energy Generation System 800 with Thermal Energy Generation System 1500, Chemical Energy Generation System 1600, Secondary Thermal Energy Generation System 1700, and/or any other energy generation system, or any combination thereof, derived from energy producing components contained in fluids originating from one or a plurality of subterranean zone(s), strata, or reservoir(s), designated as Geothermal Heat, Hydrocarbon, Secondary Heat Recovery, Hydrogen Energy, Osmotic Energy, and any other energy, or any combination thereof, electricity generation system that may comprise Energy Production Facility 1800 in FIG. 49, where electricity is generated. The fluids then continue to flow into fluid processing equipment, designated as fluid processing system 900, in FIG. 49, or apparatus where, if required, the fluids are separated into the individual fluids and/or components of gas, oil, water, hydrogen, water comprising sodium chloride, and/or any other energy generation components. The separated water is then contained and/or pumped into a distribution system, designated as system 1000 in FIG. 49, including one or more interconnected pipes leading to one or more wells penetrating or terminating into one or a plurality of fluid-bearing intervals containing water alone or any combination of gas, oil, water, heat, $H_2$, a salinity gradient, any other energy generation components, or a combination thereof, where it is injected into the originating subsurface zone(s), strata, or reservoir(s) for recycling and further production.

In the subsequent drawings and description, like parts are identified by the same reference numerals. Methods of joining pipe together typically are performed by three main methods which include welding pipe, using screwed connections with a threaded pin connection inserted into a threaded box connection, or through the use of flanged joint connections. One or any combination of these means of attachment may be utilized for the described embodiments. Additionally, means of joining components may refer to welded connections by fusing one body to another and component and apparatus connection may be through attachment or connection by means of a connective union that has been fused or welded to a body to permit the connection union of one body to be attached to or connected to the connection union of another body. Connection unions allow the components to be connected and disconnected relatively quickly whereby, that could be viewed as a benefit applicable to assembly time associated with a particular installation and therefore are discussed herein, accordingly, with the understanding that other means of connection by welding, screwing or through the use of flanged-type connections may also be utilized. FIGS. 7-14, FIGS. 20-40 and FIGS. 43-47 describe primary embodiments of the present disclosure whereby, individual components are described with upper and lower lateral end joining member which depict a box connection for the upper lateral end and a pin connection for the lower lateral end whereby, connection of components would be facilitated by a pin connection inserted into a box connection with each comprising threads designed to interconnect through rotation for attachment whereby, the pin connection or the box connection may also comprise a sealing member which may be an elastomeric member and/or a metallic sealing member whereby, contact on a seal face by the sealing member of one connection to another facilitates a joint seal. For those skilled in the art, this method of attachment is typical for components deployed in wells but, it should also be understood that other methods of attachment may also be utilized according to the aforementioned description for embodiments described herein.

FIG. 1A depicts a schematic cross-section view of a complex, heterogeneous, subsurface geologic system according to an embodiment of the present disclosure comprising a plurality of geologic subterranean zones, strata or reservoirs that begin at the surface whereby, the complexity that exists within subsurface geologic formations, comprising one or a plurality of subterranean zone(s), strata, or reservoir(s), is depicted. Individual zones encompass large geographic regions which are segmented by complex fracture systems within the earth, the zones are composed of formation material comprised of varying permeability, porosity and compartments that may comprise varying permeability and porosity that varies from the principle formation material, and within each zone fluid composition that may comprise water alone, oil, gas, water containing sodium chloride, hydrogen, and/or other energy generating components, may also vary from zone to zone. More specifically, FIG. 1A depicts a schematic cross-section view of a complex, heterogeneous, subsurface geologic system comprising a plurality of geologic subterranean zones that begin at the surface of the earth 5, whereby the surface of the earth is defined as any land location or the bottom of any submerged earth's surface, if in water. The complexity that exists within subsurface geologic formations, comprising one or a plurality of subterranean zone(s), strata, or reservoir(s), is depicted. Individual zones, for example, Zone A 40A, 40B, 40C, 40D and 40E encompass large geographic regions that are segmented by complex fault systems F1 within the earth. The zones are composed of formation material comprised of varying permeability, porosity and sub-compartments within each zone, for example, Zone A 40A, with sub-compartment Zone A1 40A1 and Zone A 40C with sub-compartment Zone C1 40C1, that may comprise varying permeability and porosity that varies from the principle Zone A 40A and Zone A 40C formation material, respectively, and within each zone, fluid composition that may comprise water alone, oil, gas, water containing sodium chloride, hydrogen, and/or other energy generating components, may also vary from zone-to-zone. To appropriately describe embodiments of the present disclosure, by way of example, and not meant to be limiting, Zone A—40A, 40B, 40C, 40D and 40E are comprised of non-thermal production 10 composed of primarily water with residual oil and gas hydrocarbons0, Zone B 50A and 50B with sub-compartment Zone A1 50A1 within Zone B 50A, are hydrothermal zones comprised of thermal fluid 10-T with gas in solution1, Zone C—60A, 60B and 60C are comprised of non-thermal fluid 10 composed of primarily water with residual oil hydrocarbons2, Zone D—70A, with sub-compartment Zone A1 70A1 within Zone D 70A, is comprised of non-thermal production 10 composed of primarily water alone3, Zone E00, is a non-fluid bearing impermeable rock layer, Zone F10, is a non-fluid bearing fractured thermal zone, Zone G20, is a non-fluid bearing impermeable rock layer, and Zone H30, is an underlying heat source.

Figure 1B:
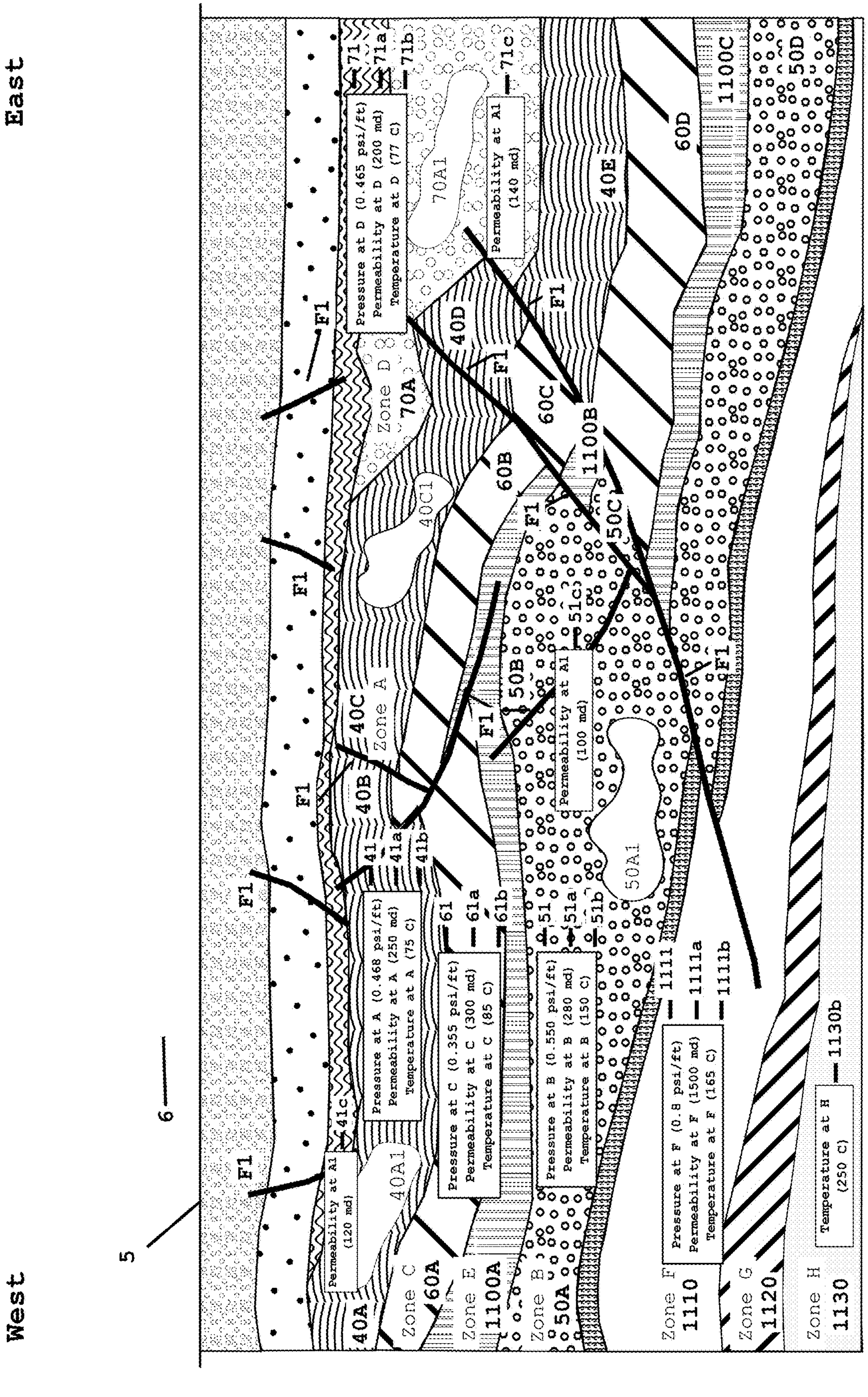
FIG. 1B depicts a schematic cross-section view of a complex, heterogeneous, subsurface geologic system according to an embodiment of the present disclosure.

FIG. 1B depicts a schematic cross-section view of a complex, heterogeneous, subsurface geologic system according to an embodiment of the present disclosure comprising a plurality of geologic subterranean zones, strata or reservoirs that begin at the surface whereby, the complexity that exists within subsurface geologic formations, comprising one or a plurality of subterranean zone(s), strata, or reservoir(s), is depicted. A complex heterogeneous subsurface geologic system may comprise a plurality of geologic subterranean zones, strata or reservoirs that begin at the surface whereby reservoirs which include zones of varying permeability, porosity, compartmentalized subzones, fracture networks, varying pressure, fluids, fluid compositions, increasing temperature with depth and are divided structurally by subsurface fault systems. More specifically, FIG. 1B depicts a schematic cross-section view of a complex, heterogeneous, subsurface geologic system comprising a plurality of geologic subterranean zones beginning at the surface of the earth 5, comprising an ambient air temperature 6, whereby the plurality of zones depicted are the same zones described in FIG. 1A and are further described as having varying properties whereby, Zone A 40A, 40B, 40C, 40D and 40E is comprised of a normally pressured zone, with a Zone A pressure 41, Zone A permeability 41*a*, Zone A temperature 41*b*, comprising sub-compartment Zone A1 40A1, having a permeability of 41*c*, Zone B 50A and 50B is comprised of a geopressured zone, with a Zone B pressure 51, Zone B permeability 51*a*, Zone B temperature 51*b*, comprising sub-compartment Zone A1 50A1, having a permeability of 51*c*, Zone C 60A, 60B, 60C and 60D is comprised of a sub-normally pressured zone, with a Zone C pressure 61, Zone C permeability 61*a*, and Zone C temperature 61*b*, Zone D 70A is comprised of a normally pressured zone, with a Zone D pressure 71, Zone D permeability 71*a*, Zone D temperature 71*b*, comprising sub-compartment Zone A1 70A1, having a permeability of 71*c*, Zone E 1100, is a non-fluid bearing impermeable rock layer, Zone F 1110 is comprised of a geopressured zone, with a Zone F 1110 pressure 1111, Zone F 1110 fracture matrix permeability 1111*a*, and Zone F 1110 temperature 1111*b*, Zone G 1120, is a non-fluid bearing impermeable rock layer, and Zone H 1130, is an underlying heat source with Zone H 1130 temperature 1130*b*.

Figure 2:
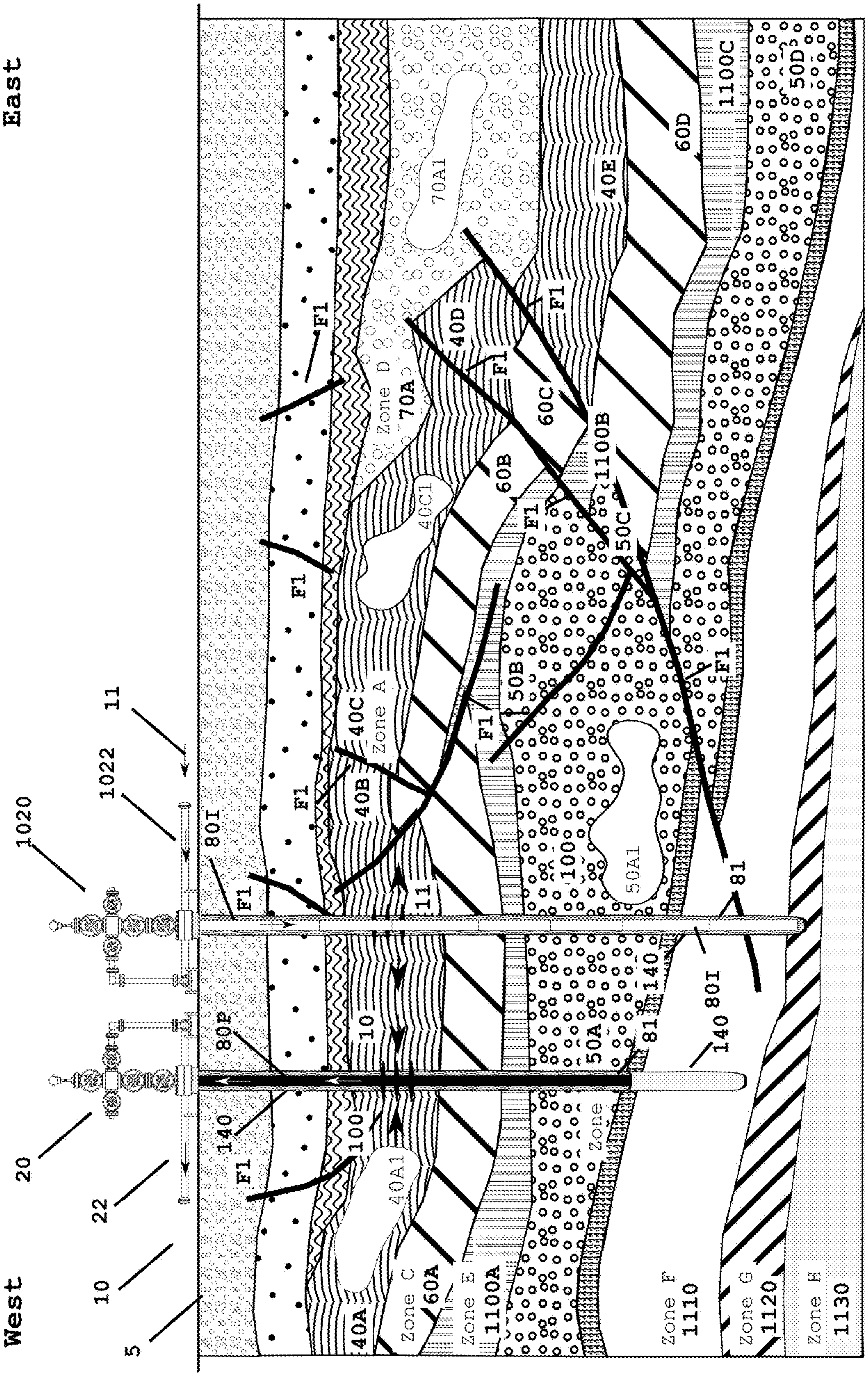
FIG. 2 depicts a schematic cross-section view of a partially cased and cemented vertical production well according to an embodiment of the present disclosure.

FIG. 2 depicts a schematic cross-section view of a partially cased and cemented vertical production well according to an embodiment of the present disclosure that includes a non-cased or cemented borehole section producing fluid from a geopressured zone and a cased and cemented vertical injection well injecting fluid into the originating zone with both wells penetrating a plurality of subsurface zones. More specifically, FIG. 2 depicts a schematic cross-section view of a complex, heterogeneous, subsurface geologic system comprising producer well 20 and injection well 1020 located at the surface of earth 5, whereby producer well 20 and injection well 1020 are depicted as vertical wellbores by way of example only, and may also include wells which are deviated from a vertical orientation, sidetracked or horizontal wellbores, being further defined as parent wellbores or parent boreholes 140, and may include one or any number of branches or lateral wellbores, being further defined as child wellbores or child boreholes 140*a* (not shown), that may extend from a parent borehole 140, and a child borehole may include one or any number of sub-branches, being further defined as a child sub-branch wellbore or child sub-branch borehole 140*a*-*sb* (not shown), that may extend from a child borehole 140*a* (not shown). Boreholes may be further defined to include any number of boreholes, branch boreholes and/or sub-branch boreholes by way of additional nomenclature, for example, branch borehole 1 extending from borehole 140 is designated as 140*a*1, branch borehole 2, 140*a*2, etc. and sub-branch borehole 1 extending from branch borehole 1 is designated as 140*a*1-*sb*1, sub-branch borehole 2, 140*a*1-*sb*2, etc., and sub-branch borehole 1 extending from branch borehole 2 is designated as 140*a*2-*sb*1, etc., to describe any number of branch and/or sub-branch boreholes. Producer well 1 20 may include a tubular conduit or casing, and defined as producer well external casing completion assembly 80P, penetrates a plurality of subterranean zones, strata, or reservoirs, 40A, 60A,00, 50A and is terminated in Zone F10, with perforations 100, penetrating through producer well external casing completion assembly 80P, through parent borehole 140, into Zone A 40A, to permit Zone A 40A, non-thermal production 10, entry into producer well 20, to flow to the surface of the earth 5, into non-thermal zone inlet line 22 and further for additional use. Producer well 20 is comprised of parent borehole 140, terminated in Zone F10, which includes a portion of parent borehole 140 comprising a producer well external casing completion assembly 80P, and a portion that is uncased. Subsurface zones, strata, or reservoirs may include a variety of fluids that may consist of water alone, water containing sodium chloride, which may include high concentrations of sodium chloride, hydrocarbons, $CO_2$, $H_2S$, or other components that may be corrosive and/or may include conditions whereby, the zones contain pressure and/or heat, and other energy producing components, and/or other components or conditions, or any combination thereof, that may exist below the surface of the earth, or within one or a plurality of zone(s), strata, or reservoir(s) within the earth, and are intersected or penetrated by a parent borehole 140 that may require a special bonding system 81, to effect a seal between components within a parent borehole 140, to the parent borehole 140, to the borehole/zone interface and to effect isolating one zone from another. A bonding system 81 may provide other purposes whereby, components comprising bonding system 81 may be heat conductive or may be heat insulators whereby, a bonding system 81 may include an intended purpose of transferring heat from an intersected zone, to a producer well external casing completion assembly 80P, or to insulate a producer well external completion assembly 80P, from heat that may exist within one or a plurality of intersected subterranean zone(s), strata, or reservoir(s), by the inclusion of a heat conductive or heat insulating bonding system 81 within a parent borehole 140, child borehole 140*a*, child borehole sub-branch borehole 140*a-sb*, or any combination thereof. A bonding system 81, which may be used for a variety of purposes, and may include bonding a producer well external casing completion assembly 80P to a parent borehole 140, effect a seal between components within a parent borehole 140, to a parent borehole 140, to a borehole/zone interface, to effect isolating one zone from another, to act as a heat conductor or insulator, or any other purpose known to those skilled in the art, or any combination thereof, may be composed of conventional API or ASTM cementitious systems, bonding material for $CO_2$ resistance, pozzolanic bonding material, gypsum-based bonding material, microfine bonding material, expansive bonding material, high-alumina bonding material, latex-based bonding material, perma-frost bonding material, resin or plastic-based bonding material, high thermally conductive bonding material, low thermally conductive bonding material, any other bonding material(s) that may be used for bonding components contained within a parent borehole 140, to the parent borehole 140, or whereby, any of the aforementioned conditions may exist within boreholes drilled from the surface of the earth 5, which may require one or more bonding system(s) 81, within a parent borehole 140, which facilitate the desired intended purpose of said bonding system 81. At the surface of the earth 5, also included is injection well 1020, which includes parent borehole 140 comprising a tubular conduit or casing, and defined as injection well external casing completion assembly 80I, with a bonding system 81 within parent borehole 140, which penetrates a plurality of subterranean zones, strata, or reservoirs, 40A, 60A,00, 50A and is terminated in Zone G20, with perforations 100, penetrating through injection well external casing completion assembly 80I, through parent borehole 140 and into Zone A 40A, to permit Zone A 40A, non-thermal injection zone fluid, flowing through non-thermal zone inlet line 1022, entry into injection well 1020, and back into originating Zone A 40A for production again. Producing well 20 and injection well 1020, when drilled below the surface of the earth 5, can penetrate multiple zones, strata, or reservoirs, each with varying pressures that can be hydropressured, geopressured or abnormal (pressure-depleted), can be fluid-bearing and contain heat, pressure, hydrocarbons, water, water comprising sodium chloride of varying concentrations, water comprising hydrogen, hydrocarbons comprising hydrogen, hydrogen alone, or any other energy producing components, or any combination thereof, whereby fluid originating from a plurality of zones, comprising fluid containing energy generating components, is produced from a plurality of wells, into inlet lines whereby fluid is directed to an energy production facility, energy generating components produce electricity utilizing apparatus for electricity production designed for use with the specific energy generating component and the fluid, composed primarily of water, is injected back into the originating zones for production again. The aforementioned FIG. 2 exemplifies a producer well and injection well system of wells used for the purpose of producing fluid to generate hydroelectric power from a plurality of subsurface wells according to prior disclosure Ser. No. 17/718,391 submitted on Apr. 12, 2022.

Figure 3:
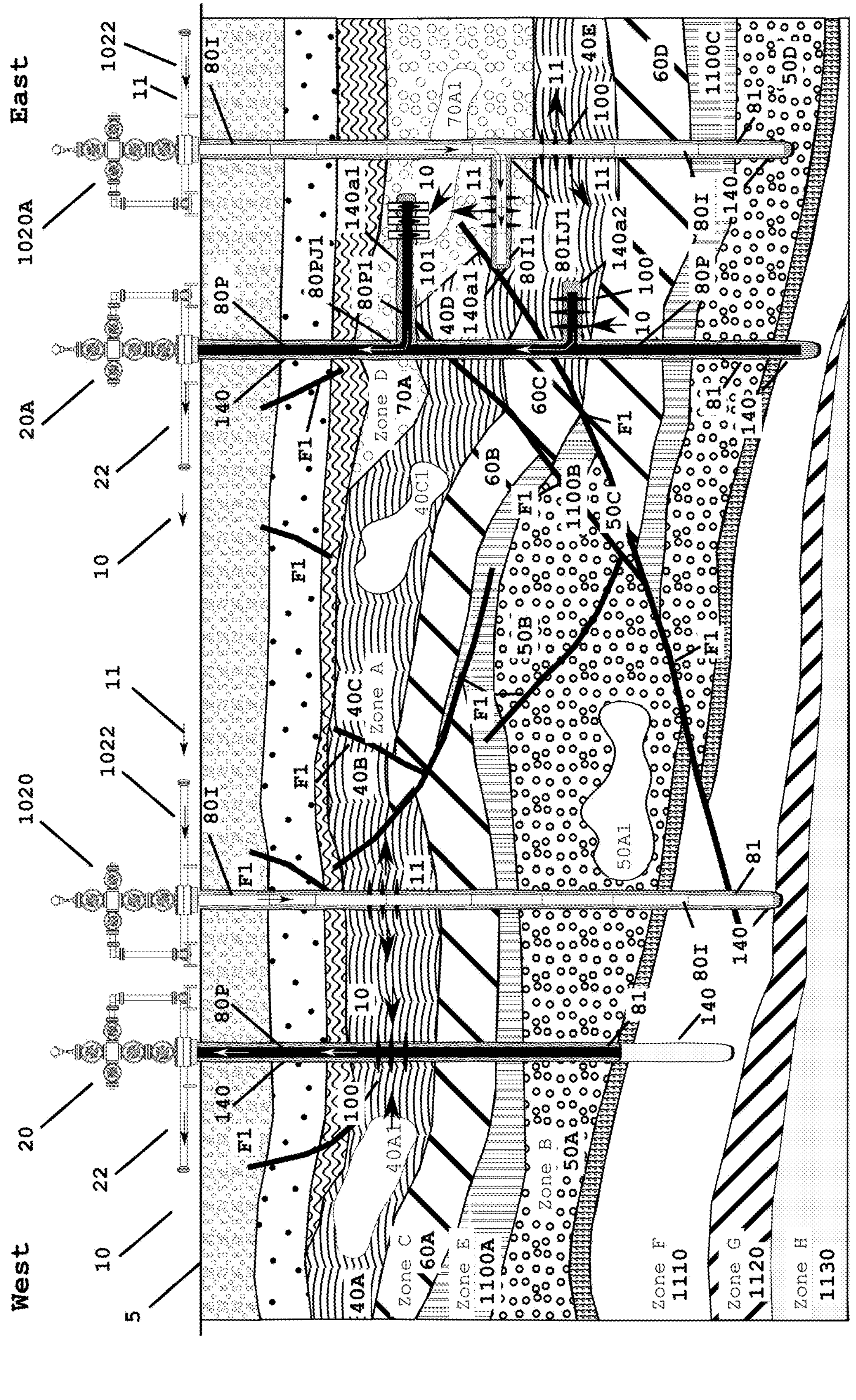
FIG. 3 depicts a schematic cross-section view of a plurality of production wells according to an embodiment of the present disclosure.

FIG. 3 depicts a schematic cross-section view of a plurality of production wells according to an embodiment of the present disclosure, one that includes a partially cased and cemented vertical wellbore with a non-cased or cemented borehole section producing from a geopressured zone and one that is fully cased and cemented that includes a plurality of main lateral wellbore branch sections extending from the main vertical (parent) wellbore with one lateral branch producing from a normally pressured zone and another producing from a geopressured zone, together with a plurality of injection wells that are cased and cemented, one being vertical with injection into a geopressured zone and the alternate including a lateral branch wellbore section extending from the main vertical (parent) wellbore with injection into a normally pressured zone combined with injection from the main parent wellbore into a geopressured zone. Production and injection well pairs are separated geologically by subsurface faults and penetrate a plurality of subsurface zones. More specifically, FIG. 3 depicts a schematic cross-section view of a complex, heterogeneous, subsurface geologic system, comprising a plurality of producer wells 20, 20A and plurality injection wells 1020, 1020A whereby, a plurality of producer wells comprise an interconnected system of producer wells with one or a plurality of injection wells for the purpose of producing fluid which may contain valuable energy producing components that may include fluid flow, heat, pressure, hydrocarbons, hydrogen, salinity and any other valuable components that may be contained within the fluid that may provide energy and/or a useful purpose according to embodiments of the present disclosure. Producer well 1 is designated as producer well 20, is producing fluid originating from non-thermal Zone A 40A, and producer well 2, designated as producer well 20A, is producing fluid from non-thermal Zones D 70A, subcompartment Zone D1 70A1 and Zone A 40E, respectively, whereby producer well 1 20 and injection well 1 1020 are described according to the aforementioned description in FIG. 2. Producer well 2 20A is comprised of parent borehole 140 and a plurality of child boreholes 140*a*1, 140*a*2 extending from parent borehole 140, and is terminated in Zone F10, which includes parent borehole 140 comprising a tubular conduit or casing, defined as producer well external casing completion assembly 80P, with a bonding system 81 within parent borehole 140. Extending from parent borehole 140 is a plurality of child boreholes 140*a*1, 140*a*2 each comprising a tubular conduit or casing, defined as producer well branch external casing completion assembly 80P1, which include a junction component, defined as producer well casing completion branch junction 80PJ1, and used for the purpose of joining producer well casing completion assembly 80P to producer well branch external casing completion assembly 80P1, within parent borehole 140, and child boreholes 140*a*1, 140*a*2 and bonded within child boreholes with bonding system 81. Producer well 2 20A penetrates a plurality of subterranean zones, strata, or reservoirs, 70A, 40C, 40D, 60C, 40E, 60D,00C, 50D, and is terminated in Zone F10. Producer well 2 20A child boreholes 140*a*1 and 140*a*2 include perforations 100, penetrating through producer well branch external casing completion assembly 80P1, through child boreholes 140*a*1 and 140*a*2, into Zones D 70A and Zone A 40E, respectively, to permit Zone D 70A and Zone A 40E, non-thermal zone fluid 10, entry into producer well 20A, which includes hydraulic fracture 101 for the purpose of creating a linear flow path within Zone D 70A, and interconnecting sub-compartment Zone D1 70A1, whereby hydraulic fracture 101, comprising a high permeability material, defined as proppant to those skilled in the art, within the fracture, extends beyond the drilling induced damage zone out into the undamaged zone, intersecting sub-compartment Zone D1 70A1, whereby Zone D 70A and sub-compartment Zone D1 70A1 are connected to child borehole 140*a*1 whereby, non-thermal zone fluid 10 is simultaneously coproduced from Zone D 70A, sub-compartment Zone D1 70A1, and Zone A 40E, respectively, to the surface of the earth 5, into non-thermal zone inlet line 22 and further for additional use. At the surface of the earth 5, also included is Injection well 2 1020A, and is comprised of parent borehole 140 which includes one child borehole 140*a*1, extending from parent borehole 140 into Zone D 70A. Injection well 2 20A penetrates a plurality of subterranean zones, strata, or reservoirs, Zone D 70A, sub-compartment Zone D1 70A1, Zone A 40E, Zone C 60D, Zone E00C, and is terminated in Zone B 50D. Injection well 2 1020A parent borehole 140, comprises a tubular conduit or casing, defined as injection well 2 external casing completion assembly 80I, and a child borehole 140*a*1, which includes a junction component, defined as injection well 2 casing completion branch junction 80IJ1, used for the purpose of joining injection well 2 external casing completion assembly 80I to injection well 2 branch external casing completion assembly 80I1, within parent borehole 140 and child borehole 140*a*1. Injection well 2 20A child borehole 140*a*1, within Zone D 70A, includes perforations 100, penetrating through injection well 2 branch external casing completion assembly 80I1, through child borehole 140*a*1, into Zone D 70A, to permit Zone D 70A, non-thermal zone fluid 10, exit from injection well 2 1020A back into originating Zone D 70A, and perforations 100, penetrating through injection well 2 external casing completion assembly 80I, through parent wellbore 140, into Zone A 40E, to permit Zone A 40E non-thermal zone fluid 10, exit back into originating Zone A 40E, respectively, to permit Zone D 70A and Zone A 40E, non-thermal injection zone fluid, flowing through non-thermal zone inlet line 1022, entry into injection well 2 1020A, and back into originating Zones D 70A and A 40E, respectively, for production again. Producing well 2 20A and injection well 2 1020A, when drilled below the surface of the earth 5, can penetrate multiple zones, strata, or reservoirs, each with varying pressures that can be hydropressured, geopressured or abnormal (pressure-depleted), can be fluid-bearing and contain heat, pressure, hydrocarbons, water, water comprising sodium chloride of varying concentrations, water comprising hydrogen, hydrocarbons comprising hydrogen, hydrogen alone, or any other energy producing components, or any combination thereof whereby, fluid originating from a plurality of zones, comprising fluid containing energy generating components, is produced from a plurality of wells, into inlet lines whereby fluid is directed to an energy production facility, energy generating components produce electricity utilizing apparatus for electricity production designed for use with the specific energy generating component and the fluid, composed primarily of water, is injected back into the originating zones for production again.

Figure 4:
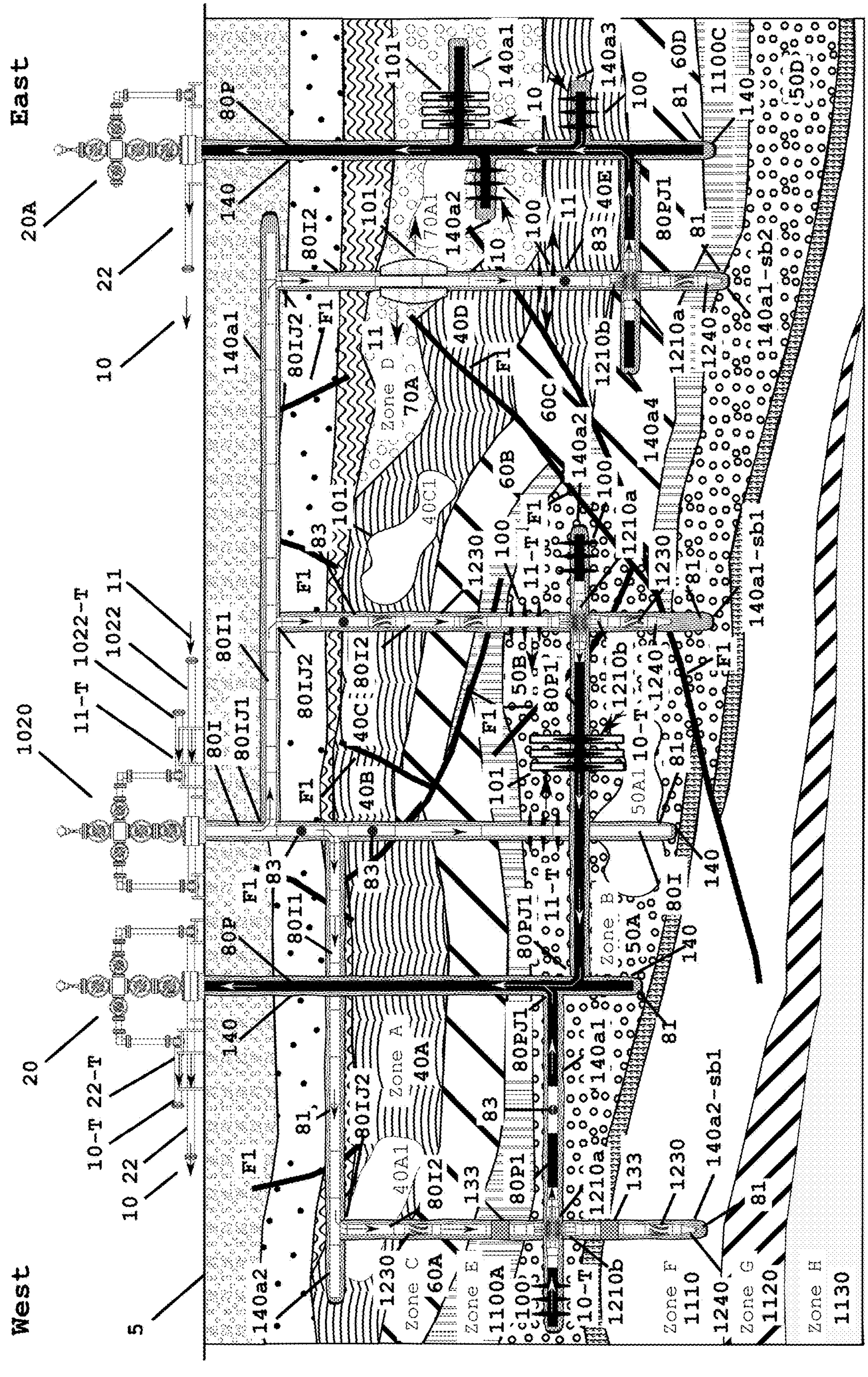
FIG. 4 depicts a schematic cross-section view of a plurality of production wells according to an embodiment of the present disclosure.

FIG. 4 depicts a schematic cross-section view of a plurality of production wells according to an embodiment of the present disclosure, each that include a plurality of lateral branch wellbore sections, together with a single injection well that includes a plurality of lateral branch wellbore sections, that are intersected by the producing wells, are separated geologically by subsurface faults and penetrate a plurality of subsurface zones according to an embodiment of the present disclosure. More specifically, FIG. 4 depicts a schematic cross-section view of a complex, heterogeneous, subsurface geologic system, comprising a plurality of producer wells 20, 20A and injection well 1020 whereby, a plurality of producer wells comprise an interconnected system of producer wells together with one or a plurality of injection wells for the purpose of producing fluid to the surface of the earth into a system of pipes combining fluid from said wells, which may contain valuable energy producing components that may include fluid flow, heat, pressure, hydrocarbons, hydrogen, salinity and any other valuable components that may be contained within the fluid that may provide energy and/or a useful purpose according to embodiments of the present disclosure whereby, a plurality of producer wells may include any number of wells with an example described herein as, producer well 1, designated as producer well 20, and is producing thermal fluid originating from thermal Zones B 50A and 50B, respectively, and producer well 2, designated as producer well 20A, is producing non-thermal fluid originating from non-thermal Zones D 70A, sub-compartment Zone D1 70A1 and Zone A 40E, respectively. Producer well 1 20 penetrates a plurality of subterranean zones, strata, or reservoirs, Zone A 40A, Zone C 60A, Zone E00A, and is terminated in Zone B 50A. Producer well 1 20 is comprised of parent borehole 140 and a plurality of child boreholes 140*a*1, 140*a*2 extending from parent borehole 140, which includes parent borehole 140 comprising a tubular conduit or casing, defined as producer well external casing completion assembly 80P, with a bonding system 81 within parent borehole 140, bonding together the external casing completion assembly 80P, the parent borehole 140 and the zone/borehole interface. Extending from parent borehole 140, child boreholes 140*a*1, 140*a*2, each comprising a tubular conduit or casing, defined as producer well branch external casing completion assembly 80P1, which include a junction component, defined as producer well casing completion branch junction 80PJ1, and used for the purpose of joining producer well casing completion assembly 80P to producer well branch external casing completion assembly 80P1, within parent borehole 140, and child boreholes 140*a*1, 140*a*2 each containing a producer well branch external completion assembly 80P1 and are bonded together with the borehole/zone interface, within child boreholes, with bonding system 81. Child borehole 140*a*1 extends horizontally from producer parent wellbore 140, and terminates in Zone B 50A. Producer well branch external casing completion assembly 80P1 within producer well child borehole 140*a*1, comprises a flow control device 83, which may be used for the purpose of isolating or restricting fluid flow within producer well branch external casing completion assembly 80P1 whereby, isolating and/or restricting non-thermal production 10 and/or thermal production 10-T flow could prevent producing non-thermal production 10 and/or thermal production 10-T entry into an external casing completion assembly 80P1 within producer 1 well 20 child borehole 140*a*1, or could direct producing fluid 10 and/or 10-T, originating from a specific zone, within the network of interconnected pipes created by interconnecting producer wells 20, 20A to an injection well which may be injection well 1 1020, injection 2 1020A, or any number of injection wells, according to embodiments of the present disclosure, and branch wellbore connection interface device 1210*a*, and is used for the purpose of interconnecting producer well 1 20 to injection well 1 1020, creating a network of interconnected pipes between producer well 20 and injection well 1020, permitting unimpeded, continuous flow between producer well 1 20 and injection well 1 1020, according to embodiments of the present disclosure. A detailed description of wellbore connection interface device 1210 will be further disclosed herein, in FIG. 7, as another embodiment of the present disclosure. Also extending from parent borehole 140 is child borehole 140*a*2 extending horizontally through Zone B 50A, across fault F1, into Zone B 50B, and intersecting injection well 1 1020 sub-branch borehole 140*a*1-*sb*1. Producer well 1 20 child borehole 140*a*1 includes perforations 100, penetrating through producer well branch external casing completion assembly 80P1, through child borehole 140*a*1, into Zone B 50A to permit thermal production 10-T, entry into producer well 1 20. Producer well 1 20 child borehole 140*a*2, includes hydraulic fracture 101 for the purpose of creating a linear flow path within Zone B 50A, and interconnecting sub-compartment Zone B1 50A1, whereby hydraulic fracture 101, comprising a high permeability material, defined as proppant to those skilled in the art, within the fracture, extends beyond the drilling induced damage zone out into the undamaged zone, intersecting sub-compartment Zone B1 50A1, and further within child borehole 140*a*2, within Zone B 50B, included are perforations 100, penetrating through producer well branch external casing completion assembly 80P1, through child borehole 140*a*2, into Zone B 50B to permit thermal production 10-T, entry into producer well 1 20 together with thermal production 10-T produced from Zone B 50A. Producer well branch external casing completion assembly 80P1, within producer well child borehole 140*a*2, includes branch wellbore connection interface device 1210*a*, used for the purpose of interconnecting producer well 1 20 to injection well 1 1020, permitting unimpeded, continuous flow between producer well 1 20 and injection well 1 1020, according to embodiments of the present disclosure. Producer well 2 20A is comprised of parent borehole 140 and a plurality of child boreholes 140*a*1, 140*a*2, 140*a*3 and 140*a*4 extending horizontally from parent borehole 140, and penetrates a plurality of subterranean zones, strata, or reservoirs, Zone D 70A, Zone A 40E, Zone C 60D and is terminated in Zone E00C. Producer well 2 20A child boreholes 140*a*1, 140*a*2, and 140*a*3 include perforations 100, penetrating through producer well branch external casing completion assembly 80P1, through child boreholes 140*a*1, 140*a*2, and 140*a*3, into Zones D 70A and Zone A 40E, respectively, to permit Zone D 70A and Zone A 40E, non-thermal zone fluid 10, entry into producer well 2 20A, which includes in child borehole 140*a*1, hydraulic fracture 101 for the purpose of creating a linear flow path within Zone D 70A, and interconnecting sub-compartment Zone D1 70A1, whereby hydraulic fracture 101, comprising a high permeability material, defined as proppant to those skilled in the art, within the fracture, extends beyond the drilling induced damage zone out into the undamaged zone, intersecting sub-compartment Zone D1 70A1, whereby Zone D 70A and sub-compartment Zone D1 70A1 are connected to child borehole 140*a*1 permitting simultaneous coproduction of non-thermal production 10 from Zone D 70A, sub-compartment Zone D1 70A1, and Zone A 40E, respectively, to the surface of the earth 5, into non-thermal zone inlet line 22 and further for additional use. Producer well branch external casing completion assembly 80P1, within producer well child borehole 140*a*4, includes branch wellbore connection interface device 1210*a*, used for the purpose of interconnecting producer well 2 20A to injection well 1 1020, permitting unimpeded, continuous flow between producer well 2 20A and injection well 1 1020, according to embodiments of the present disclosure. At the surface of the earth 5, also included is injection well 1 1020 which penetrates a plurality of subterranean zones, strata, or reservoirs, Zone A 40B, Zone A 40A, Zone C 60A, Zone E00A, and is terminated in Zone B 50A. Injection well 1 1020 is comprised of parent borehole 140 and a plurality of child boreholes 140*a*1, 140*a*2 extending from parent borehole 140 whereby, borehole 140 comprises a tubular conduit or casing, defined as injection well external casing completion assembly 80I, which includes a junction component, defined as injection well 1 casing completion branch junction 80IJ1, used for the purpose of joining injection well 1 external casing completion assembly 80I to injection well 1 branch external casing completion assembly 80I1, within parent borehole 140 and child boreholes 140*a*1 and 140*a*2, respectively, with a bonding system 81 within parent borehole 140, bonding together the injection well external casing completion assembly 80I, the parent borehole 140, and the zone/borehole interface. Comprised within injection well external casing completion assembly 80I are a plurality of flow control devices 83 used for the purpose of isolating or restricting fluid flow within injection well branch external casing completion assembly 80I1 whereby, isolating and/or restricting non-thermal injection zone fluid and/or thermal injection zone fluid flow could prevent non-thermal injection zone fluid and/or thermal injection zone fluid entry into an external casing completion assembly 80I1 contained within a parent borehole 140, a child borehole 140*a*1, or a child sub-branch borehole 140*a*1-*sb*1 extending from a child borehole 140*a*1, for example, or could direct non-thermal injection zone fluid and/or thermal injection zone fluid into a specific zone, or to any pipe within the network of interconnected pipes created by interconnecting producer wells 20, 20A to injection well 1020, according to embodiments of the present disclosure. Injection well 1 1020 parent borehole 140, comprises a tubular conduit or casing, defined as injection well 1 external casing completion assembly 80I, and a child borehole 140*a*1, which includes a junction component, defined as injection well casing completion branch junction 80IJ1, and is used for the purpose of joining injection well external casing completion assembly 80I to injection well branch external casing completion assembly 80I1, within parent borehole 140 and child boreholes 140*a*1 and 140*a*2, respectively. Injection well 1 1020 borehole 140, comprising injection well external casing completion assembly 80I within thermal Zone B 50A, includes perforations 100, penetrating through injection well external casing completion assembly 80I, through borehole 140, into Zone B 50A, to permit Zone B 50A, thermal injection zone fluid entry from injection well 1 1020 back into originating Zone B 50A. Injection well 1 1020, comprised of a vertical parent borehole 140, includes child boreholes 140*a*1 and 140*a*2, respectively, extending from injection well 1 1020 parent borehole 140 whereby, child borehole 140*a*1 extends horizontally and east from the vertical parent borehole 140, in an adjacent zone parallel to, and above, Zones A 40B, 40C, and Zone D 70A, respectively, and child borehole 140*a*2 extends horizontally and in an opposed west direction to child borehole 140*a*1 in an adjacent zone parallel to and above Zone A 40B and 40A, respectively, terminating in Zone A 40A. Extending vertically from child borehole 140*a*1 are child sub-branch boreholes 140*a*1-*sb*1 and 140*a*1-*sb*2, respectively, whereby, child sub-branch borehole 140*a*1-*sb*1 penetrates a plurality of subterranean zones, strata, or reservoirs, Zone A 40C, Zone C 60B, Zone E00A, Zone B 50B, Zone B 50A, and is terminated in Zone B 50D. Injection well 1 1020 child sub-branch borehole 140*a*1-*sb*1, comprises a tubular conduit or casing, defined as injection well sub-branch external casing completion assembly 80I2, a junction component, defined as injection well casing completion sub-branch junction 80IJ2, and is used for the purpose of joining injection well branch external casing completion assembly 80I1 to injection well sub-branch external casing completion assembly 80I2, within child sub-branch borehole 140*a*1-*sb*1, flow control device 83, borehole offset body 1230, used for the purpose of offsetting, centralizing and/or guiding injection well and/or production well external casing completion assemblies within parent boreholes 140, branch child boreholes 140*a* and/or child sub-branch boreholes 140*a*-*sb*, and/or centralizing wellbore connection guide nozzle body 1240 comprising an injection well connection interface device 1210*b*, to permit entry into and penetration through a producer well branch connection interface device 1210*a*, providing an interconnection between a producer well branch external casing completion assembly 80P1 to an injection well branch external casing completion assembly 80I1, injection well sub-branch external casing completion assembly 80I2, or any combination thereof, external casing completion assembly, injection well connection interface device 1210*b*, used for the purpose of interconnecting injection well sub-branch external casing completion assembly 80I2 to producing well branch external casing completion assembly 80P1 whereby, when for each respective well connection interface device, an interconnection is made, a network of interconnected pipes between producer well 20 and injection well 1020 is created, permitting unimpeded, continuous flow between producer well 1 20 and injection well 1 1020, according to embodiments of the present disclosure, and at the termination of injection well sub-branch external casing completion assembly 80I2 is wellbore connection guide nozzle body 1240, which is used for the purpose of guiding injection well sub-branch external casing completion assembly 80I2 through producing well branch external casing completion assembly 80P1, and providing a flow nozzle to circulate drilling fluids and cement system 81 through the external casing completion assembly and into the borehole which may be child sub-branch borehole 140*a*1-*sb*1, or any other borehole that includes an external casing completion assembly comprising wellbore connection guide nozzle body 1240 according to embodiments of the present disclosure whereby, an assembly comprising the aforementioned components of a wellbore connection interface device 1210, borehole offset body 1230 and a wellbore connection guide nozzle assembly 1240, is defined as a wellbore connection interface assembly 1250. Injection well 1 child sub-branch borehole 140*a*1-*sb*1, within thermal Zone B 50B, includes perforations 100, penetrating through injection well child sub-branch external casing completion assembly 80I2, through child sub-branch borehole 140*a*1-*sb*1, into Zone B 50B, to permit Zone B 50B, thermal injection zone fluid entry from injection well 1 1020 back into originating Zone B 50B, permitting production again from producer well 1 20 and subsequent energy production according to embodiments of the present disclosure. Extending vertically from child borehole 140*a*1 is child sub-branch borehole 140*a*1-*sb*2, whereby, child sub-branch borehole 140*a*1-*sb*2 penetrates a plurality of subterranean zones, strata, or reservoirs, Zone D 70A, Zone A 40D, Zone A 40E, Zone C 60D, Zone E00C, and is terminated in Zone B 50D. Injection well 1 1020 child sub-branch borehole 140*a*1-*sb*2, comprises injection well sub-branch external casing completion assembly 80I2, an injection well casing completion sub-branch junction 80IJ2, flow control device 83, and a wellbore connection interface assembly 1250, comprised of components which may be an injection well connection interface device 1210*b*, borehole offset body 1230, and wellbore connection guide nozzle body 1240 whereby, wellbore connection guide nozzle body 1240 and offset body 1230, guide and centralize injection well sub-branch external casing completion assembly 80I2, facilitating entry into and penetration through a producer well branch connection interface device 1210*a*, whereby an interconnection between a producer well branch external casing completion assembly 80P1, to an injection well branch external casing completion assembly 80I1, injection well sub-branch external casing completion assembly 80I2, or any combination thereof, external casing completion assembly whereby, when each respective well connection interface device interconnection is made, a network of interconnected pipes between producer well 20 and injection well 1020 is created, permitting unimpeded, continuous flow between producer well 1 20 and injection well 1 1020, according to embodiments of the present disclosure. Injection well 1 1020 child sub-branch borehole 140*a*1-*sb*2, includes hydraulic fracture 101 for the purpose of creating a linear flow path within Zone D 70A, and interconnecting sub-compartment Zone D1 70A1, whereby hydraulic fracture 101, comprising a high permeability material, defined as proppant to those skilled in the art, within the fracture, whereby hydraulic fracture 101 extends beyond the drilling induced damage zone out into the undamaged zone, intersecting sub-compartment Zone D1 70A1, whereby Zone D 70A and sub-compartment Zone D1 70A1 are connected to injection well child sub-branch borehole 140*a*1-*sb*2, permitting injection of non-thermal injection zone fluid back into Zone D 70A and sub-compartment Zone D1 70A1, and child sub-branch borehole 140*a*1-*sb*2 also includes perforations 100, penetrating through injection well sub-branch external casing completion assembly 80I2, through child borehole 140*a*1-*sb*2, into Zone A 40E, to permit Zone A 40E, non-thermal injection zone fluid, entry from injection well 1 1020 back into originating Zone A 40E, permitting coproduction again from Zone D 70A and Zone A 40E facilitated by producer well 2 20A whereby, subsequent energy production is continuously produced from producing fluid 10, according to embodiments of the present disclosure. Injection well 1 1020, comprised of a vertical parent borehole 140, also includes child borehole 140*a*2, extending horizontally and in an opposed west direction to child borehole 140*a*1 in an adjacent zone parallel to and above Zone A 40B and 40A, respectively, terminating in Zone A 40A. Extending vertically from child borehole 140*a*2 is child sub-branch boreholes 140*a*2-*sb*1 whereby, child sub-branch borehole 140*a*2-*sb*1 penetrates a plurality of subterranean zones, strata, or reservoirs, Zone A 40A, Zone C 60A, Zone E00A, Zone B 50A, and is terminated in Zone F10. Injection well 1 1020 child sub-branch borehole 140*a*2-*sb*1, comprises a tubular conduit or casing, defined as injection well sub-branch external casing completion assembly 8012, a junction component, defined as injection well casing completion sub-branch junction 80IJ2, and is used for the purpose of joining injection well branch external casing completion assembly 80I1 to injection well sub-branch external casing completion assembly 80I2, within child sub-branch borehole

140*a*2-*sb*1, borehole offset body 1230, used for the purpose of offsetting, centralizing and/or guiding injection well and/or production well external casing completion assemblies within parent boreholes 140, branch child boreholes 140*a* and/or child sub-branch boreholes 140*a-sb*, and/or centralizing wellbore connection guide nozzle body 1240 comprising an injection well connection interface device 1210*b*, to permit entry into and penetration through a producer well branch connection interface device 1210*a*, providing an interconnection between a producer well branch external casing completion assembly 80P1 to an injection well branch external casing completion assembly 80I1, injection well sub-branch external casing completion assembly 80I2, or any combination thereof, external casing completion assembly, primary borehole sealing device 133, used for the purpose of borehole isolation, isolation of components or apparatus that may be contained within the borehole, isolation of one zone from another, or any combination thereof, from pressure and/or fluid sources that may originate from one or more subterranean zones, strata or reservoirs, injection well connection interface device 1210*b*, borehole offset body 1230, and wellbore connection guide nozzle body 1240, whereby wellbore connection guide nozzle body 1240 and borehole offset body 1230, guide and centralize injection well sub-branch external casing completion assembly 80I2, facilitating entry into and penetration through a producer well branch connection interface device 1210*a*, whereby an interconnection between a producer well branch external casing completion assembly 80P1 to injection well sub-branch external casing completion assembly 80I2, is made, permitting unimpeded, continuous flow between producer well 1 20 and injection well 1 1020, according to embodiments of the present disclosure. Embodiments of the present disclosure as described in FIG. 4 provide a system of interconnected pipes, used for the purpose of producing fluid from subterranean zones that may contain water as the primary fluid, water that may comprise pressure, hydrocarbons, water containing hydrogen, water that may be heated from heat sources originating below the surface of the earth, water that may contain sodium chloride, water that may contain any other energy producing components, or any combination thereof, for the purpose of generating hydroelectric power, cogenerating hydroelectric power together with power generated from thermal heat, cogenerating hydroelectric power together with power generated from chemical components contained within the fluid (e.g., hydrocarbons, hydrogen, or other chemical components), or any combination thereof, used for electricity production from energy generation components contained within the water, and produced from a plurality of subsurface wells.

Figure 5:
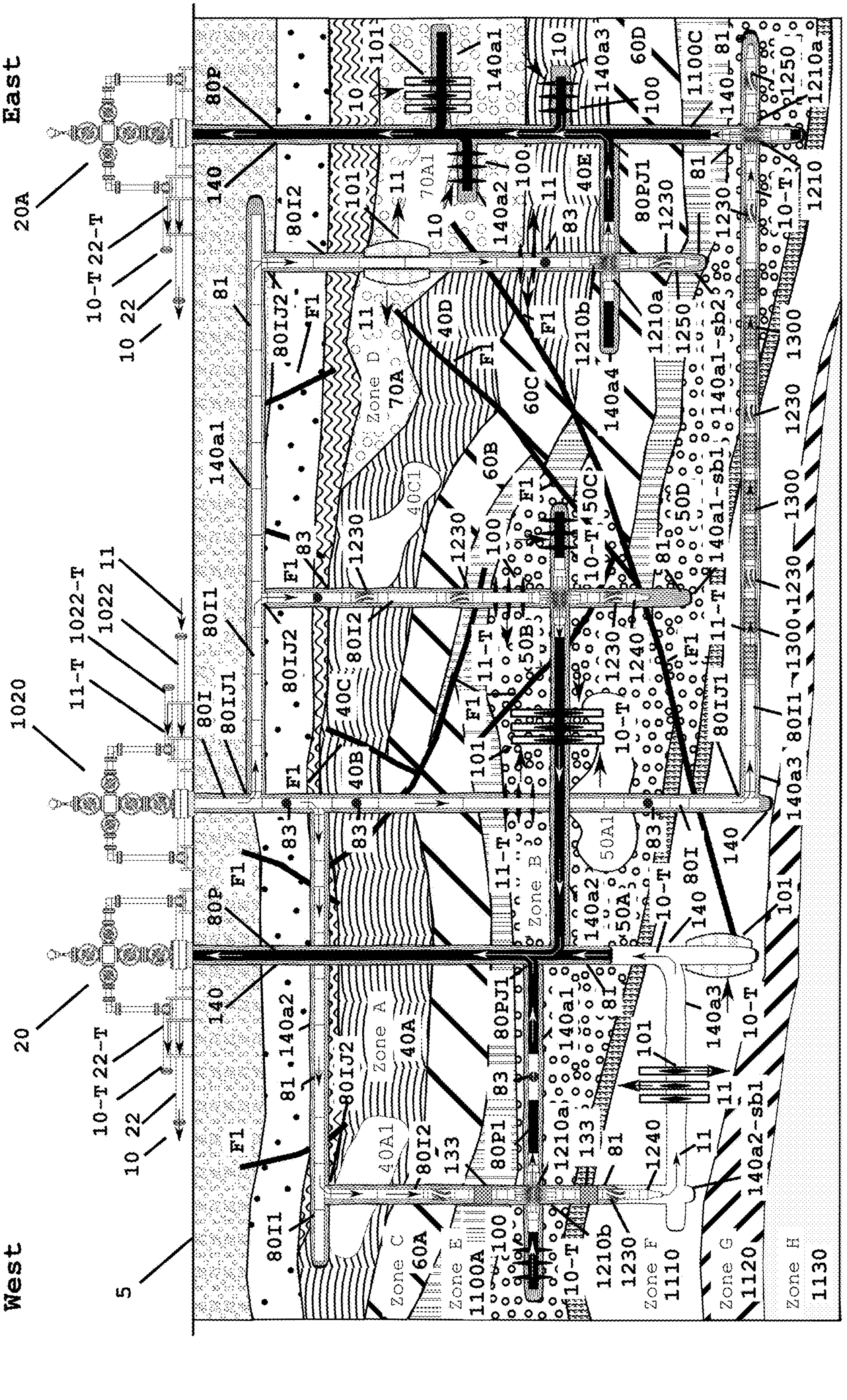
FIG. 5 depicts a schematic cross-section view of a plurality of production wells according to an embodiment of the present disclosure.

FIG. 5 depicts a schematic cross-section view of a plurality of production wells according to an embodiment of the present disclosure, each that include a plurality of lateral branch wellbore sections, together with a single injection well that includes a plurality of lateral branch and lateral sub-branch wellbore sections, that are intersected by the producing wells, are separated geologically by subsurface faults and are producing non-thermal fluid from a plurality of shallow zones simultaneously with thermal fluid from a plurality of deeper geothermal zones, according to an embodiment of the present disclosure. More specifically, FIG. 5 depicts a schematic cross-section view of a complex, heterogeneous, subsurface geologic system, comprising a plurality of producer wells 20, 20A and injection well 1 1020 whereby, a plurality of producer wells comprise an interconnected system of producer wells together with one or a plurality of injection wells for the purpose of producing fluid to the surface of the earth into a system of interconnected pipes, combining fluid from said wells, which may contain valuable energy producing components that may include fluid flow, heat, pressure, hydrocarbons, hydrogen, salinity and any other valuable components that may be contained within the fluid, which may provide energy and/or a useful purpose according to embodiments of the present disclosure whereby, a plurality of producer wells may include any number of wells which may include a producer well 1 20, producing thermal production 10-T, which may comprise a vapor, liquid, or any combination thereof, originating from thermal Zone F10 whereby, the geologic matrix comprising thermal Zone F10 is a system of interconnected natural fractures and vugular shaped pore spaces, which are the primary conduit paths for fluid within thermal Zone F10, with underlying Zone H30 being the thermal heat source used to transfer heat to overlying Zone G20, Zone F10, and Zones B 50A, 50B, 50C and 50D, respectively, and producer well 2 20A, is coproducing non-thermal production 10 and thermal production 10-T whereby, non-thermal production 10 is originating from non-thermal Zone D 70A, sub-compartment Zone D1 70A1, and Zone A 40E, respectively, and thermal production 10-T is originating from thermal Zone B 50D, and thermal Zone F10, respectively. Producer well 1 20 penetrates a plurality of subterranean zones, strata, or reservoirs, Zone A 40A, Zone C 60A, Zone E00A, Zone B 50A and is terminated in Zone F10. Producer well 1 20 is comprised of parent borehole 140 and a plurality of child boreholes 140*a*1, 140*a*2 and 140*a*3, extending from parent borehole 140, which includes parent borehole 140 comprising a tubular conduit or casing, defined as producer well external casing completion assembly 80P, with a bonding system 81 within parent borehole 140, bonding together the external casing completion assembly 80P, the parent borehole 140 and the zone/borehole interface. Extending from parent borehole 140, child boreholes 140*a*1, and 140*a*2, each comprise a tubular conduit or casing, defined as producer well branch external casing completion assembly 80P1, which include a junction component, defined as producer well casing completion branch junction 80PJ1, and used for the purpose of joining producer well casing completion assembly 80P to producer well branch external casing completion assembly 80P1, within parent borehole 140, and child boreholes 140*a*1, 140*a*2, each containing a producer well branch external completion assembly 80P1 and are bonded together with the borehole/zone interface, within child boreholes 140*a*1 and 140*a*2, with bonding system 81. Producer well 1 20 child borehole 140*a*3 is non-cased and intersects a non-cased portion of injection well 1 1020 child sub-branch borehole 140*a*2-*sb*1 within thermal Zone F10. Child borehole 140*a*1 extends horizontally and west from producer parent wellbore 140, within Zone B 50A, intersecting injection well 1 1020 and terminating in Zone B 50A. Producer well 1 20 producer well branch external casing completion assembly 80P1 within producer well child borehole 140*a*1, comprises a producer well branch wellbore connection interface device 1210*a*, used for the purpose of interconnecting producer well 1 20 to injection well 1 1020, creating a network of interconnected pipes between producer well 20 and injection well 1020, permitting unimpeded, continuous flow between producer well 1 20 and injection well 1 1020, a flow control device 83, used for the purpose of isolating or restricting fluid flow within producer well branch external casing completion assembly 80P1 whereby, isolating and/or restricting thermal production 10-T, originating from Zone B 50A, produced through perforations 100, within producer well 1 20 producer well external casing completion assembly 80P1, within child borehole 140*a*1, and fluid originating from injection well 1 1020 injection flowlines 1022 and 1022-T, respectively, at the surface of the earth 5, may divert thermal production 10-T, non-thermal injection zone fluid, and thermal injection zone fluid into producer well 1 20 child borehole 140*a*3 within Zone F10, out hydraulic fracture 101, used for the purpose of connecting producer well 1 20 child borehole 140*a*3 to the natural fracture network and/or vugular shaped pore spaces within Zone F10 whereby, heat from within Zone F10 is transferred to said injection fluid whereby, non-thermal injection zone fluid transitions into thermal production 10-T, which may contain other valuable energy producing components that may include fluid flow, pressure, hydrocarbons, hydrogen, salinity and any other valuable components that may be contained within the fluid that may provide energy and/or a useful purpose according to embodiments of the present disclosure, or any combination thereof, energy producing components, and thermal production 10-T is produced linearly through hydraulic fracture 101, used for the purpose of connecting producer well 1 20 parent borehole 140 to the natural fracture network and/or vugular shaped pore spaces within Zone F10, whereby non-thermal injection zone fluid injected into hydraulic fracture 101 extending from producer well 1 child borehole 140*a*3 may enter the fracture network contained within Zone F10, traverse through the fracture network, into producer well 1 20 hydraulic fracture 101 extending from parent borehole 140 and into producer well 1 20 parent bore 140, comprising an uncased portion and a cased portion, defined as producer well external casing completion assembly 80P whereby, thermal production 10-T, originating from Zone F10 and Zone B 50A, is produced to the surface of the earth 5, into thermal production inlet line 22-T, and further for energy production and additional processing, according to embodiments of the present disclosure. Also extending from producer well 1 20 parent borehole 140, is child borehole 140*a*2, extending horizontally and east from parent borehole 140, through Zone B 50A, across fault F1, into Zone B 50B, and intersecting injection well 1 1020 child sub-branch borehole 140*a*1-*sb*1. Producer well 1 20 child borehole 140*a*1 includes perforations 100, penetrating through producer well branch external casing completion assembly 80P1, through child borehole 140*a*1, into Zone B 50A to permit thermal production 10-T, entry into producer well 1 20. Producer well 1 20 child borehole 140*a*2, includes hydraulic fracture 101 for the purpose of creating a linear flow path within Zone B 50A, and interconnecting sub-compartment Zone B1 50A1, whereby hydraulic fracture 101, comprising a high permeability material, defined as proppant to those skilled in the art, within the fracture, extends beyond the drilling induced damage zone out into the undamaged zone, intersecting sub-compartment Zone B1 50A1, and further within child borehole 140*a*2, within Zone B 50B, included are perforations 100, penetrating through producer well branch external casing completion assembly 80P1, through child borehole 140*a*2, into Zone B 50B to permit thermal production 10-T, entry into producer well 1 20 together with thermal production 10-T produced from Zone B 50A. Producer well branch external casing completion assembly 80P1, within producer well child borehole 140*a*2, includes producer well branch wellbore connection interface device 1210*a*, used for the purpose of interconnecting producer well 1 20 to injection well 1 1020, permitting unimpeded, continuous flow between producer well 1 20 and injection well 1 1020, according to embodiments of the present disclosure whereby, thermal production 10-T, originating from Zone B 50A and Zone B 50B is coproduced with thermal production 10-T originating from Zone F10 and Zone B 50A, is produced to the surface of the earth 5, into thermal production line 22-T, and further for energy production and additional processing, according to embodiments of the present disclosure. Producer well 2 20A is comprised of parent borehole 140 and a plurality of child boreholes 140*a*1, 140*a*2, 140*a*3 and 140*a*4 extending horizontally from parent borehole 140, and penetrates a plurality of subterranean zones, strata, or reservoirs, Zone D 70A, Zone A 40E, Zone C 60D, Zone E00C and is terminated in Zone B 50D. Producer well 2 20A child boreholes 140*a*1, 140*a*2, and 140*a*3 include perforations 100, penetrating through producer well branch external casing completion assembly 80P1, through child boreholes 140*a*1, 140*a*2, and 140*a*3, into Zones D 70A and Zone A 40E, respectively, to permit Zone D 70A and Zone A 40E, non-thermal zone fluid 10, entry into producer well 20A, which includes in child borehole 140*a*1, hydraulic fracture 101 for the purpose of creating a linear flow path within Zone D 70A, and interconnecting sub-compartment Zone D1 70A1, whereby hydraulic fracture 101, comprising a high permeability material, defined as proppant to those skilled in the art, within the fracture, extends beyond the drilling induced damage zone out into the undamaged zone, intersecting sub-compartment Zone D1 70A1, whereby Zone D 70A and sub-compartment Zone D1 70A1 are connected to child borehole 140*a*1 permitting simultaneous coproduction of non-thermal production 10 from Zone D 70A, sub-compartment Zone D1 70A1, and Zone A 40E, respectively, to the surface of the earth 5, into non-thermal zone inlet line 22 and further for additional use. Producer well branch external casing completion assembly 80P1, within producer well child borehole 140*a*4, is comprised of a producer well branch wellbore connection interface device 1210*a*, used for the purpose of interconnecting producer well 2 20A to injection well 1 1020, permitting unimpeded, continuous flow between producer well 2 20A and injection well 1 1020, according to embodiments of the present disclosure. Extending below child borehole 140*a*4 and comprised within parent borehole 140, external casing completion assembly 80P also comprises wellbore connection interface 1210 within Zone B 50D, used for the purpose of interconnecting producer well 2 20A to injection well 1 1020, permitting unimpeded, continuous flow between producer well 2 20A and injection well 1 1020 whereby, non-thermal injection zone fluid is pumped from the surface of the earth 5, down external casing assembly 80I within injection well 1 1020 parent borehole 140, to branch child borehole 140*a*3 whereby, injection well branch external casing completion assembly 80I1 comprising one or a plurality of thermal heat transfer bodies 1300, to be further disclosed herein in FIGS. 20-42, as other embodiments of the present disclosure, is used for the purpose of heat transfer through means of heat conduction, heat convection, or any combination thereof, heat transfer whereby, heat contained within thermal Zone F10 is transferred to cement system 81, which may be composed of a high thermally conductive bonding material, bonding injection well child borehole 140*a*3 and injection well branch external casing completion assembly 80I within injection well branch borehole 140*a*3 together, and to thermally conductive components comprising injection well branch external casing completion assembly 80I, which may be a thermal heat transfer body 1300 comprising thermally conductive components whereby, heat is transferred to non-thermal injection zone fluid, flowing within a thermal heat transfer body 1300, transitioning said fluid to thermal production 10-T, whereby, thermal production 10-T originating from Zone F10 is coproduced with non-thermal production 10 originating within producing well 2 20A Zone A 60D and Zone D 70A, respectively, within producing well 2 20A, and are produced to the surface of the earth 5, into thermal production line 22-T, and further for energy production and additional processing, according to embodiments of the present disclosure. Coproduction of thermal production 10-T together with non-thermal production 10, is facilitated by thermally insulated production tubing 90P-T (not shown), comprising one or a plurality of components defined as a primary thermal insulated body 1400 (not shown), which may also comprise a component included as an additional and/or accessory component attached to primary thermal insulated body 1400 (not shown), and defined as secondary thermal insulated body 1400A (not shown), whereby, the inclusion of one or a plurality of thermal insulated bodies 1400, 1400A (not shown), which may comprise component(s) of a non-thermal production tubing assembly 90P (not shown), and are defined as thermally insulated production tubing 90P-T (not shown) whereby, thermal production 10-T is produced internally within the bore of thermally insulated production tubing 90P-T and is a separate and/or an isolated conduit for the purpose of producing thermal production 10-T, and non-thermal production 10, is produced in the annular space, internally within producer well 2 20A parent borehole 140 external completion assembly 80P, and external to thermally insulated production tubing 90P-T (not shown), which may also be comprised of portions of non-insulated production tubing 90P (not shown) whereas, non-thermal production 10 is separate and thermally insulated from thermal production 10-T, permitting coproduction of thermal production 10-T together with non-thermal production 10 whereby thermal production 10-T, at the surface of the earth 5 flows into thermal production inlet line 22-T and non-thermal production 10 flows into non-thermal production inlet line 22, and further for energy production and additional processing, according to embodiments of the present disclosure. Primary thermal insulated body 1400 (not shown), and secondary thermal insulated body 1400A (not shown), which may comprise component(s) of a non-thermal production tubing assembly 90P (not shown), and define thermally insulated production tubing 90P-T (not shown) are to be further disclosed herein FIGS. 41 and 42 for non-thermal production tubing 90P and thermally insulated production tubing 90P-T, and FIGS. 43-47 for thermal insulated body 1400, 1400A, respectively, as other embodiments of the present disclosure. At the surface of the earth 5, also included is injection well 1 1020 which penetrates a plurality of subterranean zones, strata, or reservoirs, Zone A 40B, Zone A 40A, Zone C 60A, Zone E00A, Zone B 50A and is terminated in Zone F10. Injection well 1 1020 is comprised of parent borehole 140 and a plurality of child boreholes 140*a*1, 140*a*2 and 140*a*3, respectively, extending from parent borehole 140 whereby, borehole 140 comprising an injection well external casing completion assembly 80I, includes a plurality of casing completion branch junctions 80IJ1, and a plurality of flow control devices 83 which may be used to isolate and/or restrict non-thermal injection zone fluid and/or thermal injection zone fluid within injection well parent borehole 140, and/or injection well external casing completion assembly 80I within borehole 140 whereby, non-thermal injection zone fluid may be isolated and/or diverted within injection well external casing completion assembly 80I, whereby isolation and/or restriction may include any child borehole 140*a*1, 140*a*2, 140*a*3, any injection well external casing completion assembly 80I1, included within said child borehole(s) and/or child sub-branch borehole 140*a*1-*sb*1, 140*a*1-*sb*2, 140*a*2-*sb*1, and/or injection well sub-branch external casing completion assembly 80I2, within said child sub-branch boreholes, or any combination thereof, within the network of interconnected pipes created by interconnecting producer wells 20, 20A to injection well 1 1020, according to embodiments of the present disclosure. Injection well 1 1020 borehole 140, comprising injection well external casing completion assembly 80I within thermal Zone B 50A, includes perforations 100, penetrating through injection well external casing completion assembly 80I, through borehole 140, into Zone B 50A, to permit Zone B 50A, thermal injection zone fluid entry from injection well 1 1020 back into originating Zone B 50A. Injection well 1 1020, comprised of a vertical parent borehole 140, includes child boreholes 140*a*1, 140*a*2, and 140*a*3, respectively, extending from injection well 1 1020 parent borehole 140 whereby, child borehole 140*a*1 extends horizontally and east from the vertical parent borehole 140, in an adjacent zone parallel to, and above, Zones A 40B, 40C, and Zone D 70A, respectively, child borehole 140*a*2 extends horizontally and in an opposed west direction to child borehole 140*a*1, in an adjacent zone parallel to and above Zone A 40B and 40A, respectively, terminating in Zone A 40A and child borehole 140*a*3 extends horizontally and in an east direction, parallel to child borehole 140*a*1, traversing through Zone F10 and terminating in Zone B 50D. Injection well 1 1020 child borehole 140*a*1, includes an injection well casing completion branch junction 80IJ1, and is used for the purpose of joining injection well external casing completion assembly 80I to injection well branch external casing completion assembly 80I1, within parent borehole 140. Injection well 1 1020 child borehole 140*a*2, includes an injection well casing completion branch junction 80IJ1, and is used for the purpose of joining injection well external casing completion assembly 80I to injection well branch external casing completion assembly 80I1, within parent borehole 140 and injection well 1 1020 child borehole 140*a*3, includes an injection well casing completion branch junction 80IJ1, and is used for the purpose of joining injection well external casing completion assembly 80I to injection well branch external casing completion assembly 80I1, within parent borehole 140, a plurality of borehole offset bodies 1230, a plurality of thermal heat transfer bodies 1300, to be further disclosed herein FIGS. 20-40, as another embodiment of the present disclosure, and is used for the purpose of heat transfer through means of heat conduction, heat convection, or any combination thereof, heat transfer whereby, heat contained within thermal Zone F10 is transferred to cement system 81, which may be composed of a high thermally conductive bonding system 81, bonding injection well child borehole 140*a*3 and injection well branch external casing completion assembly 80I within injection well branch borehole 140*a*3 together, and to thermally conductive components comprising injection well branch external casing completion assembly 80I, which may be a thermal heat transfer body 1300 comprising thermally conductive components whereby, heat is transferred to non-thermal injection zone fluid, flowing within a thermal heat transfer body 1300, transitioning said fluid to thermal production 10-T, and further comprising injection well 1 1020 child borehole 140*a*3, injection well branch external casing completion assembly 80I, is a branch wellbore connection interface assembly 1250, comprised of an injection well branch wellbore connection interface device 1210*a*, borehole offset body 1230 and a wellbore connection guide nozzle body 1240, according to embodiments of the present disclosure. Extending vertically from child borehole 140*a*1 are child sub-branch boreholes 140*a*1-*sb*1 and 140*a*1-*sb*2, respectively, whereby, child sub-branch borehole 140*a*1-*sb*1 penetrates a plurality of subterranean zones, strata, or reservoirs, Zone A 40C, Zone C 60B, Zone E00A, Zone B 50B, Zone B 50A, and is terminated in Zone B 50D. Injection well 1 1020 child sub-branch borehole 140*a*1-*sb*1, comprises an injection well sub-branch external casing completion assembly 80I2, injection well casing completion sub-branch junction 80IJ2, flow control device 83, a plurality of borehole offset bodies 1230, injection well connection interface device 1210*b*, and a wellbore connection guide nozzle body 1240. Injection well 1 child sub-branch borehole 140*a*1-*sb*1, within thermal Zone B 50B, includes perforations 100, penetrating through injection well child sub-branch external casing completion assembly 80I2, through child sub-branch borehole 140*a*1-*sb*1, into Zone B 50B, to permit Zone B 50B, thermal injection zone fluid entry from injection well 1 1020 back into originating Zone B 50B, permitting production again from producer well 1 20 and subsequent energy production according to embodiments of the present disclosure. Extending vertically from child borehole 140*a*1 is child sub-branch borehole 140*a*1-*sb*2, whereby, child sub-branch borehole 140*a*1-*sb*2 penetrates a plurality of subterranean zones, strata, or reservoirs, Zone D 70A, Zone A 40D, Zone A 40E, Zone C 60D, and is terminated in Zone E00C. Injection well 1 1020 child sub-branch borehole 140*a*1-*sb*2, comprises injection well sub-branch external casing completion assembly 80I2, an injection well casing completion sub-branch junction 80IJ2, flow control device 83, injection well connection interface device 1210*b*, borehole offset body 1230, and wellbore connection guide nozzle body 1240, according to embodiments of the present disclosure. Injection well 1 1020 child sub-branch borehole 140*a*1-*sb*2, includes hydraulic fracture 101 for the purpose of creating a linear flow path within Zone D 70A, and interconnecting sub-compartment Zone D1 70A1, and child sub-branch borehole 140*a*1-*sb*2 also includes perforations 100, penetrating through injection well sub-branch external casing completion assembly 80I2, through child sub-branch borehole 140*a*1-*sb*2, into Zone A 40E, to permit Zone A 40E, non-thermal injection zone fluid, entry from injection well 1 1020 back into originating Zone A 40E, permitting coproduction again from Zone D 70A and Zone A 40E facilitated by producer well 2 20A whereby, subsequent energy production is continuously produced from non-thermal producing fluid 10, according to embodiments of the present disclosure. Injection well 1 1020, comprised of a vertical parent borehole 140, also includes child borehole 140*a*2, extending horizontally and in an opposed west direction to child borehole 140*a*1 in an adjacent zone parallel to and above Zone A 40B and 40A, respectively, terminating in Zone A 40A. Extending vertically from child borehole 140*a*2 is child sub-branch borehole 140*a*2-*sb*1 whereby, child sub-branch borehole 140*a*2-*sb*1 penetrates a plurality of subterranean zones, strata, or reservoirs, Zone A 40A, Zone C 60A, Zone E00A, Zone B 50A, and is terminated in Zone F10. Injection well 1 1020 child sub-branch borehole 140*a*2-*sb*1, comprises an injection well sub-branch external casing completion assembly 80I2, an injection well casing completion sub-branch junction 80IJ2, a plurality of borehole offset bodies 1230, a plurality of primary borehole sealing devices 133, and a wellbore connection guide nozzle body 1240, according to embodiments of the present disclosure. Embodiments of the present disclosure as described in FIG. 5 provide a system of interconnected pipes, used for the purpose of producing fluid from one or a plurality of subterranean zone(s), strata or reservoir(s), that may contain water as the primary fluid, water that may include hydrocarbons, water containing hydrogen, water that may be heated from heat sources originating below the surface of the earth, water that may contain sodium chloride, water that may contain any other energy producing components, or any combination thereof, for the purpose of generating hydroelectric power, cogenerating hydroelectric power together with power generated from thermal heat, cogenerating hydroelectric power together with power generated from chemical components contained within the fluid (e.g., hydrocarbons, hydrogen, or other chemical components), or any combination thereof, used for electricity production from energy generation components contained within the water, and produced from a plurality of subsurface wells.

Figure 6:
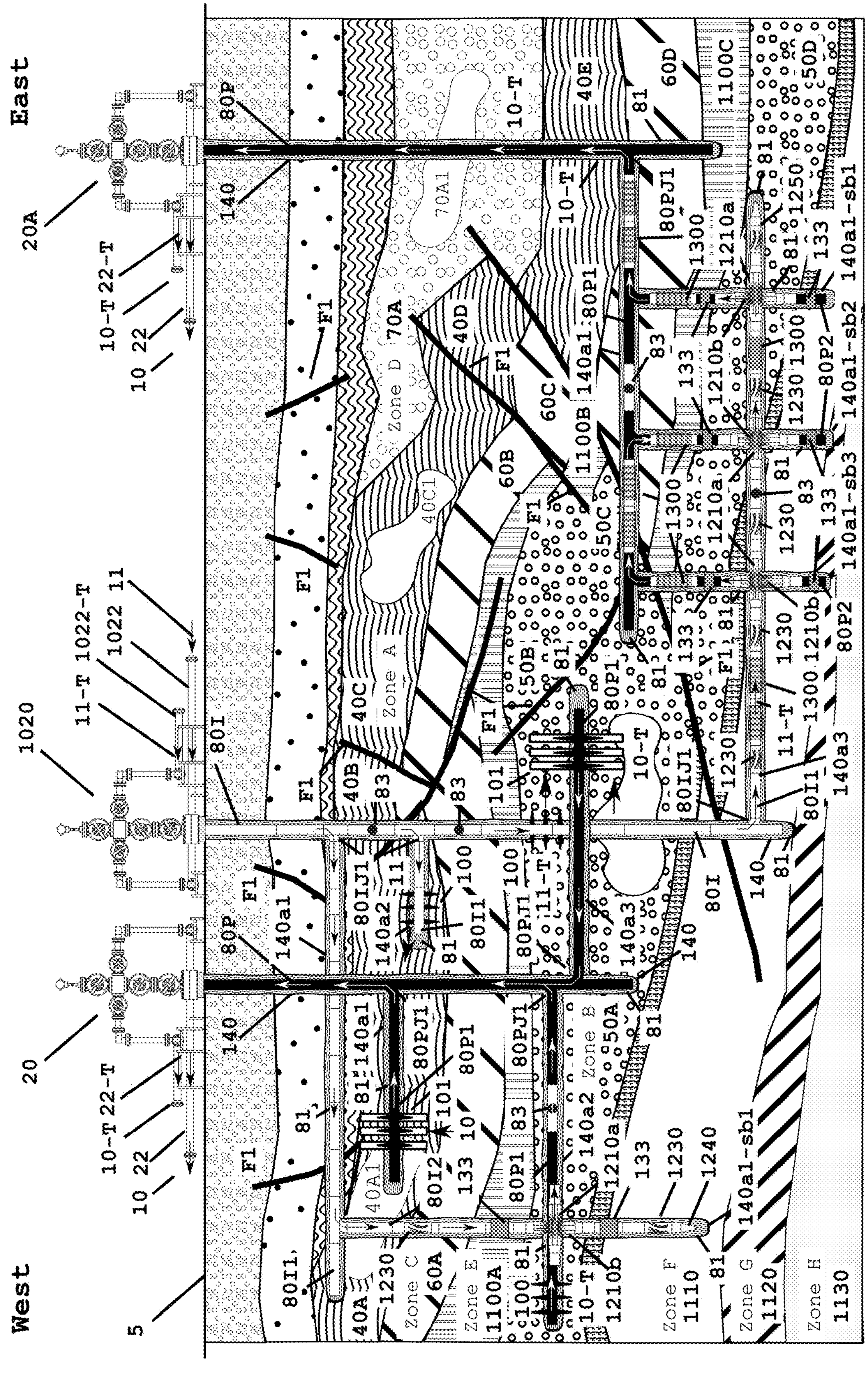
FIG. 6 depicts a schematic cross-section view of a plurality of production wells according to an embodiment of the present disclosure.

FIG. 6 depicts a schematic cross-section view of a plurality of production wells according to an embodiment of the present disclosure, each that include a plurality of lateral branch wellbore sections, together with a single injection well that includes a plurality of lateral branch wellbore sections, that are intersected by the producing well lateral branch and sub-branch wellbore sections configured to create a flow loop in a deep geothermal zone, are separated geologically by subsurface faults and are producing non-thermal fluid from a plurality of shallow zones simultaneously with thermal fluid from a plurality of deeper geothermal zones, according to an embodiment of the present disclosure. More specifically, FIG. 6 depicts a schematic cross-section view of a complex, heterogeneous, subsurface geologic system, comprising a plurality of producer wells 20, 20A and injection well 1 1020 whereby, a plurality of producer wells comprise an interconnected system of producer wells together with one or a plurality of injection wells for the purpose of producing fluid to the surface of the earth into a system of interconnected pipes, combining fluid from said wells, which may contain valuable energy producing components that may include fluid flow, heat, pressure, hydrocarbons, hydrogen, salinity and any other valuable components that may be contained within the fluid, which may provide energy and/or a useful purpose according to embodiments of the present disclosure whereby, a plurality of producer wells may include any number of wells which may include a producer well 1 20, whereby producer well 1 20 is coproducing non-thermal production 10, originating from non-thermal Zone A 40A, together with thermal production 10-T, originating from thermal Zone B 50A, and producer well 2 20A, is producing thermal production 10-T, originating from thermal Zone B 50D and thermal Zone F10, respectively. Producer well 1 20 penetrates a plurality of subterranean zones, strata, or reservoirs, Zone A 40A, Zone C 60A, Zone E00A, and is terminated in Zone B 50A. Producer well 1 20 is comprised of parent borehole 140 and a plurality of child boreholes 140*a*1, 140*a*2, and 140*a*3, extending from parent borehole 140, which includes parent borehole 140 comprising a producer well external casing completion assembly 80P, with a bonding system 81 within parent borehole 140, bonding together the external casing completion assembly 80P, the parent borehole 140 and the zone/borehole interface. Extending from parent borehole 140, child boreholes 140*a*1, 140*a*2, and 140*a*3 each comprise a producer well branch external casing completion assembly 80P1, which include a producer well casing completion branch junction 80PJ1, and used for the purpose of joining producer well casing completion assembly 80P to producer well branch external casing completion assembly 80P1, within parent borehole 140, and are bonded together with the borehole/zone interface, within child boreholes 140*a*1, 140*a*2, and 140*a*3 with bonding system 81. Child borehole 140*a*1 extends horizontally and west from producer well 1 20 parent wellbore 140, traversing within Zone A 40A, terminating in sub-compartment Zone A1 40A1. Producer well 1 20 child borehole 140*a*1 includes hydraulic fracture 101 for the purpose of creating a linear flow path within Zone A 40A, interconnecting sub-compartment Zone A1 40A1, and creating a flow which extends beyond the drilling induced damage zone out into the undamaged portion of Zone A 40A whereby, non-thermal production 10, originating from Zone a 40A and sub-compartment Zone A1 40A1, is produced to the surface of the earth 5, into non-thermal production line 22, and further for energy production and additional processing, according to embodiments of the present disclosure. Child borehole 140*a*2 extends horizontally and west from producer parent wellbore 140, within Zone B 50A, intersecting injection well 1 1020 and terminating in Zone B 50A. Producer well 1 20 producer well branch external casing completion assembly 80P1 within producer well child borehole 140*a*2, comprises a producer well branch wellbore connection interface device 1210*a*, used for the purpose of interconnecting producer well 1 20 to injection well 1 1020, creating a network of interconnected pipes between producer well 20 and injection well 1020, permitting unimpeded, continuous flow between producer well 1 20 and injection well 1 1020, a flow control device 83, used for the purpose of isolating or restricting fluid flow within producer well branch external casing completion assembly 80P1, and Producer well 1 20 child borehole 140*a*3, includes hydraulic fracture 101 for the purpose of creating a linear flow path within Zone B 50A, and interconnecting sub-compartment Zone B1 50A1, whereby hydraulic fracture 101, comprising a high permeability material, defined as proppant to those skilled in the art, within the fracture, extends beyond the drilling induced damage zone out into the undamaged zone, intersecting sub-compartment Zone B1 50A1, to permit thermal production 10-T, entry into producer well 1 20 originating from Zone B 50A, together with non-thermal production 10, produced from Zone A 40A. Coproduction of thermal production 10-T together with non-thermal production 10, is facilitated by thermally insulated production tubing 90P-T (not shown), comprising one or a plurality of components defined as a primary thermal insulated body 1400 (not shown), which may also comprise a component included as an additional and/or accessory component attached to primary thermal insulated body 1400 (not shown), and defined as secondary thermal insulated body 1400A (not shown), whereby, the inclusion of one or a plurality of thermal insulated bodies 1400, 1400A (not shown), which may comprise component(s) of a non-thermal production tubing assembly 90P (not shown), and are defined as thermally insulated production tubing 90P-T (not shown) whereby, thermal production 10-T is produced internally within the bore of thermally insulated production tubing 90P-T and is a separate and/or an isolated conduit for the purpose of producing thermal production 10-T, and non-thermal production 10, is produced in the annular space, internally within producer well 2 20A parent borehole 140 external completion assembly 80P, and external to thermally insulated production tubing 90P-T (not shown), which may also be comprised of portions of non-insulated production tubing 90P (not shown) whereas, non-thermal production 10 is separate and thermally insulated from thermal production 10-T, permitting coproduction of thermal production 10-T together with non-thermal production 10 whereby thermal production 10-T, at the surface of the earth 5 flows into thermal production inlet line 22-T and non-thermal production 10 flows into non-thermal production inlet line 22, and further for energy production and additional processing, according to embodiments of the present disclosure. Producer well 2 20A is comprised of parent borehole 140 and child borehole 140*a*1, extending from parent borehole 140, which includes parent borehole 140 comprising a producer well external casing completion assembly 80P, with a bonding system 81 within parent borehole 140, bonding together the external casing completion assembly 80P, the parent borehole 140 and the zone/borehole interface. Child borehole 140*a*1 extends horizontally and west from producer well 1 20 parent wellbore 140, traversing within Zone 60D, across fault F1, and terminating in Zone 50A whereby, child borehole 140*a*1 comprises a producer well branch external casing completion assembly 80P1, which include a producer well casing completion branch junction 80PJ1, and used for the purpose of joining producer well casing completion assembly 80P to producer well branch external casing completion assembly 80P1, within parent borehole 140, and child borehole 140*a*1, respectively, and are bonded together with the borehole/zone interface, within child borehole 140*a*1, with bonding system 81, a plurality of thermal heat transfer bodies 1300, and a flow control device 83, which may be used to isolate and/or restrict thermal production 10-T within production well 2 20A child borehole 140*a*1. Extending vertically from producing well 2 20A child borehole 140*a*1, are a plurality of child sub-branch boreholes 140*a*1-*sb*1, 140*a*1-*sb*2 and 140*a*1-*sb*3, respectively, each intersecting injection well 1 1020 child borehole 140*a*3 whereby, each respective child sub-branch borehole includes a junction component, defined as producer well casing completion sub-branch junction 80PJ2, and used for the purpose of joining producer well branch external casing completion assembly 80P1 to producer well sub-branch external casing completion assembly 80P2, within child sub-branch boreholes 140*a*1-*sb*1, 140*a*1-*sb*2 and 140*a*1-*sb*3, respectively, a plurality of thermal heat transfer bodies 1300, a plurality of primary borehole sealing devices 133, and a sub-branch wellbore connection interface device 1210*b*, used for the purpose of interconnecting producer well 2 20A to injection well 1 1020, permitting unimpeded, continuous flow between producer well 2 20A and injection well 1 1020, according to embodiments of the present disclosure. By way of example only, and not meant to be limited to the described configuration, as there are an unlimited number of configurations possible of interconnected producer wellbores, which may be cased with a producer well external casing completion assembly or uncased, and connected to injection wellbores which may be cased with an injection well external casing completion assembly or uncased accordingly, for the described example in FIG. 6 whereby, with flow control device 83 comprised within producer well 2 20A child borehole 140*a*1, producer well branch external casing completion assembly 80P1 is in an isolated or closed configuration, and with flow control device 83, comprised within injection well 1 1020 child borehole 140*a*3, injection well branch external casing completion assembly 80I1, and flow control device 83 is in an isolated or closed configuration whereby, the interconnection of producer well sub-branch external casing completion assemblies 80P2 comprising a plurality of thermal heat transfer bodies 1300, within child sub-branch boreholes 140*a*1-*sb*1, 140*a*1-*sb*2 and 140*a*1-*sb*3, respectively, creates thermally conductive and/or thermally convective flow loop heat exchanger whereby, non-thermal production is pumped from the surface of the earth 5 down injection well 1 1020 parent borehole 140 injection well external casing completion assembly 80I, into injection well 2 1020 child borehole 140*a*3 injection well branch external casing completion assembly 80I1, whereby non-thermal production flows through one or a plurality of thermal heat transfer bodies 1300, and with flow control device 83 within injection well child borehole 140*a*3 injection well branch external casing completion assembly 80I closed or isolated, non-thermal injection flows up into producing well 2 20A child sub-branch borehole 140*a*1-*sb*3 producer well sub-branch external casing completion assembly 80P2 comprising one or a plurality of thermal heat transfer bodies 1300 to producing well 2 20A child borehole 140*a*1 with branch external casing completion assembly 80P1 comprising one or a plurality of thermal heat transfer bodies 1300 whereby, injection fluid with flow control device 83 within child borehole 140*a*1 branch external casing completion assembly 80P1 closed or isolated, flows down producing well 2 20A child sub-branch borehole 140*a*1-*sb*2 producer well sub-branch external casing completion assembly 80P2, comprising one or a plurality of thermal heat transfer bodies 1300, to injection well 2 1020 child borehole 140*a*3 injection well branch external casing completion assembly 80I1, whereby non-thermal production flows through one or a plurality of thermal heat transfer bodies 1300, and flows up into producing well 2 20A child sub-branch borehole 140*a*1-*sb*1 producer well sub-branch external casing completion assembly 80P2 comprising one or a plurality of thermal heat transfer bodies 1300 to producing well 2 20A child borehole 140*a*1 with branch external casing completion assembly 80P1 comprising one or a plurality of thermal heat transfer bodies 1300 and further into producing well 2 20A parent borehole 140 with external casing completion assembly 80P, whereby heat contained within thermal Zone F10 is used for the purpose of heat transfer through means of heat conduction, heat convection, or any combination thereof, heat transfer whereby, heat contained within thermal Zone F10 is transferred to cement system 81, which may be composed of a high thermally conductive bonding material, within injection well and producing well boreholes, and to thermally conductive components comprising injection well branch external casing completion assembly 80I1, producing well 2 20 producer well sub-branch external casing completion assemblies 80P2 and producing well 2 20A branch external casing completion assembly 80P1, which may be one or a plurality of thermal heat transfer bodies 1300, comprising thermally conductive components whereby, as injection fluid flows through the flow loop created by interconnected injection wells to producing wells, heat is transferred to non-thermal injection, flowing within the external casing completion assemblies 80I1, 80P2, 80P1, and thermal heat transfer bodies 1300, transitioning said fluid to thermal production 10-T, whereby, thermal production 10-T originating from Zone F10 is produced to the surface of the earth 5, into thermal production line 22-T, and further for energy production and additional processing, according to embodiments of the present disclosure. At the surface of the earth 5, also included is injection well 1 1020 which penetrates a plurality of subterranean zones, strata, or reservoirs, Zone A 40B, Zone A 40A, Zone C 60A, Zone E00A, Zone B 50A and is terminated in Zone F10. Injection well 1 1020 is comprised of parent borehole 140 and a plurality of child boreholes 140*a*1, 140*a*2 and 140*a*3, respectively, extending from parent borehole 140 whereby, borehole 140 comprising an injection well external casing completion assembly 80I, includes a plurality of casing completion branch junctions 80IJ1, and a plurality of flow control devices 83 which may be used to isolate and/or restrict injection within injection well parent borehole 140, and/or injection well external casing completion assembly 80I within borehole 140 whereby, injection may be isolated and/or diverted within injection well external casing completion assembly 80I, whereby isolation and/or restriction may include any child borehole 140*a*1, 140*a*2, 140*a*3, any injection well external casing completion assembly 80I1, included within said child borehole(s) and/or child sub-branch borehole 140*a*1-*sb*1, and/or injection well sub-branch external casing completion assembly 80I2, within said child sub-branch boreholes, or any combination thereof, within the network of interconnected pipes created by interconnecting producer wells 20, 20A to injection well 1 1020, according to embodiments of the present disclosure. Injection well 1 1020 parent borehole 140, comprising injection well external casing completion assembly 80I within thermal Zone B 50A, includes perforations 100, penetrating through injection well external casing completion assembly 80I, through borehole 140, into Zone B 50A, to permit Zone B 50A, thermal injection A, entry from injection well 1 1020 back into originating Zone B 50A. Injection well 1 1020, comprised of a vertical parent borehole 140, includes child boreholes 140*a*1, 140*a*2, and 140*a*3, respectively, extending from injection well 1 1020 parent borehole 140 whereby, child borehole 140*a*1 extends horizontally and west from the vertical parent borehole 140, in an adjacent zone parallel to, and above, Zones A 40B and 40A, respectively, child borehole 140*a*2 extends horizontally and in a west direction parallel to child borehole 140*a*1, traversing within Zone A 40A, and terminating in Zone A 40A and child borehole 140*a*3 extends horizontally and in an east direction, traversing through Zone F10 and terminating in Zone B 50D whereby, child borehole 140*a*3 comprising injection well branch external casing completion 80I1, intersects a plurality of producer well 2 child sub-branch boreholes 140*a*1-*sb*3, 140*a*1-*sb*2 and 140*a*1-*sb*1, each comprising producer well sub-branch external casing completion assembly 80P2, respectively. Injection well 1 1020 child borehole 140*a*1, 140*a*2 and 140*a*3, respectively, each include an injection well casing completion branch junction 80IJ1, used for the purpose of joining injection well external casing completion assembly 80I to injection well branch external casing completion assembly 80I1, within parent borehole 140. Extending vertically from child borehole 140*a*1 is child sub-branch boreholes 140*a*1-*sb*1 whereby, child sub-branch borehole 140*a*1-*sb*1 penetrates a plurality of subterranean zones, strata, or reservoirs, Zone A 40A, Zone C 60A, Zone E00A, Zone B 50A, and is terminated in Zone F10. Injection well 1 1020 child sub-branch borehole 140*a*1-*sb*1, comprises an injection well sub-branch external casing completion assembly 80I2, injection well casing completion sub-branch junction 80IJ2, a plurality of borehole offset bodies 1230, injection well connection interface device 1210*b*, used for the purpose of interconnecting producer well 1 20 to injection well 1 1020, permitting unimpeded, continuous flow between producer well 1 20 and injection well 1 1020, according to embodiments of the present disclosure, and a wellbore connection guide nozzle body 1240. Injection well 1 child sub-branch borehole 140*a*1-*sb*2, within non-thermal Zone A 40A, includes perforations 100, penetrating through injection well branch external casing completion assembly 80I1, through child borehole 140*a*2, into Zone A 40A, to permit Zone A 40A, non-thermal injection, entry from injection well 1 1020 back into originating Zone A 40A, permitting production again from producer well 1 20 and subsequent energy production according to embodiments of the present disclosure. Injection well 1 1020 child borehole 140*a*3, includes an injection well casing completion branch junction 80IJ1, a plurality of borehole offset bodies 1230, a plurality of thermal heat transfer bodies 1300, used for the purpose of heat transfer through means of heat conduction, heat convection, or any combination thereof, heat transfer whereby, heat contained within thermal Zone F10 is transferred to cement system 81, which may be composed of a high thermally conductive bonding system 81, bonding injection well child borehole 140*a*3 and injection well branch external casing completion assembly 80I within injection well branch borehole 140*a*3 together, and to thermally conductive components comprising injection well branch external casing completion assembly 80I, which may be a thermal heat transfer body 1300 comprising thermally conductive components whereby, heat is transferred to non-thermal injection, flowing within a thermal heat transfer body 1300, transitioning said fluid to thermal production 10-T, and further comprising injection well 1 1020 child borehole 140*a*3, injection well branch external casing completion assembly 80I, are a plurality of branch wellbore connection interface devices 1210*a*, used for the purpose of interconnecting injection well 1 1020 to producer well 2 20A, creating a network of interconnected pipes between injection well 1 1020 and producer well 2 20A, permitting unimpeded, continuous flow between injection well 1 1020 and producer well 2 20A, according to embodiments of the present disclosure, and injection well 1 1020 child borehole 140*a*3, injection well branch external casing completion assembly 80I comprises a branch wellbore connection interface assembly 1250, comprised of a branch wellbore connection interface device 1210*a*, borehole offset body 1230 and a wellbore connection guide nozzle body 1240, according to embodiments of the present disclosure. Embodiments of the present disclosure as described in FIG. 6 provide a system of interconnected pipes, used for the purpose of producing fluid from one or a plurality of subterranean zone(s), strata or reservoir(s), that may contain water as the primary fluid, water that may include hydrocarbons, water containing hydrogen, water that may be heated from heat sources originating below the surface of the earth, water that may contain sodium chloride, water that may contain any other energy producing components, or any combination thereof, for the purpose of generating hydroelectric power, cogenerating hydroelectric power together with power generated from thermal heat, cogenerating hydroelectric power together with power generated from chemical components contained within the fluid (e.g., hydrocarbons, hydrogen, or other chemical components), or any combination thereof, used for electricity production from energy generation components contained within the water, and produced from a plurality of subsurface wells.

Figure 7:
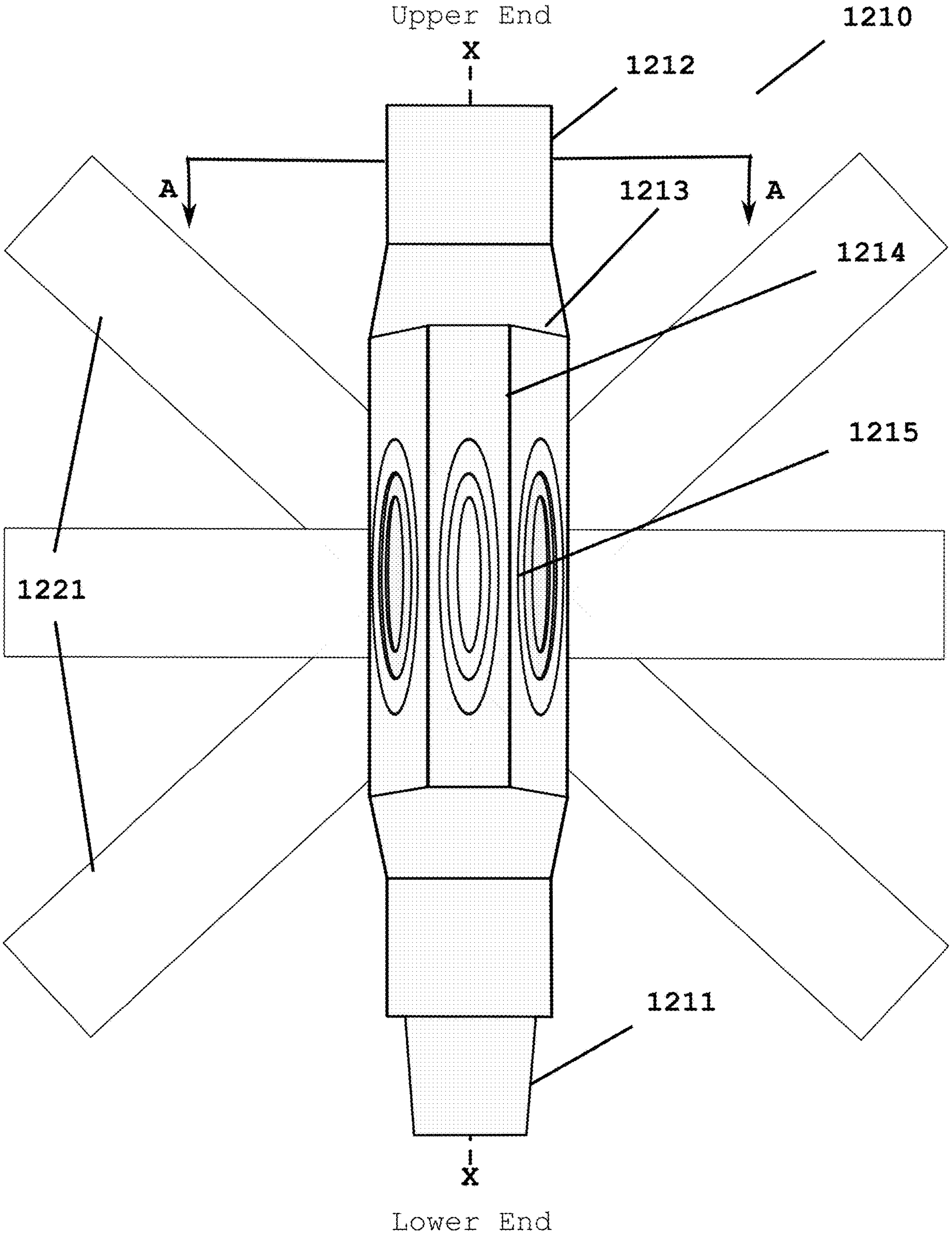
FIG. 7 depicts a top view of the well connection interface assembly according to an embodiment of the present disclosure.

FIGS. 7-14 illustrate embodiments of the present disclosure which may provide an apparatus used for the purpose of interconnecting a plurality of wells which may be producer wells, injection wells, or any combination thereof, by external means. A multitude of apparatus and methods have been developed which facilitate the exit from new and/or existing wellbores and conduits or casing comprised within boreholes and are well known to those skilled in the art, whereby apparatus guide or direct a drilling assembly toward the interior face of said conduit or casing, facilitating penetration through the conduit wall out into the surrounding zone. An apparatus of the present disclosure, described herein FIG. 7, facilitates external penetration, entry into, and through, out into the surrounding zone, strata or reservoir facilitated by a wellbore connection drilling assembly 1200 (not shown), for a new and/or existing borehole which may comprise a conduit and/or casing, and known to those skilled in the art, whereby an interconnection is facilitated between a plurality of wells which may be producer wells, injection wells, or any combination thereof. In the foregoing figures descriptive terms which may include “internal, inner and internally” denote elements that are radially closest to the center longitudinal axis X-X of each concentric body described and conversely, the terms “external, outside and externally” denote elements furthest radially from the center longitudinal axis X-X. FIG. 7 depicts a plan view of wellbore connection interface device 1210, according to an embodiment of the present disclosure, generally with a tubular or cylindrical configuration which may have a multi-sided tubular or cylindrical configuration, with a wellbore connection interface main body bore 1216 (not shown), centrally located within the body, to permit the passage of fluid flow, intervention apparatus, which may be a wellbore connection drilling assembly 1200 (not shown) or an internal wellbore connection milling assembly 1200A (not shown), location assistance apparatus, or other devices, whereby passage through the wellbore connection interface main body bore 1216 (not shown), may be required from time-to-time, wellbore connection interface lower longitudinal end joining member 1211, which may be a threaded pin joining member, located at the lower longitudinal end of wellbore connection interface device 1210, wellbore connection interface main body 1213 whereby, the body exterior diameter transitions radially from the outer face diameter of wellbore connection interface lower longitudinal end joining member 1211, to the outer face diameter of wellbore connection interface main body 1213, wellbore connection interface penetration face 1214, which may include a tubular three-sided, four-sided, five-sided, six-sided, seven-sided, eight-sided (as shown) configuration, or any number of sides, being three or more, positioned radially around the body whereby, the wellbore connection interface penetration face 1214, is comprised of one or a plurality of penetration contact face(s) 1215, which are stepped depressions extending out radially on each wellbore connection interface penetration face 1214, and inwardly projecting toward wellbore connection interface main body bore 1216, which may facilitate contact by a penetration device, which may be a wellbore connection drilling assembly 1200 (not shown), for the purpose of stabilizing and/or maintaining contact to a penetration face by a penetration device, which may require rotation for penetration, within the one or plurality of inwardly stepped of penetration contact face(s) 1215, located on wellbore connection penetration face 1214, facilitating the external penetration of a contacted face by a penetration device, and wellbore connection interface upper longitudinal end joining member 1212, which may be a threaded box joining member, located at the upper longitudinal end of wellbore connection interface device 1210, whereby, the body exterior diameter transitions radially from the outer face diameter of wellbore connection interface main body 1213 to the outer face diameter of wellbore connection interface upper longitudinal end joining member 1212. A wellbore connection interface device 1210 may comprise an individual component whereby, one or a plurality of wellbore connection interface device(s) 1210, may be joined together with wellbore connection interface upper longitudinal end joining member 1212 attached to wellbore connection interface lower longitudinal end joining member 1211, to facilitate any length for a plurality of said devices, joined one to another, which may be required. Wellbore connection interface penetration face 1214, which may include any number of sides, being three or more, positioned radially around the body, facilitates penetration by a wellbore penetration device from any radial direction around wellbore connection interface device 1210, and from any penetration orientation angle 1221, which may occur during an interconnection drilling sequence method, to be described herein, by FIGS. 15-19, according to methods and embodiments of the present disclosure. Body shape may not be restricted to a tubular or cylindrical configuration as described, as other body shapes may be joined together with another, and the present disclosure encompasses operations and processes whereby subsurface conditions and fluids are variable, and as such, the material composition of the embodiment may vary depending upon anticipated subsurface fluid, fluid composition and pressure exposure to the embodiments described.

Figure 8:
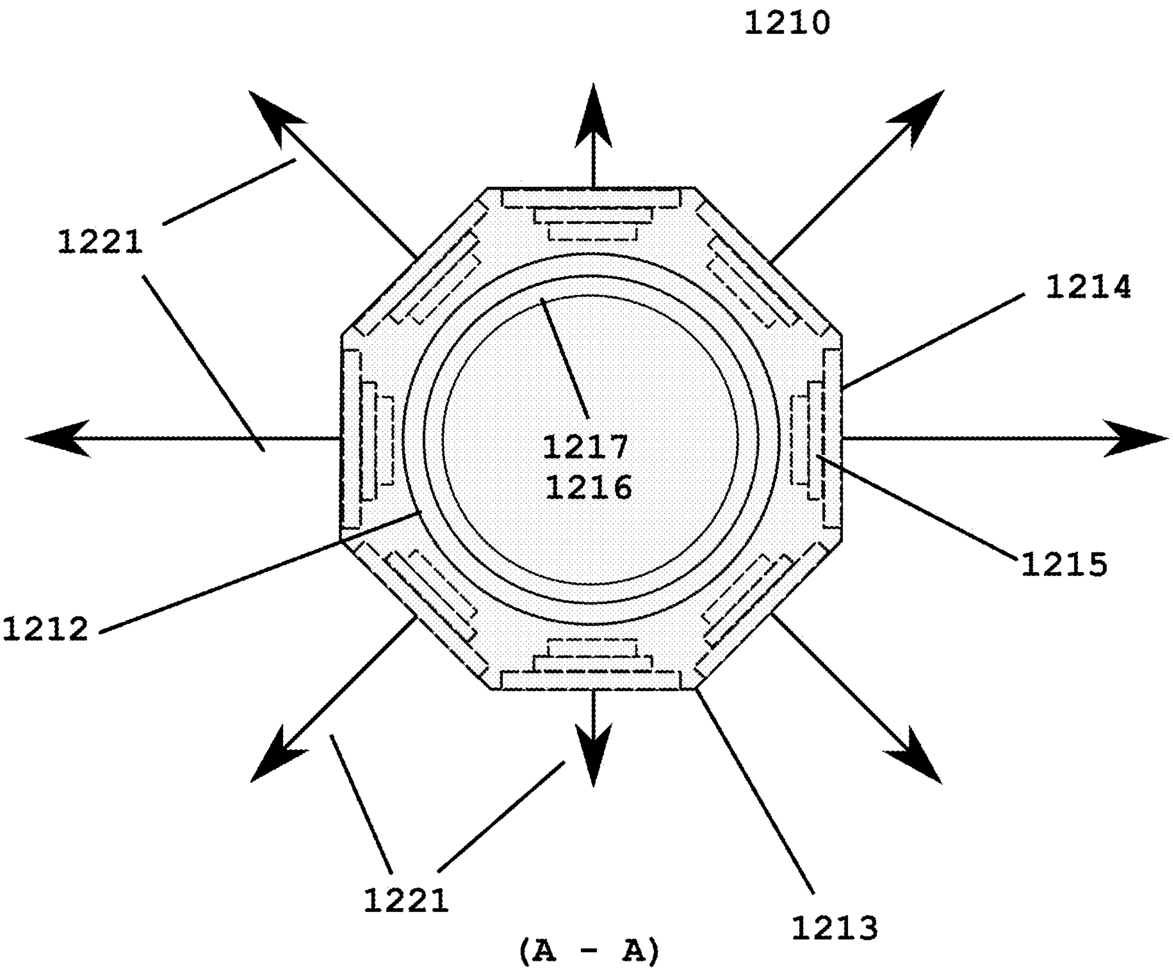
FIG. 8 depicts a cross section view of FIG. 7, Section A-A of the well connection interface assembly according to an embodiment of the present disclosure.

FIG. 8 depicts an elevation view of cross-section A-A shown on FIG. 7, wellbore connection interface device 1210, according to an embodiment of the present disclosure. This view provides a perspective from the upper end to the lower end showing wellbore connection interface device 1210, wellbore connection interface main body bore 1216 whereby, wellbore connection interface device 1210 wellbore connection interface main body bore 1216 extends from the upper lateral end of wellbore connection interface device 1210 to the lower lateral end comprising wellbore connection interface main body bore interior face 1217, wellbore connection interface upper longitudinal end joining member 1212, wellbore connection interface main body 1213, and wellbore connection interface penetration face 1214 whereby, penetration orientation angle 1221, is described by arrows radiating about the circumference of wellbore connection interface penetration face 1214 comprising wellbore connection interface main body 1213 being a component of wellbore connection interface device 1210, whereby external penetration by a penetration device from any orientation angle is shown.

Figure 9:
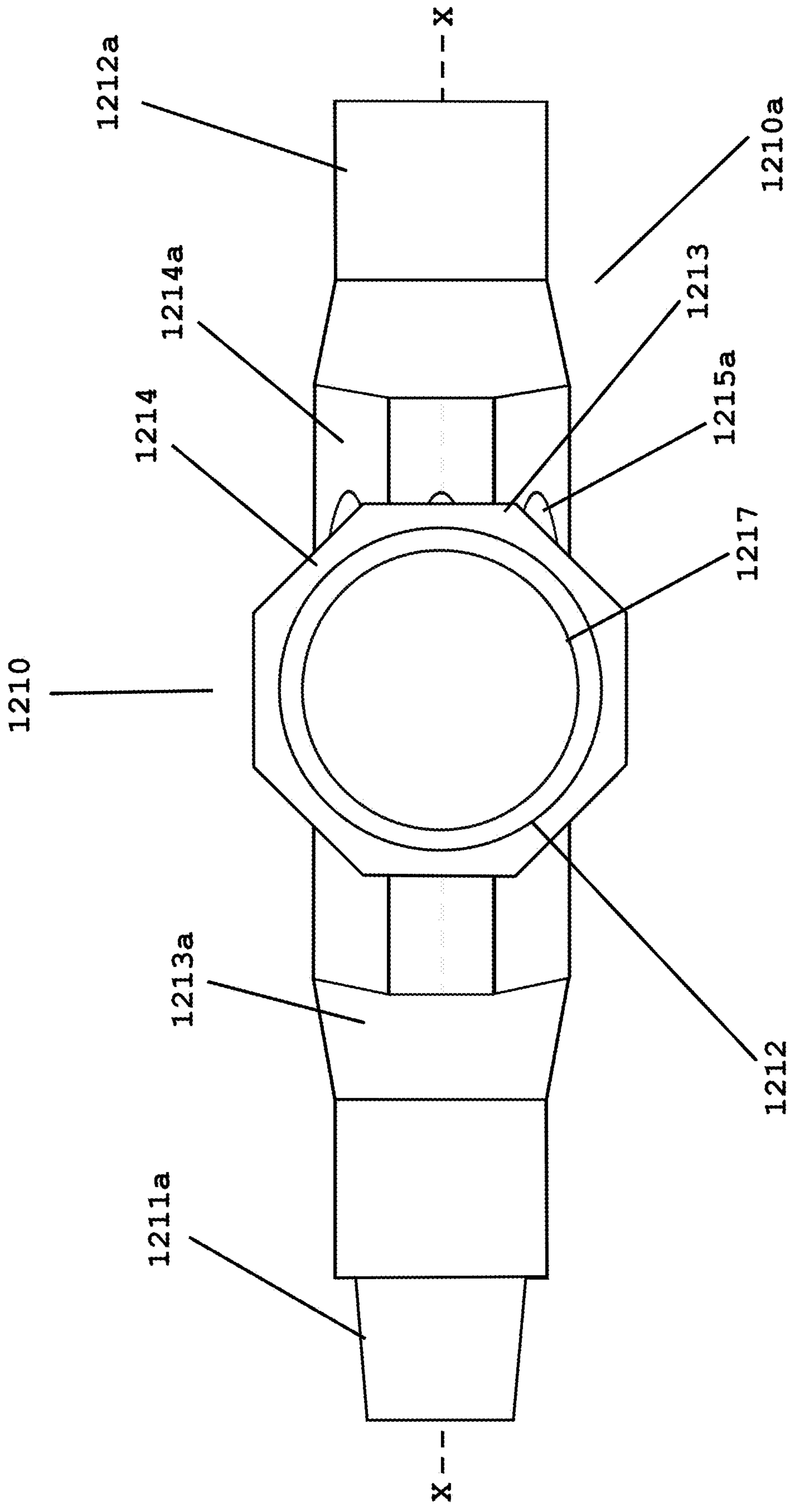
FIG. 9 depicts the joined bodies of the well connection interface assembly (front view) with the well connection interface subassembly (side view), according to embodiments of the present disclosure.

FIG. 9 depicts a side elevation view of wellbore connection interface device 1210 interconnected by a branch wellbore connection interface device 1210*a* according to an embodiment of the present disclosure. A wellbore connection interface device facilitates the interconnection of external casing completion assemblies within boreholes, as described within the present disclosure whereby, wellbores comprise a variable internal diameter which may decrease with increasing depth and/or length and may be defined as a primary or parent borehole 140, as described within the present disclosure. Boreholes extending from a primary or parent borehole 140 may be defined as a secondary, branch or child borehole 140*a*, as described within the present disclosure, and may include a variable diameter which may be equal to or slightly smaller than the internal diameter of a primary or parent borehole 140. Boreholes extending from secondary, branch, or a child borehole 140*a* may be defined as child sub-branch boreholes 140*a-sb*, as described within the present disclosure, and may include a variable diameter which may be equal to or slightly smaller than the secondary, branch or child borehole 140*a*, and accordingly, each respective external casing completion assembly within said boreholes will also comprise variable external diameter sizes based upon the internal diameter of a borehole comprising the external casing completion assembly. For this disclosure, to simplify explanation of wellbore connection interface devices, a wellbore connection interface device which penetrates another wellbore connection interface device may be defined as a secondary wellbore connection interface device and the penetrated device may be defined as a primary wellbore connection interface device and/or a wellbore connection interface device may be described based upon the borehole designation comprising a wellbore connection interface device. For example, a wellbore connection interface device within a parent borehole 140 may be defined as wellbore connection interface device 1210, or primary wellbore connection interface device 1210, and the penetrating wellbore connection interface device, penetrating within a primary wellbore connection interface device, required to facilitate an interconnection or joint between an external casing completion assembly within a child borehole 140*a*, to an external casing completion assembly within a parent borehole 140, may be defined as branch wellbore connection interface device 1210*a* or secondary wellbore connection interface device 1210*a* and/or if the secondary penetrating wellbore connection interface device, within a primary wellbore connection interface device, required to facilitate an interconnection or joint, is between an external casing completion assembly within a child sub-branch borehole 140*a-sb* and an external casing completion assembly within a child borehole 140*a*, the penetrating wellbore connection interface device may be defined as child sub-branch wellbore connection interface device 1210*b* or secondary wellbore connection interface device 1210*b*, and the penetrated wellbore connection interface device within an external casing completion assembly in a child borehole 140*a*, may be defined as branch wellbore connection interface device 1210*a*, or primary wellbore connection interface device 1210*a*, and so on whereby, the intersecting device is secondary to a primary intersected device. This view illustrates the interconnection joint created by the intersection of primary wellbore connection interface device 1210 interconnected by a secondary branch wellbore connection interface device 1210*a*, which create an interconnected bore between bodies and wells which may be producer wells 20 (not shown), injection wells 1020 (not shown), or any combination thereof, facilitating the passage of fluid flow, intervention apparatus, which may be a wellbore connection drilling assembly 1200 (not shown) or an internal wellbore connection milling assembly 1200A (not shown), location assistance apparatus, or other devices, whereby passage through the interconnected bodies may be required from time-to-time. This view provides a perspective from the upper end to the lower end of wellbore connection interface device 1210, whereby branch wellbore connection interface device 1210*a* intersects wellbore connection interface device 1210 whereby, the external diameter of branch wellbore connection interface device 1210*a* is approximately equal to but slightly smaller than the internal diameter of wellbore connection interface main body bore 1216 facilitating penetration through wellbore connection interface device 1210 as shown. Wellbore connection interface device 1210 includes wellbore connection interface main body bore 1216 with wellbore connection interface main body bore interior face 1217, wellbore connection interface upper longitudinal end joining member 1212, wellbore connection interface main body 1213, and wellbore connection interface penetration face 1214. Branch wellbore connection interface device 1210*a* includes branch wellbore connection interface lower longitudinal end joining member 1211*a*, which may be a threaded pin joining member, located at the lower longitudinal end of branch wellbore connection interface device 1210*a*, branch wellbore connection interface main body 1213*a* whereby, the body exterior diameter transitions radially from the outer face diameter of branch wellbore connection interface lower longitudinal end joining member 1211*a*, to the outer face diameter of branch wellbore connection interface main body 1213*a*, branch wellbore connection interface penetration face 1214*a*, which may include a tubular three-sided, four-sided, five-sided, six-sided, seven-sided, eight-sided (as shown) configuration, or any number of sides, being three or more, positioned radially around the body whereby, the branch wellbore connection interface penetration face 1214*a*, is comprised of one or a plurality of branch wellbore connection interface penetration contact face(s) 1215*a*, which are stepped depressions extending out radially on each branch wellbore connection interface penetration face 1214*a*, and inwardly projecting toward branch wellbore connection interface main body bore 1216*a*, which may facilitate contact by a penetration device, which may be a wellbore connection drilling assembly 1200 (not shown), for the purpose of stabilizing and/or maintaining contact to a penetration face by a penetration device, which may require rotation for penetration, within the one or plurality of inwardly stepped branch wellbore connection interface penetration contact face(s) 1215*a*, located on branch wellbore connection interface penetration face 1214*a*, facilitating the external penetration of a contacted face by a penetration device, and branch wellbore connection interface upper longitudinal end joining member 1212*a*, which may be a threaded box joining member, located at the upper longitudinal end of branch wellbore connection interface device 1210*a*, whereby, the body exterior diameter transitions radially from the outer face diameter of branch wellbore connection interface main body 1213*a* to the outer face diameter of branch wellbore connection interface upper longitudinal end joining member 1212*a*. A branch wellbore connection interface device 1210*a* may comprise an individual component whereby, one or a plurality of branch wellbore connection interface device(s) 1210*a*, may be joined together with branch wellbore connection interface upper longitudinal end joining member 1212*a* attached to branch wellbore connection interface lower longitudinal end joining member 1211*a*, to facilitate any length for a plurality of said devices, joined one to another, which may be required. Branch wellbore connection interface penetration face 1214*a*, which may include any number of sides, being three or more, positioned radially around the body, facilitates penetration by a wellbore penetration device from any radial direction around branch wellbore connection interface device 1210*a*, and from any penetration orientation angle 1221 (not shown), which may occur during an interconnection drilling sequence method, to be described herein, by FIGS. 15-19, according to methods and embodiments of the present disclosure. Body shape may not be restricted to a tubular or cylindrical configuration as described, as other body shapes may be joined together with another, and the present disclosure encompasses operations and processes whereby subsurface conditions and fluids are variable, and as such, the material composition of the embodiment may vary depending upon anticipated subsurface fluid, fluid composition and pressure exposure to the embodiments described.

Figure 10:
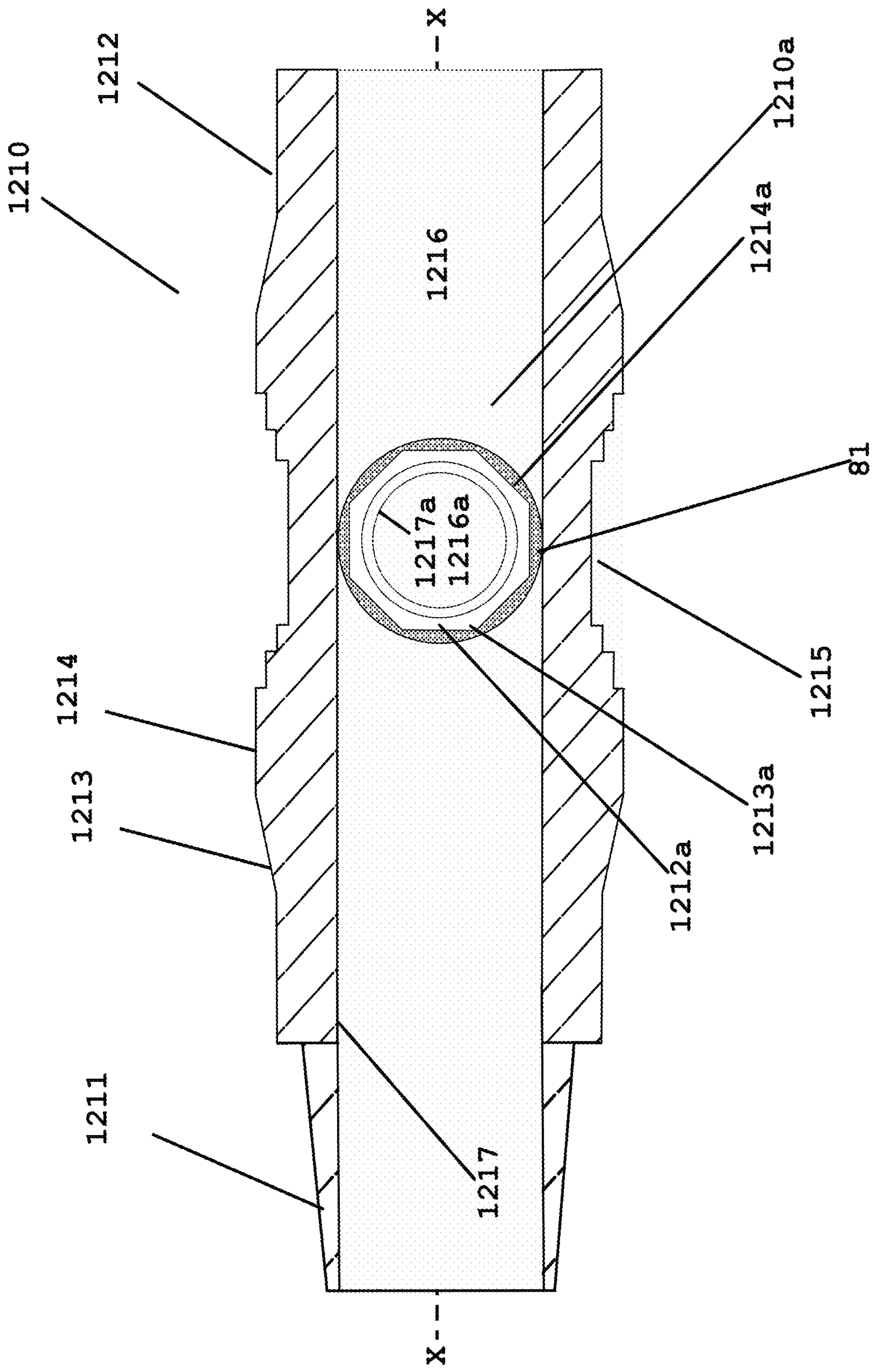
FIG. 10 depicts the joined bodies of the well connection interface assembly (side cross-sectional view) with the well connection interface subassembly (front view), prior to interface subassembly removal inside the well connection interface assembly, according to embodiments of the present disclosure.

FIG. 10 depicts a cross-section side elevation view of primary wellbore connection interface device 1210 interconnected by a secondary branch wellbore connection interface device 1210*a*, according to an embodiment of the present disclosure. This view illustrates a sequence of interconnection, further described in FIGS. 15-19, during an interconnection drilling sequence method, according to methods and embodiments of the present disclosure whereby, wellbore connection interface device 1210 is a component of producer well external casing completion assembly 80P (not shown), within a parent borehole 140 (not shown), and a wellbore connection drilling assembly 1200 (not shown), has drilled an injection well child borehole 140*a* (not shown) whereby, producer well external casing completion assembly 80P (not shown), comprising producer well wellbore connection interface device 1210 has been located, wellbore connection drilling assembly 1200 (not shown) has penetrated and drilled through producer well wellbore connection interface device 1210, branch wellbore connection interface device 1210*a* has been deployed as a component comprising injection well branch external casing assembly 80I1 (not shown), within injection well child borehole 140*a* (not shown), intersecting producer well wellbore connection interface device 1210 and injection well child borehole 140*a* (not shown) comprising injection well branch external casing assembly 80I1 (not shown), with injection well branch wellbore connection interface device 1210*a* contained within producer well wellbore connection interface device 1210, is bonded together with a bonding system 81. The view depicted and described herein provides a perspective from the upper end to the lower end of branch wellbore connection interface device 1210*a*, which includes branch wellbore connection interface main body bore 1216*a* with branch wellbore connection interface main body bore interior face 1217*a*, branch wellbore connection interface upper longitudinal end joining member 1212*a*, branch wellbore connection interface main body 1213*a*, and branch wellbore connection interface penetration face 1214*a*, within wellbore connection interface main body bore 1216 of producer well wellbore connection interface device 1210 and bonded together with a bonding system 81 according to embodiments of the present disclosure.

FIG. 11 depicts a cross-section side elevation view of a primary well wellbore connection interface device 1210 interconnected by a secondary well branch wellbore connection interface device 1210*a*, according to an embodiment of the present disclosure. This view illustrates wellbore connection secondary seal device 134 set within primary well wellbore connection interface device 1210, facilitating a secondary seal isolating the interconnection joint formed by joining a primary well wellbore connection interface device 1210 within a parent borehole 140, to a secondary well wellbore connection interface device 1210*a*, isolating the interconnection joint from cement system 81 within a child borehole 140*a*, and isolating the interconnection joint from the interface of child borehole 140*a* and any adjoining zone, strata or reservoir, facilitating an internal secondary seal between interconnected bodies, independent from primary seals created external to the joint, which may be cement system 81, primary borehole sealing device 133, or any combination thereof, according to embodiments of the present disclosure. Following are methods and apparatus which may provide a secondary seal at the intersection of joined bodies from within a producer well 20, an injection well 1020, or a plurality of joined bodies from within a plurality of producer wells 20, and/or a plurality of injection wells 1020, or any combination thereof. Wellbore connection secondary seal device 134, is an elongated lateral body comprising secondary seal tubular body 1218, with secondary seal tubular body bore 1219 and a plurality of secondary seal tubular body seal elements 1220 whereby, secondary seal tubular body 1218 may comprise a rigid elongated lateral tubular body or an expandable elongated lateral tubular body, with sealing element material, which may be an elastomer, swellable elastomer, inflatable elastomer, metal-to-metal sealing member, and may be comprised of PTFE (polytetrafluoroethylene), PEEK (polyetheretherketone), Fluorosilicone, Silicone, or any combination thereof, material composition, and is designed for high pressure and/or high temperature, exposure to fluids comprising hydrocarbons and/or fluids which may include corrosive component(s), or any combination thereof, positioned around secondary seal tubular body exterior face 1221 of secondary seal tubular body 1218, and sized whereby, the outer diameter of the secondary seal tubular body 1218 comprising the plurality of secondary seal tubular body seal elements 1220, is equal to, very close to, or slightly smaller than, the internal diameter of primary wellbore connection interface device body bore 1216. The thickness of secondary seal tubular body 1218 is sufficient to provide structural integrity, which may prevent failure from pressure internal to or external to the secondary seal tubular body 1218, while affecting a secondary seal within primary wellbore connection interface device body bore 1216. Secondary seal tubular body bore 1219 permits the passage of fluid flowing through the tubular body and components that may be deployed into the well from time-to-time. An expandable tubular body encompassing solid expandable tubular (SET) technology is well known to those skilled in the art. In SET technology, a conical mandrel is pushed or pulled through a solid steel conduit or tubular, expanding it to a predetermined size. The most common and valuable application of SET technology is zonal isolation whereby, devices comprising SET technology, placed within a borehole intersecting one or a plurality of subterranean zone(s), strata, or reservoir(s), facilitate isolation of fluid cross-flow between geological layers. SET technology together with one or a plurality of sealing elements which may be swellable, mounted and/or attached to SET, have been used successfully for isolation within boreholes that are cased or uncased for isolation purposes, and/or within conduits for isolation purposes, or any combination thereof. Secondary seal tubular body seal elements 1220 are further defined, whereby the secondary seal tubular body seal elements 1220 are positioned near each lateral end of secondary seal tubular body 1218, with the joint created by the interconnection of primary wellbore interconnection device and secondary wellbore interconnection device located within the sealed area facilitating a joint seal and extend radially outward and sealingly engage the wellbore connection interface main body bore interior face 1217 of a primary wellbore connection interface device, which may be wellbore connection interface device 1210, as shown, facilitating a seal which may isolate and/or prevent pressure and/or fluid that may exist from nearby sources entry into the joint created by interconnected primary and secondary wellbore connection interface devices. For swellable sealing elements, contact to wellbore connection interface main body bore interior face 1217 of a primary wellbore connection interface device may result from contact to material comprising the swellable seal with contact by an activating agent in the well. The term "swell" or similar terms like "swellable" are used herein to indicate an increase in volume of the swellable material effected by the incorporation of molecular components of an activating agent into the swellable material itself but, if desired, other swelling mechanisms or techniques may be used. Preferably, the swelling material swells when contacted with a particular activating agent that may be a hydrocarbon, water, acid, other chemicals, or any combination thereof, in the well. The activating agent may be introduced after the wellbore connection secondary seal device 134, comprising secondary seal tubular body 1218 and secondary seal tubular body seal elements 1220, is in place, or it may already be present in the well or it may be carried into the well within a chamber comprising a separate component of the wellbore connection interface device whereby release of the agent may be affected by various means at a future time. The swellable material could alternatively swell in response to a particular temperature whereby, the temperature that exists at the desired setting location, or the temperature may be transported to the swellable material whereby, heat contained within a fluid or other means comes in close proximity to the swellable material, the transfer of heat from the heat source to the swellable material through conduction, convection or other means of heat transfer, swells the material whereby, contact to the inner face of the wellbore connection interface device is made, or the material swells upon the passage of a period of time or in response to another stimulus, or any combination thereof. Swellable materials used for the purpose of sealing may comprise several sections of swelling material mounted on a conduit or secondary seal tubular body 1218, according to the aforementioned description, of a certain diameter and/or length whereby, any diameter and/or length of secondary seal tubular body 1218 comprising a swelling material may be connected, one section to another, to yield seals of any required diameter and/or length. Swellable materials are novel types of polymers whereby, the material increases its volume when exposed to an activating agent causing changes in geometry, together with variations in density, hardness and other material properties. Various swellable materials are known to those skilled in the art, which swell when contacted with water and/or hydrocarbon fluid or other fluids, heat, time or by other methods. The mechanism of osmosis may be the basis for swelling in water-based activating agents and the mechanism of diffusion action resulting in absorption of hydrocarbons may be the basis for swelling in hydrocarbon-based activating agents, for example. Rate of swelling is a function of temperature, pressure, swelling material type, and composition of the activating agent medium. Swellable materials may be mounted or attached to conduits used for the purpose of sealing according to the aforementioned description, and used for the purpose described herein, and/or may be mounted or attached to conduits and used for the purpose of sealing and comprise a sealing component within an external casing completion assembly 80P, 80I, or for other purposes whereby, a seal is required. Prior disclosures, U.S. Pat. Nos. 7,059,415 and 7,143,832 document some of the known swellable materials known to those skilled in the art, which are referenced and incorporated herein, together with other materials known to those skilled in the art. Accordingly, it will be appreciated and known to those skilled in the art that a wide variety of different means may be utilized to effect seals that may be a seal resulting from swelling of the swelling material mounted or attached to a conduit or tubular body, which may be a secondary seal tubular body 1218, a seal created by an expandable SET technology device comprising a conduit or tubular body with sealing component(s) mounted or attached, a solid conduit or tubular body with sealing component(s) mounted or attached, a solid conduit or tubular body comprising penetrations with sealing component(s) mounted or attached, or any combination thereof. Accordingly, the scope of the disclosure is not limited to any details of the well system and method(s) described herein, since principles of this disclosure can be applied to many different circumstances. The wellbore connection secondary seal device 134 is deployed from the surface inside the well which may be a producer well 20, injection well 1020, or any combination thereof whereby, deployment may be facilitated by various means which may include electric line whereby, the secondary interconnection seal assembly is attached to one or more devices comprising an electric line tool assembly and used for the purpose of deploying components or multiple components comprising an assembly, locating a specific location where desired component(s) may be required within a well and positioning said components at their desired location. The electric line tool assembly, connected to a cable that may convey an electric current to the assembly for the purpose of activating a device that may comprise a setting device component of the assembly and is used for a specific purpose that may include setting and/or release of a wellbore connection secondary seal device 134 at a desired location within a well, combined with device(s) for determining a location within a well, which may include device(s) that identify the location of individual sections of conduit or components within a well, may include device(s) that can determine locations based upon the fluid, composition or components comprising a formation, (e.g. formation gamma ray or resistivity measurement) within the earth whereby, a location may be determined based upon the measurement of the fluid composition or measurement of components comprising a formation that may provide a signature or measurement pattern of the corresponding formation whereby the location or depth within the earth, or within a well relative to the earth is known, relative to the producing well with its contained components, and said devices are attached to the secondary interconnection seal assembly whereby, the assembly is deployed within the producing well to a location close to the producing wellbore connection interface device and the joint made by the injection wellbore connection interface device whereby, the location device(s) attached to an electric line tool assembly, are used to determine the exact setting location required to position the wellbore connection secondary seal device 134 in its desired location within the wellbore connection interface device to effect the joint seal between the producer well 20 and injection well 1020 whereby, the method of seal engagement is performed, thereby creating a seal and anchoring the wellbore connection secondary seal device 134 between the secondary seal tubular body exterior face 1221 of wellbore connection secondary seal device 134 and wellbore connection interface main body bore interior face 1217, 1217*a* of wellbore connection interface device 1210, 1210*a*, effecting a seal at the joint location within the well. Setting of the wellbore connection secondary seal device 134 may include setting facilitated by an electric current sent from the surface down the electric line to the setting device that activates a setting mechanism to effect seal engagement and release of the electric line setting tool assembly from the wellbore connection secondary seal device 134, or an electric current sent from the surface down the electric line to the setting device may be used simply to release the setting tool from the wellbore connection secondary seal device 134, Upon setting and/or release of wellbore connection secondary seal device 134, the electric line setting tool assembly is extracted from the well. Other means known to those skilled in the art and used for the purpose of deploying, locating, orienting, and setting components and/or assemblies of components within wells, may be utilized for the purpose of locating, orienting, and setting a wellbore connection secondary seal device 134 to effect a joint seal for joint(s) made by the interconnection of producing well(s) 20 and injection well(s) 1020, according to the present disclosure and are known by those skilled in the art, and may include slickline or simply wireline whereby, the setting device or tool is activated by battery power instead of an electric current provided by electric line and location may be determined by other devices that may comprise an internal completion assembly, which may also be defined as non-thermal production tubing 90P or thermally insulated production tubing 90P-T, non-thermal injection tubing 901, or any combination thereof, and will be further described herein FIG. 41 and FIG. 42, and devices comprising an wellbore connection secondary seal device 134 are used for location defining purposes within a well, or other purposes, or may be conveyed on a conduit that may be deployed within another conduit and known to those skilled in the art as coiled tubing and/or a concentric workstring, or may be deployed by any other means which permit deployment within a producing well 20 and/or injection well 1020. With wellbore connection secondary seal device 134 now in place within primary wellbore connection interface device 1210, sealing the joint created by the penetration of secondary wellbore connection interface device 1210*a*, wellbore connection secondary seal device 134 now covers the joint whereby, secondary seal tubular body 1218 creates a blockage within the joint preventing flow into primary wellbore connection interface device 1210 wellbore connection interface main body bore 1216 whereby, secondary seal tubular body 1218, used to affect a joint secondary seal requires penetration from within the well comprising secondary wellbore connection interface device 1210*a*, to create a bore connecting branch wellbore connection interface main body bore 1216*a* to wellbore connection interface main body bore 1216. Apparatus designed for the purpose of removing obstructions within conduit bores, which may be an obstruction removal milling assembly 1200A, whereby obstruction material may comprise an wellbore connection secondary seal device 134 comprising a secondary seal tubular body 1218, a bonding system 81 and/or other material desired to be removed from within bores, and obstruction removal milling assembly 1200A which may comprise special mills, drill bits, penetration devices, location and/or orienting devices, or other devices designed for obstruction removal within conduits, or any apparatus or device combination thereof, are appropriately sized and designed to mill through and/or drill through obstructions within conduits, together with accessory components which facilitate said obstruction removal operations, which may include obstructions comprising a secondary seal tubular body 1218, and said obstruction removal milling assembly 1200A is sized with an outer diameter equal to, very close to, or slightly smaller than, the inner diameter of branch wellbore connection interface main body bore 1216*a* of the well comprising secondary wellbore connection interface device 1210*a*, now blocked by secondary seal tubular body 1218 set within primary wellbore connection interface device 1210, whereby the obstruction removal milling assembly 1200A is deployed from the surface of the earth 5 within the well, to a first blockage location whereby, operations commence to mill through, drill through and/or perform required methods whereby, said blockage, created by secondary seal tubular body 1218 comprising a component of wellbore connection secondary seal device 134 is removed creating a bore which connects branch wellbore connection interface main body bore 1216*a* to wellbore connection interface main body bore 1216 within the joint created by the interconnection of primary wellbore connection interface device 1210 to secondary wellbore connection interface device 1210*a* which may be a bore for the passage of fluids from an injection well 1020 to a producer well 20, according to embodiments of the present disclosure, required for energy production. Subsequent blockages created by wellbore connection secondary seal device 134 which may comprise a plurality of joints between producer wells 20 and injection wells 1020 may be removed accordingly whereby, after all blockages have been removed, the obstruction removal milling assembly 1200A is extracted from the well to the surface of the earth 5. The aforementioned obstruction removal milling operation is further described herein FIG. 19, whereby methods describing interconnection drilling sequence 5 are disclosed, according to other methods and embodiments of the present disclosure.

Figures 11A, 11B:
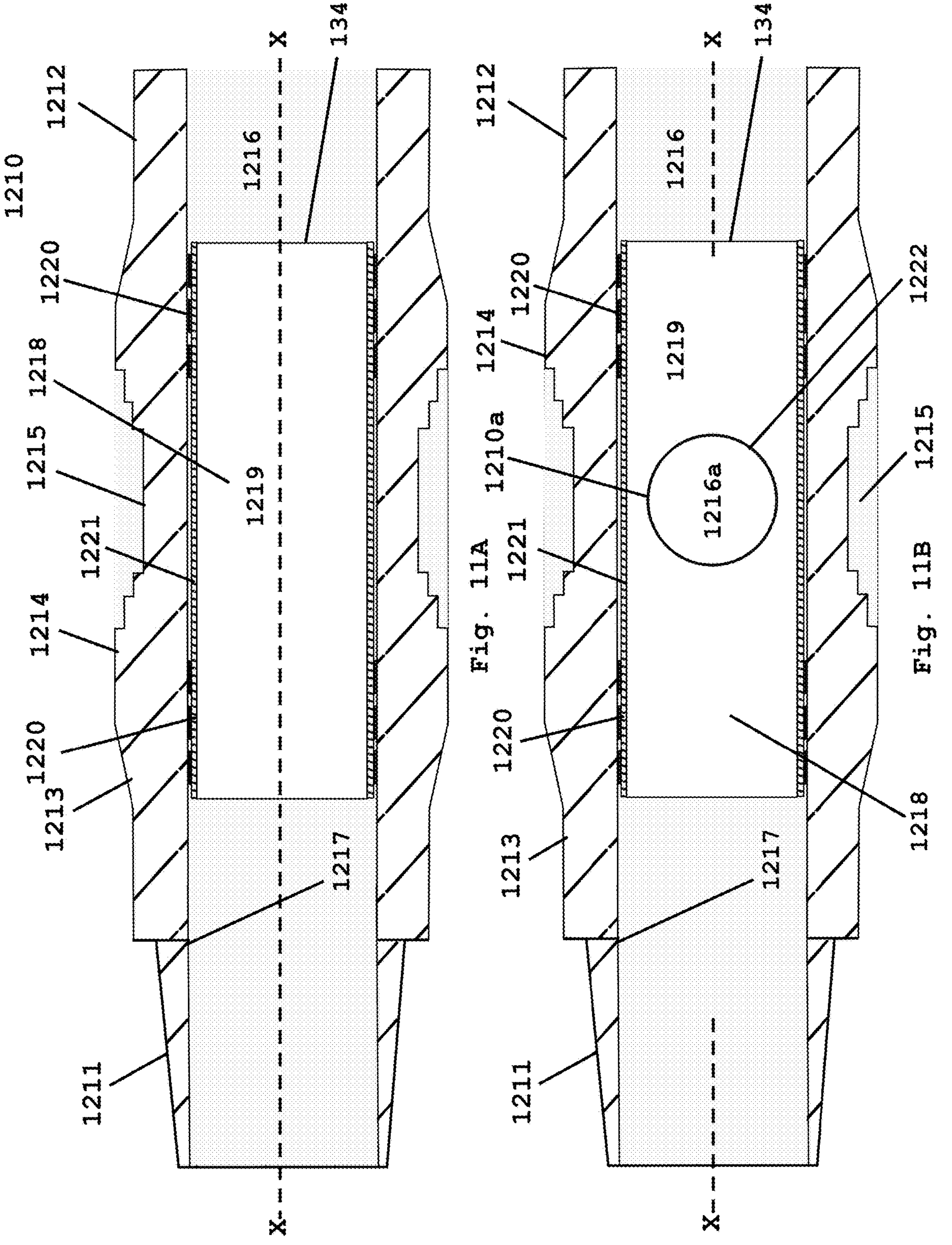
FIG. 11A and FIG. 11B depict the joined bodies of the wellbore connection interface assembly (side cross-sectional view) with the wellbore connection secondary seal assembly shown in FIG. 11, before internal bore configuration, and in FIG. 11A, after internal bore configuration, according to embodiments of the present disclosure.

In another embodiment of the present disclosure, in FIG. 11B wellbore connection secondary seal device 134, is an elongated lateral body comprising secondary seal tubular body 1218 whereby, secondary seal tubular body 1218 may include an elongated lateral body comprising two secondary seal tubular body interconnection penetrations 1222, located on opposing sides of the secondary seal tubular body 1218 whereby, penetration by obstruction removal milling assembly 1200A according to the aforementioned description provided in FIG. is not required. Secondary seal tubular body 1218 comprising two secondary seal tubular body interconnection penetrations 1222, located on opposing sides of the secondary seal tubular body 1218, which also comprises secondary seal tubular body bore 1219 and a plurality of secondary seal tubular body seal elements 1220 whereby, secondary seal tubular body 1218 may comprise a rigid elongated lateral tubular body or an expandable elongated lateral tubular body, with sealing element material, which may be an elastomer, swellable elastomer, inflatable elastomer, metal-to-metal sealing member, and may be comprised of PTFE (polytetrafluoroethylene), PEEK (polyetheretherketone), Fluorosilicone, Silicone, or any combination thereof, material composition, and is designed for high pressure and/or high temperature, exposure to fluids comprising hydrocarbons and/or fluids which may include corrosive component(s), or any combination thereof, positioned around secondary seal tubular body exterior face 1221 of secondary seal tubular body 1218, and sized whereby, the outer diameter of the secondary seal tubular body 1218 comprising the plurality of secondary seal tubular body seal elements 1220, is equal to, very close to, or slightly smaller than, the internal diameter of primary wellbore connection interface device body bore 1216. The thickness of secondary seal tubular body 1218 is sufficient to provide structural integrity, which may prevent failure from pressure internal to or external to the secondary seal tubular body 1218, while affecting a secondary seal within primary wellbore connection interface device body bore 1216. Secondary seal tubular body bore 1219 permits the passage of fluid flowing through the tubular body and components that may be deployed into the well from time-to-time. Secondary seal tubular body 1218 which may include secondary seal tubular body interconnection penetrations 1222 located on opposing sides of the secondary seal tubular body 1218 is further defined whereby, the secondary seal tubular body 1218 containing two secondary seal tubular body interconnection penetrations 1222, may be circular, ovoid or any other shape, and secondary seal tubular body interconnection penetrations 1222 are sized with a dimension equal to, or nearly equal to but slightly larger than, branch wellbore connection interface main body bore 1216*a* of the secondary wellbore connection interface device, which may be branch child wellbore connection interface device 1210*a*, penetrating through the primary wellbore connection interface device 1210, which may a wellbore connection interface device 1210 in a parent wellbore whereby, secondary seal tubular body interconnection penetrations 1222 are located centrally on the body on opposing sides in a lateral orientation whereby, one penetration on one side of the body aligns exactly with the penetration on the opposing side of the body and when in place with secondary seal tubular body seal elements 1220 set, effectively seal the joint from pressure and/or fluid that may exist from nearby sources while also permitting fluid flow originating from either the producing well or the injection to flow through the tubular body and permit the passage of components that may be deployed into the well and through the joint from time-to-time. Secondary seal tubular body 1218 comprising two secondary seal tubular body interconnection penetrations 1222 may also be comprised of an expandable tubular body encompassing solid expandable tubular (SET) technology and similarly described consistent with the description provided in FIG. 11. Secondary seal tubular body seal elements 1220 are further defined whereby, the secondary seal tubular body seal elements 1220 are positioned near each lateral end of secondary seal tubular body 1218, with the joint created by the interconnection of primary wellbore interconnection device and secondary wellbore interconnection device located within the sealed area facilitating a joint seal, and secondary seal tubular body seal elements 1220 extend radially outward and sealingly engage the wellbore connection interface main body bore interior face 1217 of a primary wellbore connection interface device, which may be wellbore connection interface device 1210 as shown, affecting a seal from pressure and/or fluid that may exist from nearby sources when contact is made between the seal element and the inner face surface. Other descriptive attributes, deployment and setting methods described in FIG. 11A and applicable for secondary seal tubular body 1218 without existing secondary seal tubular body interconnection penetrations 1222 equally apply to secondary seal tubular body 1218 which include secondary seal tubular body interconnection penetrations 1222, described herein FIG. 11A, according to embodiments of the present disclosure.

FIGS. 12A and 12B depict a plan view of borehole offset body 1230 shown in FIG. 12A and a plan view of borehole offset body 1230 with borehole offset body bore 1236 shown in FIG. 12B. In FIG. 12A plan view, provided is a perspective from the upper end to the lower end showing borehole offset body 1230 whereby, borehole offset body 1230 is a tubular lateral body section comprising offset main body 1233 with a plurality of radially outwardly extending offset body vanes 1234 on the outside surface of offset main body 1233, offset body upper longitudinal end joining member 1232, and offset body lower longitudinal end joining member 1231. Offset body vanes 1234, beginning at the upper longitudinal end comprising offset body upper longitudinal end joining member 1232, include a dimension close to and slightly larger than the external dimension of offset main body 1233, gradually increasing to a maximum dimension, at the opposing end near lower longitudinal end joining member 1231, close to and slightly smaller than, the internal diameter created within a primary wellbore interface device 1210 (not shown) by wellbore connection drilling assembly 1200 (not shown) during wellbore connection interface drilling sequence 3 whereby, wellbore connection interface guide cone body 1240 (not shown) is attached to borehole offset body 1230 by way of attaching the lower longitudinal end joining member 1241 (not shown), which may be a male threaded pin connection, of wellbore connection interface guide cone body 1240, into offset body upper longitudinal end joining member 1232, which may be a female threaded box connection whereby, means of interconnection between members utilize the same configuration to permit joining one member to another, and wellbore connection guide cone body 1240 (not shown), enters the penetration in primary wellbore interface device 1210 (not shown) and the radially increasing external dimension of a plurality of borehole offset body vanes 1234 on the outside surface of offset main body 1233, guide the assembly into and through the penetration within primary wellbore interface device 1210 (not shown), as will be further described herein FIGS. 15-19, according to other embodiments of the present disclosure.

FIGS. 13A and 13B depict a plan view of wellbore connection interface guide cone body 1240 shown in FIG. 13A and a plan view of wellbore connection interface guide cone body 1240 with borehole guide cone body bore 1246 and borehole guide nozzle port bores 1246*a* shown in FIG. 13B. In FIG. 13A plan view of borehole guide cone body 1240, illustrated is a perspective from the upper terminal end of borehole guide cone body 1240 to the lower end showing borehole guide cone nozzle nose 1242 at the terminal end, borehole guide cone main body 1243, and guide cone body lower longitudinal end joining member 1241, at the opposing end whereby, borehole guide cone nozzle nose 1242 includes a plurality of borehole guide nozzle ports 1244 at the terminal top end of borehole guide cone nozzle nose 1242 and used for the purpose of guiding a secondary wellbore connection interface device 1210*a*, comprised as a component in an external casing completion assembly, which may be a producer well 20, injection well 1020, or any combination thereof, external casing completion assembly, into and through a primary wellbore connection interface device and used for the purpose of providing a flow nozzle for pumping and/or circulating fluids within an external casing completion assembly used during a drilling operation which may include weighted fluids or drilling mud used for pressure control, borehole stability, fluid loss control, drilling assembly cooling and lubrication, or any combination thereof, and for pumping bonding systems used to bond together external casing completions to the borehole and borehole/formation interface during a drilling operation or for other purposes known to those skilled in the art which require fluid flow within and exit from a conduit used during a drilling operation which may include external casing completion assemblies.

Figure 14:
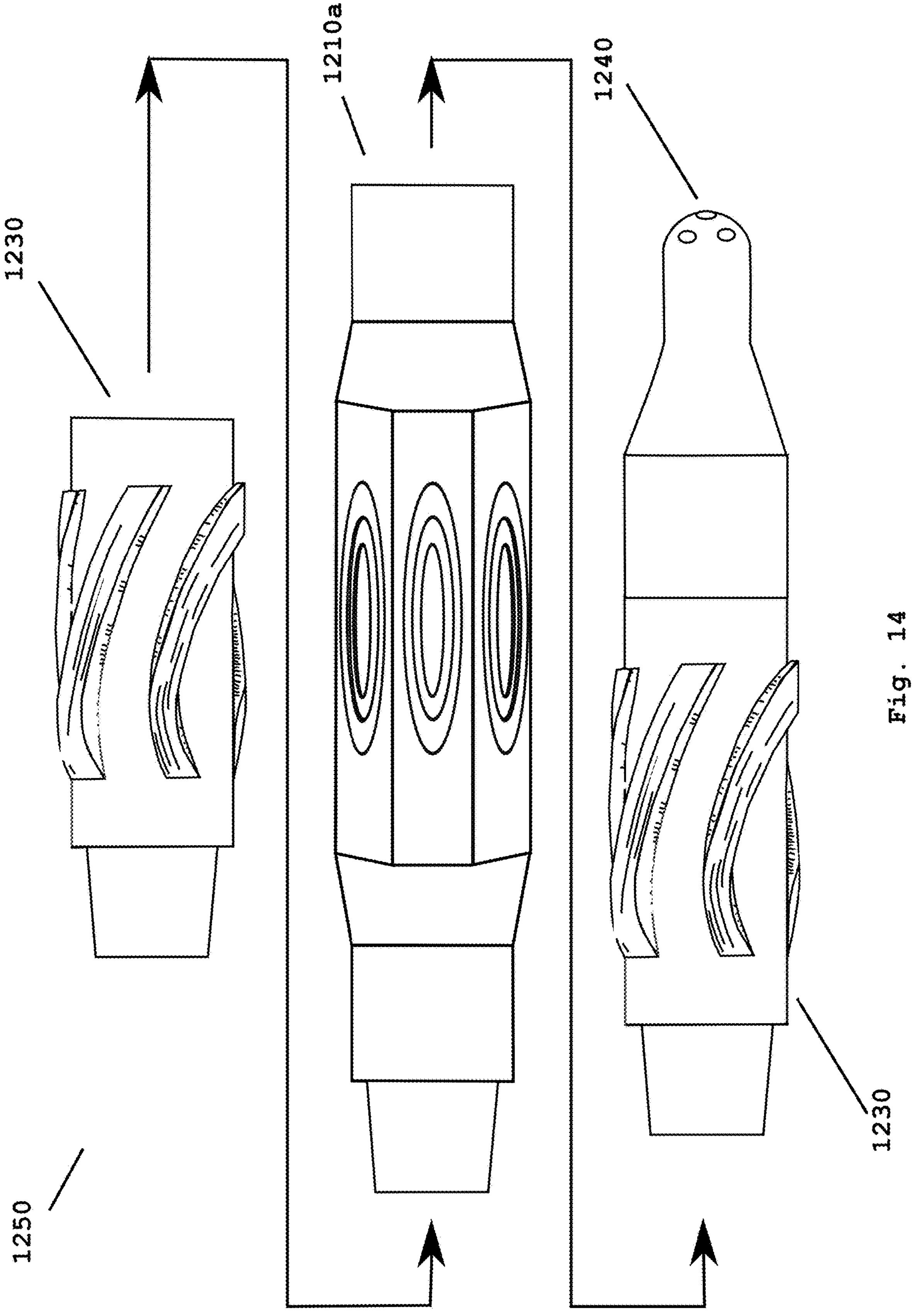
FIG. 14 depicts the side view of the well connection interface guide cone body, borehole offset body assembly, well connection interface assembly and borehole offset body assembly configuration, according to embodiments of the present disclosure.

FIG. 14 depicts a plan view of wellbore connection interface assembly 1250, according to embodiments of the present disclosure, which comprise components or an external casing completion assembly whereby, a secondary wellbore connection interface device 1210*a* is connected together with one or a plurality of borehole offset bodies 1230 and a borehole guide nozzle body 1240 and used for the purpose of entry and guidance into the penetration created in a primary wellbore connection interface device 1210 by a wellbore connection drilling assembly 1200 during a wellbore connection interface drilling sequence whereby, a connection between a secondary wellbore connection interface device 1210*a* and a primary wellbore connection interface device 1210 is made.

Figure 15:
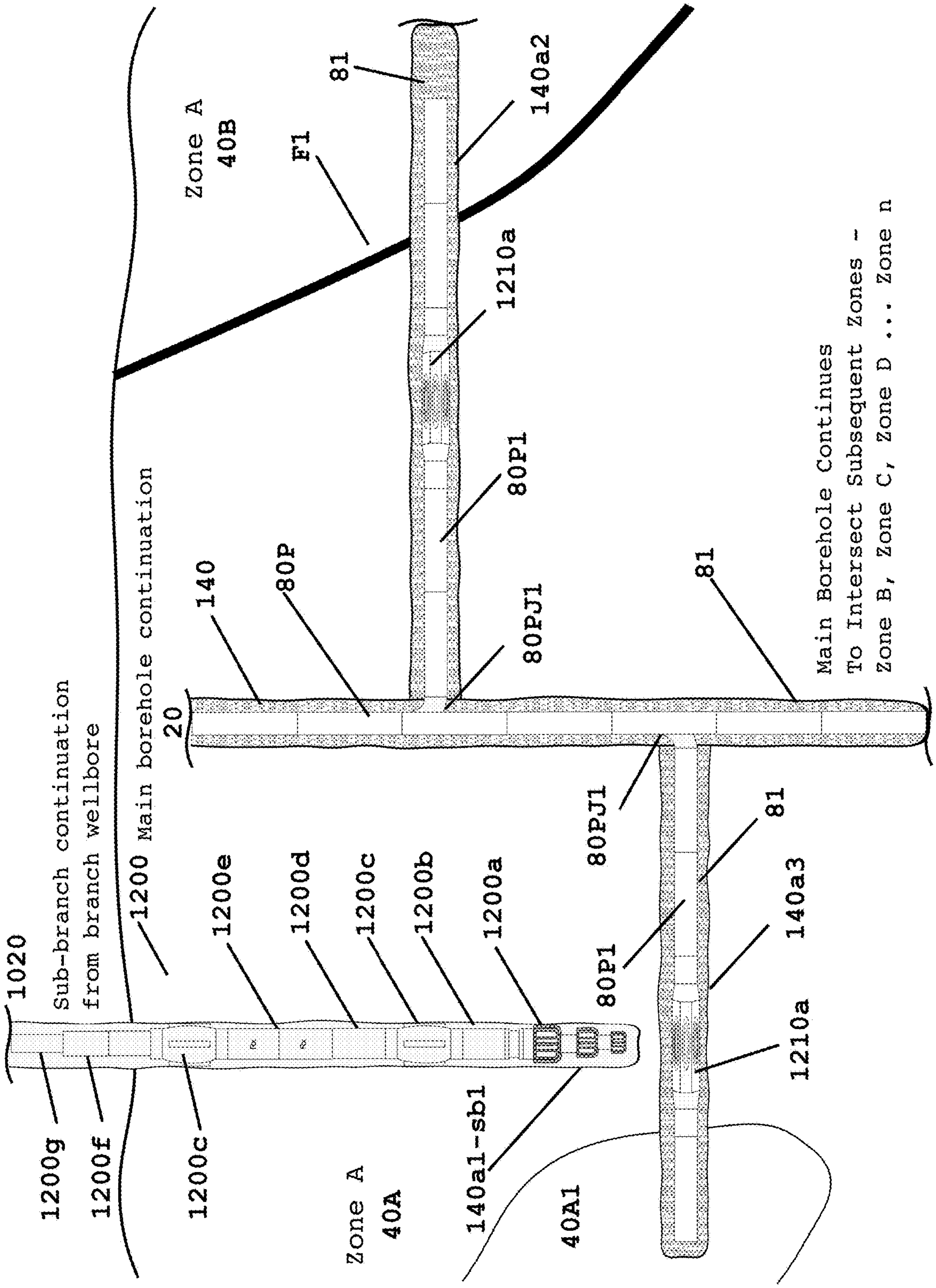
FIG. 15 depicts a schematic cross-section view of drilling sequence 1, according to embodiments of the present disclosure.

FIGS. 15-19, disclose a five (5) sequence drilling operation whereby, methods and apparatus are described which facilitate the intersection of a primary well borehole by a secondary well borehole for the purpose of interconnecting an external completion assembly within a primary borehole to an external completion assembly within a secondary borehole whereby, the interconnection of devices create a joint, facilitated by the interconnection of a wellbore connection interface device in a primary borehole which is penetrated by a wellbore connection interface device in a secondary borehole. A primary embodiment of the present disclosure utilized for said purpose, is a wellbore connection interface device 1210. It is to be understood that a drilling operation is complex, requiring many steps known to those skilled in the art but, for the sake of conciseness, all features of an actual implementation, as in any engineering or design project, may not be described or illustrated and therefore, it is understood that the foregoing illustrative descriptions are intended for ease of understanding related to well interconnection drilling operation sequences disclosed herein, and without limiting the scope of the present disclosure, it is to be understood that the present disclosure is not limited in its application to the details referenced and that various changes, alterations and substitutions can be made without departing from the spirit and scope of the disclosure. The foregoing description is applicable to one or a plurality of wells which may be producer wells, injection wells, or any combination thereof, and may be applicable to any borehole which may be vertical, directional, deviated, sidetracked, horizontal and/or one or a plurality of boreholes which may extend from other boreholes, which may be vertical, directional, deviated, sidetracked, horizontal, or any combination thereof. In FIG. 15 a schematic cross-section view depicts Well Interconnection Drilling Sequence 1 whereby, sequence 1 describes drilling and locating a secondary borehole in close proximity to a primary borehole whereby, and for the foregoing description, producer well 1 20 is a primary borehole and injection well 1 1020 is a secondary borehole. Vertical producer well 1 20 includes a plurality of lateral child boreholes 140*a*1 (not shown), 140*a*2 and 140*a*3, extending from the main, vertical, parent borehole 140, with lateral child boreholes 140*a*2 and 140*a*3 comprising a conduit, defined as external casing completion assembly 80P1 which includes as a component, defined as a branch wellbore connection interface device 1210*a* whereby, producer well 1 20 branch wellbore connection interface device 1210*a* is bonded to boreholes 140*a*2 and 140*a*3, respectively, with bonding material 81 designed for said purpose, and a lateral injection well 1 1020 child sub-branch borehole 140*a*1-*sb*1 is extended from injection well 1 1020 lateral child borehole 140*a*1 (not shown), extended from injection well 1 1020 parent borehole 140 (not shown), with orientation proximate to producer well 1 20 branch wellbore connection interface device 1210*a* within lateral child borehole 140*a*3 whereby, comprised within injection well 1 1020 child sub-branch borehole 140*a*1-*sb*1 is wellbore connection drilling assembly 1200 and comprised within producer well 1 20 lateral child borehole 140*a*3 is producer well 1 20 branch external casing completion assembly 80P1, which includes as a component, producer well wellbore connection interface device 1210*a*. Injection well 1 wellbore connection drilling assembly 1200 may be comprised of a variable sized drilling bit 1200*a*, designed for the purpose of drilling boreholes 140, 140*a*, 140*a*-*sb*, etc., contacting, penetrating and drilling through a wellbore connection interface device 1210, 1210*a*, 1210*b*, etc., and continuing drilling boreholes, a drilling motor 1200*b* which may be required for bit rotation, one or more centering and/or stabilizing device(s) 1200*c*, designed to center and/or stabilize wellbore connection drilling assembly 1200 within a borehole, an orientation device 1200*d*, which may include a gyro and/or conventional magnetic orientation device required to determine borehole azimuth and inclination, and used for the purpose of defining a location of wellbore connection drilling assembly 1200 within the earth, a transmission signal receiving device 1200*e* whereby, a transmission signal 1201 (not shown), is received from a transmission device 1202 (not shown), with the transmission device 1202 (not shown) positioned within or attached to another assembly, which may be an external casing completion assembly 80P1 whereby, the transmission device 1202 (not shown) may be positioned in another wellbore, which may be producer well 1 20, and used for the purpose of location determination of producer well 1 20 and components within producer well 1, which may be a branch wellbore connection interface device 1210*a*, proximate to the assembly location or assembly component containing the transmission signal receiving device 1200*e* located within wellbore connection drilling assembly 1200, within injection well 1 1020 child sub-branch borehole 140*a*1-*sb*1 whereby, determination of the location of injection well 1 1020 borehole 1401*a*1-*sb*1 proximate to producer well 1 20 lateral child borehole 140*a*3 comprising branch wellbore connection interface device 1210*a*, is desired, one or more additional centering and/or stabilizing device(s) 1200*c*, one or more weight devices 1200*f*, used to provide weight to the wellbore connection drilling assembly 1200, and variable sized drilling bit 1200*a*, and the drilling conduit, defined as a workstring assembly 1200*g*, that extends from the wellbore connection drilling assembly 1200 within the borehole to the surface of the earth 5. In well interconnection drilling sequence 1 transmission device 1202 (not shown) is deployed within producer well 1 20 to various locations which may be location 1, location 2, location 3, . . . location n, whereby each location is at a depth and location approaching the depth and location of branch wellbore connection interface device 1210*a* within producer well 1 20 lateral child borehole 140*a*3 whereby, transmission device 1202 (not shown) transmits a transmission signal 1201 (not shown), received by transmission receiving device 1200*e* within wellbore connection drilling assembly 1200 and through the use of Passive Magnetic Ranging (PMR) or dual-well active ranging techniques, orientation device 1200*d* and transmission receiving device 1200*e*, within wellbore connection drilling assembly 1200, facilitates drilling injection well 1 1020 borehole 140*a*1-*sb*1 in close proximity to producer well 1 20 lateral child borehole 140*a*3. Well Interconnection Drilling Sequence 1 is complete when, through the use of location determination methods, which may include Passive Magnetic Ranging (PMR), dual-well active ranging techniques, or any known location determination methods known to those skilled in the art and used for the purpose of determining the location of one well relative to another, or any combination thereof, the location of injection well 1 1020 child sub-branch borehole 140*a*1-*sb*1 borehole, is proximate to producer well 1 20 lateral child borehole 140*a*3 comprising branch wellbore connection interface device 1210*a*.

Figure 16:
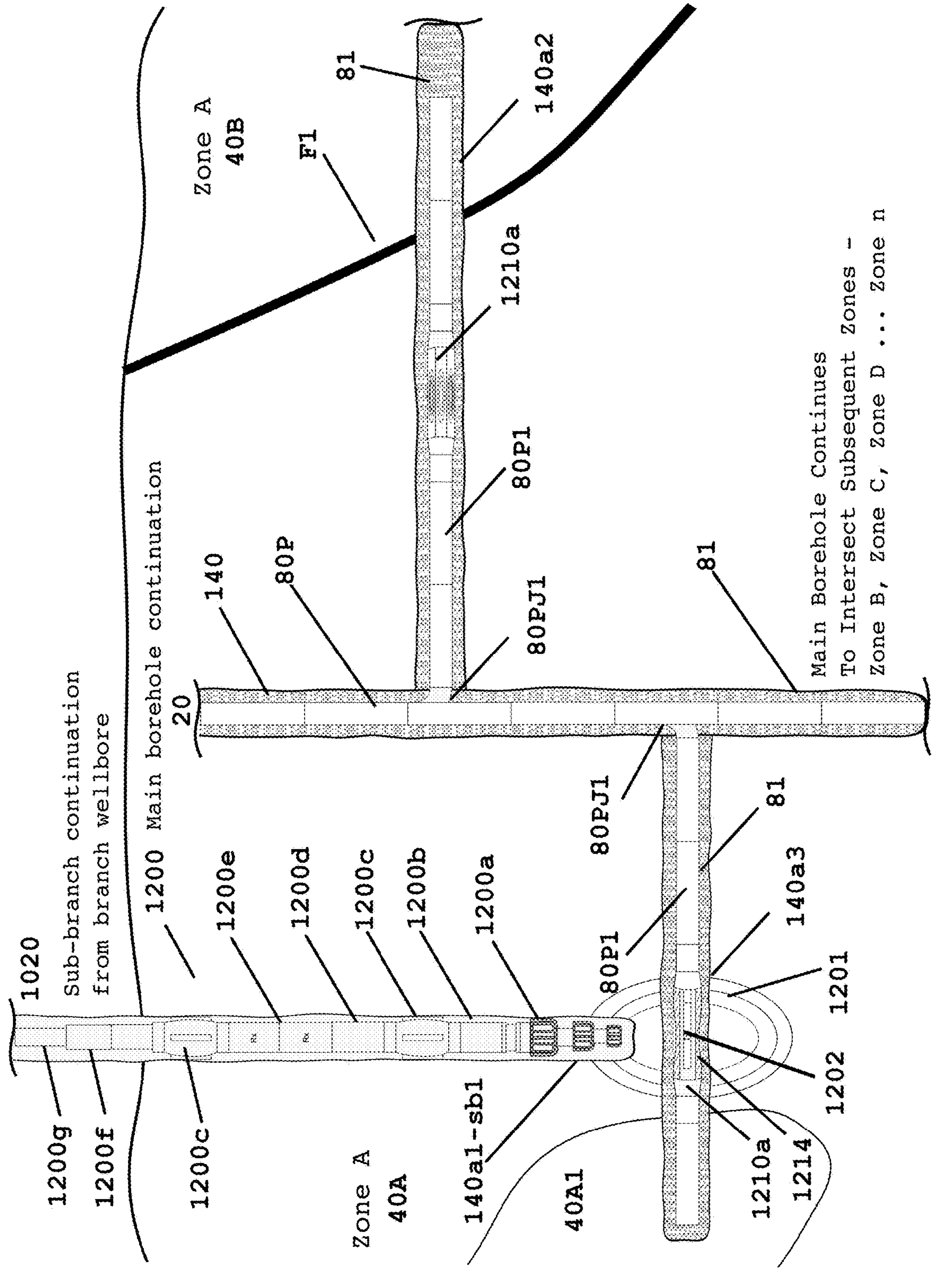
FIG. 16 depicts a schematic cross-section view of drilling sequence 2, according to embodiments of the present disclosure.

In FIG. 16 a schematic cross-section view depicts Well Interconnection Drilling Sequence 2 whereby, sequence 2 describes in more detail the location determination process and precisely locating a wellbore connection interface device 1210 within a primary borehole relative to a secondary borehole and is a drilling sequence continuation following Well Interconnection Drilling Sequence 1 whereby, description of wells, boreholes, components within boreholes and apparatus are the same. In Well Interconnection Drilling Sequence 2 the location of injection well 1 1020 child sub-branch borehole 140*a*1-*sb*1 borehole, is proximate to producer well 1 20 lateral child borehole 140*a*3 comprising branch wellbore connection interface device 1210*a* and is confirmed, and in, step A, a method implemented for the identification of the position of a wellbore connection drilling assembly 1200 and used for the purpose of drilling, orienting and locating a borehole relative to another borehole within the earth is discussed in greater detail. The method includes any known methods to those skilled in the art, used for the purpose which may include orienting a wellbore connection drilling assembly 1200 or identifying the position of a wellbore connection drilling assembly 1200 in one borehole relative to another borehole, used for the purpose of orienting and/or locating the position of a borehole, drilling the borehole in a certain direction for the purpose of following a specific path and/or for determining the relative position of a first borehole or primary borehole relative to a second borehole or secondary borehole within the earth, or any combination thereof, and may include a method known to those skilled in the art based upon the principle of Passive Magnetic Ranging (PMR), (i.e., a passive magnetic telemetry method) or dual-well active ranging techniques whereby, the position of a first well relative to a second well can be deduced through the measurement of a transmission signal 1201 that may be a magnetic field. The device generating the transmission signal is a transmission device or transmitter 1202, and the device measuring the intensity of the transmission signal, is a transmission receiving device or receiver 1200*e*. The transmission device 1202 may be operated by way of an electrical current provided by a cable or line designed for the transmission of electricity within a well, and known to those skilled in the art as electric line, or the transmission device 1202 can operate through the use of battery power, and be conveyed on cable or line whereby an electric current is not present, and known to those skilled in the art as slickline or simply wireline, or conveyed on a conduit that may be deployed within another conduit and known to those skilled in the art as coiled tubing and/or a concentric workstring, or may be deployed by any other means which permit deployment within a borehole that may be cased, uncased or any combination thereof. A transmission device 1202 that may be deployed, or conveyed through various means from the surface of the earth 5, to various locations within a primary well borehole, and/or conduit contained within the borehole, being producer well 1 20, is positioned at various locations within the producer well 1 20 leading to a final location within the center of branch wellbore connection interface device 1210*a* whereby, a transmission signal 1201, which may be in the form of a magnetic field, is generated or transmitted from the transmission device 1202, which radiates outwardly from the transmission device 1202 in all directions, and the intensity of the transmission signal 1201 is measured by the transmission receiving device 1200*e* contained within the secondary well borehole, being injection well 1 1020, child sub-branch borehole 140*a*1-*sb*1, and located within a component contained within the wellbore connection drilling assembly 1200, used for the purpose of drilling a borehole, orientation of said borehole within the earth, relative to producer well 1 20, orientation of the variable sized drilling bit 1200*a* contained as a component within the interconnection drilling assembly 1200. In step A the location of branch wellbore connection interface device 1210*a* within producer well 1 lateral child borehole 140*a*3 is confirmed relative to interconnection drilling assembly 1200 within injection well 1 1020 child sub-branch borehole 140*a*1-*sb*1. In step B, transmission device 1202, located in a position at or near the producer well 1 20 branch wellbore connection interface device 1210*a*, transmission device 1202, is placed in a location that is centered within a plurality of wellbore connection interface penetration faces 1214, disposed radially around the circumference of branch wellbore connection interface device 1210*a*, and begins transmitting a transmission signal 1201 that radiates through the plurality of wellbore connection interface penetration faces, through producer well 1 20 lateral child borehole 140*a*3, out into the zone, strata or reservoir, and to transmission receiver 1200*e* located within injection well 1 1020 wellbore connection drilling assembly 1200 whereby, the transmission signal 1201 is received and the intensity is measured by transmission receiving device 1200*e*, confirming the central location of wellbore connection interface penetration face 1214 on branch wellbore connection interface device 1210*a* within producer well 1 20 lateral child borehole 140*a*3 whereby the precise location is confirmed. The borehole containing the injection wellbore connection drilling assembly 1200, comprising a variable sized drilling bit 1200*a*, is oriented proximate to the borehole, which contains the producing wellbore connection interface device 1210, and the center location of the penetration face to be contacted, penetrated and drilled through in a linear direction, into the surrounding zone, strata or reservoir, is confirmed by the receiving device comprised as a component of the wellbore connection drilling assembly 1200. The location of the injection well 1 1020 child sub-branch borehole 140*a*1-*sb*1, proximate to the center location of wellbore connection interface device penetration face 1214, within the producer well 1 20 lateral child borehole 140*a*3, can be in any orientation proximate to producer well 1 20 branch wellbore connection interface device 1210*a* whereby, any orientation may facilitate the penetration, intersection and/or interconnection by wellbore connection drilling assembly 1200 within injection well 1 1020 child sub-branch borehole 140*a*1-*sb*1, into and penetrating through, the branch wellbore connection interface device 1210*a* contained within producer well 1 20 lateral child borehole 140*a*3, and may be parallel to, or at least closely parallel, perpendicular to, or at least closely perpendicular, any variable angle parallel to, or at least closely parallel to, a parallel or closely parallel orientation, any variable angle perpendicular to, or at least closely perpendicular to, a perpendicular or closely perpendicular orientation, or any other variable angle between a parallel and/or perpendicular orientation or any other variable angle relative to any other variable angle between a parallel and/or perpendicular orientation, and defined as penetration orientation angle 1221 (not shown), relative to the producer well 1 20 lateral child borehole 140*a*3 containing branch wellbore connection interface device 1210*a*. With the precise central location of wellbore connection interface penetration face 1214 on branch wellbore connection interface device 1210*a* within producer well 1 20 lateral child borehole 140*a*3 confirmed, drilling within injection well 1 1020 child sub-branch borehole 140*a*1-*sb*1 proceeds slowly until contact by variable sized drilling bit 1200*a* is made to wellbore connection interface penetration face 1214 on branch wellbore connection interface device 1210*a*.

Figure 17:
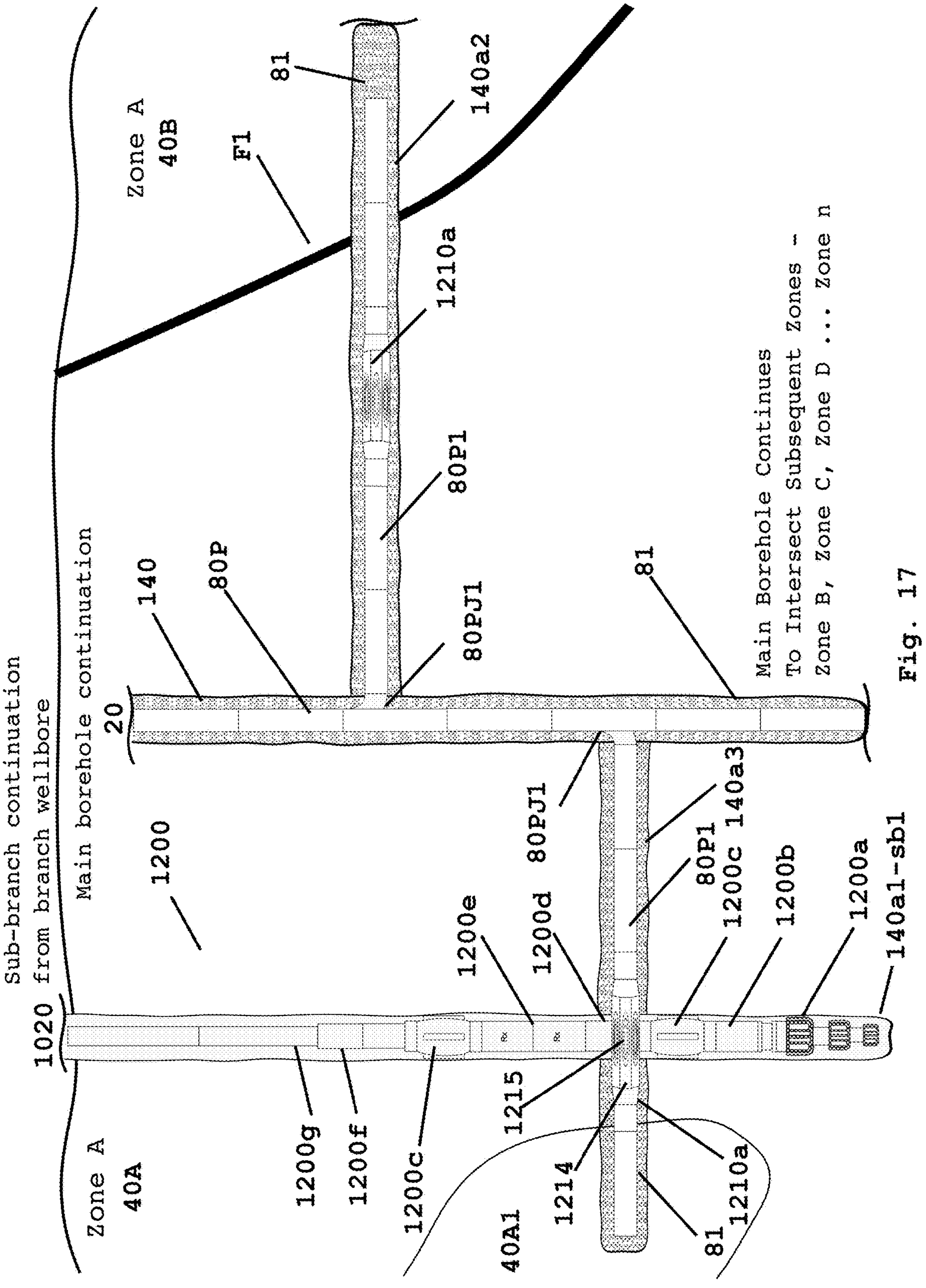
FIG. 17 depicts a schematic cross-section view of drilling sequence 3, according to embodiments of the present disclosure.
Figure 17:
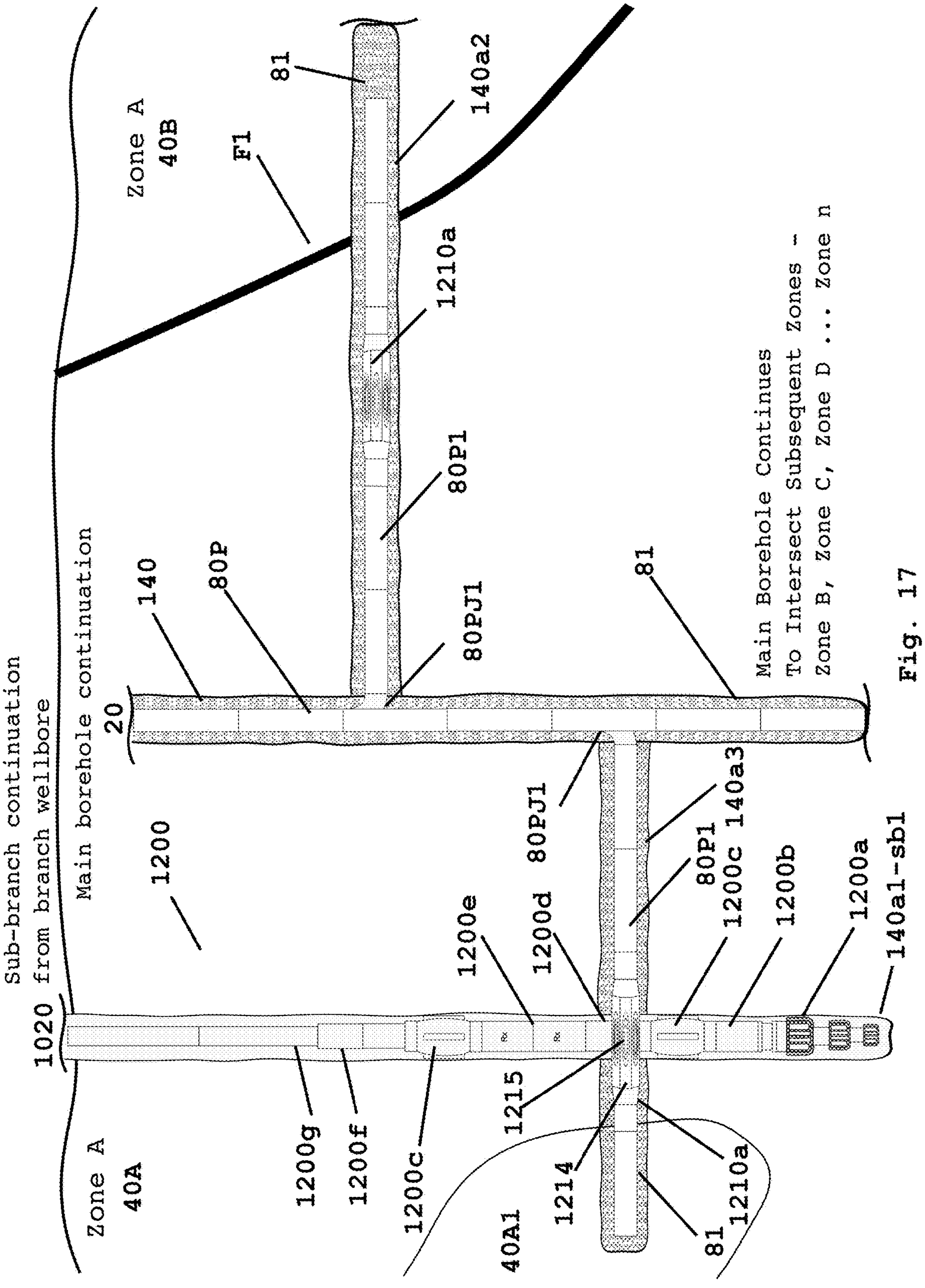

In FIG. 17 a schematic cross-section view depicts Well Interconnection Drilling Sequence 3 whereby, sequence 3 describes penetration, drilling through branch wellbore connection interface device 1210*a*, out into the surrounding formation, and is a continuation of Well Interconnection Drilling Sequence 2 whereby, description of wells, boreholes, components within boreholes and apparatus are the same. In sequence 3, variable sized drilling bit 1200*a* comprising a component of wellbore connection drilling assembly 1200 is in contact with wellbore connection interface penetration face 1214 on branch wellbore connection interface device 1210*a* within producer well 1 20 lateral child borehole 140*a*3. Upon confirmation of said location, the transmission device 1202 located at the center location of branch wellbore connection interface device 1210*a*, located within the producer well 1 20 lateral child borehole 140*a*3, is withdrawn to another location within the producer well 1 20 external casing completion assembly 80P1, 80P, outside the interior of branch wellbore connection interface device 1210*a*, or to the surface of the earth 5 (not shown). Variable sized drilling bit 1200*a* is rotated, facilitated by motor 1200*b*, contacts wellbore connection interface penetration face 1214, comprising penetration contact face 1215, contained on the producer well 1 20 branch wellbore connection interface device 1210*a*, penetrates said device, and drills through said device in a linear direction into the surrounding zone, strata or reservoir that may be a terminating location or further on into the zone, strata or reservoir or to another zone, strata or reservoir or a plurality of zone(s), strata, reservoir(s) or to one or a plurality of other producer well 1 20 wellbore connection interface device(s) whereby, said device(s) are penetrated and drilled through in a linear direction, into the surrounding zone, strata or reservoir, until all said devices have been drilled through, and a final borehole termination point is reached.

Figure 18:
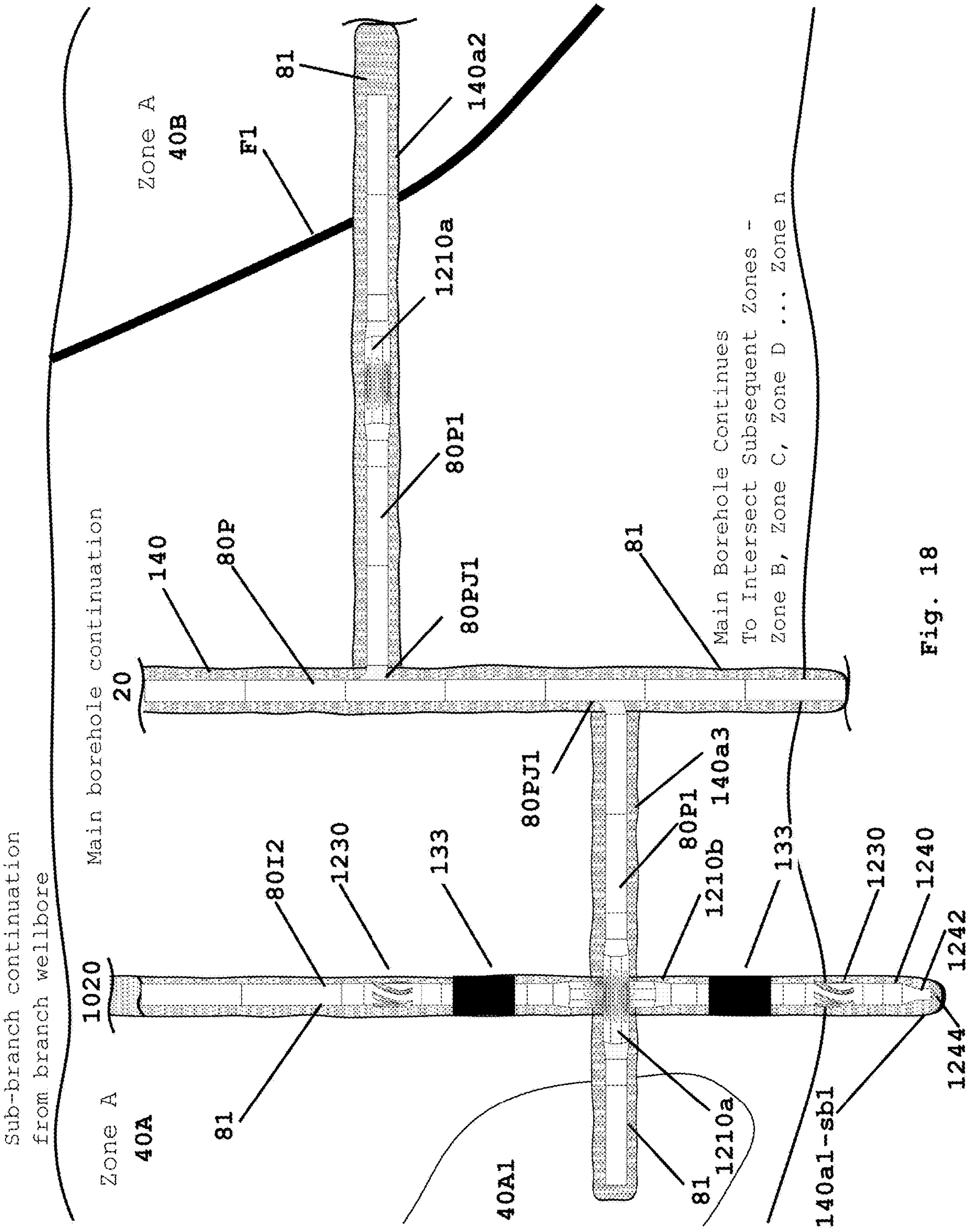
FIG. 18 depicts a schematic cross-section view of drilling sequence 4, according to embodiments of the present disclosure.

In FIG. 18 a schematic cross-section view depicts Well Interconnection Drilling Sequence 4 whereby, sequence 4 describes the deployment and installation of injection well 1 1020 child sub-branch external casing completion assembly 80I2, penetration through producer well 1 20 branch wellbore connection interface assembly 1210*a*, and bonding child sub-branch external casing completion assembly 80I2 to child sub-branch borehole 140*a*1-*sb*1 with bonding system 81, and is a continuation of Well Interconnection Drilling Sequence 3 whereby, description of wells, boreholes, components within boreholes and apparatus are the same. In Well Interconnection Drilling Sequence 4, the branch wellbore connection interface device 1210*a* located within the producer well 1 20 lateral child borehole 140*a*3 has been drilled through and intersected by the wellbore connection drilling assembly 1200 whereby, injection well 1 1020 child sub-branch borehole 140*a*1-*sb*1 extends through the producer well 1 lateral child borehole 140*a*3 branch wellbore connection interface device 1210*a*, and further into the zone, strata or reservoir or to other zones, strata or reservoirs leading to a termination point within said zone(s), strata or reservoir(s), whereby the drilling process is complete or at least a particular sequence within a drilling operation is complete, requiring a next phase, or sequence, which may include placing one or more conduits within the injection well borehole, interconnecting conduits contained within the injection well borehole to conduits contained within the producer well borehole, and bonding said conduits to the borehole and the borehole/formation interface whereby, when complete, will create a flow path permitting continuous and unimpeded flow between producer well 1 20 and injection well 1 1020. In step A, the wellbore connection drilling assembly 1200 is withdrawn from within the injection well 1 1020 to the surface of the earth 5 (not shown). In step B, injection well 1 1020 child sub-branch external casing completion assembly 80I2 is assembled and deployed whereby, child sub-branch external casing completion assembly 80I2 may be comprised of injection well 1 1020 child sub-branch wellbore connection interface device 1210*b*, borehole offset body 1230 and a wellbore connection guide nozzle body 1240, used to guide and centralize an external casing assembly within a borehole, assist with entry into a wellbore connection interface device and facilitate pumping drilling fluids, bonding systems and/or any other fluids which may be required during a drilling operation, through the conduit assembly into a borehole, one or a plurality of primary borehole sealing device(s) 133, one or a plurality of heat transfer bodies 1300 (not shown), one or more flow control devices 83, (not shown) and any other component that may comprise an injection well external casing completion assembly 80I (not shown), injection well branch external casing completion assembly 80I1 (not shown), injection well child sub-branch external casing completion assembly 80I2, or any combination thereof, and used for the purpose of stabilizing a borehole, isolating a borehole, isolating one zone from another, providing a flow path for fluids contained within one or a plurality of zone(s), strata, or reservoir(s), or to flow to the surface, are joined, connected or attached to injection well 1 1020 child sub-branch external casing completion assembly 80I2 and deployed from the surface of the earth 5 (not shown) within injection well 1 1020 parent borehole 140 (not shown), lateral child borehole 140*a*1 (not shown) and into child sub-branch borehole 140*a*1-*sb*1. Within injection well 1 1020 child sub-branch external casing completion assembly 80I2, each component comprising the assembly is desired to be placed in a certain location such that, the component may provide a certain purpose or function at that specific location whereby, the component may be separated one component from another by individual sections of conduit or casing whereby, when placed accordingly, the location of said components are placed in the specific location desired when the assembly bottom is at the termination point within a borehole. For example, individual sections of casing may be placed within the external casing completion assembly separating individual components one from another, whereby, when a wellbore connection guide nozzle body 1240 is at a termination point or closely near a termination point within a borehole, primary borehole sealing device(s) 133, contained within injection well 1 1020 child sub-branch external casing completion assembly 80I2, are positioned at locations that, upon the completion of the drilling sequence 4, may permit effective sealing of the borehole and/or sealing of zone(s) that may contain pressure and fluid that could enter joined bodies comprising joined wellbore connection interface devices 1210*a* and 1210*b*, respectively, for an injection well 1 1020 and/or producer well 1 20, whereby if a plurality of boreholes from a producer well 1 are desired to be intersected by an injection well 1 1020 borehole which may be child sub-branch borehole 140*a*1-*sb*1, each child sub-branch wellbore connection interface device 1210*b*, contained within child sub-branch external casing completion assembly 80I2 is at the desired location within the wellbore connection interface device 1210, 1210*a*, etc. whereby, the position of bodies will facilitate an interconnection of wellbore connection interface devices between wells. Injection well 1 1020 child sub-branch external casing completion assembly 80I2, comprised of the aforementioned components, and positioned accordingly by placing sections of casing between components, such that when the first attached device to the external casing completion assembly, which may be the interconnection guide cone body 1240, is at its termination point within injection well 1 1020, attached devices within injection well 1 1020 external casing completion assembly within parent borehole 140, child borehole 140*a*, child sub-branch borehole 140*a*-*sb*, are at their desired locations whereby, all injection well 1 1020 wellbore connection interface devices are within all producer well 1 20 wellbore connection interface devices, which may be injection well 1 1020 wellbore connection interface device 1210*b* intersecting producer well 1 20 branch wellbore connection interface device 1210*a*, and may include a plurality of other wellbore connection interface device interconnections, together with other components that may be included to provide a specific function or purpose which are also positioned accordingly, by placing sections of conduit(s) between components, to permit said devices to facilitate their designed and desired purpose, at each respective desired location. In step C, injection well 1 1020 child sub-branch external casing completion assembly 80I2 has been deployed within the well whereby, the base of the external casing completion assembly, that may include wellbore connection guide nozzle body 1240, is at the termination point in the borehole, penetrating through or intersecting producer well 1 20 branch wellbore connection interface devices 1210*a*, in one or more locations whereby, attached devices or apparatus contained within injection well 1 1020 child sub-branch external casing completion assembly 80I2, which facilitate an interconnection with producer well 1 20, which may be one or a plurality of branch wellbore connection interface device(s) 1210*a*, as previously described, and according to embodiments of the present disclosure, are at each respective desired location, facilitating an interconnection between wells. With injection well 1 1020 child sub-branch external casing completion assembly 80I2 at its desired termination point, bonding system 81 is pumped from the surface of the earth 5 (not shown), together with any apparatus required to facilitate pumping bonding system 81 whereby, bonding system 81 is pumped through injection well 1 1020 external casing completion assembly, reaching wellbore connection guide nozzle body 1240, flowing into the guide nozzle nose 1242, exiting one or more guide nozzle port(s) 1244 and flowing up within child sub-branch borehole 140*a*1-*sb*1, around external casing completion assembly 80I2, through each respective producer well 1 20 branch wellbore connection interface device 1210*a* intersected, filling the borehole space, to facilitate bonding injection well 1 1020 child sub-branch external casing completion assembly 8012 to the borehole and to the borehole/formation interface. Subsurface zones, strata, or reservoirs may contain a variety of fluids that may consist of water alone, water containing sodium chloride, which may include high concentrations of sodium chloride, hydrocarbons, $CO_2$, $H_2S$, or other components that may be corrosive, and/or may include conditions whereby, the zones contain pressure and/or heat, and zones main contain formation material, other components, and/or other conditions, or any combination thereof, that may exist below the surface of the earth 5 (not shown), or within one or a plurality of zone(s), strata, or reservoir(s) within the earth, and are intersected by boreholes that may require special bonding material systems which may include materials, components and/or methods for placement and/or to effecting bonding of said system(s) to effect a seal between components within a borehole, to the borehole, to the borehole/formation interface and to effect isolating one zone from another, or any combination thereof. Following are bonding systems 81 that may be used to bond an external casing completion assembly, which may include injection well 1 1020 and/or producing well 1 20 external casing completion assembly, or any number of boreholes which may be defined as injection well 1020 boreholes and/or producer well 20 boreholes, to the borehole and the borehole/formation interface that may include one or more subterranean zone(s), strata, or reservoir(s), whereby apparatus may be placed inside an external casing completion assembly to facilitate the bonding operation followed by bonding material that may be composed of conventional API or ASTM cementitious systems, bonding material for $CO_2$ resistance, pozzolanic bonding material, gypsum-based bonding material, microfine bonding material, expansive bonding material, high-alumina bonding material, latex-based bonding material, perma-frost bonding material, resin or plastic-based bonding material, high thermally conductive bonding material, low thermally conductive bonding material, any other bonding material(s) that may be used for bonding components contained within a borehole, to the borehole, and/or borehole/formation interface, or for isolating one zone from another, or any combination thereof, whereby the aforementioned conditions may exist within boreholes drilled from the surface of the earth 5 (not shown) to locations within the earth, which may require one or more bonding system(s) 81 to effect a seal within a borehole, between a borehole that may contain components used for the purpose of producing fluids from and/or injecting fluids into one or a plurality of subterranean zone(s), strata, or reservoir(s). In step D, with one or more cement system(s) 81 in place, and at a time that may be immediately following the cessation of pumping of said cement system(s) 81, any contained primary borehole sealing device(s) 133, and/or other components that may comprise an external casing completion assembly which may require a setting procedure, are set according to the method required for said device(s), to effect a seal within the borehole containing the cement system 81 whereby, primary borehole sealing device 133 may isolate the external casing completion assembly from one subterranean zone, strata, or reservoir, relative to another, and/or isolate the borehole from the now joined wellbore interface connection device(s) that may be comprised within child sub-branch borehole external casing completion assembly 80I2 and each respective producer 1 20 borehole.

Figure 19:
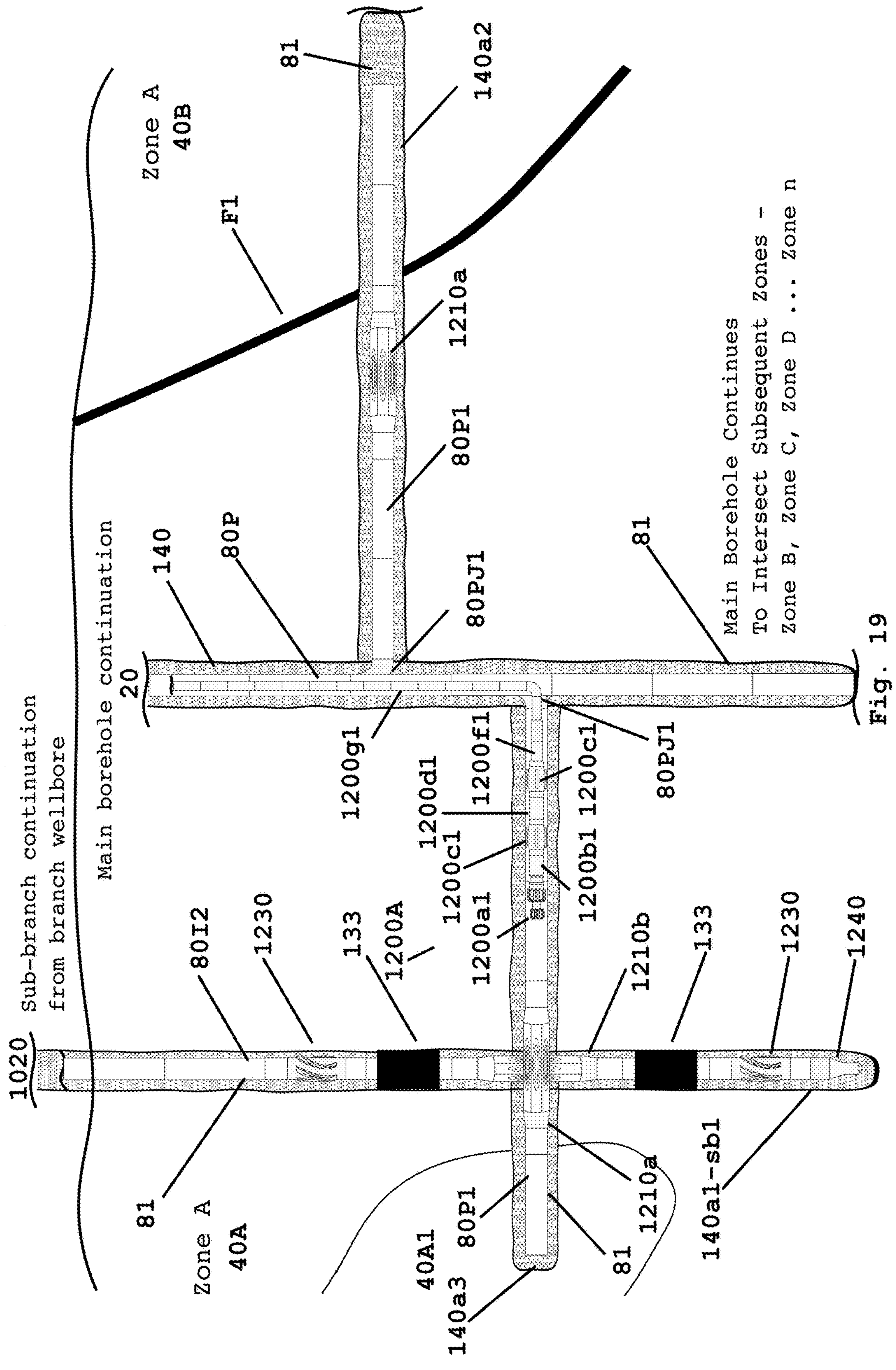
FIG. 19 depicts a schematic cross-section view of drilling sequence 5, according to embodiments of the present disclosure.

In FIG. 19 a schematic cross-section view depicts Well Interconnection Drilling Sequence 5 whereby, sequence 5 describes the removal of obstructions created within producer well 1 20 branch external casing completion assembly 80P1 by deploying injection well 1 1020 child sub-branch wellbore connection interface devices 1210*b* through producer well 1 20 branch wellbore connection interface device(s) 1210*a* and pumping of cement system 81 within injection well 1 1020 child sub-branch borehole 140*a*1-*sb*1, followed by a description whereby, wellbore connection secondary seal device 134 (not shown) is installed within producer well 1 branch wellbore connection interface device 1210*a* to facilitate an internal joint seal, and is a continuation of Well Interconnection Drilling Sequence 4 whereby, description of wells, boreholes, components within boreholes and apparatus are the same. In Well Interconnection Drilling Sequence 5, step A, all obstructions created within producer well 1 20 branch external casing completion assembly 80P1 by deploying injection well 1 1020 child sub-branch wellbore connection interface devices 1210*b* through producer well 1 20 branch wellbore connection interface device(s) 1210*a* and pumping of cement system 81 within injection well 1 1020 child sub-branch borehole 140*a*1-*sb*1 are removed whereby, removal of said obstruction is required to create a flow path between producer well 1 20 and injection well 1020 according to embodiments of the present disclosure. Apparatus designed and/or configured for the purpose of removing obstructions within conduit bores, and defined as an obstruction removal milling assembly 1200A may be configured to comprise special mills and/or drilling apparatus for the purpose of removing bonding system material, and material that may comprise a wellbore connection interface device, or any combination of the aforementioned obstruction types and/or other material desired to be removed from within bores. An obstruction removal milling assembly 1200A may comprise like devices or apparatus similar to those used for drilling boreholes within the earth and may comprise the same or similar components comprising an wellbore connection drilling assembly 1200, which may include a variable sized mill 1200*a*1, milling motor 1200*b*1, well casing centralizer 1200*c*1, location determination device 1200*d*1, casing weight device 1200*f*1 and concentric workstring 1200*g*1 or other devices designed for obstruction removal within conduits, or any apparatus or device combination thereof, are appropriately sized and configured to mill through and/or drill through obstructions within conduits, together with accessory components which may facilitate said obstruction removal operations within conduits, that may include obstructions within conduits that comprise bonding system 81, branch wellbore connection interface device 1210*a* or other components that may comprise external casing completion assemblies, may be included in obstruction removal milling assembly 1200A, to facilitate said obstruction removal, and said obstruction removal assembly is sized with an outer diameter equal to, very close to, or slightly smaller than, the inner diameter of the bore of producer well 1 branch external casing completion assembly 80P1 or appropriately sized for the internal diameter of the respective external casing completion assembly whereby, obstruction removal is desired. Within producer well 1 20 obstruction removal milling assembly 1200A is deployed from the surface of the earth 5 (not shown) within producer well 1 external casing completion assembly 80P and into branch external casing completion assembly 80P1, to a first blockage location which may be cement system 81 and/or injection well 1 1020 child sub-branch wellbore connection interface assembly 1210*b* whereby, operations commence to mill through, drill through and/or perform required methods whereby, said blockage(s), are removed, leaving a bore with an inner diameter equal to or slightly less than the inner diameter bore of producer well 1 20 branch external casing completion assembly 80P1 whereby, obstruction removal milling assembly 1200A may be deployed further to a second location and subsequent locations within producer well 1 20 branch external casing completion assembly 80P1 whereby, each encountered obstruction is subsequently removed, one after another, from within of producer well 1 20 branch external casing completion assembly 80P1, until all such obstructions have been removed, leaving producer well 1 20 branch external casing completion assembly 80P1 free of any and all obstructions, whereby the inner diameter bore is the same or nearly the same throughout the entirety of producer well 1 20 branch external casing completion assembly 80P1. Upon removal of said obstruction(s), the obstruction removal milling assembly is extracted from within the well external casing completion assembly to the surface of the earth 5 (not shown). In step B, wellbore connection secondary sealing device 134 is set within producer well 1 20 branch wellbore connection interface device 1210*a* whereby an internal secondary seal isolates the joint created by the intersection of injection well 1 child sub-branch wellbore connection interface device 1210*b* and producer well 1 branch wellbore connection interface device 1210*a*, isolating the internal bore and created joint from injection well 1 1020 child sub-branch borehole 140*a*1-*sb*1. Within a well borehole, primary borehole sealing devices 133 may be placed in locations whereby, placement may facilitate a seal at or near the joint interface comprising injection well(s) 1020, producing well(s) 20, or any combination thereof, which may isolate the joint from pressure and/or fluids that may exist from intersected, and/or a penetrated subterranean zone, strata, or reservoir, or a plurality of intersected zones whereby, sealing devices may also include bonding systems 81 and/or apparatus designed for the specific purpose for borehole isolation, isolation of components or apparatus that may be contained within the borehole, isolation of one zone from another, or any combination thereof, from pressure and/or fluid sources that may originate from one or more subterranean zones, strata or reservoirs whereby, a bonding system 81 alone may not effect a seal sufficient to isolate the joined bodies from pressure and/or fluid sources for an extended period of time, or may not be considered a primary sealing device sufficient to effect a joint seal isolating pressure and/or fluids for an extended period of time, from said zone(s) in the vicinity of or very near a vicinity whereby, the zone(s) containing fluid and/or pressure are close to the joined bodies whereby, one or more sealing device(s) may be required, which may include one or a plurality of primary borehole sealing device(s) 133 in addition to the seal created by bonding system 81 within a borehole, to effect a seal for the purpose of creating a pressure and/or fluid seal between the source of pressure and/or fluid and the joined bodies for an extended period of time, that may include times that encompass years or dozens of years. To effect joint sealing for an extended period of time, joint sealing may require a plurality of sealing devices which may include a primary borehole sealing device 133, being external to the joined bodies, and/or may include a bonding system 81 together with one or more borehole primary borehole sealing device(s) 133, designed for the specific purpose of borehole isolation, isolation of components or apparatus that may be contained within the borehole, isolation of one zone from another, or any combination thereof, from pressure and/or fluid sources that may originate from one or more subterranean zones, strata or reservoirs, and a secondary sealing device comprising an inner sealing apparatus within the joined bodies. Following are methods and apparatus which may provide a secondary seal at the intersection of joined bodies from within a producer well 20, an injection well 1020, or a plurality of joined bodies from within a plurality of producer wells 20, and a plurality of injection wells 1020, or any combination thereof. The apparatus used for implementing a secondary seal, according to an embodiment of the present disclosure is wellbore connection secondary seal device 134 (not shown). Wellbore connection secondary seal device 134 (not shown) is deployed from the surface inside the producing 1 20 whereby, deployment may be facilitated by various means which may include electric line whereby, a wellbore connection secondary seal device 134 (not shown) is attached to one or more devices comprising an electric line tool assembly whereby, an electric line tool assembly, connected to a cable that may convey an electric current to the assembly for the purpose of activating a device that may comprise a setting device component of the assembly and is used for a specific purpose that may include setting and/or release of a wellbore connection secondary seal device 134 at a desired location within a well, combined with device(s) for determining a location within a well, which may include device(s) that identify the location of individual sections of conduit or components within a well, may include device(s) that can determine locations based upon the fluid, composition or components comprising a formation, (e.g. formation gamma ray or resistivity measurement) within the earth whereby, a location may be determined based upon the measurement of the fluid composition or measurement of components comprising a formation that may provide a signature or measurement pattern of the corresponding formation whereby the location or depth within the earth, or within a well relative to the earth is known, relative to the producing well with its contained components, and said devices are attached to wellbore connection secondary seal device 134 whereby, the assembly is deployed within producer well 1 20 to a location close to producer well branch wellbore connection interface device 1210*a* and the joint made by injection well 1 1020 child sub-branch wellbore connection interface device 1210*b* whereby, the location determination device(s) attached to an electric line tool assembly, are used to determine the exact setting location required to position the wellbore connection secondary seal device 134 in its desired location within the producing well branch wellbore connection interface device 1210*a* to facilitate the joint seal between the producer well 1 20 and injection well 1 1020 whereby, the method of seal engagement is performed, thereby creating a seal and anchoring wellbore connection secondary seal device 134 between the outer face of the wellbore connection secondary seal device 134 and branch wellbore connection interface device 1210*a* inner face, facilitating a seal at the joint location within the producer well 1 20. Setting of the wellbore connection secondary seal device 134 may include setting facilitated by an electric current sent from the surface down the electric line to the setting device that activates a setting mechanism to effect seal engagement and release of the electric line setting tool assembly from the wellbore connection secondary seal device 134, or an electric current sent from the surface down the electric line to the setting device may be used simply to release the setting tool from the wellbore connection secondary seal device 134, or by means facilitated by methods used for setting expandable devices or by any other means known to those skilled in the art. Upon setting and/or release of wellbore connection secondary seal device 134, the electric line setting tool assembly or device setting assembly is extracted from the producing well 20.

Figures 20, 21, 22, 23:
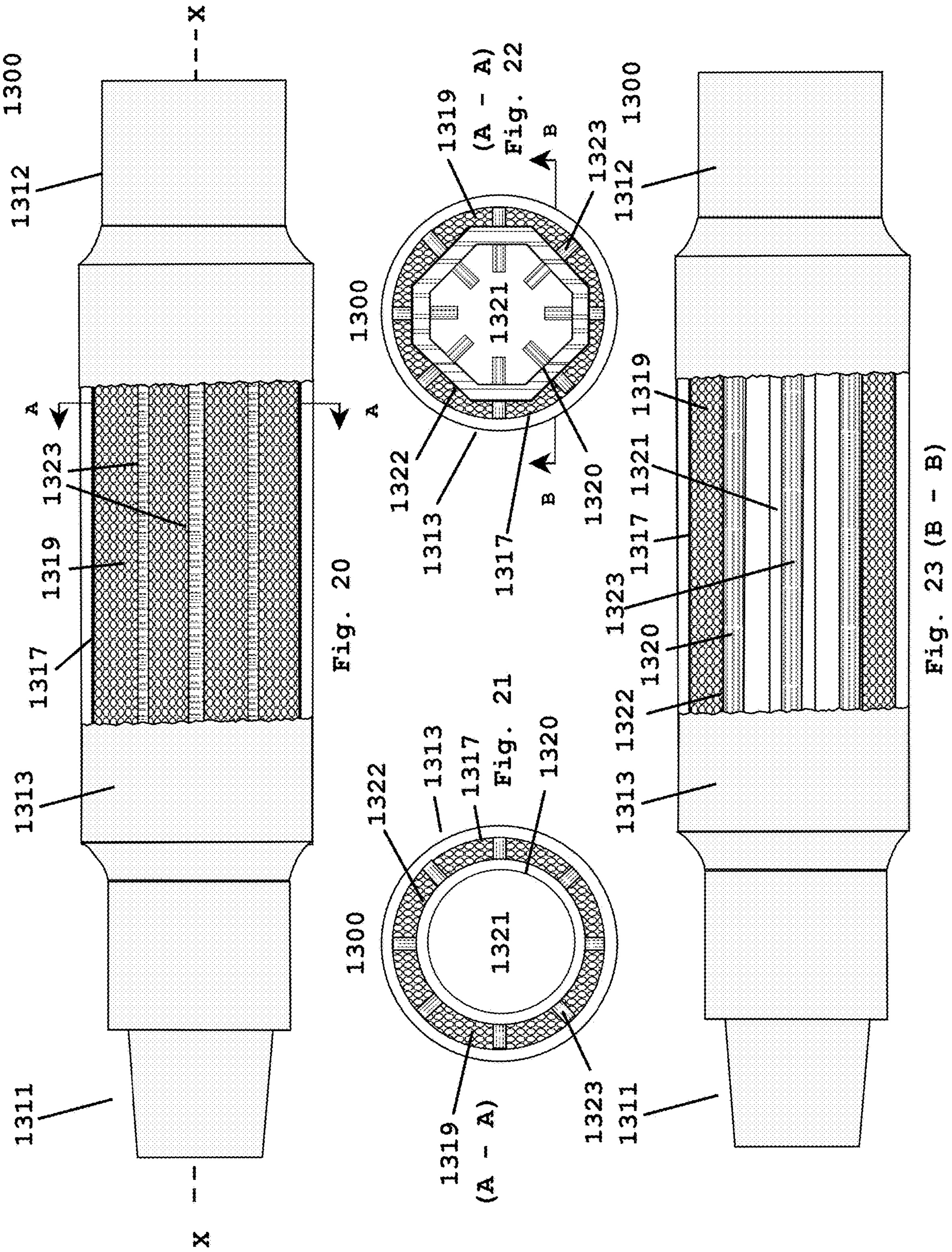
FIG. 20 depicts a partial cross-sectional view of a heat transfer body, according to an embodiment of the present disclosure.
FIG. 21 depicts an elevation cross-sectional view (Section A-A) of the heat transfer body shown in FIG. 20, according to an embodiment of the present disclosure.
FIG. 22 depicts an elevation cross-sectional view (Section A-A) of an alternate configuration for the heat transfer body shown in FIG. 20, according to an embodiment of the present disclosure.
FIG. 23 depicts an alternate partial cross-sectional view (Section B-B of FIG. 22) of the heat transfer body shown in FIG. 20, according to an embodiment of the present disclosure.

FIGS. 20-40 depict an embodiment of the present disclosure defined as thermal heat transfer body 1300, which is depicted with alternate configurations whereby, the flow direction through thermal heat transfer body 1300 may be from the upper lateral end to the lower lateral end or may be from the lower lateral end to the upper lateral end, and each configuration may facilitate heat transfer through means of conduction and/or convection processes whereby, heat from a heat source, or geothermal energy system, which may be one or a plurality of subterranean thermal zone(s), strata, or reservoir(s) from within the earth, is transferred to thermal heat transfer body 1300, which is a component device which may facilitate heat transfer from a primary heat source whereby, heat from the primary heat source by way of conduction processes, convection processes, or any combination thereof, are transferred to the thermal heat transfer body 1300 whereby, now transferred heat within thermal heat transfer device 1300 is transferred to fluid which may be a heat carrier whereby, a heat carrier may include fluid originating from one or a plurality of subterranean zone(s), strata or reservoir(s), fluid from another source, or any combination thereof, and said heat carrier is comprised within the interior of thermal heat transfer body 1300, together with components which may comprise thermal heat transfer body 1300 and are used to improve and/or increase the thermal heat transfer efficiency from a heat source to a heat carrier whereby, the heat carrier flows through a borehole, or conduit(s) within a borehole, to the surface of the earth, into a gathering system, which may comprise one or a plurality of pipes, flow lines, or a gathering system comprising one or a plurality of flow lines whereby, the heat carrier, which may be a fluid in liquid form, vapor form, or any combination thereof, flows through apparatus designed for the purpose of converting heat comprising a heat carrier into energy providing a useful purpose, which may include electricity facilitated by a thermal turbine which operates a generator to produce electricity according to embodiments of the present disclosure. Heat transfer from a heat source to a heat transfer body can occur by one or a combination of heat transfer processes which may be convection, conduction, or radiation processes whereby, convection refers to the transfer of heat energy by the movement of fluids through free convection or forced convection, conduction refers to the mechanism whereby, an energy exchange occurs between substances which are in contact with each other, transmitted through collisions between atoms or molecules which may include substances comprising subterranean zones, strata or reservoirs formation, fluid within subterranean zones, strata or reservoirs, thermally conductive components, which may include cement systems, pipes or conduits which may be comprised within a borehole, and components within a pipe or conduit, which are in contact with each other, and radiation heat transfer is the electromagnetic transfer of energy from a hot surface to a cold surface and represents heat transfer without a physical medium. Fluid which may originate from one or a plurality of subterranean zone(s), strata or reservoir(s) flowing within a well which may be cased, uncased, or any combination thereof, may include laminar flow and/or turbulent flow. With laminar flow in conduits or pipes, defined as fluid flow with a Reynolds Number less than or equal to 2000, for fluids comprising uniform velocity and temperature, dynamic and thermal boundary layers begin to develop symmetrically along the interior wall or surface of a conduit comprising a thermal heat transfer body whereby, the heat carrier fluid boundary layer thickness increases along the conduit, length and thermal fluid with temperature equal to or nearly equal to the heat source temperature, gradually fills the entirety of the fluid flow section whereby, dynamic boundary layers are joined, and a constant velocity distribution is established whereby, the constant velocity distribution is parabola-shaped for laminar flow. Thermal boundary layers are joined at a certain distance from the conduit inlet where the thermal transfer process is initiated, whereby this distance is defined as the thermal entrance length, and thereafter all fluid participates in heat transfer whereby, thermal fluid comprises a temperature equal to or nearly equal to the heat source temperature. Turbulent flow in pipes or conduits, defined as fluid flow with a Reynolds Number greater than 4000, with is characterized by chaotic and irregular movement of fluid particles whereby, fluid mixing, swirling, and forming eddies or vortices are created in turbulent fluid movement and is advantageous and preferable compared to laminar flow for thermal heat exchange whereby, thermal exchange is more efficient facilitated by fluid mixing, which may reduce the thermal entrance length where thereafter, all fluid comprises a temperature equal to or nearly equal to the heat source temperature. Transitional fluid flow in conduits or pipes is defined as fluid flow, which is transitioning from laminar flow to turbulent flow with a Reynolds Number from 2000-4000. Heat transfer from a heat source to a heat carrier whereby, a heat carrier may include fluid originating from one or a plurality of subterranean zone(s), strata or reservoir(s), fluid from another source, or any combination thereof, varies with distance as distance increases away from the heat source. Heat transfer inside flow passages, which may include conduits or pipes, can be enhanced by using passive surface modifications such fins, protrusions, ribs, dimples, any other passive surface modifications which facilitate improved thermal performance known to those skilled in the art, or any combination thereof. Thermal performance and heat transfer enhancement may be facilitated by three broadly classified methods namely, active methods, passive methods, and compound methods whereby, an active method is facilitated by the addition of energy, such as vibration, or by the addition nano-sized, high thermal conductivity together with a base fluid comprising a metallic powder, for example, for improved heat transfer, and passive methods are facilitated by the placement of inserts on a surface whereby, an insert is a secondary surface extending from a primary surface and used for the purpose of increasing thermal contact surface area and/or to create artificial two-dimensional and three-dimensional roughness whereby turbulent flow is created through fluid flow contact with an insert within the conduit whereby, a vortex and/or swirling flow is created which may interrupt the thermal boundary layer on the heat transfer body contact surface, effectively increasing a thermal body surface area to affect a thermal heat exchange, and in addition to inserts, thermal bodies which may comprise extended surfaces, surface modifications or treated surfaces, the use of additives, or any combination thereof, may increase the effective surface area of a heat transfer body, and/or increase residence time of a heat carrier within the heat transfer body, which may often improve heat transfer, and the third method being a compound method, comprises a combination of the aforementioned active and passive methods. Passive heat transfer augmentation methods comprising inserts may include twisted tape or twisted metallic strip geometries, wire coils, ribs, baffles, plates, helical screw inserts, mesh inserts, convergent-divergent conical rings, any other passive heat transfer augmentation methods, or any combination thereof. Passive heat transfer augmentation methods comprising treated surfaces may include pits, cavities, scratches, machined or grooved surfaces, formed or modified low-fin surfaces, multi-layered surfaces, coated surfaces, or any combination thereof. Passive heat transfer augmentation methods comprising extended surfaces may include one or plurality of fin(s), defined as a surface that extends from an object to increase the effective surface area thereby increasing the rate of heat transfer to and from the environment by increasing convection, which may include fins comprising cylindrical shapes or spherical shapes, cylindrical dome shapes, bullet shapes, airfoil shapes, irregular shaped bodies, rectangular shapes, cylindrical shapes, cylindrical dome shapes, triangular shapes, trapezoidal shapes, semi-circular shapes, S or wavy shapes, any other shapes, or any combination of shapes thereof. A primary embodiment of the present disclosure utilized for the purpose of heat transfer from a heat source, to a heat transfer body to a heat carrier, is facilitated by thermal heat transfer body 1300 whereby, heat transfer body 1300 may comprise any of the aforementioned components or elements which may actively and/or passively improve or enhance thermal performance and heat transfer facilitated by active methods, passive methods, and/or compound methods, according to embodiments of the present disclosure. It is to be understood that a thermal heat transfer body 1300, may comprise many configurations which may comprise any of the aforementioned improvements which facilitate active, passive or compound methods but, for the sake of conciseness, all features of an actual implementation, as in any engineering or design project, may not be described or illustrated and therefore, it is understood that the foregoing illustrative descriptions are intended for ease of understanding related to a thermal heat transfer body 1300, disclosed herein, and without limiting the scope of the present disclosure, it is to be understood that the present disclosure is not limited in its application to the details referenced and that various changes, alterations and substitutions can be made without departing from the spirit and scope of the disclosure. FIG. 20 depicts a partial cross-section side elevation view of thermal heat transfer body 1300 according to an embodiment of the present disclosure. This view shows thermal heat transfer body 1300 comprising a tubular body with heat transfer main body 1313 being a primary outer conduit body with heat transfer main body interior face 1317, which includes a concentric heat carrier tubular member 1320 (not shown), lower longitudinal end joining member 1311 fused or connected to heat transfer main body 1313, and upper longitudinal end joining member 1312 fused or connected to heat transfer main body 1313 whereby, lower longitudinal end joining member 1311, may be a threaded pin joining member, located at the lower longitudinal end of thermal heat transfer body 1300, and upper longitudinal end joining member 1312 may be a threaded box joining member, located at the upper longitudinal end of thermal heat transfer body 1300. Comprised within heat transfer main body 1313, and external to heat carrier tubular member 1320 (not shown) is heat transfer media 1319 comprising a dry packed bed with a sphere-shaped material which may be comprised of any high thermally conductive metallic, non-metallic, or polymer composite material, which may include silver, components comprising silver, which may include silver paste, or silver alloys, copper, copper alloys, gold, aluminum, aluminum nitride, aluminum alloys, tungsten, tungsten alloys, zinc, zinc alloys, silicon carbide, Zeolites, which may be comprised of consolidated NaX Zeolite, graphite, graphite with expanded natural graphite, which may include silica gel-expanded graphite, diamonds, components comprising diamonds which may include diamond powder or diamond coatings, any composite material, composite adsorbents, composite coated adsorbents, composite coatings, and/or any other high thermally conductive materials, or any combination thereof, or any other high thermally conductive materials known to those skilled in the art. Packed beds may comprise components packed in a lateral orientation, longitudinal orientation, diagonal orientation or stacked configuration relative to heat transfer main body 1313, or any combination thereof, and may include materials which are stacked side-by-side, stacked on top of one another, dry packed whereby, solid spheres for example, are used to fill the annular space comprised within heat transfer main body 1313 and heat carrier tubular member 1320 (not shown), packed coated materials, materials bound together using thermally conductive composite materials, which may include adsorbent composite materials, or bound together by other means and whereby, the material shape may include solid spheres, solid ovoid spheres, solid cylinders, solid cylindrical dome shapes, solid bullet shapes, solid airfoil shapes, solid irregular shaped bodies, solid rectangular shapes, solid triangular shapes, solid trapezoidal shapes, solid semi-circular shapes, any other solid shapes, mesh material, multi-layer mesh material, plates, multi-layer plates, S-shaped or wavy plates, which may also include multi-layer stacked S-shaped or wavy plates, or any combination thereof, and extending from heat transfer main body interior face 1317, penetrating through heat carrier tubular member 1320 (not shown), a certain distance into heat carrier tubular member bore 1321 (not shown), are a plurality of longitudinal rectangular shaped conduction fin members 1323, which may be fused or attached to heat carrier tubular member 1320 (not shown), to heat transfer main body 1313, or any combination thereof, extending from a location at or near the upper lateral end of heat transfer main body 1313 to a location at or near the lower lateral end of heat transfer main body 1313, positioned radially around heat carrier tubular member 1320 (not shown) for the purpose of adding thermally conductive effective surface area to heat transfer main body, heat carrier tubular member 1320 (not shown) and to induce turbulent flow to a carrier fluid comprised within heat carrier tubular member 1320 (not shown) whereby, conduction fin member shapes may include solid cylinders, solid cylindrical dome or button shapes, solid dimple shapes, solid bullet shapes, solid airfoil shapes, solid irregular shaped bodies, solid square or rectangular shapes, solid triangular shapes, solid trapezoidal shapes, solid semi-circular shapes, solid S or wavy shapes, any other solid shapes, or any combination thereof whereby, heat from a heat source is transferred from the source through a borehole, which may comprise a bonding system 81 (not shown), binding together the borehole and the borehole/zone interface to a conduit within the borehole, which may be an external casing completion assembly 80 (not shown), comprising a thermal heat transfer body 1300, comprising high thermally conductive internal components, which may include heat transfer media 1319, a plurality of conduction fin members 1323, and internal heat carrier tubular member 1320 (not shown), comprising a heat carrier fluid whereby, said heat is transferred to a carrier fluid within heat carrier tubular member 1320 (not shown), which may be non-thermal production 10 (not shown), transitioning said fluid into thermal production 10-T (not shown), whereby thermal production 10-T (not shown) flows to the surface of the earth 5 (not shown) and further into energy producing apparatus, which may include a thermal turbine used for energy production derived from heat sources, according to an embodiment of the present disclosure.

FIG. 21 depicts an elevation view of thermal heat transfer body 1300 cross-section A-A, illustrated in FIG. 20. This view shows thermal heat transfer body 1300 comprising a tubular body with heat transfer main body 1313 being a primary outer conduit body with heat transfer main body interior face 1317, which may include an inner concentric conduit, heat carrier tubular member 1320, which includes heat carrier tubular member exterior face 1322 and heat carrier tubular member bore 1321, extending from the upper lateral end to the lower lateral end longitudinally within thermal heat transfer body 1300, which encompass upper longitudinal end joining member 1312 (not shown) and lower longitudinal end joining member 1311 (not shown), and heat carrier tubular member 1320 centrally located within heat transfer main body 1313 whereby, thermal heat transfer body 1300 comprises a pipe-in-pipe configuration. The depicted embodiment illustrates heat carrier tubular member 1320 with a round cylindrical configuration comprised within heat transfer main body 1313, and external to heat carrier tubular member 1320 is heat transfer media 1319, comprising any high thermal conductivity material disclosed herein, according to the aforementioned description in FIG. 20, and extending from heat transfer main body interior face 1317, fused or attached to heat carrier tubular exterior face 1322 are a plurality of longitudinal rectangular shaped conduction fin members 1323, extending from a location at or near the upper lateral end of heat transfer main body 1313 to a location at or near the lower lateral end of heat transfer main body 1313, positioned radially around heat carrier tubular member 1320 for the purpose of adding thermally conductive effective surface area to heat transfer main body and heat carrier tubular member 1320 illustrating one configuration which may comprise thermal heat transfer body 1300 whereby, conduction fin member 1323 does not penetrate through heat carrier tubular member 1320. Heat transfer main body 1313 and heat carrier tubular member 1320 may comprise any shape which may include a circular configuration, as depicted, oval body shapes, rectangular body shapes, triangular body shapes, trapezoidal body shapes, any multi-sided body shape comprising five or more sides, or any combination thereof, according to an embodiment of the present disclosure.

FIG. 22 depicts an elevation view of cross-section A-A of an alternate configuration of thermal heat transfer body 1300 illustrated in FIG. 20. This view shows thermal heat transfer body 1300 comprising a tubular body with heat transfer main body 1313 being a primary outer conduit body with heat transfer main body interior face 1317, which may include an inner concentric conduit, heat carrier tubular member 1320, which includes heat carrier tubular member exterior face 1322 and heat carrier tubular member bore 1321, extending from the upper lateral end to the lower lateral end longitudinally within thermal heat transfer body 1300, which encompass upper longitudinal end joining member 1312 (not shown) and lower longitudinal end joining member 1311 (not shown), and heat carrier tubular member 1320 centrally located within heat transfer main body 1313 whereby, thermal heat transfer body 1300 comprises a pipe-in-pipe configuration. The depicted embodiment illustrates heat carrier tubular member 1320 with a multi-sided octagonal body configuration comprised within heat transfer main body 1313, and external to heat carrier tubular member 1320 is heat transfer media 1319, comprising any high thermally conductivity material disclosed herein, according to the aforementioned description in FIG. 20, and extending from heat transfer main body interior face 1317, penetrating through heat carrier tubular member 1320, a certain distance into heat carrier tubular member bore 1321, are a plurality of longitudinal rectangular shaped conduction fin members 1323, which may be fused or attached to heat carrier tubular member 1320, to heat transfer main body 1313, or any combination thereof, extending from a location at or near the upper lateral end of heat transfer main body 1313 to a location at or near the lower lateral end of heat transfer main body 1313, positioned radially around heat carrier tubular member 1320, for the purpose of adding thermally conductive effective surface area to heat transfer main body 1313, heat carrier tubular member 1320, and to induce turbulent flow to a carrier fluid comprised within heat carrier tubular member 1320 whereby, conduction fin member 1323 is illustrated as a solid rectangular shaped plate as an example, but may also include solid cylinder shapes, solid cylindrical dome or button shapes, solid dimple shapes, solid bullet shapes, solid airfoil shapes, solid irregular shaped bodies, solid square shapes, solid triangular shapes, solid trapezoidal shapes, solid semi-circular shapes, solid S or wavy shapes, any other solid shapes, or any combination thereof. Heat transfer main body 1313 and heat carrier tubular member 1320 may comprise any shape which may include a multi-sided octagonal configuration, as depicted, oval body shapes, rectangular body shapes, triangular body shapes, trapezoidal body shapes, any multi-sided body shape comprising five or more sides, or any combination thereof, according to an embodiment of the present disclosure.

FIG. 23 depicts a partial cross-section side elevation view of cross-section B-B illustrated in FIG. 22 which include upper longitudinal end joining member 1312 and lower longitudinal end joining member 1311. This view shows thermal heat transfer body 1300 comprising a tubular body with heat transfer main body 1313 being a primary outer conduit body with heat transfer main body interior face 1317, which may include an inner concentric conduit, heat carrier tubular member 1320, which includes heat carrier tubular member exterior face 1322 and heat carrier tubular member bore 1321, extending from the upper lateral end to the lower lateral end longitudinally within thermal heat transfer body 1300, which encompass upper longitudinal end joining member 1312 and lower longitudinal end joining member 1311, and heat carrier tubular member 1320 centrally located within heat transfer main body 1313 whereby, thermal heat transfer body 1300 comprises a pipe-in-pipe configuration. The depicted embodiment illustrates heat carrier tubular member 1320 with a multi-sided octagonal body configuration comprised within heat transfer main body 1313, and external to heat carrier tubular member 1320 is heat transfer media 1319, comprising any high thermally conductive material disclosed herein, according to the aforementioned description in FIG. 20, and extending from heat transfer main body interior face 1317, penetrating through heat carrier tubular member 1320, a certain distance into heat carrier tubular member bore 1321, are a plurality of longitudinal rectangular shaped conduction fin members 1323, which may be fused or attached to heat carrier tubular member 1320, to heat transfer main body 1313, or any combination thereof, extending from a location at or near the upper lateral end of heat transfer main body 1313 to a location at or near the lower lateral end of heat transfer main body 1313, positioned radially around heat carrier tubular member 1320, for the purpose of adding thermally conductive effective surface area to heat transfer main body 1313, heat carrier tubular member 1320, and to induce turbulent flow to a carrier fluid comprised within heat carrier tubular member 1320 according to an embodiment of the present disclosure.

Figures 24, 25, 26:
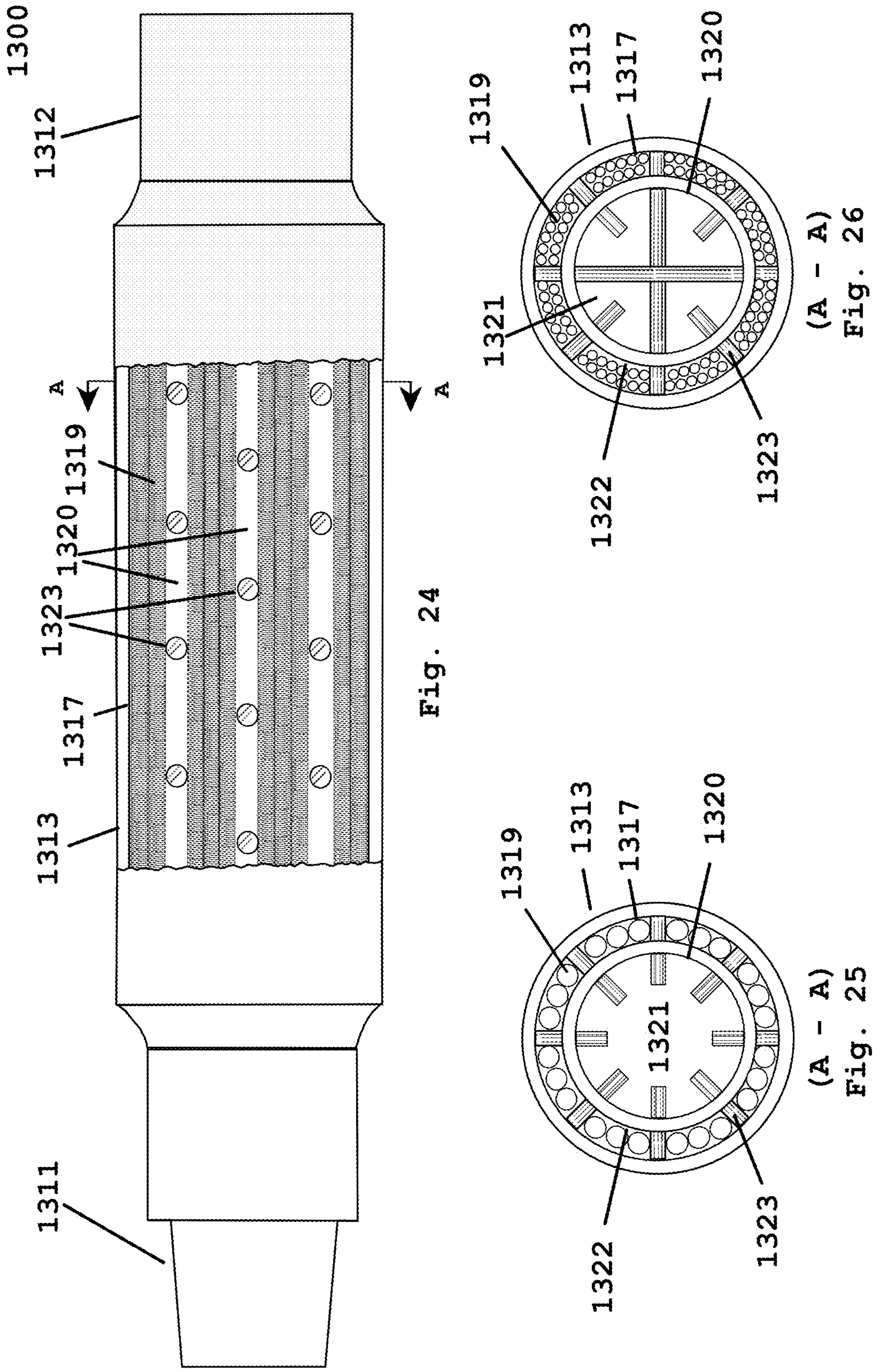
FIG. 24 depicts a partial front cross-sectional view of an alternate configuration for the heat transfer body shown in FIG. 20, according to an embodiment of the present disclosure.
FIG. 25 and FIG. 26 depict elevation cross-sectional views (Section A-A) of alternate configurations for the heat transfer body shown in FIG. 20 and depicted by FIG. 24, according to an embodiment of the present disclosure.

FIG. 24 depicts a partial cross-section side elevation view of an alternate configuration for thermal heat transfer body 1300 illustrated in FIG. 20. This view shows thermal heat transfer body 1300 comprising a tubular body with heat transfer main body 1313 being a primary outer conduit body with heat transfer main body interior face 1317, which may include an inner concentric conduit, heat carrier tubular member 1320, which includes heat carrier tubular member exterior face 1322 (not shown) and heat carrier tubular member bore 1321 (not shown), extending from the upper lateral end to the lower lateral end longitudinally within thermal heat transfer body 1300, which encompass upper longitudinal end joining member 1312 and lower longitudinal end joining member 1311, and heat carrier tubular member 1320 centrally located within heat transfer main body 1313 whereby, thermal heat transfer body 1300 comprises a pipe-in-pipe configuration. The depicted embodiment illustrates heat carrier tubular member 1320 with a round cylindrical body configuration comprised within heat transfer main body 1313, and external to heat carrier tubular member 1320 is heat transfer media 1319, depicted with a plurality of high thermally conductive solid cylinders or rods, stacked longitudinally side-by-side, within the annular space created by the interior of heat transfer main body 1313 and the exterior of heat carrier tubular member 1320, or heat transfer media 1319 may comprise any other high thermally conductive material disclosed herein, according to the aforementioned description in FIG. 20, and extending from heat transfer main body interior face 1317, penetrating through heat carrier tubular member 1320, a certain distance into heat carrier tubular member bore 1321 (not shown), are a plurality of round cylindrical shaped conduction fin members 1323, which may be fused or attached to heat carrier tubular member 1320, to heat transfer main body 1313, or any combination thereof, positioned radially and extending laterally around heat carrier tubular member 1320, from a location at or near the upper lateral end of heat transfer main body 1313 to a location at or near the lower lateral end of heat transfer main body 1313, for the purpose of adding thermally conductive effective surface area to heat transfer main body 1313, heat carrier tubular member 1320, and to induce turbulent flow to a carrier fluid comprised within heat carrier tubular member 1320 according to an embodiment of the present disclosure.

FIG. 25 depicts an elevation view of cross-section A-A of thermal heat transfer body 1300 illustrated in FIG. 24. This view shows thermal heat transfer body 1300 comprising a tubular body with heat transfer main body 1313 being a primary outer conduit body with heat transfer main body interior face 1317, which may include an inner concentric conduit, heat carrier tubular member 1320, which includes heat carrier tubular member exterior face 1322 and heat carrier tubular member bore 1321, extending from the upper lateral end to the lower lateral end longitudinally within thermal heat transfer body 1300, which encompass upper longitudinal end joining member 1312 (not shown) and lower longitudinal end joining member 1311 (not shown), and heat carrier tubular member 1320 centrally located within heat transfer main body 1313 whereby, thermal heat transfer body 1300 comprises a pipe-in-pipe configuration. The depicted embodiment illustrates heat carrier tubular member 1320 with a round cylindrical shaped body configuration comprised within heat transfer main body 1313, and external to heat carrier tubular member 1320 is heat transfer media 1319, depicted with a plurality of high thermally conductive solid cylinders or rods, stacked longitudinally side-by-side, within the annular space created by the interior of heat transfer main body 1313 and the exterior of heat carrier tubular member 1320, or heat transfer media 1319 may comprise any other high thermally conductive material disclosed herein, according to the aforementioned description in FIG. 20, and in FIG. 24, and extending from heat transfer main body interior face 1317, penetrating through heat carrier tubular member 1320, a certain distance into heat carrier tubular member bore 1321, are a plurality of round cylindrical shaped conduction fin members 1323, which may be fused or attached to heat carrier tubular member 1320, to heat transfer main body 1313, or any combination thereof, extending from a location at or near the upper lateral end of heat transfer main body 1313 to a location at or near the lower lateral end of heat transfer main body 1313, positioned radially and extending laterally around heat carrier tubular member 1320, for the purpose of adding thermally conductive effective surface area to heat transfer main body 1313, heat carrier tubular member 1320, and to induce turbulent flow to a carrier fluid comprised within heat carrier tubular member 1320 whereby, conduction fin member 1323 is illustrated as a plurality of round cylindrical shaped rods, as an example, but may also include rectangular shapes, solid cylindrical dome or button shapes, solid dimple shapes, solid bullet shapes, solid airfoil shapes, solid irregular shaped bodies, solid square shapes, solid triangular shapes, solid trapezoidal shapes, solid semi-circular shapes, solid S or wavy shapes, any other solid shapes, or any combination thereof. Heat transfer main body 1313 and heat carrier tubular member 1320 may comprise any shape which may include a multi-sided octagonal configuration, as depicted, oval body shapes, rectangular body shapes, triangular body shapes, trapezoidal body shapes, any multi-sided body shape comprising five or more sides, or any combination thereof, according to an embodiment of the present disclosure.

FIG. 26 depicts an elevation view of cross-section A-A of an alternate configuration of thermal heat transfer body 1300 illustrated in FIG. 24. This view shows thermal heat transfer body 1300 comprising a tubular body with heat transfer main body 1313 being a primary outer conduit body with heat transfer main body interior face 1317, which may include an inner concentric conduit, heat carrier tubular member 1320, which includes heat carrier tubular member exterior face 1322 and heat carrier tubular member bore 1321, extending from the upper lateral end to the lower lateral end longitudinally within thermal heat transfer body 1300, which encompass upper longitudinal end joining member 1312 (not shown) and lower longitudinal end joining member 1311 (not shown), and heat carrier tubular member 1320 centrally located within heat transfer main body 1313 whereby, thermal heat transfer body 1300 comprises a pipe-in-pipe configuration. The depicted embodiment illustrates heat carrier tubular member 1320 with a round cylindrical shaped body configuration comprised within heat transfer main body 1313, and external to heat carrier tubular member 1320 is heat transfer media 1319, depicted with a plurality of high thermally conductive solid cylinders or rods, stacked longitudinally side-by-side which may also include one or more layers comprising a plurality of longitudinally stacked rods, within the annular space created by the interior of heat transfer main body 1313 and the exterior of heat carrier tubular member 1320, or heat transfer media 1319 may comprise any other high thermally conductive material disclosed herein, according to the aforementioned description in FIG. 20, and in FIG. 24, and extending from heat transfer main body interior face 1317, penetrating through heat carrier tubular member 1320, a certain distance into heat carrier tubular member bore 1321, which may also include a distance which extends from heat transfer main body interior face 1317, penetrating through heat carrier tubular member 1320 the entirety of heat carrier tubular member bore 1321 diameter, to heat transfer main body interior face 1317 opposite to and in a straight line from the originating location on main body interior face 1317, are a plurality of round cylindrical shaped conduction fin members 1323, which may be fused or attached to heat carrier tubular member 1320, to heat transfer main body 1313, or any combination thereof, extending from a location at or near the upper lateral end of heat transfer main body 1313 to a location at or near the lower lateral end of heat transfer main body 1313, positioned radially and extending laterally around heat carrier tubular member 1320, for the purpose of adding thermally conductive effective surface area to heat transfer main body 1313, heat carrier tubular member 1320, and to induce turbulent flow to a carrier fluid comprised within heat carrier tubular member 1320 whereby, conduction fin member 1323 is illustrated as a plurality of round cylindrical shaped rods, as an example, but may also include rectangular shapes, solid cylindrical dome or button shapes, solid dimple shapes, solid bullet shapes, solid airfoil shapes, solid irregular shaped bodies, solid square shapes, solid triangular shapes, solid trapezoidal shapes, solid semi-circular shapes, solid S or wavy shapes, any other solid shapes, or any combination thereof. Heat transfer main body 1313 and heat carrier tubular member 1320 may comprise any shape which may include a multi-sided octagonal configuration, as depicted, oval body shapes, rectangular body shapes, triangular body shapes, trapezoidal body shapes, any multi-sided body shape comprising five or more sides, or any combination thereof, according to an embodiment of the present disclosure.

Figures 27, 28, 29, 30, 31, 32:
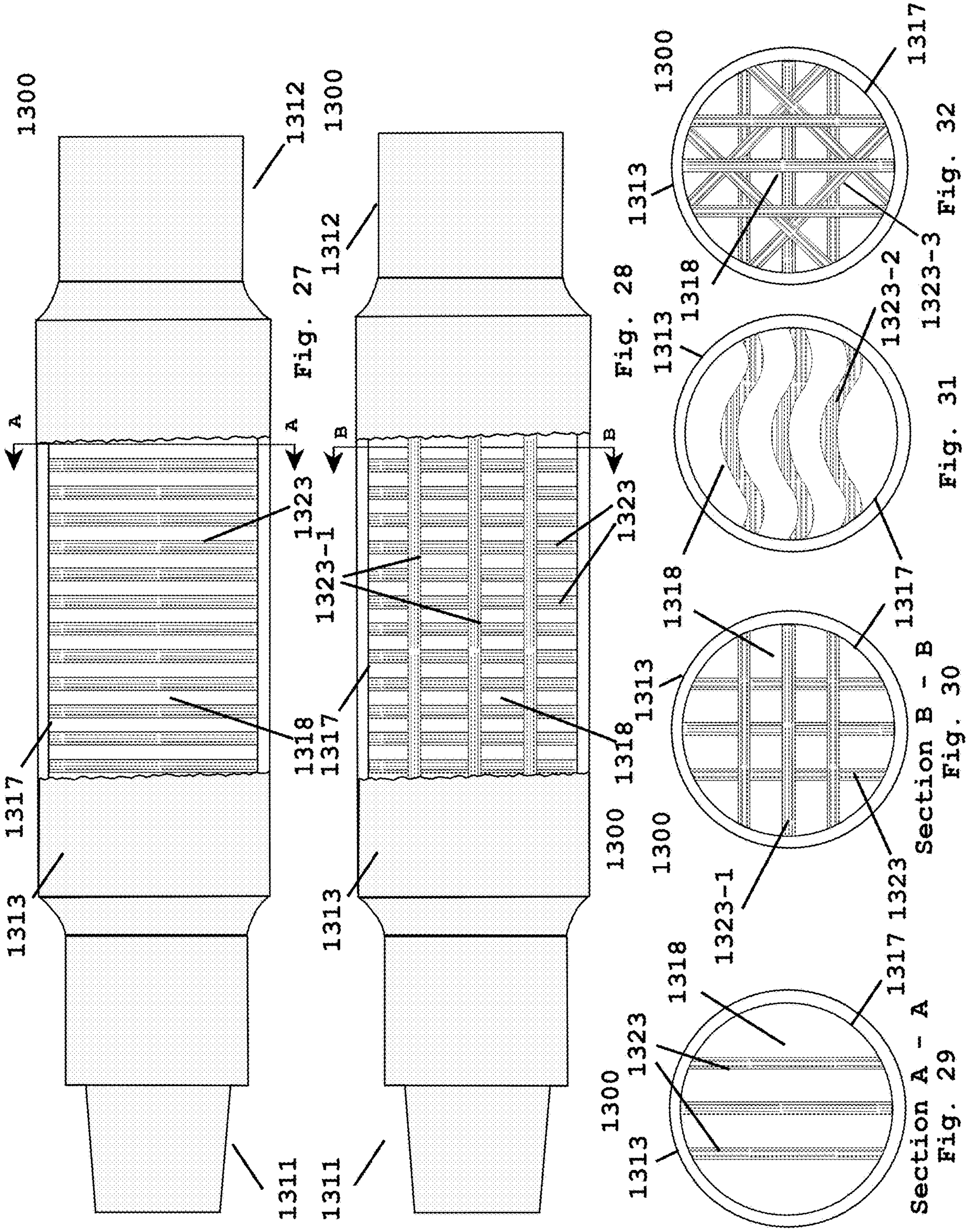
FIG. 27 and FIG. 28 depict partial front cross-sectional views of alternate configurations for the heat transfer body shown in FIG. 20, according to an embodiment of the present disclosure.
FIG. 29 depicts an elevation cross-sectional view (Section A-A) of alternate configurations for the heat transfer body shown in FIG. 20 and depicted by FIG. 27, according to an embodiment of the present disclosure.
FIG. 30 depicts an elevation cross-sectional view (Section B-B) of alternate configurations for the heat transfer body shown in FIG. 20 and depicted by FIG. 28, according to an embodiment of the present disclosure.
FIG. 31 and FIG. 32 depict elevation cross-sectional views of alternate configurations for the heat transfer body shown in FIG. 20 and depicted by FIGS. 27 and 28, according to an embodiment of the present disclosure.

FIG. 27 depicts a partial cross-section side elevation view of an alternate configuration for thermal heat transfer body 1300 illustrated in FIG. 20. This view shows thermal heat transfer body 1300 comprising a tubular body with heat transfer main body 1313 being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 and lower longitudinal end joining member 1311. Comprised within heat transfer main body bore 1318 are a plurality of round cylindrical shaped conduction fin members 1323, which may be fused or attached to heat transfer main body heat transfer main body interior face 1317, positioned laterally across heat transfer main body bore 1318 and extending in a longitudinal direction beginning at or near the upper lateral end of heat transfer main body 1313 to a location at or near the lower lateral end of heat transfer main body 1313, for the purpose of adding thermally conductive effective surface area to heat transfer main body 1313, and to induce turbulent flow to a carrier fluid which may be comprised within heat transfer main body bore 1318 whereby, heat is transferred to a carrier fluid, which may be non-thermal production 10 (not shown), transitioning said fluid into thermal production 10-T (not shown) whereby, thermal production 10-T (not shown) flows to the surface of the earth 5 (not shown) and further into energy producing apparatus, which may include a thermal turbine used for energy production derived from heat sources, according to an embodiment of the present disclosure.

FIG. 28 depicts a partial cross-section side elevation view of an alternate configuration for thermal heat transfer body 1300 illustrated in FIG. 20. This view shows thermal heat transfer body 1300 comprising a tubular body with heat transfer main body 1313 being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 and lower longitudinal end joining member 1311. Comprised within heat transfer main body bore 1318 are a plurality of round cylindrical shaped conduction fin members 1323, intersecting a plurality of rectangular shaped horizontal fin plates 1323-1, which may be fused or attached to heat transfer main body interior face 1317, and the plurality of round cylindrical shaped conduction fin members 1323, are positioned perpendicular to the plurality rectangular shaped horizontal fin plates 1323-1, and are fused or attached to the plurality of rectangular shaped horizontal fin plates 1323-1, which are positioned laterally across heat transfer main body bore 1318 and extend in a longitudinal direction beginning at or near the upper lateral end of heat transfer main body 1313 to a location at or near the lower lateral end of heat transfer main body 1313, for the purpose of adding thermally conductive effective surface area to heat transfer main body 1313, and to induce turbulent flow to a carrier fluid which may be comprised within heat transfer main body bore 1318 whereby, heat is transferred to a carrier fluid, which may be non-thermal production 10 (not shown), transitioning said fluid into thermal production 10-T (not shown) whereby, thermal production 10-T (not shown) flows to the surface of the earth 5 (not shown) and further into energy producing apparatus, which may include a thermal turbine used for energy production derived from heat sources, according to an embodiment of the present disclosure.

FIG. 29 depicts an elevation view of cross-section A-A of an alternate configuration of thermal heat transfer body 1300 illustrated in FIG. 20 and described in FIG. 27. This view shows heat transfer main body bore 1318, comprised within heat transfer main body 1313, being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 (not shown) and lower longitudinal end joining member 1311 (not shown). Comprised within heat transfer main body bore 1318 are a plurality of round cylindrical shaped conduction fin members 1323, which may be fused or attached to heat transfer main body heat transfer main body interior face 1317, positioned laterally across heat transfer main body bore 1318 and extending in a longitudinal direction beginning at or near the upper lateral end of heat transfer main body 1313 to a location at or near the lower lateral end of heat transfer main body 1313, for the purpose of adding thermally conductive effective surface area to heat transfer main body 1313, and to induce turbulent flow to a carrier fluid which may be comprised within heat transfer main body bore 1318, according to an embodiment of the present disclosure.

FIG. 30 depicts an elevation view of cross-section B-B of an alternate configuration of thermal heat transfer body 1300 illustrated in FIG. 20 and described in FIG. 28. This view shows heat transfer main body bore 1318, comprised within heat transfer main body 1313, being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 (not shown) and lower longitudinal end joining member 1311 (not shown). Comprised within heat transfer main body bore 1318 are a plurality of round cylindrical shaped conduction fin members 1323, intersecting a plurality of rectangular shaped horizontal fin plates 1323-1, which may be fused or attached to heat transfer main body interior face 1317, and the plurality of round cylindrical shaped conduction fin members 1323, are positioned perpendicular to the plurality rectangular shaped horizontal fin plates 1323-1, and are fused or attached to the plurality of rectangular shaped horizontal fin plates 1323-1, which are positioned laterally across heat transfer main body bore 1318 and extend in a longitudinal direction beginning at or near the upper lateral end of heat transfer main body 1313 to a location at or near the lower lateral end of heat transfer main body 1313, for the purpose of adding thermally conductive effective surface area to heat transfer main body 1313, and to induce turbulent flow to a carrier fluid which may be comprised within heat transfer main body bore 1318, according to an embodiment of the present disclosure.

FIG. 31 depicts an elevation view of an alternate configuration of thermal heat transfer body 1300 illustrated in FIG. 20. This view shows heat transfer main body bore 1318, comprised within heat transfer main body 1313, being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 (not shown) and lower longitudinal end joining member 1311 (not shown). Comprised within heat transfer main body bore 1318 are a plurality of horizontal S-shaped conduction fin members 1323-2, which may be fused or attached to heat transfer main body interior face 1317, and are positioned laterally across heat transfer main body bore 1318 and extend in a longitudinal direction beginning at or near the upper lateral end of heat transfer main body 1313 to a location at or near the lower lateral end of heat transfer main body 1313, for the purpose of adding thermally conductive effective surface area to heat transfer main body 1313, and to induce turbulent flow to a carrier fluid which may be comprised within heat transfer main body bore 1318, according to an embodiment of the present disclosure.

FIG. 32 depicts an elevation view of an alternate configuration of thermal heat transfer body 1300 illustrated in FIG. 20. This view shows heat transfer main body bore 1318, comprised within heat transfer main body 1313, being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 (not shown) and lower longitudinal end joining member 1311 (not shown). Comprised within heat transfer main body bore 1318 are a plurality of round cylindrical shaped conduction fin members 1323 oriented in a mesh configuration, which may be fused or attached to heat transfer main body heat transfer main body interior face 1317, positioned laterally across heat transfer main body bore 1318 and extending in a longitudinal direction beginning at or near the upper lateral end of heat transfer main body 1313 to a location at or near the lower lateral end of heat transfer main body 1313, for the purpose of adding thermally conductive effective surface area to heat transfer main body 1313, and to induce turbulent flow to a carrier fluid which may be comprised within heat transfer main body bore 1318, according to an embodiment of the present disclosure.

Figure 33:
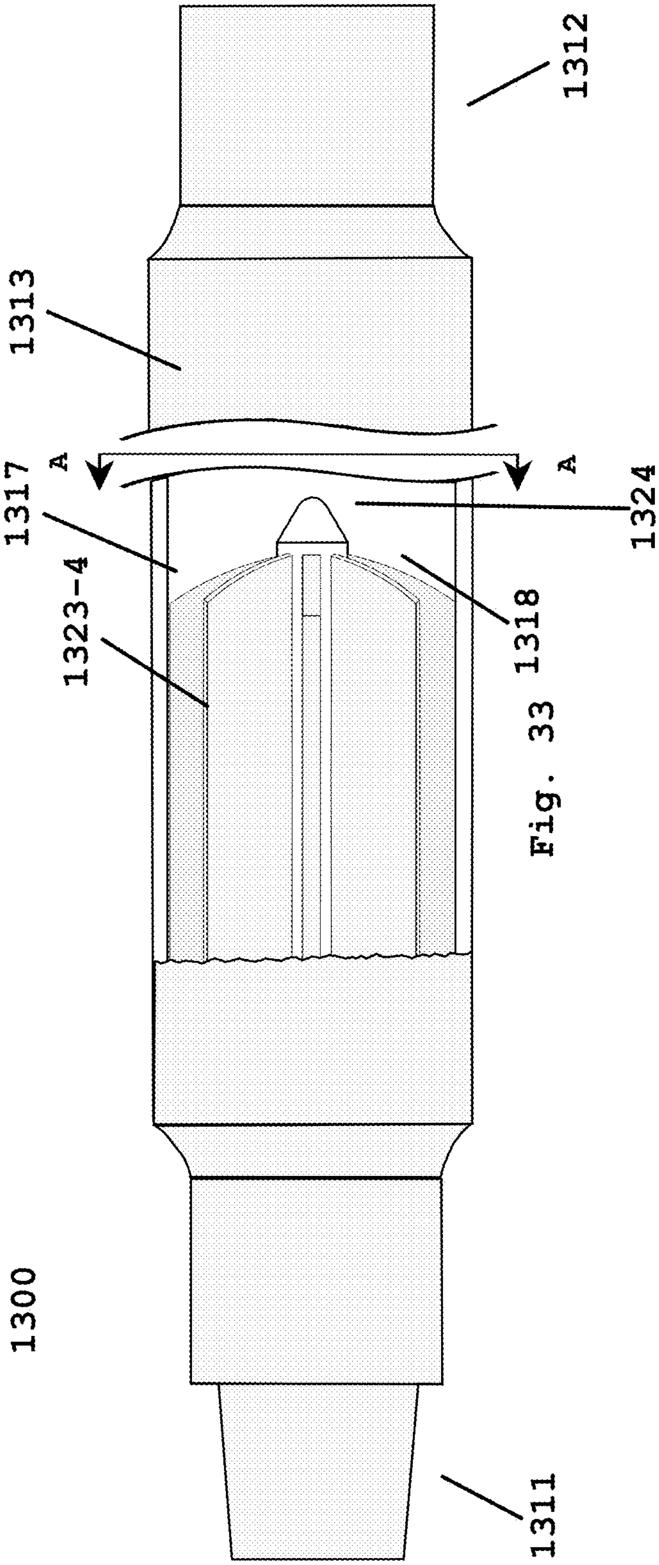
FIG. 33 depicts a partial front cross-sectional view of an alternate configuration for the heat transfer body shown in FIG. 20, according to an embodiment of the present disclosure.

FIG. 33 depicts a partial cross-section side elevation view of an alternate configuration for thermal heat transfer body 1300 illustrated in FIG. 20. This view shows thermal heat transfer body 1300 comprising a tubular body with heat transfer main body 1313 being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 and lower longitudinal end joining member 1311. Comprised within heat transfer main body bore 1318 are a plurality of swept-back conduction fin members 1323-4, extending out radially around, and positioned longitudinally on, the external surface of parabolic-shaped concentric cylinder member 1324, centrally located within heat transfer main body bore 1318 whereby, a plurality of swept-back conduction fin members 1323-4 are fused or attached to the external surface of parabolic-shaped concentric cylinder member 1324, and to heat transfer main body interior face 1317, and extending in a longitudinal direction beginning at or near the upper lateral end of heat transfer main body 1313 to a location at or near the lower lateral end of heat transfer main body 1313, for the purpose of adding thermally conductive effective surface area to heat transfer main body 1313, and to induce turbulent flow to a carrier fluid which may be comprised within heat transfer main body bore 1318 whereby, heat is transferred to a carrier fluid, which may be non-thermal production 10 (not shown), transitioning said fluid into thermal production 10-T (not shown) whereby, thermal production 10-T (not shown) flows to the surface of the earth 5 (not shown) and further into energy producing apparatus, which may include a thermal turbine used for energy production derived from heat sources, according to an embodiment of the present disclosure.

Figure 34:
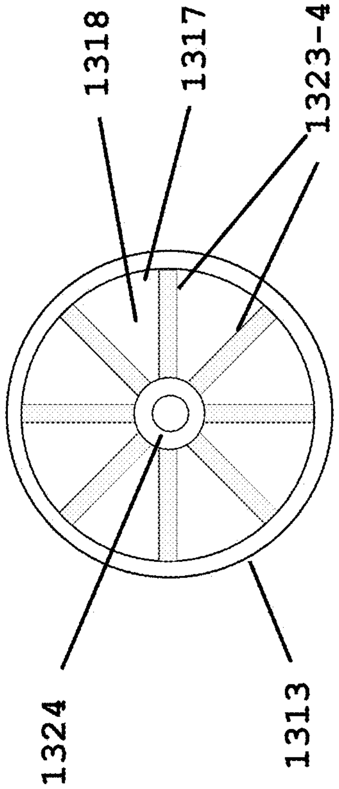
FIG. 34 depicts an elevation cross-sectional view (Section A-A) of an alternate configuration for the heat transfer body shown in FIG. 20 and depicted by FIG. 33, according to an embodiment of the present disclosure.

FIG. 34 depicts an elevation view of cross-section A-A of an alternate configuration of thermal heat transfer body 1300 illustrated in FIG. 20 and described in FIG. 33. This view shows heat transfer main body bore 1318, comprised within heat transfer main body 1313, being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 (not shown) and lower longitudinal end joining member 1311 (not shown). Comprised within heat transfer main body bore 1318 are a plurality of swept-back conduction fin members 1323-4, extending out radially around, and positioned longitudinally on, the external surface of parabolic-shaped concentric cylinder member 1324, centrally located within heat transfer main body bore 1318 whereby, a plurality of swept-back conduction fin members 1323-4 are fused or attached to the external surface of parabolic-shaped concentric cylinder member 1324, and to heat transfer main body interior face 1317, and extending in a longitudinal direction beginning at or near the upper lateral end of heat transfer main body 1313 to a location at or near the lower lateral end of heat transfer main body 1313, for the purpose of adding thermally conductive effective surface area to heat transfer main body 1313, and to induce turbulent flow to a carrier fluid which may be comprised within heat transfer main body bore 1318, according to an embodiment of the present disclosure.

Figures 35, 36, 37, 38:
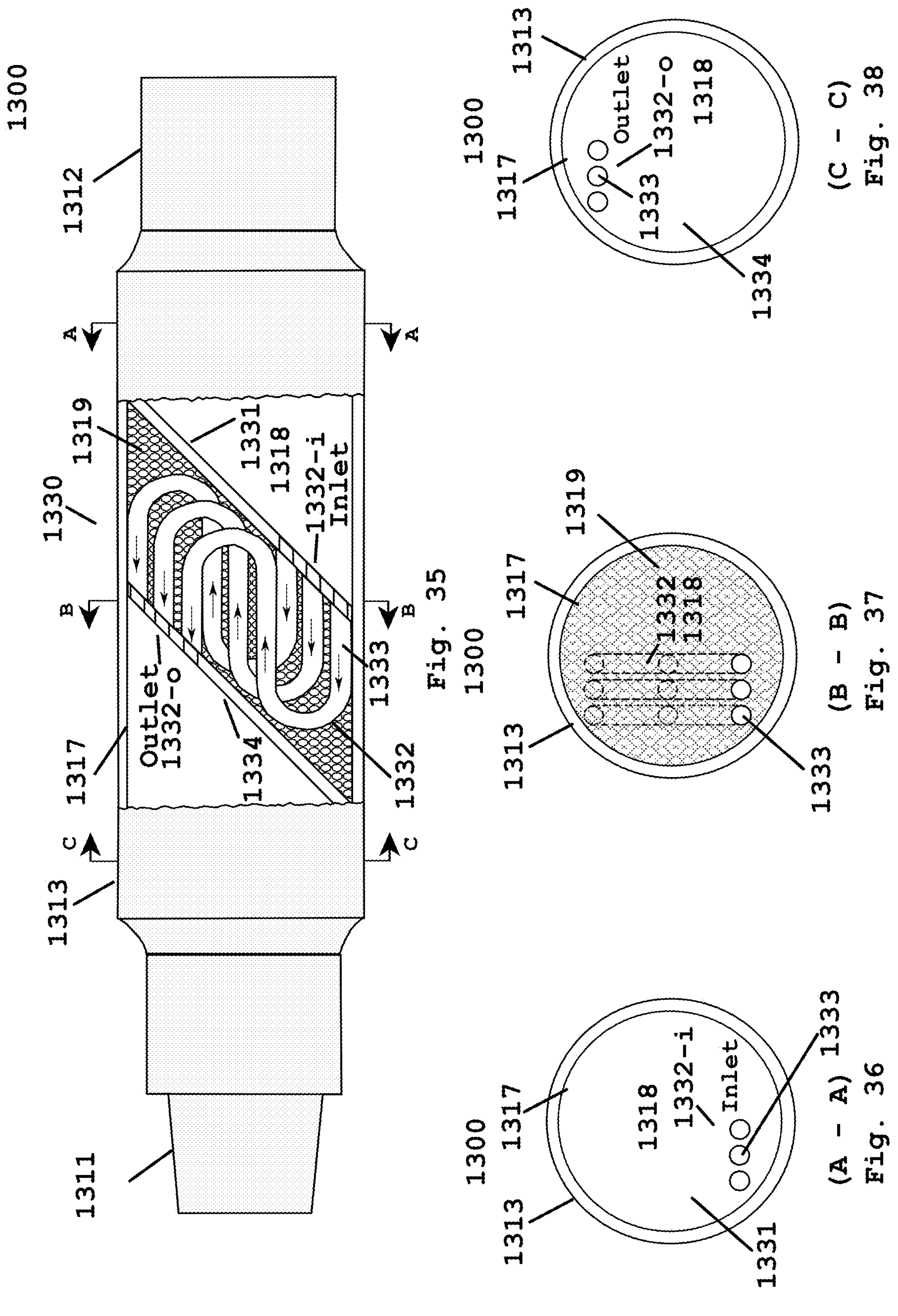
FIG. 35 depicts a partial front cross-sectional view of an alternate configuration for the heat transfer body shown in FIG. 20, according to an embodiment of the present disclosure.
FIGS. 36-38 depict elevation cross-sectional views of Section A-A, Section B-B and Section C-C, respectively, of the heat transfer body shown in FIG. 20, and depicted by FIG. 35, according to an embodiment of the present disclosure.

FIG. 35 depicts a partial cross-section side elevation view of an alternate configuration for thermal heat transfer body 1300 illustrated in FIG. 20. This view shows thermal heat transfer body 1300 comprising a tubular body with heat transfer main body 1313 being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 and lower longitudinal end joining member 1311. Comprised within heat transfer main body bore 1318 is heat carrier conduit module 1330 comprising inlet strike plate 1331, fused or connected to the inlet end section exterior circumference of each respective heat carrier tube 1332, and inlet strike plate 1331 is fused or connected to heat transfer main body interior face 1317, which may comprise one or a plurality of heat carrier tube(s 1332), comprising heat carrier tube bore 1333, extending through heat carrier tube 1332 from heat carrier tube inlet 1332-*i* to heat carrier tube outlet 1332-*o* whereby, the outlet end exterior circumference of each respective heat carrier tube 1332 is fused or connected to outlet isolation plate 1334, and outlet isolation plate 1334 is fused or connected to heat transfer main body interior face 1317 whereby, heat carrier tube 1332 may comprise one or a plurality of fluid flow conduits(s) comprising a plurality of bends which may be U-shaped, S-shaped, V-shaped, W-shaped, Spiral-shaped or other configurations which may create an extended flow path within heat transfer main body bore 1318, with the purpose of increasing fluid retention time within heat carrier tube 1332, required to transfer heat from a heat source to a heat carrier, and the space comprising heat transfer main body bore 1318 within inlet strike plate 1331 and outlet isolation plate 1334 comprised with one or a plurality of heat carrier tube(s) 1332 is filled with heat transfer media 1319 fully encapsulating the one or a plurality of heat carrier tube(s) 1332 whereby, heat from a heat source is transferred from the source through a borehole, which may comprise a bonding system, binding together the borehole and the borehole/zone interface to a conduit within the borehole, which may be an external casing completion assembly 80 (not shown), comprising a thermal heat transfer body 1300, comprising high thermally conductive internal components, which may include heat transfer body 1300 comprising heat carrier conduit module 1330 within heat transfer main body 1313, according to embodiments of the present disclosure. Heat carrier conduit module 1330, within heat transfer main body 1313, may include other heat transfer enhancement components, which may include one or a plurality of conduction fin members 1323 (not shown), external to heat carrier conduit module 1330, within heat transfer main body bore 1318, and/or may also include the same heat transfer media 1319, or second, third, fourth heat transfer media 1319*a*, 1319*b*, 1319*c*, (not shown), etc., respectively, or any combination thereof, external to heat carrier conduit module 1330, within heat transfer main body bore 1318, which varies from heat transfer media 1319 within heat carrier conduit module 1330 whereby, a heat carrier which may be a non-thermal producer fluid or non-thermal injection zone fluid would be flowing within an external casing completion assembly, would enter thermal heat transfer body 1300, through heat transfer main body bore 1318 comprising heat transfer media 1319, into heat carrier tube inlet 1332-*i*, into heat carrier tube 1332, exiting heat carrier tube outlet 1332-*o*, into heat transfer media 1319 within heat transfer main body bore 1318 and further as required, and with each fluid flow phase acquire heat from a heat source, for example whereby, said heat is transferred from a heat source, through a borehole 140 (not shown), which may include cement system 81 (not shown) comprising high thermally conductive components, binding together an external casing assembly 80 (not shown), comprising a thermal heat transfer body 1300, to a borehole and the borehole/zone interface, to heat transfer main body 1313, to heat transfer media 1319 fully encapsulating one or a plurality of heat carrier tube(s) 1332, to a carrier fluid within one or a plurality of heat carrier tube(s) 1332, which may be a non-thermal producer fluid or non-thermal injection zone fluid, transitioning said fluid into a thermal fluid whereby, thermal fluid flows to the surface of the earth 5 (not shown), and further into energy producing apparatus, which may include a thermal turbine used for energy production derived from heat sources whereby, the turbine operates an electricity producing generator to produce electricity, according to an embodiment of the present disclosure. Heat transfer main body 1313 may comprise any length whereby, one or a plurality of heat carrier conduit module(s) 1330, 1330*a*, 1330*b*, 1330*c*, etc., may be comprised within heat transfer main body 1313 whereby, a carrier fluid flows into heat carrier tube inlet 1332-*i* of heat carrier conduit module 1330*a*, through one or a plurality of heat carrier tube(s) 1332, to heat carrier tube outlet 1332-*o*, into heat carrier tube inlet 1332-*i* of heat carrier conduit module 1330*b*, through one or a plurality of heat carrier tube(s) 1332 to heat carrier tube outlet 1332-*o*, etc., for any number of heat carrier conduit module(s) 1330*a*, 1330*b*, 1330*c*, etc., which may comprise heat transfer main body 1313, according to an embodiment of the present disclosure.

FIG. 36 depicts an elevation view of cross-section A-A of an alternate configuration of thermal heat transfer body 1300 illustrated in FIG. 20 and described in FIG. 35. This view shows heat transfer main body bore 1318, comprised within heat transfer main body 1313, being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 (not shown) and lower longitudinal end joining member 1311 (not shown). Comprised within heat transfer main body bore 1318 and illustrated in cross-section A-A are inlet components comprising heat carrier conduit module 1330 (not shown) which include, one or a plurality of heat carrier tube(s) 1332 (not shown) each with heat carrier tube bore 1333 penetrating through inlet strike plate 1331, fused or connected to the inlet end section exterior circumference of each respective heat carrier tube 1332 (not shown), and inlet strike plate 1331 is fused or connected to heat transfer main body interior face 1317 around the circumference of inlet strike plate 1331, completely sealing inlet strike plate 1331 to transfer main body interior face 1317 and one or a plurality of heat carrier tube inlet(s) 1332-*i* for one or a plurality of heat carrier tube(s) 1332 (not shown) whereby, a carrier fluid within an external casing completion assembly enters thermal heat transfer body 1300 through heat transfer main body bore 1318, striking include inlet strike plate 1331, and is guided toward heat carrier tube inlet 1332-*i* into heat carrier tube 1332 (not shown), according to an embodiment of the present disclosure.

FIG. 37 depicts an elevation view of cross-section B-B of an alternate configuration of thermal heat transfer body 1300 illustrated in FIG. 20 and described in FIG. 35. This view shows heat transfer main body bore 1318, comprised within heat transfer main body 1313, being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 (not shown) and lower longitudinal end joining member 1311 (not shown). Comprised within heat transfer main body bore 1318 and illustrated in cross-section B-B are internal components comprising heat carrier conduit module 1330 which include one or a plurality of heat carrier tube(s) 1332, each with heat carrier tube bore 1333, encapsulated within heat transfer media 1319 whereby, heat from an external heat source is transferred to a heat carrier facilitated by contact with and between the heat source, heat transfer main body 1313, heat transfer media 1319, to one or a plurality of heat carrier tube(s) 1332 and to a heat carrier fluid within heat carrier tube bore 1333, according to an embodiment of the present disclosure.

FIG. 38 depicts an elevation view of cross-section C-C of an alternate configuration of thermal heat transfer body 1300 illustrated in FIG. 20 and described in FIG. 35. This view shows heat transfer main body bore 1318, comprised within heat transfer main body 1313, being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 (not shown) and lower longitudinal end joining member 1311 (not shown). Comprised within heat transfer main body bore 1318 and illustrated in cross-section C-C are outlet components comprising heat carrier conduit module 1330 which include, one or a plurality of heat carrier tube(s) 1332 (not shown), each with heat carrier tube bore 1333 penetrating through outlet isolation plate 1334, fused or connected to the outlet end section exterior circumference of each respective heat carrier tube 1332 (not shown), and outlet isolation plate 1334 is fused or connected to heat transfer main body interior face 1317 around the circumference of outlet isolation plate 1334, completely sealing outlet isolation plate 1334 to transfer main body interior face 1317 and one or a plurality of heat carrier tube outlet(s) 1332-*o* for one or a plurality of heat carrier tube(s) 1332 (not shown) whereby, a carrier fluid within an external casing completion assembly enters thermal heat transfer body 1300 through heat transfer main body bore 1318, striking include inlet strike plate 1331, and is guided toward heat carrier tube inlet 1332-*i* into heat carrier tube 1332, flowing through heat carrier tube bore 1333 and exiting out of heat carrier tube outlet(s) 1332-*o*, into heat transfer main body bore 1318, according to an embodiment of the present disclosure.

Figure 39:
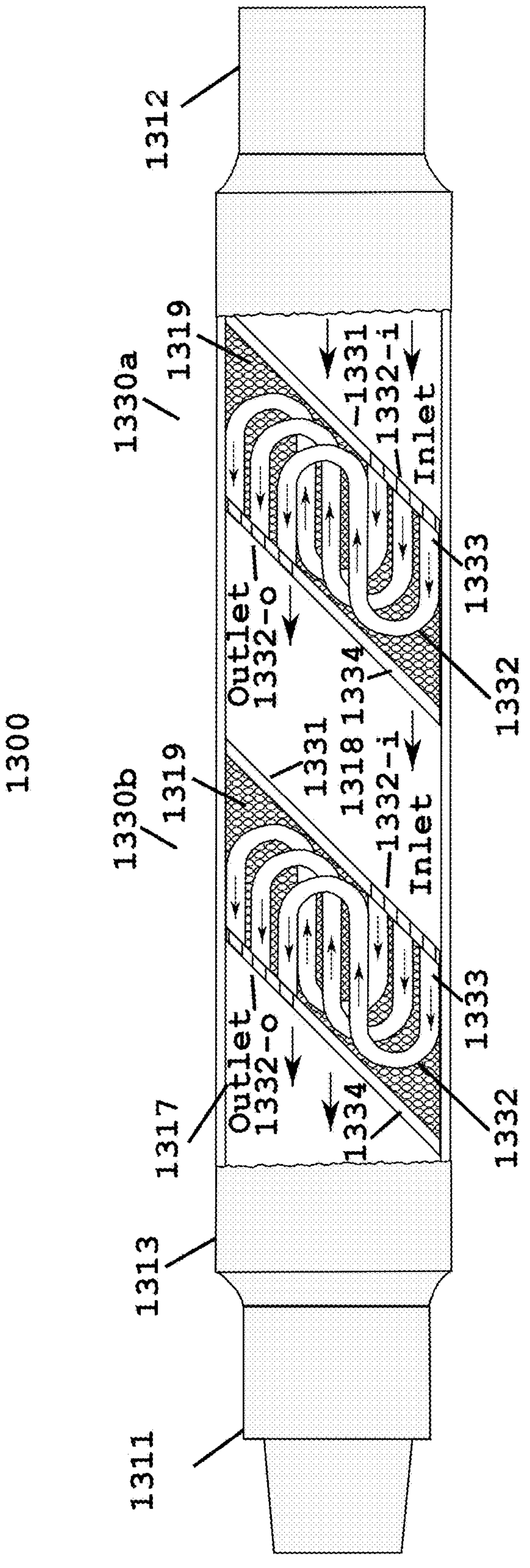
FIG. 39 and FIG. 40 depict a top cross-sectional view (Section A-A) of an alternate configuration for the heat transfer body shown in FIG. 20 and depicted by FIG. 35, according to an embodiment of the present disclosure.

FIG. 39 depicts a partial cross-section side elevation view of an alternate configuration for thermal heat transfer body 1300 illustrated in FIG. 20, with similar component details disclosed and described in FIGS. 35-38. This view shows thermal heat transfer body 1300 comprising a tubular body with heat transfer main body 1313 being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 and lower longitudinal end joining member 1311. Comprised within heat transfer main body bore 1318 are heat carrier conduit modules 1330*a* and 1330*b*, respectively. FIG. 39 illustrates heat transfer main body 1313 comprising a longer body length compared to heat transfer main body 1313 illustrated in FIG. 35 whereby, the longer body length may facilitate a plurality of heat carrier conduit module(s) 1330*a* and 1330*b*, illustrating any number of heat carrier conduit modules may be comprised within heat transfer main body 1313 whereby, a carrier fluid flows into heat carrier tube inlet 1332-*i* of heat carrier conduit module 1330*a*, through one or a plurality of heat carrier tube(s) 1332, to heat carrier tube outlet 1332-*o*, into heat carrier tube inlet 1332-*i* of heat carrier conduit module 1330*b*, through one or a plurality of heat carrier tube(s) 1332 to heat carrier tube outlet 1332-*o*, etc., for any number of heat carrier conduit module(s) 1330*a*, 1330*b*, 1330*c*, etc., which may comprise heat transfer main body 1313, according to an embodiment of the present disclosure.

Figure 40:
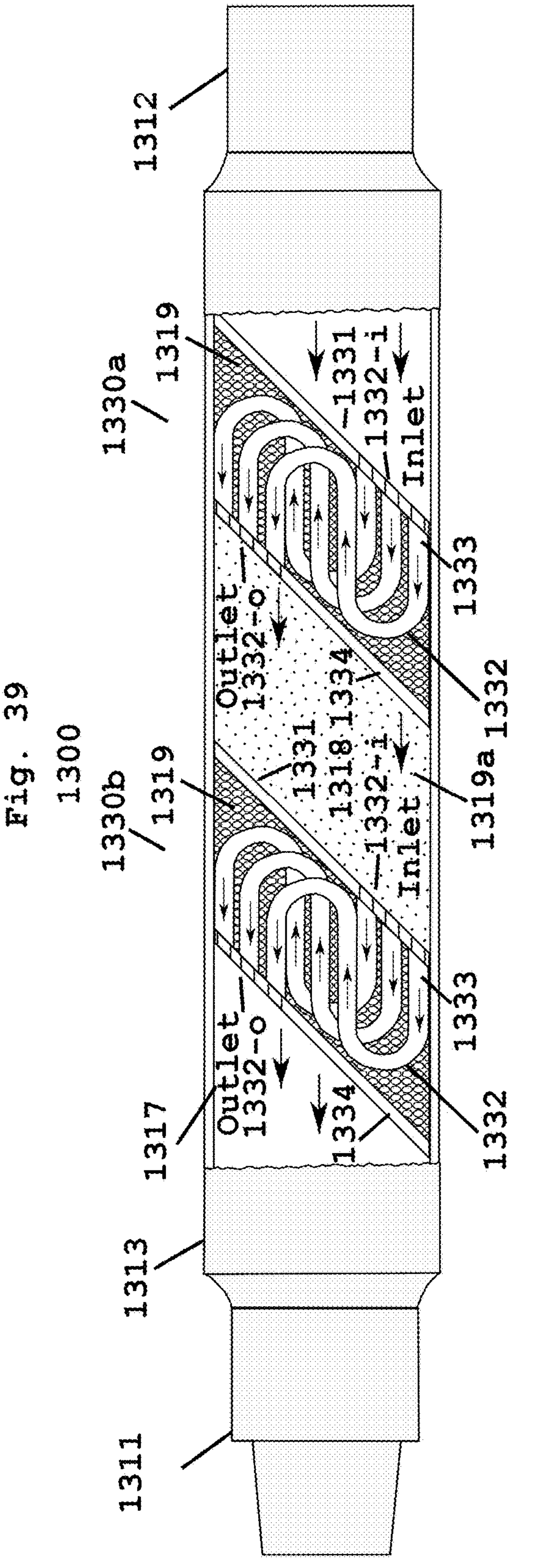

FIG. 40 depicts a partial cross-section side elevation view of an alternate configuration for thermal heat transfer body 1300 illustrated in FIG. 20, with similar component details disclosed and described in FIGS. 35-39. This view shows thermal heat transfer body 1300 comprising a tubular body with heat transfer main body 1313 being a primary outer conduit body with heat transfer main body interior face 1317, and heat transfer main body bore 1318, extending from the upper lateral end to the lower lateral end longitudinally within thermal heat transfer body 1300, which encompass upper longitudinal end joining member 1312 and lower longitudinal end joining member 1311. Comprised within heat transfer main body bore 1318 are heat carrier conduit modules 1330*a* and 1330*b*, whereby, FIG. 40 illustrates other heat transfer enhancement components discussed in FIG. 30 which may include a second heat transfer media 1319*a* within heat transfer main body bore 1318 together with a plurality of heat carrier conduit modules 1330*a* and 1330*b*, respectively whereby, within heat transfer main body bore 1318, and between heat carrier conduit modules 1330*a* and 1330*b*, the space comprising heat transfer main body bore 1318 is filled with second heat transfer media 1319*a* whereby, if a plurality of additional heat carrier conduit modules are added, for example heat carrier conduit modules 1330*c*, 1330*d*, 1330*e*, respectively, the space within heat transfer main body bore 1318, and between heat carrier conduit modules 1330*b* and 1330*c*, may be filled with a third heat transfer media 1319*b* and the space within heat transfer main body bore 1318, and between heat carrier conduit modules 1330*c* and 1330*d* may be filled with a fourth heat transfer media 1319*c*, etc. whereby, for any number of heat carrier conduit modules 1330*a*, 1330*b*, 1330*c*, etc. comprising heat transfer main body bore 1318, there may be any number of heat transfer media 1319 within heat transfer main body bore 1318, which may include the same heat transfer media 1319, or second, third, fourth heat transfer media 1319*a*, 1319*b*, 1319*c*, etc., respectively, which may be combined with any number of other heat transfer enhancing components which may include any number of conduction fin members 1323, 1323-1, 1323-2, 1323-3, etc., or any combination thereof, heat transfer enhancing components, according to embodiments of the present disclosure.

Figures 41, 42:
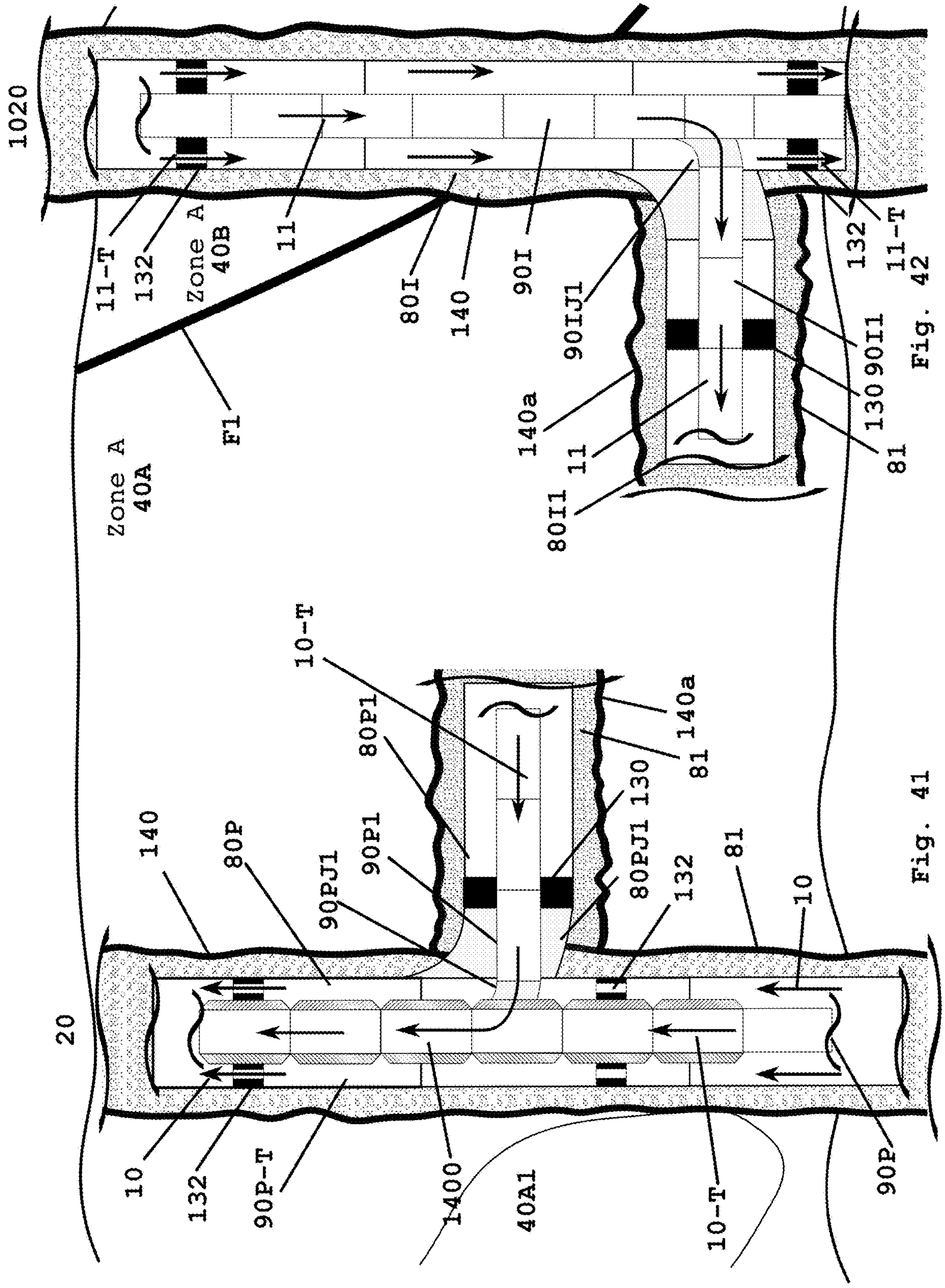
FIG. 41 depicts a schematic cross-section view of a producer well comprising an external conduit assembly with an internal conduit assembly depicting coproduction of a thermal fluid together with a non-thermal fluid, according to embodiments of the present disclosure.
FIG. 42 depicts a schematic cross-section view of a injection well comprising an external conduit assembly with an internal conduit assembly depicting co-injection of fluid originating from a non-thermal zone injected back into a non-thermal zone and of fluid originating from a thermal zone injected back into a thermal zone, according to embodiments of the present disclosure.

FIG. 41 and FIG. 42 depict a schematic cross-section view of a section of producer well 20 and a section of injection well 1020 intersecting Zone A 40 whereby, illustrated are internal well components which may facilitate coproduction of non-thermal fluid which originates from a non-thermal zone, strata, or reservoir, together with thermal fluid originating from a thermal zone, strata, or reservoir, for the purpose of cogenerating energy derived from energy producing components that may comprise said fluid, for the purpose of cogenerating energy which may include hydroelectric power (Kinetic Energy) together with power generated from geothermal heat (Thermal Energy), hydroelectric power (Kinetic Energy) together with power generated from components contained within the water that may include hydrocarbons or hydrogen (Chemical Energy), hydroelectric power (Kinetic Energy) together with power that may be generated from any other energy producing component contained within the fluid and/or from other valuable components contained within the fluid that may provide a useful purpose, or any combination thereof, according to embodiments of the present disclosure. FIG. 41 illustrates a section of producer well 1 20 intersecting non-thermal Zone A 40A and continuing to an undisclosed thermal zone not shown whereby, producer well 1 20 comprises a vertical parent borehole 140 and extending from parent borehole 140 is horizontal child borehole 140*a*. Comprised within each borehole are producer well external casing completion assembly 80P within parent borehole 140, and producer well branch external casing completion assembly 80P1 within child borehole 140*a*, respectively, which are joined together by producer well casing completion branch junction 80PJ1 whereby, bonding system 81 bonds together components within each respective borehole, to the borehole, and the borehole/zone interface. Comprised within producer well external casing completion assembly 80P, is an internal conduit, producer well internal completion assembly 90P, which may also be defined as producer well production tubing 90P, and within producer well branch external casing completion assembly 80P1 is an internal conduit, producer well branch internal completion assembly 90P1, which may also be defined as producer well branch production tubing 90P1, and is joined together with producer well production tubing 90P, by producer well branch internal completion assembly junction 90PJ1. Producer well production tubing 90P and/or producer well branch production tubing 90P1 may include as a component in sections of a well, primary thermal insulated body 1400, located in well sections where thermal production is coproducing with non-thermal production, and/or in well sections where the external temperature within the earth, or environment, may result in a loss of heat carrier thermal energy whereby, primary thermal insulated body 1400 facilitates insulating producer well production tubing 90P, producer well branch production tubing 90P1 and a heat carrier which may be comprised within producer well production tubing 90P, or producer well branch production tubing 90P1 from producer well external casing completion assemblies 80P, producer well branch external casing completion assembly 80P1 and fluid which may be comprised within the annular space created external to producer well production tubing 90P, producer well branch production tubing 90P1 and internal to producer well external casing completion assemblies 80P, branch external casing completion assembly 80P1 whereby, a heat carrier which may be producer well thermal production 10-T may be comprised within producer well production tubing 90P, producer well branch production tubing 90P1, and non-thermal production 10 may be comprised within the annular space created within producer well external casing completion assembly 80P, branch external casing completion assembly 80P1 as illustrated. To facilitate said insulation primary thermal insulated body 1400 is comprised of low thermally conductive materials which may prevent or at least reduce thermal heat loss and may be used for the purpose of thermal insulation whereby, for components comprising primary thermal insulated body 1400, with a heat carrier comprised within the component bore, thermal heat is contained within the heat carrier fluid, or is not transferred or lost at a rate which would result in a significant thermal energy loss from a heat carrier fluid to a non-thermal fluid, and/or to the surrounding environment whereby, the heat carrier would retain all or at least mostly all of the energy producing heat within the heat carrier from the originating source, which may be a subterranean zone, strata, or reservoir, to the point where energy producing heat is extracted from the carrier. Illustration and further descriptive details for primary thermal insulated body 1400 will be disclosed herein FIGS. 43-47. Producer well production tubing 90P, producer well branch production tubing 90P1, producer well sub-branch production tubing 90P2 (not shown), or any combination thereof, may comprise one or a plurality of primary thermal insulated bodies 1400 which may also include, a secondary thermal insulated body 1400A, attached to the one or plurality of primary thermal insulated bodies 1400, one or more internal completion assembly sealing devices 130, or packer(s), known to those skilled in the art, and deployed as a component attached to producer well production tubing 90P, producer well branch production tubing 90P1, producer well sub-branch production tubing 90P2 (not shown), or any combination thereof, and used for the purpose of isolating fluid flow that may exist within a producer well external casing completion assembly 80P within parent borehole 140, producer well branch external casing completion assembly 80P1 within child borehole 140*a*, producer well sub-branch external casing completion assembly 80P2 (not shown) within child sub-branch borehole 140*a-sb* (not shown), or any combination thereof, one or a plurality of internal completion assembly flow-through sealing device(s) 132, deployed as a component attached to producer well production tubing 90P, producer well branch production tubing 90P1, producer well sub-branch production tubing 90P2 (not shown), or any combination thereof, and used for the purpose of fluid flow control through a sealing device within a producer well external casing completion assembly 80P, producer well branch external casing completion assembly 80P1, producer well sub-branch external casing completion assembly 80P2 (not shown), or any combination thereof, one or more flow control device(s) 83 (not shown), which may prevent, restrict, or provide fluid flow entry from within the producer well external casing completion assembly 80P, producer well branch external casing completion assembly 80P1, producer well sub-branch external casing completion assembly 80P2 (not shown), or any combination thereof, into a producer well production tubing 90P, producer well branch production tubing 90P1, producer well sub-branch production tubing 90P2 (not shown), and/or to prevent, restrict, or provide fluid flow within producer well production tubing 90P, producer well branch production tubing 90P1, producer well sub-branch production tubing 90P2 (not shown), one or a plurality of location orientation device(s) used for the purpose of determining the location of one component contained within the producer well production tubing 90P, producer well branch production tubing 90P1, producer well sub-branch production tubing 90P2 (not shown), relative to another, one or a plurality of accessory device(s) used for the purpose of placing and/or location orientation for other devices that may measure fluid properties, pressure, temperature, flow rate or other desired fluid flow and/or zone parameters or for other purposes and/or devices that may be required and/or desired within the producer well production tubing 90P, producer well branch production tubing 90P1, producer well sub-branch production tubing 90P2 (not shown), from time-to-time, prevent or restrict fluid flow from within the producer well production tubing 90P, producer well branch production tubing 90P1, producer well sub-branch production tubing 90P2 (not shown), one or more heat transfer bodies 1300 (not shown), used for the purpose of transferring heat originating from heat sources within the earth, heat transferred from heat sources within the earth to heat transfer bodies that may comprise a producer well external casing completion assembly 80P, producer well branch external casing completion assembly 80P1, producer well sub-branch external casing completion assembly 80P2, or any combination thereof, to fluid flowing within the producer well production tubing 90P, producer well branch production tubing 90P1, producer well sub-branch production tubing 90P2 (not shown), which may then be used for energy production, and/or any other component which may compose a conduit assembly, one or a plurality of safety devices used for the purpose of pressure and/or fluid containment with a producer well production tubing 90P, producer well branch production tubing 90P1, producer well sub-branch production tubing 90P2 (not shown), components for any other purpose, or any combination thereof, which may comprise a producer well production tubing 90P, producer well branch production tubing 90P1, producer well sub-branch production tubing 90P2 (not shown), and are known to those skilled in the art and used for the purpose of producing fluid, isolating, restricting and/or diverting flow, measuring fluid and/or zone parameters, providing a flow path for fluids, contained within one or a plurality of subterranean zone(s), strata, or reservoir(s), and provide a method of coproducing thermal production 10-T and/or non-thermal production 10, for the purpose of energy production whereby, said assembly when composed, may comprise a producer well production tubing 90P, producer well branch production tubing 90P1, producer well sub-branch production tubing 90P2 (not shown) whereby, said assembly is deployed from the surface, facilitated by an assembly designed for well internal completion assemblies from the surface of the earth 5, that may be defined as a rig, drilling rig, completion rig, workover rig, hydraulic workover unit, or any device known to those skilled in the art and used for the purpose of a producer well production tubing 90P, producer well branch production tubing 90P1, producer well sub-branch production tubing 90P2 (not shown), deployment within a producer well external casing completion assembly 80P, producer well branch external casing completion assembly 80P1, producer well sub-branch external casing completion assembly 80P2 (not shown), or any combination thereof.

FIG. 42 illustrates a section of injection well 1 1020 intersecting non-thermal Zone A 40B, 40A and continuing to an undisclosed thermal zone not shown whereby, injection well 1 1020 comprises a vertical parent borehole 140 and extending from parent borehole 140 is horizontal child borehole 140*a*. Comprised within each borehole are injection well external casing completion assembly 80I within parent borehole 140, and injection well branch external casing completion assembly 80I1 within child borehole 140*a*, respectively, which are joined together by injection well casing completion branch junction 80IJ1 whereby, bonding system 81 bonds together components within each respective borehole, to the borehole, and the borehole/zone interface. Comprised within injection well external casing completion assembly 80I, is an internal conduit, injection well internal completion assembly 901, which may also be defined as injection well injection tubing 901, and within injection well branch external casing completion assembly 80I1 is an internal conduit, injection well branch internal completion assembly 9011, which may also be defined as injection well branch injection tubing 9011, and is joined together with injection well internal completion assembly 901, by injection well branch internal completion assembly junction 90IJ1. Injection well injection tubing 901, injection well branch injection tubing 9011, injection well sub-branch injection tubing 9012 (not shown), or any combination thereof, may comprise one or a plurality of internal completion assembly sealing devices 130, or packer(s), known to those skilled in the art, and deployed as a component attached to Injection well injection tubing 901, injection well branch injection tubing 9011, injection well sub-branch injection tubing 9012 (not shown), or any combination thereof, and used for the purpose of isolating fluid flow that may exist within a injection well external casing completion assembly 80I within parent borehole 140, injection well branch external casing completion assembly 80I1 within child borehole 140*a*, injection well sub-branch external casing completion assembly 80I2 (not shown) within child sub-branch borehole 140*a-sb* (not shown), or any combination thereof, one or a plurality of internal completion assembly flow-through sealing device(s) 132, deployed as a component attached to injection well injection tubing 901, injection well branch injection tubing 9011, injection well sub-branch injection tubing 9012 (not shown), or any combination thereof, and used for the purpose of fluid flow control through a sealing device within a injection well external casing completion assembly 80I, injection well branch external casing completion assembly 80I1, injection well sub-branch external casing completion assembly 80I2 (not shown), or any combination thereof, one or more flow control device(s) 83 (not shown), which may prevent, restrict, or provide fluid flow entry from within the injection well external casing completion assembly 80I, injection well branch external casing completion assembly 80I1, injection well sub-branch external casing completion assembly 80I2 (not shown), or any combination thereof, into to injection well injection tubing 901, injection well branch injection tubing 9011, injection well sub-branch injection tubing 9012 (not shown), or any combination thereof, and/or to prevent, restrict, or provide fluid flow within to injection well injection tubing 901, injection well branch injection tubing 9011, injection well sub-branch injection tubing 9012 (not shown), or any combination thereof, one or a plurality of location orientation device(s) used for the purpose of determining the location of one component contained within the injection well injection tubing 901, injection well branch injection tubing 9011, injection well sub-branch injection tubing 9012 (not shown), relative to another, one or a plurality of accessory device(s) used for the purpose of placing and/or location orientation for other devices that may measure fluid properties, pressure, temperature, flow rate or other desired fluid flow and/or zone parameters or for other purposes and/or devices that may be required and/or desired within the injection well injection tubing 901, injection well branch injection tubing 9011, injection well sub-branch injection tubing 9012 (not shown), or any combination thereof, from time-to-time, prevent or restrict fluid flow from within the injection well injection tubing 901, injection well branch injection tubing 9011, injection well sub-branch injection tubing 9012 (not shown), or any combination thereof, one or more heat transfer bodies 1300 (not shown), used for the purpose of transferring heat originating from heat sources within the earth, heat transferred from heat sources within the earth to heat transfer bodies that may comprise a injection well injection tubing 901, injection well branch injection tubing 9011, injection well sub-branch injection tubing 9012 (not shown), or any combination thereof, to fluid flowing within the injection well injection tubing 901, injection well branch injection tubing 9011, injection well sub-branch injection tubing 9012 (not shown), which may then be used for energy production, and/or any other component which may comprise a injection well conduit assembly, one or a plurality of safety devices used for the purpose of pressure and/or fluid containment with a to injection well injection tubing 901, injection well branch injection tubing 9011, injection well sub-branch injection tubing 9012 (not shown), or any combination thereof, components for any other purpose which may comprise injection well injection tubing 901, injection well branch injection tubing 9011, injection well sub-branch injection tubing 9012 (not shown), or any combination thereof, and are known to those skilled in the art and used for the purpose of injecting fluid, isolating, restricting and/or diverting injection flow, measuring fluid and/or zone parameters, providing a flow path for fluids, contained within one or a plurality of subterranean zone(s), strata, or reservoir(s), and provide a method of co-injecting non-thermal injection zone fluid 11 back into one or a plurality of non-thermal zone(s) and thermal injection zone fluid 11-T back into a thermal zone, for the purpose of energy production whereby, said assembly when composed, may comprise injection well injection tubing 901, injection well branch injection tubing 9011, injection well sub-branch injection tubing 9012 (not shown), or any combination thereof whereby, injection tubing and components comprising an injection well tubing assembly are deployed from the surface, facilitated by an assembly designed for well internal completion assemblies from the surface of the earth 5, that may be defined as a rig, drilling rig, completion rig, workover rig, hydraulic workover unit, or any device known to those skilled in the art and used for the purpose of injection well injection tubing 901, injection well branch injection tubing 9011, injection well sub-branch injection tubing 9012 (not shown), or any combination thereof, deployment within a injection well external casing completion assembly 80I, injection well branch external casing completion assembly 80I1, injection well sub-branch external casing completion assembly 80I2 (not shown), or any combination thereof, according to embodiments of the present disclosure.

Figures 43, 44, 45:
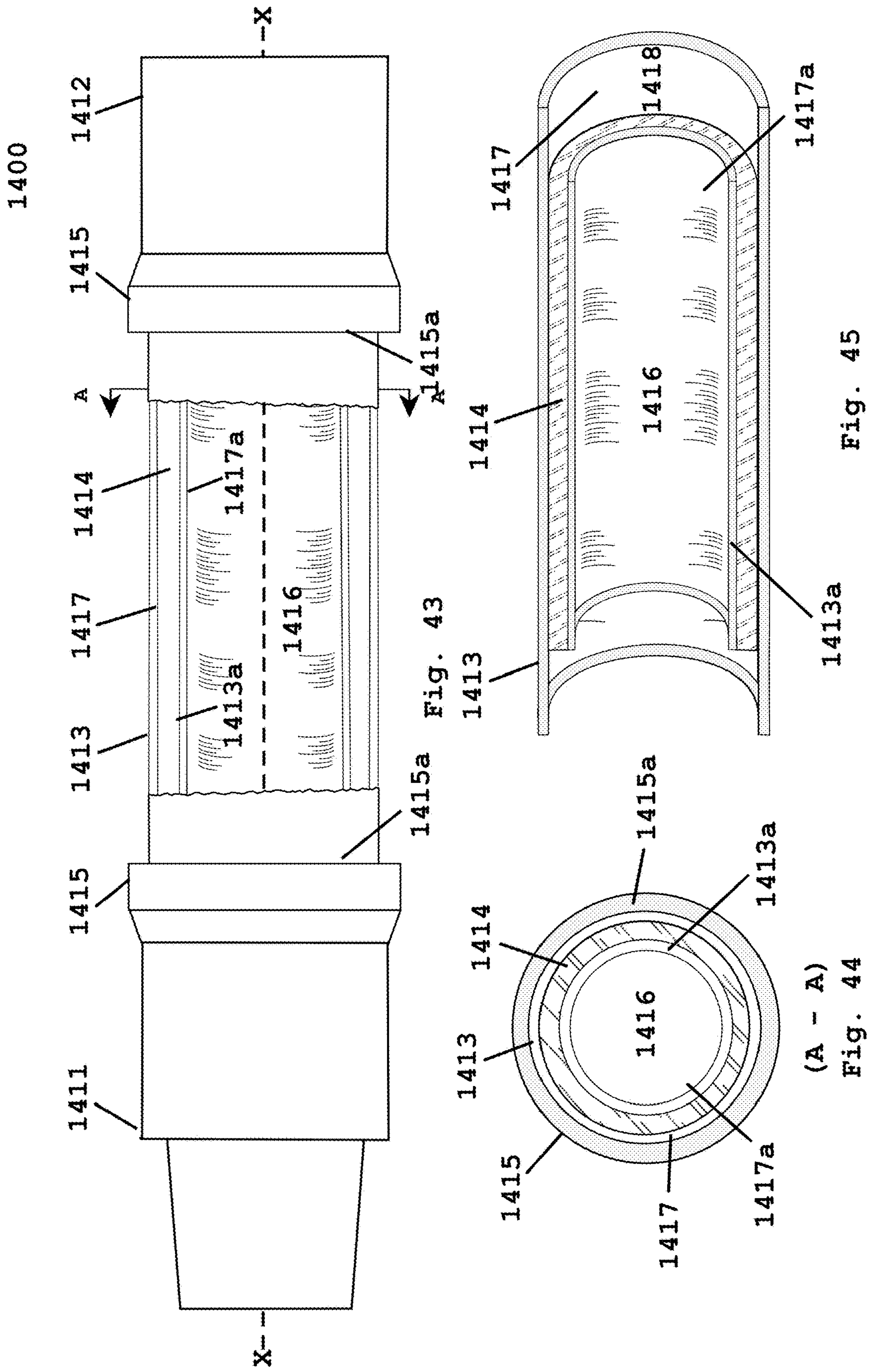
FIG. 43 depicts a partial front cross-sectional view of a primary thermal insulated device, according to an embodiment of the present disclosure.
FIG. 44 depicts an elevation cross-sectional view (Section A-A) for the primary thermal insulated device shown in FIG. 43, according to an embodiment of the present disclosure.
FIG. 45 depicts a side cross-sectional view for an external thermal insulated main body comprising an internal main body for the primary thermal insulated device shown in FIG. 43, according to an embodiment of the present disclosure.
Figures 46, 47:
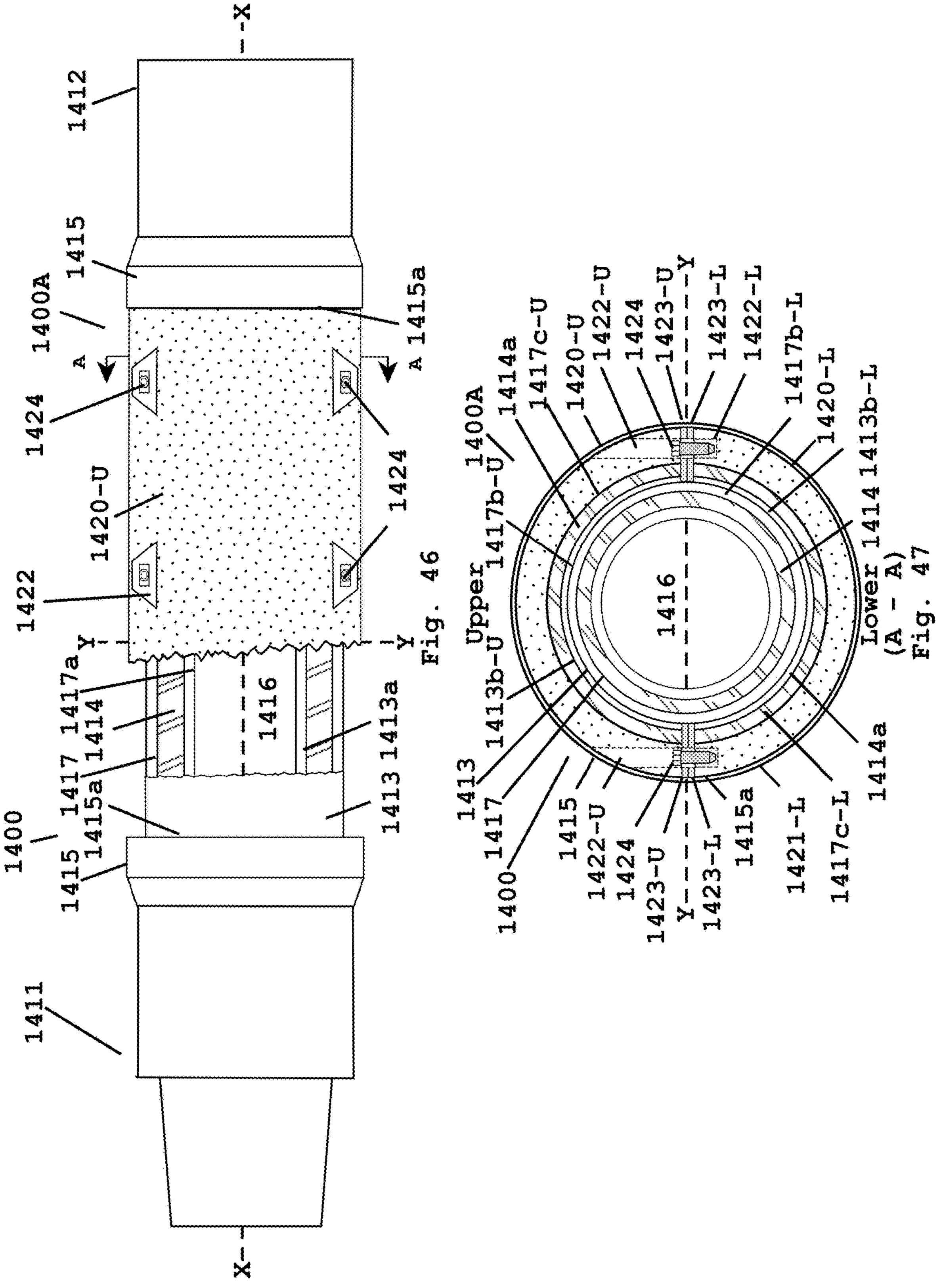
FIG. 46 depicts a partial side cross-sectional view for the primary thermal insulated device shown in FIG. 43 with a secondary thermal insulated body member attached, according to an embodiment of the present disclosure.
FIG. 47 depicts an elevation cross-sectional view (Section A-A of FIG. 46) for the primary thermal insulated device shown in FIG. 43 with a secondary thermal insulated body member attached, according to an embodiment of the present disclosure.

FIGS. 43-47 FIG. illustrate embodiments of the present disclosure depicting various views of primary thermal insulated body 1400, which may also comprise secondary thermal insulated body 1400A described in FIG. 46 and FIG. 47, extending out radially from longitudinal center axis X-X. The terms "internal, inner and internally" denote elements that are radially closest to longitudinal axis X-X and conversely, the terms "external, outside and externally" denote elements furthest radially from longitudinal axis X-X. FIG. 43 depicts a partial cross-section side elevation view of primary thermal insulated body 1400, extending out radially from longitudinal center axis X-X comprising thermal insulated external main body 1413, being a primary outer conduit body, thermal insulated external main body interior face 1417, and thermal insulated external main body bore 1418 (not shown), extending from the upper lateral end to the lower lateral end longitudinally within primary thermal insulated body 1400, which encompass upper longitudinal end joining member 1412, lower longitudinal end joining member 1411 and secondary insulator retention flange 1415 with secondary insulator retention flange face 1415*a*, located at each lateral end of thermal insulated external main body 1413 fused or attached to thermal insulated external main body 1413. Comprised within thermal insulated external main body bore 1418 (not shown), extending from the upper lateral end to the lower lateral end of thermal insulated external main body 1413, is thermal insulated internal main body 1413*a*, being a primary inner conduit body with thermal insulated internal main body interior face 1417*a*, and thermal insulated internal main body bore 1416 whereby, thermal insulated internal main body bore 1416 is the flow passage for fluid through primary thermal insulated body 1400 thermal insulated internal main body bore 1416 is the flow passage for fluid through primary thermal insulated body 1400 encompassing upper longitudinal end joining member 1412 and lower longitudinal end joining member 1411. Comprised within the annular space created by thermal insulated external main body 1413 and thermal insulated internal main body 1413*a*, extending from the upper lateral end to the lower lateral end of thermal insulated external main body 1413 from thermal insulated external main body interior face 1417 to the exterior face of thermal insulated internal main body 1413*a*, is main body insulator 1414 whereby, main body insulator 1414 is comprised of materials used for the purpose thermal insulation whereby, main body insulator 1414 material may include: Yttria-stabilized zirconia (YSZ) ceramic material, aerogel/fibrous ceramic composite materials that may comprise mullite fibers and $ZrO_2$—$SiO_2$ components that may be aerogels, $ZrBr_2$—ZrC nanofiber material that may be an aerogel, ceramic silica-based materials that may be an aerogel, hexagonal boron nitride materials that may be an aerogel, polyacrylonitrile (PAN) based carbon fiber materials that may comprise poly(methyl methacrylate) (PMMA) and/or silica nanoparticles (SNP) materials, low-density, low thermal conductivity rayon-based carbon fiber material, carbon fiber-reinforced carbon composite (C/C) materials that may contain phenolic resin, any low thermal conductivity materials that may comprise resins for the purpose of developing low thermal conductivity composite material that may include phenolic resins, any other low thermal conductivity materials defined as thermal barrier materials and/or coatings known to those skilled in the art whereby, thermal conductivity is equal to or lower than 6 W/mK, and is designed for exposure to temperatures ranging from an ambient surface temperature of −90° C. through a subsurface temperature of 3,700° C., or any combination thereof, materials used for the purpose of fluid heat insulation, and thermal insulated external main body 1413 is comprised of materials which may provide structural integrity for main body insulator 1414, providing a barrier from fluids, pressure, and/or other components which may damage, reduce or eliminate thermal insulation properties for insulator materials which may result from exposure to fluids, pressure, and/or other damaging components which may originate from one or a plurality of subterranean zone(s). Components comprising primary thermal insulated body 1400 and/or main body insulator 1414 may include any of the aforementioned materials used for the purpose of fluid heat insulation, according to an embodiment of the present disclosure.

FIG. 44 depicts an elevation view of primary thermal insulated body 1400 cross-section A-A, illustrated in FIG. 43. This view shows thermal insulated external main body 1413, being a primary outer conduit body, with thermal insulated internal main body interior face 1417*a*, main body insulator 1414 comprised within thermal insulated internal main body interior face 1417*a* and thermal insulated internal main body 1413*a* exterior surface, thermal insulated internal main body 1413*a* comprising thermal insulated internal main body bore 1416, secondary insulator retention flange 1415, comprising secondary insulator retention flange face 1415*a* whereby, secondary insulator retention flange 1415 is used for the purpose of supporting secondary thermal insulated body 1400A (not shown) whereby, each lateral end of secondary thermal insulated body 1400A (not shown) is contained within and supported by the surface created by secondary insulator retention flange face 1415*a* extending radially around thermal insulated external main body 1413 and acting as a supporting member for the upper end and lower end of secondary thermal insulated body 1400A (not shown) and whereby, secondary insulator retention flange 1415 acts as a stand-off device preventing secondary thermal insulated body 1400A (not shown) exterior surface contact by the interior surface of a conduit or casing during deployment within a well, according to an embodiment of the present disclosure.

FIG. 45 depicts a partial cross-section side elevation view of thermal insulated external main body 1413, being a primary outer conduit body, thermal insulated external main body interior face 1417, and thermal insulated external main body bore 1418, extending from the upper lateral end to the lower lateral end longitudinally within primary thermal insulated body 1400, and comprised within thermal insulated external main body bore 1418, extending from the upper lateral end to the lower lateral end of thermal insulated external main body 1413, is thermal insulated internal main body 1413*a*, being a primary inner conduit body with thermal insulated internal main body interior face 1417*a*, and thermal insulated internal main body bore 1416 whereby, thermal insulated internal main body bore 1416 is the flow passage for fluid through primary thermal insulated body 1400 and extending from thermal insulated external main body interior face 1417 within the annular space created by thermal insulated external main body bore 1418 and thermal insulated internal main body 1413*a*, is main body insulator 1414.

FIG. 46 is an embodiment of the present disclosure depicting a partial cross-section side elevation view of secondary thermal insulated body 1400A extending out radially from longitudinal center axis X-X, comprising upper external shell body member 1420-U and lower external shell body member 1420-L (not shown), being two equal semi-circular cylindrical halves whereby, upper external shell body member 1420-U is positioned above lateral center axis Y-Y and lower external shell body member 1420-L (not shown) is positioned below lateral center axis Y-Y, with each respective shell body member being equal one to the other, attached together with upper mating plate 1423-U (not shown) located on each longitudinal side of, upper external shell body member 1420-U, attached to lower mating plate 1423-L (not shown) located on each longitudinal side of lower external shell body member 1420-L (not shown), by a plurality of body member attachment bolt(s) 1424, positioned and spaced equally on each longitudinal side of upper external shell body member 1420-U, mated to lower external shell body member 1420-L, facilitated by body member bolt bore mating threads 1422 (not shown) comprised within lower external shell body member 1420-L (not shown), positioned on each longitudinal side of lower external shell body member 1420-L (not shown) spaced equally to permit attachment by a plurality of body member attachment bolt(s) 1424 whereby, secondary thermal insulated body 1400A, is attached to primary thermal insulated body 1400 in some applications, as a component of primary thermal insulated body 1400, around the external diameter of thermal insulated external main body 1413, positioned from the secondary insulator retention flange face 1415*a* on secondary insulator retention flange 1415 located at the upper lateral end to the secondary insulator retention flange face 1415*a* on secondary insulator retention flange 1415 at the lower lateral end of thermal insulated external main body 1413, according to an embodiment of the present disclosure.

FIG. 47 depicts an elevation view of cross-section A-A illustrated in FIG. 46 depicting secondary thermal insulated body 1400A as an external attachment body positioned around the external circumferential surface of thermal insulated external main body 1413, comprising a primary outer conduit body of primary thermal insulated body 1400. In this view secondary thermal insulated body 1400A extends out radially from longitudinal center axis X-X (not shown), comprising upper external shell body member 1420-U and lower external shell body member 1420-L, being two equal semi-circular cylindrical halves comprising secondary thermal insulated internal main body bore 1426 (not shown) whereby, upper external shell body member 1420-U is positioned above lateral center axis Y-Y and lower external shell body member 1420-L is positioned below lateral center axis Y-Y, with each respective shell body member being equal, one to the other, comprising a diameter slightly smaller than the diameter of secondary insulator retention flange 1415 comprised as a component of thermal insulated external main body 1413, and with a length slightly smaller than the length between secondary insulator retention flange 1415 at the upper longitudinal end and secondary insulator retention flange 1415 at the lower longitudinal end comprised as components of thermal insulated external main body 1413, and secondary thermal insulated internal upper main body 1413*b*-U with secondary thermal insulated internal upper main body interior face 1417*b*-U and secondary thermal insulated internal lower main body 1413*b*-L with secondary thermal insulated internal lower main body interior face 1417*b*-L for upper external shell body member 1420-U and lower external shell body member 1420-L, respectively, comprising secondary thermal insulated internal main body bore 1426 (not shown), equally divided with secondary thermal insulated internal main body upper bore section 1426-U (not shown), above lateral center axis Y-Y, and secondary thermal insulated internal main body lower bore section 1426-L (not shown), below lateral center axis Y-Y whereby, secondary thermal insulated internal main body bore 1426 (not shown) inner diameter is approximately equal to the external diameter of thermal insulated external main body 1413. Fused to each longitudinal edge of secondary thermal insulated internal upper main body 1413*b*-U, positioned perpendicular to lateral center axis Y-Y with a length slightly smaller than the length between secondary insulator retention flange 1415 at the upper longitudinal end and secondary insulator retention flange 1415 at the lower longitudinal end of thermal insulated external main body 1413, is upper mating plate 1423-U, extending out and fused to the external longitudinal edge of upper external shell body member 1420-U along the longitudinal length of upper external shell body member 1420-U whereby, upper mating plate 1423-U comprises a plurality of equally spaced boreholes penetrating the thickness of upper mating plate 1423-U and located centrally along the longitudinal center axis of upper mating plate 1423-U with each borehole sized with a diameter to permit penetration by body member attachment bolt 1424. Extending from the upper exterior surface of upper mating plate 1423-U to the exterior surface of upper external shell body member 1420-U are a plurality of upper shell body member attachment bolt penetration(s) 1422-U, positioned directly above each borehole penetration comprised within upper mating plate 1423-U which may be of any shape whereby, the shape and shape size facilitate installation of body member attachment bolt 1424 into the borehole penetration comprised within upper mating plate 1423-U. Fused to each longitudinal edge of secondary thermal insulated internal lower main body 1413*b*-L, positioned perpendicular to lateral center axis Y-Y with a length slightly smaller than the length between secondary insulator retention flange 1415 at the upper longitudinal end and secondary insulator retention flange 1415 at the lower longitudinal end of thermal insulated external main body 1413, is lower mating plate 1423-L, extending out and fused to the external longitudinal edge of lower external shell body member 1420-L along the longitudinal length of lower external shell body member 1420-L whereby, lower mating plate 1423-L comprises a plurality of equally spaced boreholes penetrating the thickness of upper mating plate 1423-L and located centrally along the longitudinal center axis of lower mating plate 1423-L with each borehole sized with a diameter to permit penetration by body member attachment bolt 1424 whereby, lower mating plate 1423-L aligns exactly with upper mating plate 1423-U whereby, when upper external shell body member 1420-U is attached to primary thermal insulated body 1400 above lateral center axis Y-Y, and lower external shell body member 1420-L is attached to primary thermal insulated body 1400 below above lateral center axis Y-Y, the two opposing bodies are aligned exactly with the lower face of upper mating plate 1423-U positioned on the upper face of lower mating plate 1423-L with the plurality of boreholes on each respective mating plate exactly aligned. Aligned exactly with the plurality of boreholes penetrating through upper mating plate 1423-U and lower mating plate 1423-L respectively, penetrating into the upper face of lower external shell body member 1420-L, are a plurality of lower shell body member attachment bolt penetration(s) 1422-L, extending to a depth whereby, when body member attachment bolt 1424, comprising a certain length, is rotated to engage mating threads comprised within lower shell body member attachment bolt penetration(s) 1422-L and upon body member attachment bolt 1424 being positioned on the upper surface of upper mating plate 1423-U, lower shell body member attachment bolt penetration(s) 1422-L length facilitates engagement of the entirety of threads comprising body member attachment bolt 1424, facilitating a connection and attachment of upper external shell body member 1420-U to lower external shell body member 1420-L. Comprised within the annular space created external to upper external shell body member interior face 1417*c*-U and internal to secondary thermal insulated internal upper main body 1413*b*-U for upper external shell body member 1420-U and within the annular space created external to lower external shell body member interior face 1417*c*-L and internal to secondary thermal insulated internal lower main body 1413*b*-L for lower external shell body member 1420-L, respectively, is secondary body insulator 1414*a* whereby, upper external shell body member 1420-U, lower external shell body member 1420-L and thermal insulated external main body 1413 are comprised of materials which may provide structural integrity for secondary body insulator 1414*a* and main body insulator 1414, respectively, providing a barrier from fluids, pressure, and/or other components which may damage, reduce or eliminate thermal insulation properties for insulator materials which may result from exposure to fluids, pressure, and/or other damaging components which may originate from one or a plurality of subterranean zone(s), strata, or reservoir(s), and as described for main body insulator 1414, secondary body insulator 1414*a* may be comprised of materials used for the purpose thermal insulation and may include: Yttria-stabilized zirconia (YSZ) ceramic material, aerogel/fibrous ceramic composite materials that may comprise mullite fibers and $ZrO_2$—$SiO_2$ components that may be aerogels, $ZrBr_2$—ZrC nanofiber material that may be an aerogel, ceramic silica-based materials that may be an aerogel, hexagonal boron nitride materials that may be an aerogel, polyacrylonitrile (PAN) based carbon fiber materials that may comprise poly(methyl methacrylate) (PMMA) and/or silica nanoparticles (SNP) materials, low-density, low thermal conductivity rayon-based carbon fiber material, carbon fiber-reinforced carbon composite (C/C) materials that may contain phenolic resin, any low thermal conductivity materials that may comprise resins for the purpose of developing low thermal conductivity composite material that may include phenolic resins, any other low thermal conductivity materials defined as thermal barrier materials and/or coatings known to those skilled in the art whereby, thermal conductivity is equal to or lower than 6 W/mK, and is designed for exposure to temperatures ranging from an ambient surface temperature of −90° C. through a subsurface temperature of 3,700° C., or any combination thereof, materials used for the purpose of fluid heat insulation, according to an embodiment of the present disclosure. As disclosed in FIGS. 43-47 primary thermal insulated body 1400 and secondary thermal insulated body 1400A component insulation is facilitated by a pipe-in-pipe configuration comprising and inner conduit body defined as thermal insulated internal main body 1413*a*, internal to an external conduit body defined as thermal insulated external main body 1413, comprising main body insulator 1414 and secondary body insulator 1414*a* as a primary and secondary insulation component material, respectively, internal to thermal insulated external main body, and external to thermal insulated internal main body whereby, main body insulator 1414 and/or secondary body insulator 1414*a* material may include: Yttria-stabilized zirconia (YSZ) ceramic material, aerogel/fibrous ceramic composite materials that may comprise mullite fibers and $ZrO_2$—$SiO_2$ components that may be aerogels, $ZrBr_2$—ZrC nanofiber material that may be an aerogel, ceramic silica-based materials that may be an aerogel, hexagonal boron nitride materials that may be an aerogel, polyacrylonitrile (PAN) based carbon fiber materials that may comprise poly(methyl methacrylate) (PMMA) and/or silica nanoparticles (SNP) materials, low-density, low thermal conductivity rayon-based carbon fiber material, carbon fiber-reinforced carbon composite (C/C) materials that may contain phenolic resin, any low thermal conductivity materials that may comprise resins for the purpose of developing low thermal conductivity composite material that may include phenolic resins, any other low thermal conductivity materials defined as thermal barrier materials and/or coatings known to those skilled in the art whereby, thermal conductivity is equal to or lower than 6 W/mK, and is designed for exposure to temperatures ranging from an ambient surface temperature of −90° C. through a subsurface temperature of 3,700° C., or any combination thereof, materials used for the purpose of fluid heat insulation. A pipe-in-pipe configuration comprising an inner conduit body, thermal insulated internal main body, internal to an external conduit body, thermal insulated external main body, comprising main body insulator 1414 as a primary insulation component material internal to thermal insulated external main body, and external to thermal insulated internal main body, may facilitate configuration of any component body or be comprised as a component of any assembly whereby, high thermal resistance is desired for a heat carrier to minimize loss of thermal energy within the heat carrier to any other material, and/or to the surrounding environment, which may include producer well production tubing 90P whereby, when comprised according to the aforementioned description, the component designation becomes producer well thermal production tubing 90P-T, production flowline 22 becomes thermal production flowline 22-T, and components of fluid gathering and combination system 700 become thermal fluid gathering and combination system 700-T whereby, each component comprising fluid gathering and combination system 700 and fully described by U.S. application Ser. No. 17/718,391 filed Apr. 12, 2022, may comprise a pipe-in-pipe configuration with an inner conduit body, defined as thermal insulated internal main body, internal to an external conduit body, defined as thermal insulated external main body, comprising main body insulator 1414 as a primary insulation component material internal to a thermal insulated external main body, and external to thermal insulated internal main body, whereby when comprised accordingly, main body assembly 200A becomes thermal main body assembly 200A-T, main body left lateral side junction adapter 290, becomes thermal main body left lateral side adapter 290-T, main body right lateral side junction adapter 320 becomes thermal main body right lateral side junction adapter 320-T, lateral body section assembly 350A, becomes thermal lateral body section assembly 350A-T, straight body 440 becomes thermal straight body 440-T, 90° elbow fitting 460 becomes 90° thermal elbow fitting 460-T, and so on, for each component comprised within fluid gathering and combination system 700 whereby, with each component comprising a pipe-in-pipe configuration with an inner conduit body, defined as thermal insulated internal main body, internal to an external conduit body, defined as thermal insulated external main body, comprising main body insulator 1414 as a primary insulation component material internal to a thermal insulated external main body, and external to thermal insulated internal main body, fluid gathering and combination system 700 becomes thermal fluid gathering and combination system 700-T and external to each primary thermal body, comprised as an attachment for each respective component, each component may also comprise a secondary thermal insulator 1414*a* configured accordingly whereby, secondary thermal insulated body configuration may comprise a shape consistent with each respective primary thermal body and be comprised within a secondary insulator retention flange 1415 at the upper longitudinal end and secondary insulator retention flange 1415 at the lower longitudinal end for each respective primary thermal body configured, to facilitate attachment of a secondary thermal insulated body to a primary thermal insulated body, according to embodiments of the present disclosure.

FIG. 48 depicts a plan view of a plurality of well systems, non-thermal fluid gathering and combination system 700 and thermal fluid gathering and combination system 700-T whereby, wells flowing non-thermal production 10 flow into non-thermal fluid gathering and combination system 700 and wells flowing thermal production 10-T flow into thermal fluid gathering and combination system 700-T and each respective system comprises a system of pipes which may combine fluid from a plurality of wells, that may include wells flowing non-thermal production 10 and wells flowing thermal production 10-T, originating from one or a plurality of subterranean zone(s), strata, or reservoir(s), according to embodiments of the present disclosure. The well system comprises a plurality of wells, well 1, well 2, well 3, etc., for any number of wells, with a producer well 1 and producer well 2 depicted, including well tree 20, designated as producer well 1 20 and producer well 2 20A, respectively, well tree casing valve 20-*c*, non-thermal fluid inlet line or non-thermal production flowline 22 and well tree thermal production valve 20-*tp*, thermal inlet fluid line or thermal production flowline 22-T. The illustration describes a fluid path facilitating coproducing non-thermal flow or non-thermal production 10 together with thermal flow or thermal production 10-T whereby, non-thermal production 10 departs through well tree casing valve 20-*c* and thermal production 10-T departs through well tree thermal production valve 20-*tp* with direction shown by the included arrows in the illustration. From the well(s), non-thermal production 10 flows from well tree casing valve 20-*c* into non-thermal fluid inlet line or non-thermal production flowline 22, attached to well tree casing valve 20-*c*, and thermal production 10-T flows from well tree casing valve 20-*tp* into thermal fluid inlet line or thermal production flowline 22-T, attached to well tree casing valve 20-*tp*, and further whereby, non-thermal production 10 flows into the lateral body assembly 350A, designated for non-thermal production 10 and thermal production 10-T flows into thermal lateral body assembly 350A-T whereby, fluid flow from individual wells are gathered and combined, flowing further into main body assembly 200A, designated for non-thermal production 10 and into thermal main body assembly 200A-T, designated for thermal production 10-T whereby, the combined non-thermal production 10 flowing through straight body assembly 440A, designated for non-thermal production 10, making a directional turn in 90° elbow fitting 460, continuing further to Phase 3 and the combined thermal production 10-T flowing through straight body assembly 440A, designated for thermal production 10-T, making a directional turn in 90° thermal elbow fitting 460-T, continuing further to Phase 3.

Figure 49:
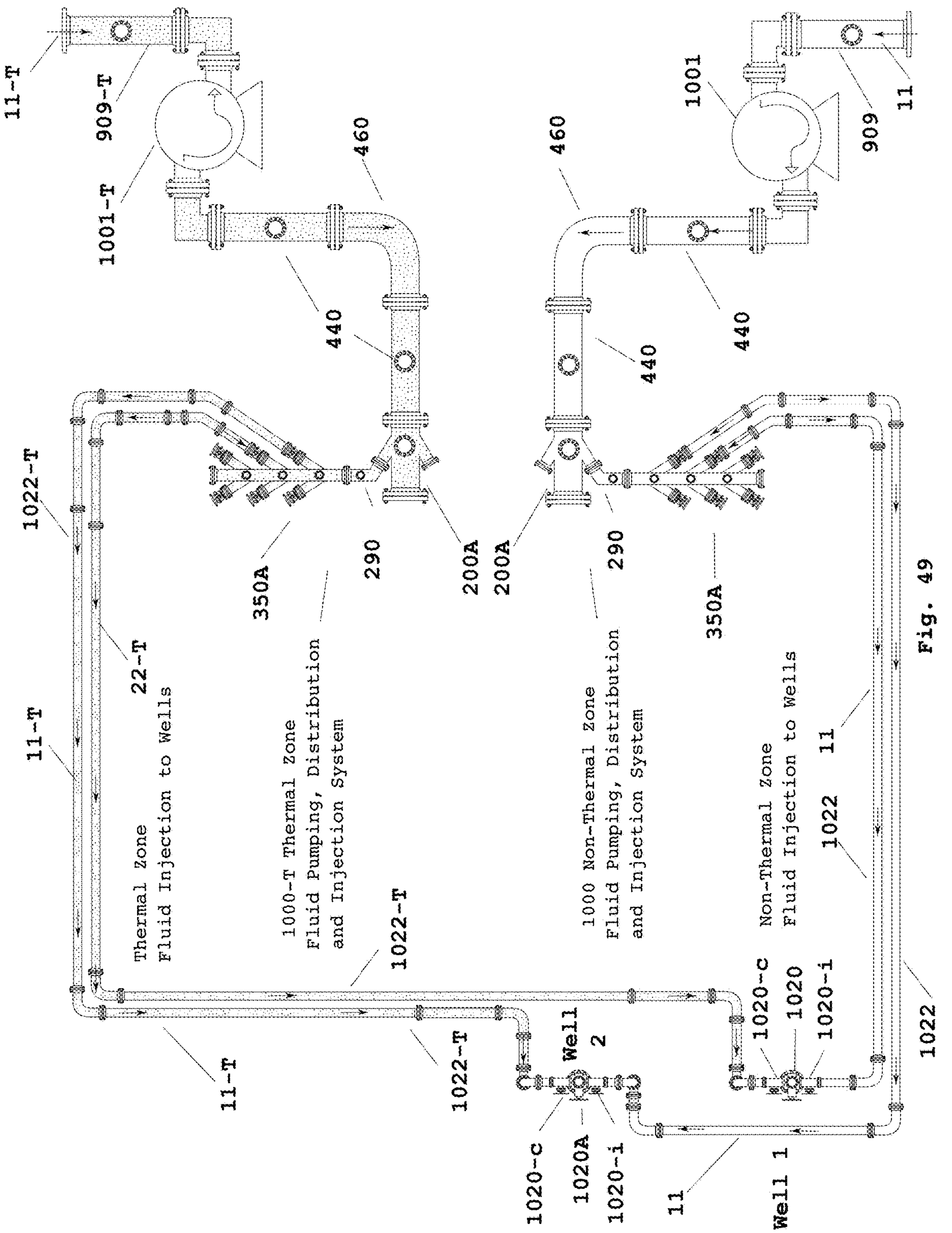
FIG. 49 depicts a plan view of a non-thermal and thermal well system, fluid pumping, distribution and injection system 1000 and 1000-T, respectively, facilitating co-injection of thermal and non-thermal fluid back into non-thermal and thermal zones for the purpose of cogenerating electricity from kinetic energy and thermal energy, kinetic energy and chemical energy, kinetic energy and other energy, from produced fluids in subterranean zones, strata, or reservoirs, according to embodiments of the present disclosure.

FIG. 49 depicts a plan view of a plurality of well systems, non-thermal zone pumping, distribution and injection system 1000 and thermal zone pumping, distribution and injection system 1000-T whereby, fluid injected into non-thermal zones, non-thermal zone injection fluid 11, flow into Non-Thermal Zone Pumping, Distribution and Injection System 1000 and fluid injected into thermal zones, thermal zone injection fluid 11-T, flow into Thermal Zone Pumping, Distribution and Injection System 1000-T and each respective system comprises a system of pipes which may facilitate injection back into originating zones whereby, fluid which may originate from one or a plurality of non-thermal zones, produced to the surface may be injected back into to originating zones and fluid which may originate from one or a plurality of thermal zones, produced to the surface may be injected back into the originating thermal zones, according to embodiments of the present disclosure. Depicted is a two well example illustrating the flow path of a fluid comprising primarily water exiting Phase 4—Fluid Processing, discharged from tank 908 (not shown) into outlet suction line 909 for fluid injection into non-thermal zones, pumped with non-thermal zone injection pump 1001 discharged into straight body 440, into 90° elbow fitting 460, being pumped further into main body assembly 200A where it is discharged into lateral body assembly 350A, further into non-thermal injection flow line 1022, into injection well tree tubing valve 1020-*i* where it is discharged into individual well non-thermal injection tubing 901 intersecting one or a plurality of non-thermal zones for injection and subsequent production again and discharged from tank 908 (not shown) into outlet suction line 909-T for fluid injection into thermal zones, pumped with thermal zone injection pump 1001-T discharged into straight body 440, into 90° elbow fitting 460, being pumped further into main body assembly 200A where it is discharged into lateral body assembly 350A further into thermal injection flow line 1022-T, into injection well tree casing valve 1020-*c* where it is discharged into the annular space external to non-thermal injection tubing 901 for individual wells intersecting one or a plurality of thermal zones for injection and subsequent production again, according to embodiments of the present disclosure.

Figure 50:
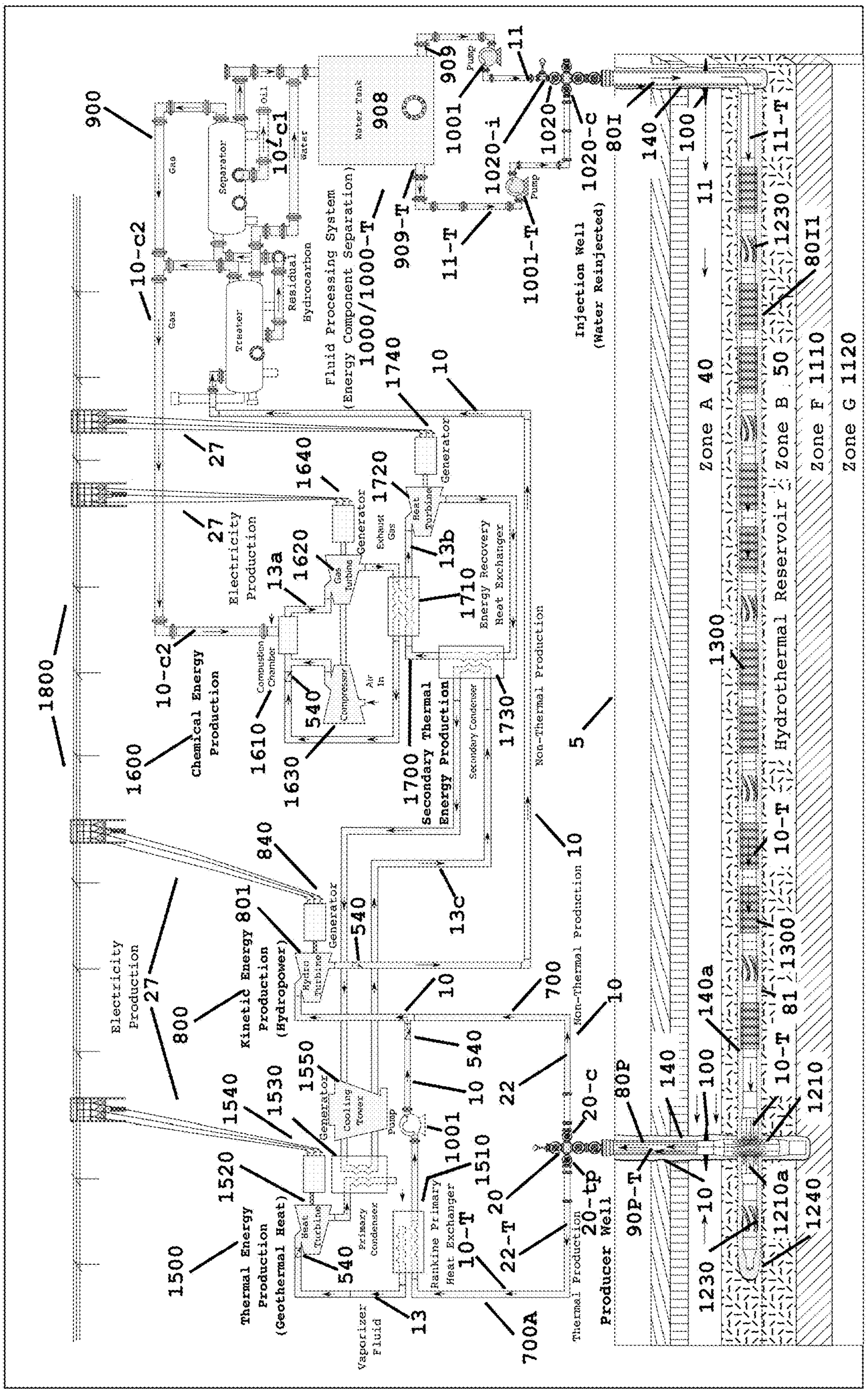
FIG. 50 depicts a process for cogenerating electricity from thermal energy, kinetic energy, chemical energy, secondary thermal recovery energy and other energy derived from energy generation components which may be comprised within produced fluids originating in subterranean zones, strata, or reservoirs, according to embodiments of the present disclosure.

FIG. 50 depicts a side view of Energy Production Facility 1800 comprising processing and electricity generation apparatus in one location facilitating cogeneration of electricity from Kinetic Energy Generation System or Hydropower Electricity Generation System 800 together with Thermal Energy Generation System 1500, Chemical Energy Generation System 1600, Secondary Thermal Energy Generation System 1700, and/or any other energy generation system (not shown), or any combination thereof, derived from energy producing components contained in fluids originating from one or a plurality of subterranean zone(s), strata, or reservoir(s) and produced by a plurality of wells whereby, electricity 27 produced by Hydropower Electricity Generation System 800 may be derived from fluid comprising pressure and fluid flow, electricity production 27 generated by Thermal Energy Generation System 1500 may be derived from hydrothermal heat and/or geothermal heat sources, electricity production 27 generated by Chemical Energy Generation System 1600 may be derived from hydrocarbons which may include oil and/or natural gas, hydrogen components within fluid used for hydrogen energy production, a varying sodium chloride concentration in fluid used for osmotic energy production, electricity production 27 generated by Secondary Thermal Energy Generation System 1700 which may be derived from secondary heat sources facilitated by primary energy generation processes within energy production facility 1800, and electricity production 27 generated by any other energy generation system(s), or any combination thereof, facilitated by electricity generator 840 or kinetic energy electricity generator 840, together with electricity generation facilitated by thermal energy electricity generator 1540, chemical energy electricity generator 1640, secondary thermal energy generator 1740 or any combination thereof whereby, electricity production 27 is generated from kinetic energy (hydropower) and at least one or a plurality of other energy generation processes concurrently to coproduce electricity production 27 derived from Kinetic Energy Generation System or Hydropower Electricity Generation System 800 combined with any other energy electricity generation system comprising energy production facility 1800 where electricity production 27 may be generated. Illustrated is the coproduction fluid flow path beginning in Phase 1 Fluid Production whereby, non-thermal production 10 is produced together with thermal production 10-T originating from a one or a plurality of subterranean zones, strata, or reservoirs which may include non-thermal zone A 40 and thermal zone B 50 whereby, non-thermal zone A 40 comprising non-thermal production 10, may contain energy producing components which may include fluid flow, pressure, hydrocarbons, water, water comprising sodium chloride of varying concentrations, water comprising hydrogen, hydrocarbons comprising hydrogen, or any other energy producing components or any combination thereof, which may comprise non-thermal production 10, together with thermal production 10-T originating from thermal zone B 50, which may contain energy producing components comprising heat, fluid flow, pressure, hydrocarbons, water, water comprising sodium chloride of varying concentrations, water comprising hydrogen, hydrocarbons comprising hydrogen, hydrogen alone, or any other energy producing components or any combination thereof, which may comprise thermal production 10-T from one zone, and non-thermal production 10 from another zone whereby, for example, thermal production 10-T originating from thermal zone B 50 originates with thermal injection zone injection fluid 11-T from injection well 1 pumped from the surface of the earth 5 into a conduit, injection well external casing completion assembly 80I, comprised within injection well 1 to a joining conduit, branch external casing completion assembly 80I1, comprised within thermal Zone B 50 whereby, thermal heat energy comprising fluid and/or zone composition material within Zone B 50 are in contact with branch borehole 140*a* which includes a high thermally conductive bonding system 81 in contact with the zone and the conduit, branch external casing completion assembly 80I1, within branch borehole 140*a* whereby, the borehole, cement system and conduit are in communication with the heat source. Branch external casing completion assembly 80I1 may be comprised of one or a plurality of primary heat exchanger(s), heat transfer body 1300 whereby, heat energy is transferred from the heat source, through bonding system 81 to one or a plurality of primary heat exchanger(s), heat transfer body 1300, which facilitates a thermal energy transfer to heat carrier, thermal injection zone injection fluid 11-T, transitioning thermal zone injection fluid 11-T into thermal production 10-T whereby, thermal production 10-T flows into thermally insulated internal conduit, thermal production tubing 90P-T within producer well 1 20 to the surface of the earth 5 and non-thermal production 10 flows concurrently, thermally isolated from thermal production 10-T, within the annular space external to thermal production tubing 90P-T within producer well 1 20 to the surface of the earth 5 whereby, non-thermal production 10 is flowing separate from but together with thermal production 10-T within producer well 1 20, continuing on to Phase 2—Fluid Gathering and Combination, according to embodiments of the present disclosure. In Phase 2 Fluid Gathering and Combination, at the surface of the earth 5, non-thermal production 10 flows through well tree casing valve 20-*c* into non-thermal fluid gathering and combination system 700 where fluid from a plurality of wells producing non-thermal production 10 are gathered together into a system of pipes directing non-thermal production 10 to Hydropower Electricity Generation System 800 and thermal production 10-T flows through well tree thermal production valve 20-*tp* into thermal fluid gathering and combination system 700-T where fluid from a plurality of wells producing thermal production 10-T are gathered together into a system of pipes directing thermal production 10-T to Thermal Energy Electricity Generation System 1500, continuing on to Phase 3—Kinetic Energy/Thermal Energy Electricity Cogeneration, according to embodiments of the present disclosure. In Phase 3 Kinetic Energy/Thermal Energy Electricity Cogeneration, non-thermal production 10 flowing in non-thermal fluid gathering and combination system 700 is directed to Hydropower Electricity Generation System 800 comprising hydraulic turbine machine 801. Hydraulic turbine machine 801 may comprise any impulse or reaction turbine known to those skilled in the art which may include Pelton, Kaplan, Francis, Crossflow, any other reaction and/or impulse turbine, or any combination thereof, which may include a turbine rotor assembly attached to a turbine shaft, attached to kinetic energy electricity generator 840 whereby, non-thermal production 10 combined with pressure energy makes contact with the turbine rotor assembly transferring energy from the fluid to the rotor facilitating rotation whereby, turbine shaft rotation attached to kinetic energy electricity generator 840 generates electricity production 27. Concurrent with electricity production 27 generated by Hydropower Electricity Generation System 800, is electricity production 27 facilitated by Thermal Energy Generation Electricity System 1500 comprising heat turbine machine 1520. Heat turbine machine 1520 may comprise any impulse or reaction type heat turbine known to those skilled in the art which may include Curtis turbine, Rateau turbine, Brown-Curtis turbine, Parsons turbine or any other heat turbine with operation facilitated by vapor which may include dry vapor, flash vapor, a secondary vapor facilitated by a binary cycle heat exchange device, or any combination thereof, heat turbine machine. Thermal production 10-T flowing from producer well 1 20 is a heat sink carrier fluid flowing in thermal fluid gathering and combination system 700-T comprising an insulative pipe-in-pipe internal configuration of components and material with high thermally resistant material composition, main body insulator 1414 (not shown), which may prevent or at least minimize heat loss to lower temperature sources which may include the outside environment surrounding heat sink carrier fluid, thermal production 10-T, and may be described as a first heat transfer fluid whereby, a first heat transfer fluid is directed to secondary heat exchanger 1510, which may comprise a shell and tube type heat exchanger configuration which may include a Organic Rankine Cycle heat exchanger, or any other heat exchanger known to those skilled in the art comprising a second heat transfer fluid or vaporizer fluid 15 whereby, vaporizer fluid 15 may include any fluid with a lower boiling point than thermal production 10-T whereby, contact within secondary heat exchanger 1510 affects flash vaporization of vaporizer fluid 15 facilitated by the heat exchange process. Vaporizer fluid 15 exits secondary heat exchanger 1510 flowing in a closed loop configuration whereby, vaporizer fluid 15 flows to Thermal Energy Electricity Generation System 1500 comprising a thermal engine or heat turbine 1520 which includes a component assembly comprising a rotor assembly attached to a shaft connected to thermal energy electricity generator 1540 whereby, vaporizer fluid 15 contacts the rotor assembly within heat turbine 1520 with heat energy comprising vaporizer fluid 15 transferred facilitating rotation of the rotor assembly whereby, the connected shaft operates thermal electricity generator 1540 to generate electricity production 27 with vaporizer fluid 15 continuing in a closed-loop through primary condenser 1530 and again to secondary heat exchanger 1510 to continue the thermal energy electricity generation process. Thermal production 10-T upon exiting secondary heat exchanger 1510 is energy depleted by the heat exchange process transitioning thermal production 10-T to non-thermal production 10 whereby, non-thermal production 10 flows or may be pumped by fluid pump 1001 through a conduit attached to non-thermal fluid gathering and combination system 700, which may include a one way flow device or check valve 540 which prevents flow from non-thermal fluid gathering and combination system 700 into the conduit comprising check valve 540 whereby, non-thermal production 10 is joined with non-thermal production 10 comprised within non-thermal fluid gathering and combination system 700 and flowing to Hydropower Electricity Generation System 800 whereby, kinetic energy electricity production 27 facilitated by Hydropower Electricity Generation System 800 and thermal energy electricity production 27 facilitated by Thermal Energy Electricity Generation System 1500 are coproduced, with non-thermal production 10 continuing on to Phase 4—Fluid Processing, according to embodiments of the present disclosure. In Phase 4 Fluid Processing, non-thermal production 10, which may include other energy generating components, exits Hydropower Electricity Generation System 800 flowing in a conduit system, which may comprise components comprising non-thermal fluid gathering and combination system 700 whereby, non-thermal production 10 is directed to Fluid Processing System 900, which may include equipment and/or systems designed for the specific purpose of separating individual energy producing components comprised within non-thermal production 10 which may include, gas, oil, water, hydrogen, water comprising sodium chloride, and/or any other energy generation components which may be comprised within non-thermal production 10 whereby, non-thermal production 10 flows into each respective energy component separation processing system facilitating the separation of said components individually for energy generation whereby, when all energy producing components have been extracted, a fluid comprising primarily water remains with each respective energy producing component continuing on to Phase 5 Kinetic Energy/Chemical Energy Electricity Cogeneration and a fluid comprising primarily water continuing on to Phase 6 Fluid Pumping, Distribution, and Injection, according to embodiments of the present disclosure. In Phase 5 Kinetic Energy/Chemical Energy Electricity Cogeneration individual energy producing components have been removed from non-thermal production 10 whereby, each component may be identified individually and may include, for example, energy producing component 1 oil 10-*c*1, energy producing component 2 gas 10-*c*2, energy producing component 3 hydrogen 10-*c*3 (not shown), etc. whereby, for each energy producing component comprised within non-thermal production 10, an electricity generation system with the purpose of electricity production 27, facilitated by each specific energy producing component, may comprise Energy Production Facility 1800. For descriptive purposes only, without limiting the scope of the present disclosure, the foregoing description of Phase 5 Kinetic Energy/Chemical Energy Electricity Cogeneration, provides an example of energy producing component 2 gas 10-*c*2 flowing from Fluid Processing System 900 into a conduit directing energy producing component 2 gas 10-*c*2 to Chemical Energy Electricity Generation System 1600 comprising combustion chamber 1610, combustion turbine machine 1620 and compressor 1630. Concurrent with electricity production 27 generated by Hydropower Electricity Generation System 800, and by Thermal Energy Generation Electricity System 1500 is electricity production 27 facilitated by Chemical Energy Electricity Generation System 1600 comprising combustion chamber 1610, combustion turbine machine 1620 and compressor 1630 whereby, combustion turbine machine 1620 operates by a Brayton Cycle facilitated by air and/or some other vapor used as a working fluid, which may include energy producing component 2 gas 10-*c*2 whereby, compressor 1630 ambient air is drawn into compressor 1630 and pressurized with now pressurized air flowing into a conduit attached to combustion chamber 1610 and energy producing component 2 gas 10-*c*2 flowing from Fluid Processing System 900 into a conduit directing energy producing component 2 gas 10-*c*2 to combustion chamber 1610 whereby, energy producing component 2 gas 10-*c*2 is a fuel, mixed with pressurized air. The combustion phase may include diffusion flame combustion whereby, the fuel/air mixing and combustion take place simultaneously in the primary combustion zone producing a near-stoichiometric high temperature fuel/air mixture, or lean premix staged combustion where the fuel/air mixture is delivered to a secondary stage where the combustion reaction takes place. Heat sink carrier fluid, hot vapor 13*a*, produced within combustion chamber 1610, exits into a conduit attached to combustion turbine machine 1620 which includes a component assembly comprising a rotor assembly attached to a shaft connected to chemical energy electricity generator 1640 whereby, hot vapor 13*a* exits combustion chamber 1610 flowing in a closed loop configuration whereby, hot vapor 13*a* flows to combustion turbine machine 1620, which includes a component assembly comprising a rotor assembly attached to a shaft connected to chemical energy electricity generator 1640 whereby, hot vapor 13*a* contacts the rotor assembly within combustion turbine machine 1620 with heat energy comprising hot vapor 13*a* transferred facilitating rotation of the rotor assembly whereby, the connected shaft operates chemical energy electricity generator 1640 to generate electricity production 27, with hot vapor 13*a* exiting gas turbine 1620, continuing in a closed-loop through energy recovery heat exchanger 1710 whereby, energy recovery heat exchanger 1710 and continuing flow again back to combustion chamber 1610 to continue the chemical energy electricity generation process. Concurrent with electricity production 27 generated by Hydropower Electricity Generation System 800, Thermal Energy Generation Electricity System 1500 and Chemical Energy Electricity Generation System 1600 is electricity production 27 facilitated by Secondary Thermal Energy Electricity Generation System 1700 comprising energy recovery heat exchanger 1710, heat recovery turbine 1720 and secondary condenser 1730. Hot vapor 13*a* flowing in a closed-loop according to the aforementioned description may be described as a first heat transfer fluid whereby, a first heat transfer fluid is directed to energy recovery heat exchanger 1710, which may comprise a shell and tube type heat exchanger configuration which may include an Organic Rankine Cycle heat exchanger, or any other heat exchanger known to those skilled in the art comprising a second heat transfer fluid or secondary vaporizer fluid 13*b* whereby, secondary vaporizer fluid 13*b* may include any fluid with a lower boiling point than first heat transfer fluid, hot vapor 13*a* whereby, contact within energy recovery heat exchanger 1710 affects flash vaporization of secondary vaporizer fluid 13*b* facilitated by the heat exchange process. Secondary vaporizer fluid 13*b* exits energy recovery heat exchanger 1710 flowing in a closed loop configuration whereby, secondary vaporizer fluid 13*b* flows to heat recovery turbine 1720 which includes a component assembly comprising a rotor assembly attached to a shaft connected to secondary thermal energy generator 1740 whereby, secondary vaporizer fluid 13*b* contacts the rotor assembly within heat recovery turbine 1720 with heat energy comprising secondary vaporizer fluid 13*b* transferred facilitating rotation of the rotor assembly whereby, the connected shaft operates secondary thermal energy generator 1740 to generate electricity production 27 with secondary vaporizer fluid 13*b* continuing in a closed-loop through secondary condenser 1730 and again to energy recovery heat exchanger 1710 to continue the secondary thermal energy electricity generation process whereby, kinetic energy electricity production 27, facilitated by Hydropower Electricity Generation System 800 is coproduced together with chemical energy electricity production 27, facilitated by Chemical Energy Electricity Generation System 1600, and secondary energy electricity production 27, facilitated by Secondary Thermal Energy Electricity Generation System 1700, respectively, according to embodiments of the present disclosure. In Phase 6 Fluid Pumping, Distribution, and Injection a fluid comprising primarily water exits Fluid Processing System 900 flowing into one or a plurality of conduits and/or retention devices which may include water tank 908 which include one or a plurality of outlets which may include one or a plurality of non-thermal zone outlet(s) 909 and one or a plurality of thermal zone outlet(s) 909-T whereby, non-thermal injection zone fluid 11 is pumped with non-thermal zone injection pump 1001 into non-thermal zone fluid pumping, distribution and injection system 1000 into non-thermal injection tubing 901 for injection into non-thermal zones and thermal injection zone fluid 11-T is pumped with thermal zone injection pump 1001-T into thermal zone fluid pumping, distribution and injection system 1000-T into the annular space external to non-thermal injection tubing 901 for injection into thermal zones facilitating production again from non-thermal zone producer wells and thermal zone producer wells for continuous energy production, according to embodiments of the present disclosure.

Figure 51:
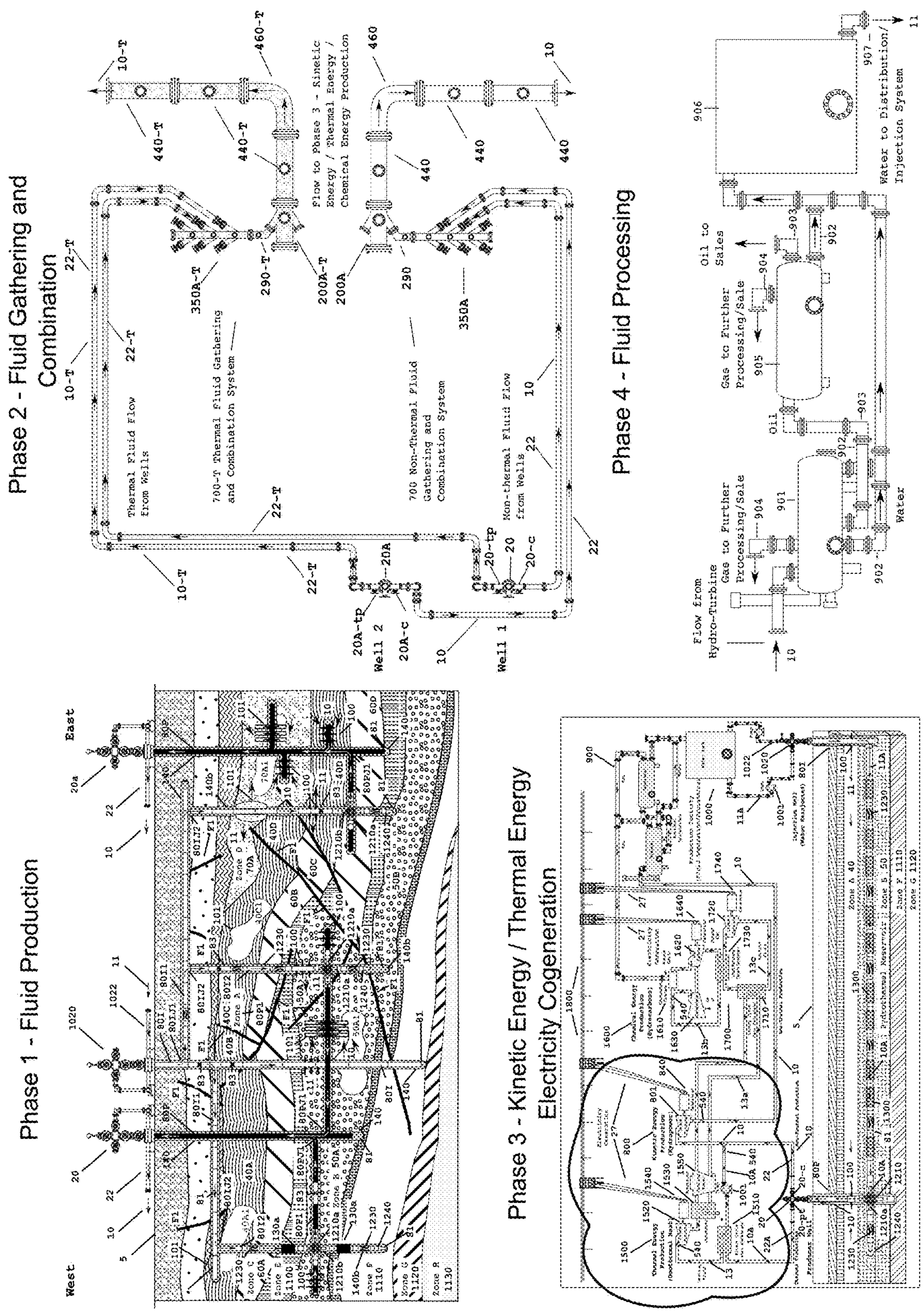
FIG. 51 and FIG. 52 depict the six (6) phases defining the methods, systems and apparatus, according to embodiments of the present disclosure.
Figure 52:
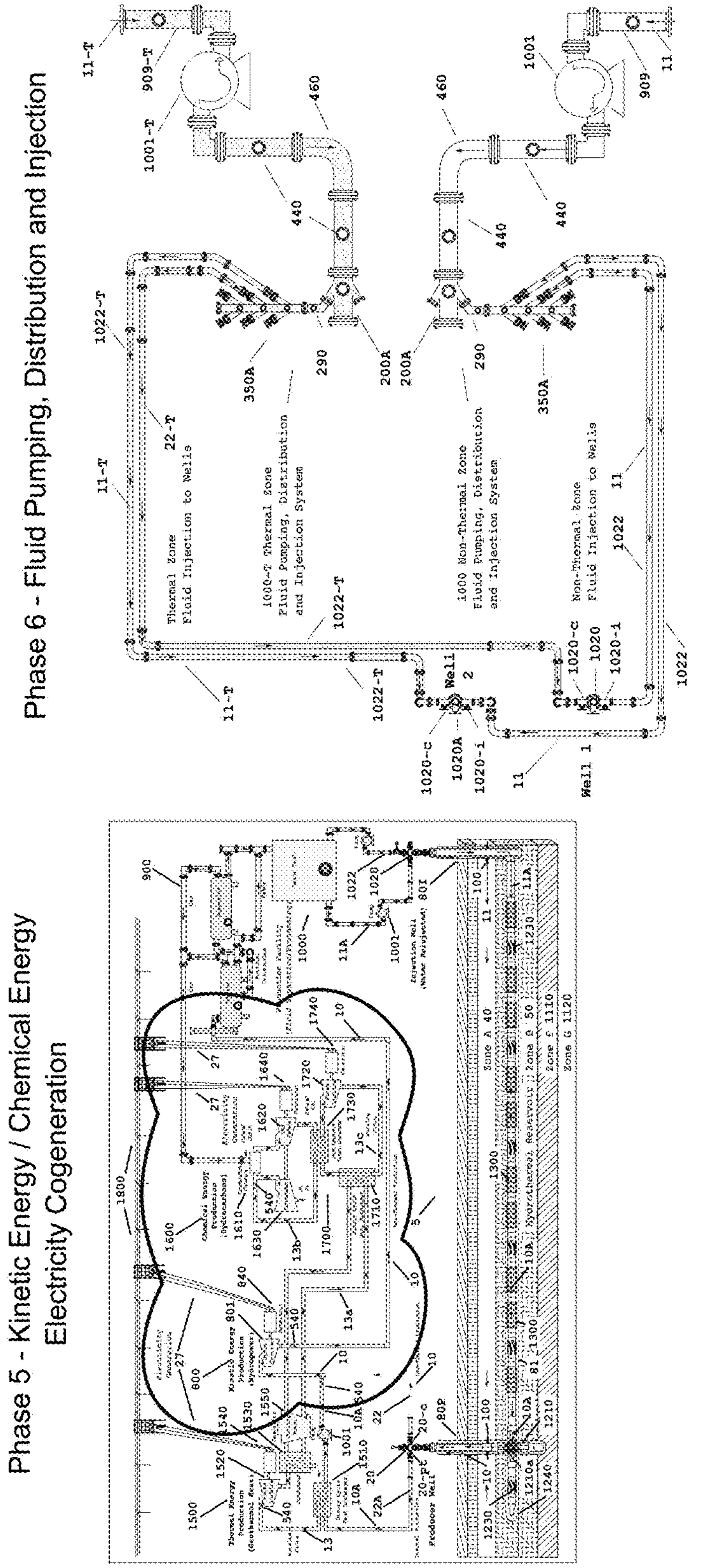

FIG. 51 and FIG. 52 illustratively depict the 6 Phase process of coproducing hydropower electricity generation concurrent with thermal energy electricity production, chemical energy electricity production, secondary recovery energy electricity production and any other energy electricity production, or any combination thereof, according to embodiments of the present disclosure.

Embodiments of the present disclosure may provide for the manufacture of components and/or apparatus by utilizing materials that increase corrosion resistance to potentially corrosive aqueous or gaseous components that may originate from subsurface wells. Accordingly, use of corrosion resistant materials for applications whereby fluid exposure from highly corrosive components is anticipated, a preferred material utilized for component manufacture may contain primarily Ni—Fe—Cr—Mo—Cu—W alloy composition or specific combinations of these components, whereby certain combinations provide optimized and/or improved corrosion resistance. Austenitic Ni-base alloys grouped together as Ni—Cr—Mo alloys offer outstanding corrosion-resistance in a range desired for severe corrosive environments. Table 1 below defines alloys within this group.

TABLE 1

| | | Composition wt. % (values denoted with * are maxima, and ** minima) | | | | | | | | | | | |
|---|---|---|---|---|---|---|---|---|---|---|---|---|---|
| Group | Alloy | Ni | Cu | Mo | Cr | Fe | W | Mn | Si | C | Al | Ti | Other |
| Ni—Cr—Mo | C-4 | 65 | 0.5* | 16 | 16 | 3* | — | 1* | 0.08* | 0.01* | — | 0.7* | — |
| | C-22 | 56 | 0.5* | 13 | 22 | 3 | 3 | 0.5* | 0.08* | 0.01* | — | — | V 0.35* |
| | C-22HS | 61 | 0.5* | 17 | 21 | 2* | 1* | 0.8* | 0.08* | 0.01* | 0.5** | — | — |
| | C-276 | 57 | 0.5* | 16 | 16 | 5 | 4 | 1* | 0.08* | 0.01* | — | — | V 0.35* |
| | C-2000 | 59 | 1.6 | 16 | 23 | 3* | — | 0.5* | 0.08* | 0.01* | 0.5* | — | — |
| | 59 | Bal. | — | 16 | 23 | 1.5* | — | 0.5* | 0.01* | 0.01* | 0.25 | — | — |
| | 686 | Bal. | — | 16 | 21 | 5* | 3.7 | 0.75* | 0.08* | 0.01* | — | 0.15 | — |
| | CW-2M | Bal. | — | 16.25 | 16.25 | 2* | 1* | 1* | 0.8* | 0.02* | — | — | — |
| | CW-6M | Bal. | — | 18.5 | 18.5 | 3* | — | 1* | 1* | 0.07* | — | — | — |
| | CW-12MW | Bal. | — | 17 | 16.5 | 6 | 4.5 | 1* | 1* | 0.12* | — | — | V 0.3 |
| | CX-2MW | Bal. | — | 13.5 | 21.5 | 4 | 3 | 1* | 0.8* | 0.02* | — | — | V 0.35* |

To manufacture according to embodiments of the present disclosure including corrosion resistant materials that may contain primarily Ni—Fe—Cr—Mo—Cu—W alloy composition, two such Ni-base alloys are preferred. HASTELLOY® alloy C-276 and INCONEL® alloy 686, respectively, with preferred nickel-base alloy composition containing in percent by weight, 54%-60% nickel, 14.5%-16.5% chromium, 15%-17% molybdenum, 4%-7% iron and a maximum of 0.1% carbon and of 1% silicon for alloy C-276 and at least 19% chromium and at least 14% molybdenum, together with at least 1.5% tungsten with more preferred ranges being about 20%-23% chromium, 14.25%-16% molybdenum and 25%-4% tungsten for alloy 686. HASTELLOY® C-276 was the first wrought, nickel-chromium molybdenum material to alleviate concerns over welding resulting from extremely low carbon and silicon contents. With its high chromium and molybdenum contents, it can withstand both oxidizing and non-oxidizing acids and exhibits outstanding resistance to pitting and crevice attack in the presence of chlorides and other halides. Furthermore, it is very resistant to sulfide stress cracking and stress corrosion cracking in sour $H_2S$ environments. INCONEL® alloy 686 is a single-phase, austenitic Ni—Cr—

Mo—W alloy offering outstanding corrosion-resistance in a range of severe environments. Its high Ni and Mo provide good resistance to reducing conditions, and high Cr resists oxidizing media. Mo and W aid resistance to localized corrosion such as pitting whereby resistance to general pitting and crevice corrosion increases with alloying Cr+Mo+W. Low carbon helps minimize grain boundary precipitation to maintain corrosion-resistance in the heat-affected zones of welded joints. Ni-base alloys, such as HASTELLOY® C-276 and INCONEL® alloy 686, combine high strength and corrosion resistance in highly corrosive environments consistent with some environments whereby fluids originate from subsurface wells and may be comprised primarily of carbon dioxide, hydrogen sulfide, saltwater and/or other salt-based corrosive components or any combination of these components. As subsequently stated, for apparatus and/or component anticipated exposure to fluids containing highly corrosive elements, Ni-base alloys, primarily HASTELLOY® C-276 and/or INCONEL® alloy 686 are preferred materials; however, fluids originating from subterranean zones are diverse, whereby some zones may contain highly corrosive fluids and others may not, whereby each application is unique and will require investigative analysis for determination of the presence of and/or severity of potentially corrosive fluids that may be contained therein.

Embodiments of the present disclosure may include components manufactured with metals comprising carbon steel, corrosive resistant carbon steel, martensitic stainless steel, martensitic ferritic stainless steel, duplex stainless steel, nickel alloys, nickel iron, nickel chrome, nickel copper, nickel molybdenum alloys, titanium and titanium alloys or other metals presently used for components and/or apparatus manufacture and/or to mitigate corrosion, erosion and cavitation component damage specific to the hydropower industry.

Descriptive processes for attachment of secondary components to primary components, attachment of connective unions, and the like, may refer to a singular process, as for example, fusing a body to another by means of heat, pressure or both forming a join as the parts cool, known as a welded joint, does not infer that this is the only means of attachment of one body to another as other connective means are possible, or that assembly requires attachment of one body to another, as manufacturing processes include fabrication means of transforming solid bodies of materials into components with a variety of shapes and sizes, as for example, a solid block fitting with a general polyhedral configuration or elongated, solid rectangular shape, could be transformed into a tubular body with a cylindrical shape, with bores drilled through or into the body for fluid passage, as opposed to component assembly by welded joint attachment.

The embodiment may receive fluid from a plurality of inlets and combine the fluid for further processing of combined fluid flow, as in an example of receiving fluid flow or production from one or more producing wells, if utilized in a Gathering and Combination System, or the embodiment my disburse fluid flow into a plurality of outlets, as in an example of pumped fluid flow into one or more injection wells, if utilized in a Pumping, Distribution and Injection System. The embodiments described are multi-purpose and can be utilized in Phase 2—Fluid Gathering and Combination System and/or Phase 6—Fluid Pumping, Distribution and Injection System.

The fluid conduit system comprises a variety of components that include sections of straight pipe and various fittings such as tees, crosses, laterals and wyes, which provide junctions at which flow is split or combined. In addition to junction fittings, fluid flow components include fittings, which are used to alter the course of fluid flow such as directional fittings that include elbows of various angles, or other such fittings used for flow direction modification.

It should be appreciated that pressured fluid flow requires a continuous conduit to contain the pressure and fluids within the body or conduit, therefore body attachment may be permanent, as in for example, a welded body or connection, or may be by other means, as for example, a connection union with seals to contain the pressure and fluids within the body, and also may include expansion and contraction control components or flexible joints used due to pressurized fluid movement, and gauges and other monitoring equipment, as well as control devices such as shut-off, plug, check, throttle, pressure release, butterfly, ball, and choke valves.

Methods of joining pipe together typically are performed by three main methods which include welding pipe, using screwed connections with a threaded pin connection inserted into a threaded box connection, or through the use of flanged joint connections. One or any combination of these means of attachment may be utilized for the described embodiment. Additionally, means of joining components may refer to welded connections by fusing one body to another and component and apparatus connection may be through attachment or connection by means of a connective union that has been fused or welded to a body to permit the connection union of one body to be attached to or connected to the connection union of another body. Connection unions allow the components to be connected and disconnected relatively quickly whereby that could be viewed as a benefit applicable to assembly time associated with a particular installation and therefore are discussed herein, accordingly, with the understanding that other means of connection by welding, screwing or through the use of flanged-type connections may also be utilized. Though spoken of in terms that may imply unions are discreet components, connection unions are interconnected subassemblies of the components joined by the union. Flange-type unions many be assembled or disassembled with relative ease. The basic design is robust and reliable, and like other fluid flow components, they are manufactured from materials adapted to pressurized fluid flow with pressures ranging from low (1,000 to 2,000 psi), medium pressure (2,000 to 4,000 psi) and high pressure (4,000 to 20,000 psi). Flange-type unions, as implied, typically provide a connection between two flanged components. Annular flanges extend radially outward from each end thus providing the appearance of a spool. The flanges provide flat surfaces or faces which allow two components to mate at their flanges. Though what may be described as "flat" herein, union faces typically will have a very slight annular boss extending upwards around the opening of the bore. The annular boss will help ensure that the abutment between mating union faces is properly loaded when two unions are joined together. The designs and features of union faces, in particular and flange unions in general, are well known, however, the connection unions, as disclosed herein, may be varied in accordance with common practice in the art.

Connection unions are also provided with a number of bolt holes. The holes are arranged angularly around the union face and may be holes that are threaded to accept standing bolts or other threaded connectors or alternately holes may be adapted to receive threaded studs or bolts, depending upon the union component selected for component connection, as shown in the following descriptive embodiments. Each connection union may have an annular groove running concentrically around the pipe opening or union face. An annular metal seal and/or seal of elastomeric composition or any combination thereof, may be carried in the groove to provide a seal between joined union faces or connection unions.

Illustrative descriptions herein may reference a particular type of turbine and/or apparatus which may comprise an electricity generation facility within the discussion for ease of discussion. Without limiting the scope of the present disclosure, it is to be understood that the present disclosure is not limited in its application to the details specifically referencing use of a particular type of turbine and/or apparatus which may comprise an electricity generation facility. Use of any type of turbine and/or apparatus which may comprise an electricity generation facility used for the purpose of electricity generation known to those skilled are equally applicable. The foregoing illustrative description is intended for ease of understanding related to a generic fluid processing method and apparatus. Fluid processing is complex and can include multiple stages of separation for liquid fluids separate from multiple stages of processing fluid to separate individual energy producing components which may comprise a fluid, and/or to separate impurities which may also comprise a fluid based upon fluid properties and/or impurities present within the fluid composition.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Also, it is to be understood that phraseology and terminology used herein with reference to the elements (such as, for example, terms like “inlet pipe”, could refer to “well casing”, “production tubing”, “flow line”, or “pipeline”, “outlet pipe”, could refer to “discharge line”, “distribution pipe” or “distribution pipeline”, “injection flow line”, “strata” could refer to “pool”, “layer”, “zone”, “reservoir”, and the like), and are only used to simplify description herein, and do not alone indicate or imply that the device or element referred must be limited to those elements. Finally, it is understood the location of each embodiment described in FIGS. 1-50, can be located at the surface of earth 5, if on land, or the subsea surface, a fixed structure attached to the subsea surface, or a floating structure, if in or on water. Accordingly, the appended claims are intended to include within their scope such processes, machines, manufacture, compositions of matter, means, methods, or steps.

The invention claimed is:

1. A system for generating electric power from subsurface wells comprising:

a plurality of wells penetrating or terminating in at least one fluid-bearing subterranean zone, wherein the at least one fluid-bearing subterranean zone contains water as a primary fluid, wherein the plurality of wells extract fluid from one or more subterranean zones, strata, or reservoirs;

a fluid gathering network configured to combine fluid produced from the plurality of wells;

at least one energy generation apparatus configured to generate electricity from kinetic energy of the produced fluid;

at least one processing apparatus configured to separate the produced fluid into component parts for subsequent combustion, chemical energy generation, or production of energy from the at least one energy producing apparatus;

at least one secondary energy generation apparatus configured to generate electricity from at least one of: thermal energy contained in the produced fluid and chemical energy derived from components contained in the produced fluid;

a heat exchange apparatus that extracts geothermal heat from the produced fluid to generate additional electricity, wherein the heat exchange apparatus is configured with carbon fiber reinforced polymer conduits to reduce thermal losses and corrosion in high-salinity environments; and a fluid distribution network configured to direct processed fluid to at least one injection well for reinjection into the at least one fluid-bearing subterranean zone, thereby creating a continuous flow loop between producing wells and injection wells.

2. The system of claim 1 further comprising:

a multi-stage energy extraction system formed of the at least one energy generation apparatus and the at least one secondary energy generation apparatus, the extraction system configured to: generate electricity from pressure and flow of the produced fluid; extract thermal energy from the produced fluid for electricity generation; separate valuable energy-producing components from the produced fluid; and generate additional electricity from the separated energy-producing components.

3. The system of claim 2 further comprising:

a fluid processing system configured to treat the produced fluid after energy extraction, wherein the fluid processing system is configured to extract at least one valuable mineral component selected from the group consisting of: lithium, magnesium, zinc, nickel, neodymium, dysprosium, platinum, and palladium.

4. The system of claim 1, wherein the subsurface wells are configured as vertical, inclined at any angle between vertical and horizontal, horizontal, lateral, and/or multilateral wells to maximize subsurface zone contact and enhance fluid production rates.

5. The system of claim 1, wherein the at least one fluid-bearing subterranean zone comprises a plurality of subterranean zones and wherein the plurality of wells are configured to produce fluid from the plurality of subterranean zones simultaneously.

6. The system of claim 1, wherein the at least one secondary energy generation apparatus is selected from the following: a binary cycle power plant configured to generate electricity from thermal energy contained in the produced fluid having temperatures between 90° C. and 182° C., a flash steam power plant configured to generate electricity from thermal energy contained in the produced fluid having temperatures above 182° C., and/or a hydrocarbon processing system configured to generate electricity from hydrocarbon components contained in the produced fluid.

7. The system of claim 1, wherein the system integrates with a combined cycle power plant to utilize waste heat for additional power generation.

8. The system of claim 1, wherein reinjection comprises automated flow control valves designed to maintain optimal reservoir pressure for continuous geothermal and hydrothermal energy production.

9. The system of claim 1 further comprising:

a network of interconnected pipes within the at least one fluid-bearing subterranean zone, wherein the network of interconnected pipes creates continuous flow paths between producing wells and injection wells.

10. The system of claim 1, wherein the system includes sensors to monitor well pressure, temperature, and salinity levels to optimize fluid production rates and maximize energy recovery efficiency.

11. A method for generating electric power from subsurface wells comprising:

producing fluid from a plurality of wells penetrating or terminating in at least one fluid-bearing subterranean zone, wherein the at least one fluid-bearing subterranean zone contains water as a primary fluid;

gathering and combining the produced fluid from the plurality of wells;

generating electricity from kinetic energy of the produced fluid;

processing the produced fluid to separate component parts;

generating electricity from thermal energy contained in the produced fluid and chemical energy derived from components contained in the produced fluid; and distributing the processed fluid to at least one injection well for reinjection into the at least one fluid-bearing subterranean zone, thereby creating a pressure-driven continuous flow loop between producing wells and injection wells.

12. The method of claim 11, wherein at least one of the plurality of wells is an existing well previously used for hydrocarbon production and produces water as a primary fluid, wherein the existing well is modified to optimize fluid production and connected to an energy generation system to perform the generating step.

13. The method of claim 11, wherein generating electricity from kinetic energy comprises directing the produced fluid through at least one turbine.

14. The method of claim 11, wherein generating electricity from thermal energy comprises directing the produced fluid through a binary cycle power plant when the produced fluid has temperatures between 90° C. and 182° C. and/or directing the produced fluid through a flash steam power plant when the produced fluid has temperatures above 182° C.

15. The method of claim 11, wherein generating electricity from chemical energy comprises processing hydrocarbon components contained in the produced fluid.

16. The method of claim 11 further comprising:

creating a network of interconnected pipes within the at least one fluid-bearing subterranean zone to establish continuous flow paths between producing wells and injection wells.

* * * * *